US011095703B2

(12) United States Patent
Oh et al.

(10) Patent No.: US 11,095,703 B2
(45) Date of Patent: Aug. 17, 2021

(54) APPARATUSES AND METHODS FOR TRANSMITTING OR RECEIVING A BROADCAST CONTENT VIA ONE OR MORE NETWORKS

(71) Applicant: LG ELECTRONICS INC., Seoul (KR)

(72) Inventors: Sejin Oh, Seoul (KR); Jangwon Lee, Seoul (KR); Woosuk Ko, Seoul (KR); Sungryong Hong, Seoul (KR); Woosuk Kwon, Seoul (KR); Kyoungsoo Moon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/413,042

(22) Filed: May 15, 2019

(65) Prior Publication Data

US 2019/0268397 A1    Aug. 29, 2019

Related U.S. Application Data

(63) Continuation of application No. 15/104,418, filed as application No. PCT/KR2015/000295 on Jan. 12, 2015, now Pat. No. 10,326,816.

(Continued)

(51) Int. Cl.
*H04L 29/06* (2006.01)
*H04N 21/236* (2011.01)
(Continued)

(52) U.S. Cl.
CPC .......... *H04L 65/608* (2013.01); *H04H 20/18* (2013.01); *H04H 60/82* (2013.01); *H04L 65/1003* (2013.01); *H04L 65/4076* (2013.01); *H04L 67/02* (2013.01); *H04N 21/236* (2013.01); *H04N 21/2362* (2013.01);
(Continued)

(58) Field of Classification Search
None
See application file for complete search history.

(56) References Cited

U.S. PATENT DOCUMENTS 9,954,717 B2 * 4/2018 Giladi ................ H04L 65/608
2007/0118850 A1   5/2007 Bertin
(Continued)

FOREIGN PATENT DOCUMENTS

CN    103109540 A    5/2013
CN    103155584 A    6/2013
(Continued)

*Primary Examiner* — Fernando Alcon
(74) *Attorney, Agent, or Firm* — Birch, Stewart, Kolasch & Birch, LLP

(57) ABSTRACT

The present invention provides an apparatus for receiving a broadcast content via one or more networks. The apparatus comprises a broadcast network interface for receiving broadcast streams including first protocol packets including first portions of the broadcast content via a broadcast network, a heterogeneity network interface for receiving second protocol packets including a second portion of the broadcast content via a heterogeneity network, and a processor for configuring the broadcast content using the first protocol packets and the second protocol packets based on information included in the third protocol packets.

8 Claims, 58 Drawing Sheets

Related U.S. Application Data

(60) Provisional application No. 61/970,908, filed on Mar. 27, 2014, provisional application No. 61/948,522, filed on Mar. 5, 2014, provisional application No. 61/932,808, filed on Jan. 29, 2014, provisional application No. 61/926,938, filed on Jan. 13, 2014.

(51) Int. Cl.

| | | |
|---|---|---|
| *H04N 21/2381* | (2011.01) | |
| *H04N 21/242* | (2011.01) | |
| *H04N 21/2362* | (2011.01) | |
| *H04N 21/2383* | (2011.01) | |
| *H04H 20/18* | (2008.01) | |
| *H04H 60/82* | (2008.01) | |
| *H04N 21/845* | (2011.01) | |
| *H04L 29/08* | (2006.01) | |
| *H04N 21/6437* | (2011.01) | |
| *H04N 21/647* | (2011.01) | |
| *H04N 21/854* | (2011.01) | |
| *H04N 21/8547* | (2011.01) | |

(52) U.S. Cl.
CPC ..... *H04N 21/2381* (2013.01); *H04N 21/2383* (2013.01); *H04N 21/242* (2013.01); *H04N 21/6437* (2013.01); *H04N 21/64707* (2013.01); *H04N 21/8456* (2013.01); *H04N 21/8547* (2013.01); *H04N 21/85403* (2013.01)

(56) References Cited

U.S. PATENT DOCUMENTS

| | | | |
|---|---|---|---|
| 2007/0153827 A1 | 7/2007 | Lee | |
| 2009/0055417 A1 | 2/2009 | Hannuksela | |
| 2010/0100917 A1 | 4/2010 | Chiao et al. | |
| 2010/0189256 A1 | 7/2010 | Doehla et al. | |
| 2011/0066746 A1 | 3/2011 | Bennett et al. | |
| 2011/0083155 A1 | 4/2011 | De Nijs et al. | |
| 2012/0259994 A1* | 10/2012 | Gillies | H04L 65/4076 709/231 |
| 2013/0016282 A1 | 1/2013 | Kim et al. | |
| 2013/0111520 A1* | 5/2013 | Lo | H04L 67/306 725/35 |
| 2013/0125187 A1 | 5/2013 | Kim et al. | |
| 2013/0335629 A1 | 12/2013 | Laurent et al. | |
| 2014/0019587 A1* | 1/2014 | Giladi | H04L 65/602 709/217 |
| 2014/0156865 A1* | 6/2014 | Giladi | H04L 65/4084 709/231 |
| 2014/0344884 A1 | 11/2014 | Kitahara et al. | |
| 2015/0100996 A1* | 4/2015 | Freeman | H04N 21/8455 725/110 |

FOREIGN PATENT DOCUMENTS

| | | |
|---|---|---|
| EP | 2597870 A2 | 5/2013 |
| EP | 2793479 A1 | 10/2014 |
| JP | 2011-525322 A | 9/2011 |
| JP | 5334335 B2 | 11/2013 |
| JP | 2013-545355 A | 12/2013 |
| WO | WO 2013/089437 A1 | 6/2013 |
| WO | WO 2013/099101 A1 | 7/2013 |

\* cited by examiner

| Content | Bits |
|---|---|
| PHY_PROFILE | 3 |
| FFT_SIZE | 2 |
| GI_FRACTION | 3 |
| EAC_FLAG | 1 |
| PILOT_MODE | 1 |
| PAPR_FLAG | 1 |
| FRU_CONFIGURE | 3 |
| RESERVED | 7 |

FIG. 13

| Content | Bits |
|---|---|
| PREAMBLE_DATA | 20 |
| NUM_FRAME_FRU | 2 |
| PAYLOAD_TYPE | 3 |
| NUM_FSS | 2 |
| SYSTEM_VERSION | 8 |
| CELL_ID | 16 |
| NETWORK_ID | 16 |
| SYSTEM_ID | 16 |
| for i = 0:3<br>    FRU_PHY_PROFILE<br>    FRU_FRAME_LENGTH<br>    FRU_GI_FRACTION<br>    RESERVED<br>end | <br>3<br>2<br>3<br>4 |
| PLS2_FEC_TYPE | 2 |
| PLS2_MOD | 3 |
| PLS2_SIZE_CELL | 15 |
| PLS2_STAT_SIZE_BIT | 14 |
| PLS2_SYN_SIZE_BIT | 14 |
| PLS2_REP_FLAG | 1 |
| PLS2_REP_SIZE_CELL | 15 |
| PLS2_NEXT_FEC_TYPE | 2 |
| PLS2_NEXT_MODE | 3 |
| PLS2_NEXT_REP_FLAG | 1 |
| PLS2_NEXT_REP_SIZE_CELL | 15 |
| PLS2_NEXT_REP_STAT_SIZE_BIT | 14 |
| PLS2_NEXT_REP_DYN_SIZE_BIT | 14 |
| PLS2_AP_MODE | 2 |
| PLS2_AP_SIZE_CELL | 15 |
| PLS2_NEXT_AP_MODE | 2 |
| PLS2_NEXT_AP_SIZE_CELL | 15 |
| RESERVED | 32 |
| CRC 32 | 32 |

FIG. 14

| Content | Bits |
|---|---|
| FIC_FLAG | 1 |
| AUX_FLAG | 1 |
| NUM_DP | 6 |
| for i = 1 : NUM_DP | |
|     DP_ID | 6 |
|     DP_TYPE | 3 |
|     DP_GROUP_ID | 8 |
|     BASE_DP_ID | 6 |
|     DP_FEC_TYPE | 2 |
|     DP_COD | 4 |
|     DP_MOD | 4 |
|     DP_SSD_FLAG | 1 |
|     if PHY_PROFILE = '010' | |
|         DP_MIMO | 3 |
|     end | |
|     DP_TI_TYPE | 1 |
|     DP_TI_LENGTH | 2 |
|     DP_TI_BYPASS | 1 |
|     DP_FRAME_INTERVAL | 2 |
|     DP_FIRST_FRAME_IDX | 5 |
|     DP_NUM_BLOCK_MAX | 10 |
|     DP_PAYLOAD_TYPE | 2 |
|     DP_INBAND_MODE | 2 |
|     DP_PROTOCOL_TYPE | 2 |
|     DP_CRC_MODE | 2 |
|     if DP_PAYLOAD_TYPE == TS('00') | |
|         DNP_MODE | 2 |
|         ISSY_MODE | 2 |
|         HC_MODE_TS | 2 |
|         if HC_MODE_TS == '01' or '10' | |
|             PID | 13 |
|         end | |
|     if DP_PAYLOAD_TYPE == IP('01') | |
|         HC_MODE_IP | 2 |
|     end | |
|     RESERVED | 8 |
| end | |
| if FIC_FLAG == 1 | |
|     FIC_VERSION | 8 |
|     FIC_LENGTH_BYTE | 13 |
|     RESERVED | 8 |
| end | |
| if AUX_FLAG == 1 | |
|     NUM_AUX | 4 |
|     AUX_CONFIG_RFU | 8 |
|     for - 1 : NUM_AUX | |
|         AUX_STREAM_TYPE | 4 |
|         AUX_PRIVATE_CONF | 28 |
|     end | |
| end | |

| Content | | Bit |
|---|---|---|
| FRAME_INDEX | | 5 |
| PLS_CHANGE_COUNTER | | 4 |
| FIC_CHANGE_COUNTER | | 4 |
| RESERVED | | 16 |
| for i = 1 : NUM_DP | | |
| | DP_ID | 6 |
| | DP_START | 15 (or13) |
| | DP_NUM_BLOCK | 10 |
| end | RESERVED | 8 |
| EAC_FLAG | | 1 |
| EAS_WAKE_UP_VERSION_NUM | | 8 |
| if EAC_FLAG == 1 | | |
| | EAC_LENGTH_BYTE | 12 |
| else | | |
| | EAC_COUNTER | 12 |
| end | | |
| for i=1:NUM_AUX | | |
| | AUX_PRIVATE_DYN | 48 |
| end | | |
| CRC 32 | | 32 |

FIG. 25
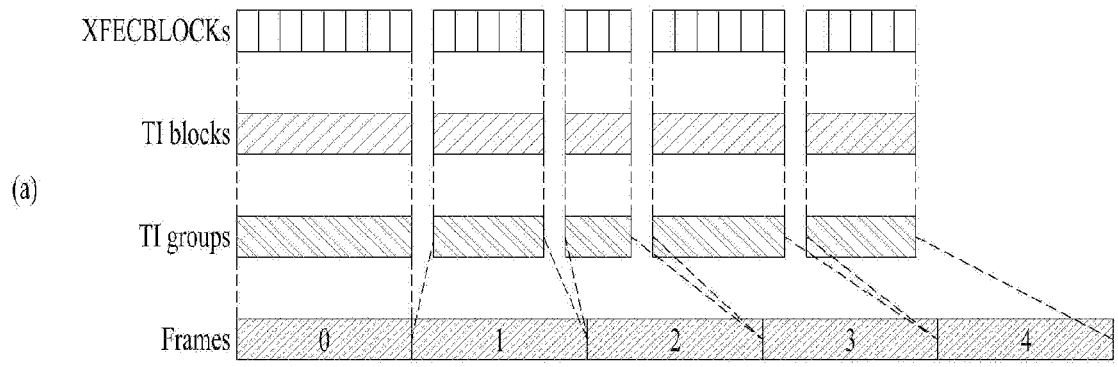
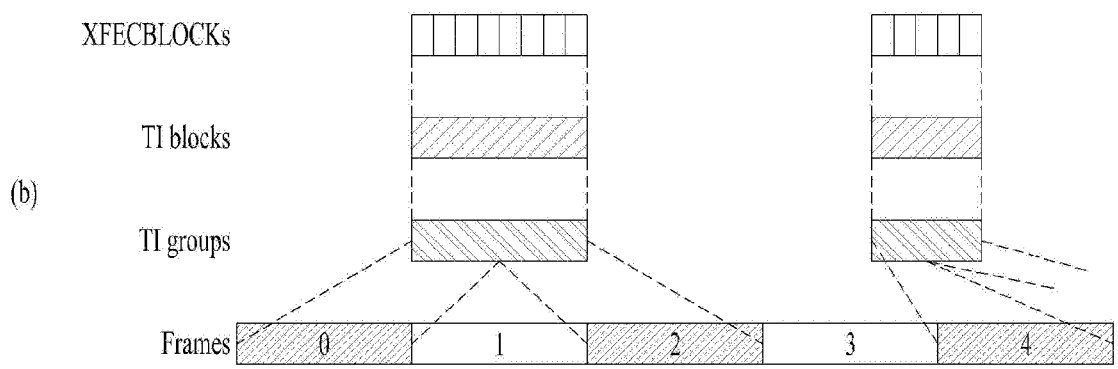
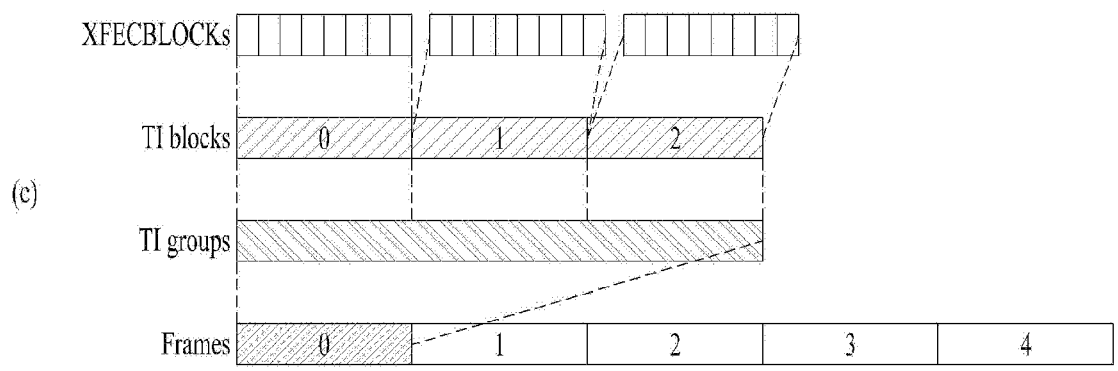

FIG. 29

FIG. 31
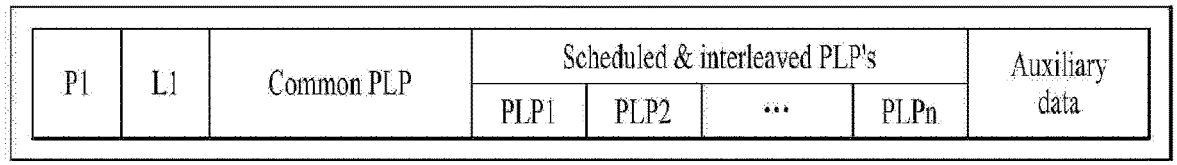
FIG. 32
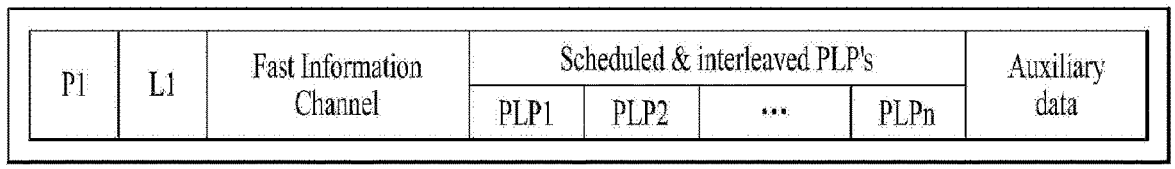
FIG. 33
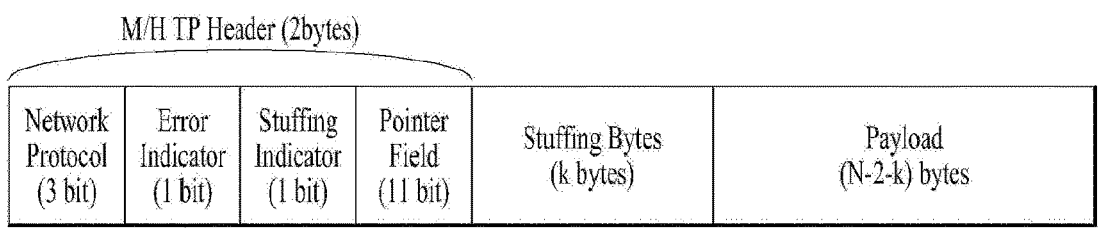
FIG. 34
| network_protocol Value | Meaning |
|---|---|
| 000 | IPv4 (conforming to RFC STD05 [5]) |
| 001-110 | ATSC reserved |
| 111 | framed_packet_type, as defined in Table 6.3 |

FIG. 38

| Syntax | No. of Bits | Format |
|---|---|---|
| service_map_table_section() { | | |
|    table_id | 8 | 0xDB |
|    section_syntax_indicator | 1 | '0' |
|    private_indicator | 1 | '1' |
|    reserved | 2 | '11' |
|    section_length | 12 | uimsbf |
|    table_id_extension { | | |
|       SMT_protocol_version | 8 | uimsbf |
|       reserved | 8 | uimsbf |
|    } | | |
|    reserved | 2 | '11' |
|    version_number | 5 | uimsbf |
|    current_next_indicator | 1 | bslbf |
|    section_number | 8 | uimsbf |
|    last_section_number | 8 | uimsbf |
|    num_services | 8 | uimsbf |
|    for (i=0; i<num_services; i++) | | |
|    { | | |
|       service_id | 16 | uimsbf |
|       reserved | 2 | '11' |
|       service_status | 2 | uimsbf |
|       SP_indicator | 1 | bslbf |
|       short_service_name_length /* m */ | 3 | uimsbf |
|       short_service_name | 16*m | bslbf |
|       reserved | 2 | '11' |
|       service_category | 6 | uimsbf |
|       reserved | 3 | '111' |
|       num_components | 5 | uimsbf |
|       for (j=0; j<num_components; j++) | | |
|       { | | |
|          essential_component_indicator | 1 | bsblf |
|          reserved | 3 | '111' |
|          num_component_level_descriptors | 4 | uimsbf |
|          for (k=0; k<num_component_level_descriptors; k++) | | |
|          { | | |
|             component_level_descriptor() | var | |
|          } | | |
|       } | | |
|       reserved | 4 | '111' |
|       num_service_level_descriptors | 4 | uimsbf |
|       for (m=0; m<num_service_level_descriptors; m++) | | |
|       { | | |
|          service_level_descriptor() | var | |
|       } | | |
|    } | | |
| } | | |

FIG. 39

| service_category | Meaning |
|---|---|
| 0x00 | The service category is not specified |
| 0x01 | Basic TV |
| 0x02 | Basic Radio |
| 0x03 | RI service – Rights Issuer service |
| 0x04 | Not specified by the current version of this standard. |
| 0x05 | Not specified by the current version of this standard. |
| 0x06 | Not specified by the current version of this standard. |
| 0x07 | Data Service |
| 0x08 | Service Guide – Service Guide (Announcement) |
| 0x09 | Emergency Alerting |
| 0x0A | Not specified by the current version of this standard. |
| 0x0B ~ 0xFF | Reserved for future use. |

FIG. 40

| Syntax | No. of Bits | Format |
|---|---|---|
| service_map_table_section() { | | |
|     table_id | 8 | 0xDB |
|     section_syntax_indicator | 1 | '0' |
|     private_indicator | 1 | '1' |
|     reserved | 2 | '11' |
|     section_length | 12 | uimsbf |
|     table_id_extension { | | |
|         SMT_protocol_version | 8 | uimsbf |
|         reserved | 8 | uimsbf |
|     } | | |
|     reserved | 2 | '11' |
|     version_number | 5 | uimsbf |
|     current_next_indicator | 1 | bslbf |
|     section_number | 8 | uimsbf |
|     last_section_number | 8 | uimsbf |
|     num_services | 8 | uimsbf |
|     for (i=0; i<num_services; i++) | | |
|     { | | |
|         service_id | 16 | uimsbf |
|         reserved | 2 | '11' |
|         service_status | 2 | uimsbf |
|         SP_indicator | 1 | bslbf |
|         short_service_name_length /* m */ | 3 | uimsbf |
|         short_service_name | 16*m | bslbf |
|         reserved | 2 | '11' |
|         service_category | 6 | uimsbf |
|         reserved | 3 | '111' |
|         num_components | 5 | uimsbf |
|         for (j=0; j<num_components; j++) | | |
|         { | | |
|             essential_component_indicator | 1 | bsblf |
|             reserved | 3 | '111' |
|             num_component_level_descriptors | 4 | uimsbf |
|             for (k=0; k<num_component_level_descriptors; k++) | | |
|             { | | |
|                 component_level_descriptor() | var | |
|             } | | |
|         } | | |
|         reserved | 4 | '111' |
|         num_service_level_descriptors | 4 | uimsbf |
|         for (m=0; m<num_service_level_descriptors; m++) | | |
|         { | | |
|             service_level_descriptor() | var | |
|         } | | |
|     reserved | 4 | '1111' |
|     num_ensemble_level_descriptors | 4 | uimsbf |
|     for (n=0; n<num_ensemble_level_descriptors; n++) | | |
|     { | | |
|         ensemble_level_descriptor() | var | |
|     } | | |
| } | | |

| Syntax | No. of bits | Format |
|---|---|---|
| targeting_descriptor(){ | | |
|     descriptor_tag | 8 | uimsbf |
|     descriptor_length | 8 | uimsbf |
|     target_device | 8 | uimsbf |
| } | | |

FIG. 59

| Syntax | No. Bits | Format |
|---|---|---|
| timeline_component_AU{ | | |
|   identifier | 8 | TBD |
|   AU_length | 32 | uimsbf |
|   location_flag | 1 | bslbf |
|   origin_timestamp_flag | 1 | bslbf |
|   timestamp_version | 1 | bslbf |
|   timestamp_type | 1 | bslbf |
|   timestamp_format | 4 | bslbf |
|   if(location_flag){ | | |
|     location_length /*M*/ | 8 | uimsbf |
|     location | 8*M | |
|   } | | |
|   if(origin_timestamp_flag){ | | |
|     origin_timestamp_version | 1 | bslbf |
|     origin_timestamp_type | 1 | uimsbf |
|     origin_timestamp_format | 4 | uimsbf |
|     origin_location_flag | 1 | bslbf |
|     reserved | 1 | |
|     if(origin_location_flag){ | | |
|       origin_location_length /*L*/ | 8 | uimsbf |
|       origin_location | 8*L | |
|     } | | |
|     if(origin_timestamp_format==0x00){ | | |
|       origin_timescale | 32 | uimsbf |
|       origin_media_time | 32 or 64 | uimsbf |
|     } else if(origin_timestamp_format==0x0F) | | |
|       private_data_length /*LEN*/ | 16 | uimsbf |
|       private_data_bytes() | 8*LEN | |
|     } else { | | |
|       origin_timestamp | 32 or 64 | uimsbf |
|     } | | |
|   } | | |
|   if(timestamp_format==0x00){ | | |
|     timescale | 32 | uimsbf |
|     media_time | 32 or 64 | uimsbf |
|   } else if(timestamp_format==0x0F) | | |
|     data_length /*LEN2*/ | 16 | uimsbf |
|     data_bytes() | 8*LEN2 | |
|   } else { | | |
|     timestamp | 32 or 64 | uimsbf |
|   } | | |
|   } | | |
| } | | |

FIG. 68

| Syntax | No. Bits | Format |
|---|---|---|
| timeline_component_AU{ | | |
|    identifier | 8 | TBD |
|    AU_length | 32 | uimsbf |
|    location_flag = "1" | 1 | bslbf |
|    origin_timestamp_flag = "1" | 1 | bslbf |
|    timestamp_version = "0" | 1 | bslbf |
|    timestamp_type = "0x01(Decoding time stamp)" | 1 | bslbf |
|    timestamp_format = "0x00(representing a MPEG DASH Media presentation time expressed in media time format)" | 4 | bslbf |
|    if(location_flag){ | | |
|       location_length /*M*/ = "30" | 8 | uimsbf |
|       location = "www.nbcu.com/sport/service3.mpd" | 8*M | |
|    } | | |
|    if(origin_timestamp_flag){ | | |
|       origin_timestamp_version = "0" | 1 | bslbf |
|       origin_timestamp_type = "0x01(Decoding timestamp)" | 1 | uimsbf |
|       origin_timestamp_format = "0x01(NTP)" | 4 | uimsbf |
|       origin_location_flag = "0" | 1 | bslbf |
|       ... | | |
|    } | | |
|    if(origin_timestamp_format ==0x00){ | | |
|       ... | 32 | uimsbf |
|    } else { | | |
|       origin_timestamp = "2013.x.xxxxx.x..x." | 32 or 64 | uimsbf |
|    } else{ | | |
|    ... | | |
|    if(timestamp_format ==0x00){ | | |
|       timescale = "10000" | 32 | uimsbf |
|       media_time = DASH Media presentation time matching with origin NTP timestamp | 32 or 64 | uimsbf |
|    .... | | |
| } | | |

$PT_N = N(1) + (PT_R - R(1)) / (RTP\ clock\ rate)$ $PT_W = W(1) + (PT_N - N(1))$ $PT_N = N(1) + (PT_D - D(1))$ $PT_W = W(1) + (PT_N - N(1))$

APPARATUSES AND METHODS FOR TRANSMITTING OR RECEIVING A BROADCAST CONTENT VIA ONE OR MORE NETWORKS

CROSS-REFERENCE TO RELATED APPLICATIONS

This application is a Continuation of co-pending U.S. patent application Ser. No. 15/104,418 filed on Jun. 14, 2016, which is the National Phase of PCT International Application No. PCT/KR2015/000295 filed on Jan. 12, 2015, which claims the priority benefit under 35 U.S.C. § 119(e) to U.S. Provisional Application Nos. 61/970,908 filed on Mar. 27, 2014, 61/948,522 filed on Mar. 5, 2014, 61/932,808 filed on Jan. 29, 2014 and 61/926,938 filed on Jan. 13, 2014, all of which are hereby expressly incorporated by reference into the present application.

BACKGROUND OF THE INVENTION

Field of the Invention

The present invention relates to a method and apparatus for supporting hybrid broadcasting in a digital broadcasting system, and more particularly, to a transmission/reception processing method and apparatus for combining and using transport streams transmitted/received from one or more transport networks in a digital broadcasting system. Furthermore, the present invention relates to a transmission/reception processing method and apparatus for combining and using packets using different protocols in a digital broadcasting system.

Discussion of the Related Art

Digital broadcast systems provide content through a terrestrial broadcast, satellite broadcast or cable broadcast network. However, these broadcast networks have limited bandwidths and it is difficult for viewers to actively participate in broadcast content.

Particularly, bandwidths of broadcast networks through which broadcast content is transmitted reach the limit due to diversification and high quality of content. To solve this, a hybrid broadcast system that receives data through a broadcast network and the Internet and simultaneously uses the data is under development.

In the hybrid broadcast system, however, a method for synchronizing transport steams respectively transmitted through the broadcast network and the Internet when the transport streams are combined has not been proposed. In addition, the hybrid broadcast system requires complicated calculations for synchronizing the transport steams respectively transmitted through the broadcast network and the Internet.

SUMMARY OF THE INVENTION

A current hybrid broadcasting system has a problem in that transport streams transmitted through each of a broadcasting network and the Internet are provided by being combined with separate content having a form that does not require synchronization.

In addition, the hybrid broadcasting system has a problem of requiring excessive calculation performance of a receiver to synchronize transport streams transmitted through each of the broadcasting network and the Internet.

A current hybrid broadcasting system has a problem in synchronizing between packets using different protocols when the packets should be combined to present a broadcast content.

An object of the present invention devised to solve the above-described problems.

To achieve the object and other advantages and in accordance with the purpose of the invention, as embodied and broadly described herein, the present invention provides an apparatus for receiving a broadcast content via one or more networks. The apparatus comprises a broadcast network interface for receiving broadcast streams including first protocol packets including first portions of the broadcast content via a broadcast network, a heterogeneity network interface for receiving second protocol packets including a second portion of the broadcast content via a heterogeneity network, and wherein the broadcast streams further include third protocol packets containing metadata for synchronizing between different protocol packets transmitted via the one or more networks, wherein the third protocol packets include location information specifying a location from which the second protocol packets are acquired, and wherein the third protocol packets further include first timing information specifying first timings when the first protocol packets are used, and second timing information specifying second timings when the second protocol packets are used, a processor for configuring the broadcast content using the first protocol packets and the second protocol packets based on information included in the third protocol packets.

Preferably, wherein the broadcast streams further include fourth protocol packets using a protocol other than that of the first protocol packets, and wherein the third protocol packets further include fourth timing information specifying fourth timings when the fourth protocol packets are used.

Preferably, wherein the first protocol packets correspond to Real Time Protocol (RTP) packets, wherein the second protocol packets carry MPEG DASH (Dynamic Adaptive Streaming over HTTP) segments, and wherein the third protocol packets correspond to RTP Control Protocol (RTCP) packets.

Preferably, wherein the processor is mapping the first timings specified by first timing information into a Network Time Protocol (NTP) timeline, mapping the second timings specified by the second timing information which are applied to the second protocol packets acquired based on the location information into the NTP timeline, and configuring the broadcast content by synchronizing the first protocol packets and the second protocol packets using the NTP timeline.

Preferably, wherein the first timing information correspond to NTP timestamps and RTP timestamps of the first protocol packets, and wherein the second timing information correspond to DASH media presentation time information.

Preferably, wherein the third protocol packets further include format information specifying formats of the second timing information.

Preferably, wherein the processor is further calculating offsets between the NTP timestamps and receiver wall clock times at points in time when the first protocol packets are received, adjusting the first timings and the second timings based on the calculated offsets, and configuring the broadcast content by synchronizing the first protocol packets and the second protocol packets using the adjusted first timings and second timings.

The present invention provides an a method for receiving a broadcast content via one or more networks in a receiver. The method comprises receiving broadcast streams including first protocol packets including first portions of the broadcast content via a broadcast network, receiving second protocol packets including a second portion of the broadcast content via a heterogeneity network, and wherein the broadcast streams further include third protocol packets containing metadata for synchronizing between different protocol packets transmitted via the one or more networks, wherein the third protocol packets include location information specifying a location from which the second protocol packets are acquired, and wherein the third protocol packets further include first timing information specifying first timings when the first protocol packets are used, and second timing information specifying second timings when the second protocol packets are used, configuring the broadcast content using the first protocol packets and the second protocol packets based on information included in the third protocol packets.

Preferably, wherein the broadcast streams further include fourth protocol packets using a protocol other than that of the first protocol packets, and wherein the third protocol packets further include fourth timing information specifying fourth timings when the fourth protocol packets are used.

Preferably, wherein the first protocol packets correspond to Real Time Protocol (RTP) packets, wherein the second protocol packets carry MPEG DASH (Dynamic Adaptive Streaming over HTTP) segments, and wherein the third protocol packets correspond to RTP Control Protocol (RTCP) packets.

Preferably, the method further comprises mapping the first timings specified by first timing information into a Network Time Protocol (NTP) timeline, mapping the second timings specified by the second timing information which are applied to the second protocol packets acquired based on the location information into the NTP timeline, and configuring the broadcast content by synchronizing the first protocol packets and the second protocol packets using the NTP timeline.

Preferably, wherein the first timing information correspond to NTP timestamps and RTP timestamps of the first protocol packets, and wherein the second timing information correspond to DASH media presentation time information.

Preferably, wherein the third protocol packets further include format information specifying formats of the second timing information.

Preferably, the method further comprises calculating offsets between the NTP timestamps and receiver wall clock times at points in time when the first protocol packets are received, adjusting the first timings and the second timings based on the calculated offsets, and configuring the broadcast content by synchronizing the first protocol packets and the second protocol packets using the adjusted first timings and second timings.

The present invention is effective in easily synchronizing transport streams transmitted through each of heterogeneous networks or packets using different protocols.

The present invention is effective in synchronizing transport streams transmitted through each of heterogeneous networks applicable to a wide use irrespective of characteristics of the heterogeneous networks or protocols.

The present invention is effective in enhancing user convenience since it is possible to provide a variety of broadcast data combinable with the same content through heterogeneous networks or different protocols.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 13 illustrates PLS1 data according to an embodiment of the present invention.

FIG. 14 illustrates PLS2 data according to an embodiment of the present invention.

FIG. 25 illustrates a time interleaving according to an embodiment of the present invention.

FIG. 29 illustrates interleaved XFECBLOCKs from each interleaving array according to an embodiment of the present invention.

FIG. 31 is a view illustrating a broadcast transmission frame according to an embodiment of the present invention.

FIG. 32 is a view of a broadcast transmission frame according to another embodiment of the present invention.

FIG. 33 is a view illustrating a structure of a transport packet transmitting a broadcast service according to an embodiment of the present invention.

FIG. 34 is a view illustrating meanings of Network Protocol field according to an embodiment of the present invention.

FIG. 38 is a view illustrating a broadcast service signaling table according to an embodiment of the present invention.

FIG. 39 is a view of meanings of the service_category field according to another embodiment of the present invention.

FIG. 40 is a view of a broadcast service signaling table according to another embodiment of the present invention.

FIG. 59 is a view illustrating a timeline signaling table of metadata according to an embodiment of the present invention.

FIG. 68 is a view illustrating syntax of a timeline component access unit according to another embodiment of the present invention.

DETAILED DESCRIPTION OF THE EMBODIMENTS

Figure 1:
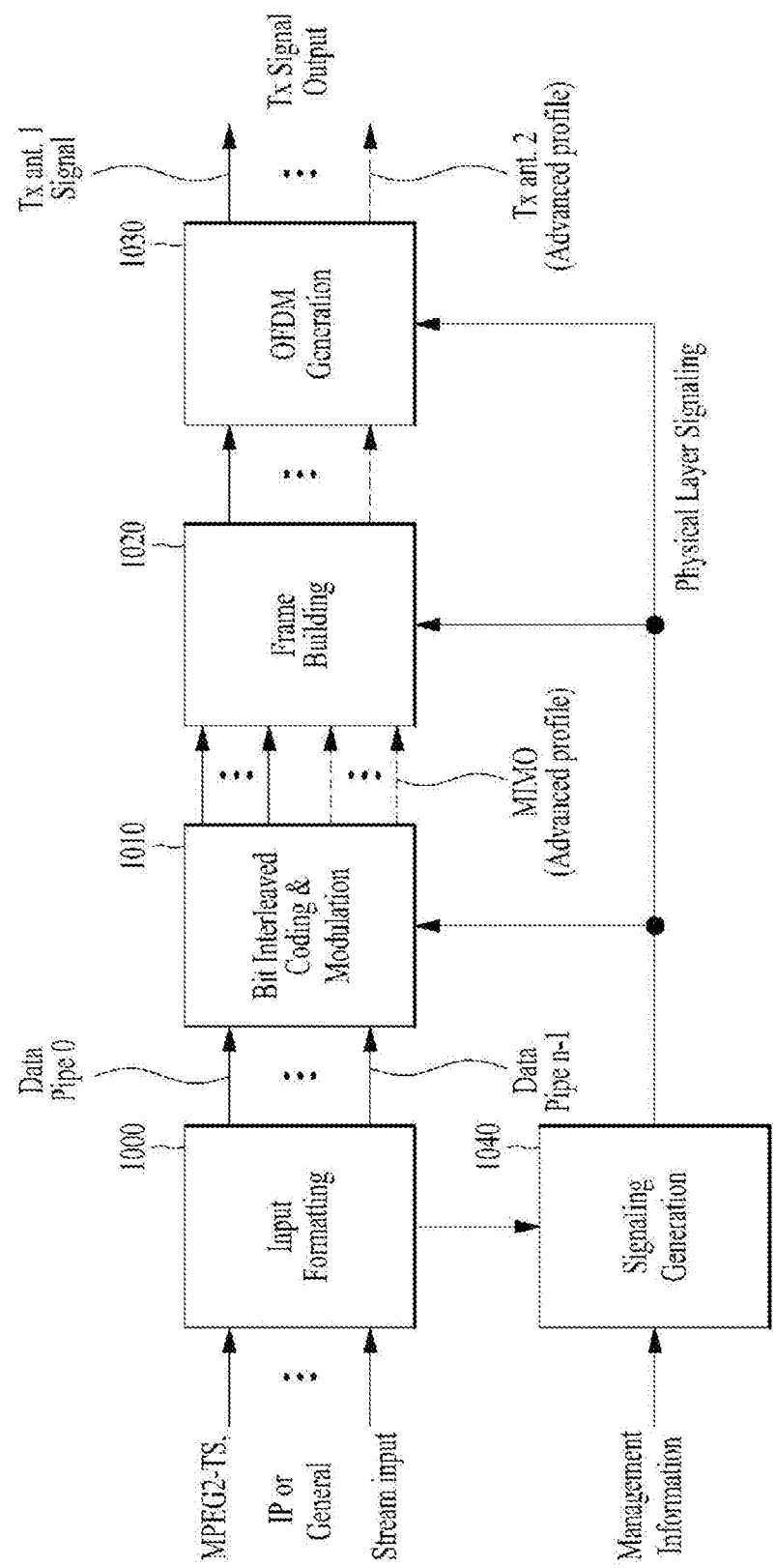
FIG. 1 illustrates a structure of an apparatus for transmitting broadcast signals for future broadcast services according to an embodiment of the present invention.

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide a thorough understanding of the present invention. However, it will be apparent to those skilled in the art that the present invention may be practiced without such specific details.

Although most terms used in the present invention have been selected from general ones widely used in the art, some terms have been arbitrarily selected by the applicant and their meanings are explained in detail in the following description as needed. Thus, the present invention should be understood based upon the intended meanings of the terms rather than their simple names or meanings.

The present invention provides apparatuses and methods for transmitting and receiving broadcast signals for future broadcast services. Future broadcast services according to an embodiment of the present invention include a terrestrial broadcast service, a mobile broadcast service, a UHDTV service, etc.

The term "signaling" in the present invention may indicate that service information (SI) that is transmitted and received from a broadcast system, an Internet system, and/or a broadcast/Internet convergence system. The service information (SI) may include broadcast service information (e.g., ATSC-SI and/or DVB-SI) received from the existing broadcast systems.

The term "broadcast signal" may conceptually include not only signals and/or data received from a terrestrial broadcast, a cable broadcast, a satellite broadcast, and/or a mobile broadcast, but also signals and/or data received from bidirectional broadcast systems such as an Internet broadcast, a broadband broadcast, a communication broadcast, a data broadcast, and/or VOD (Video On Demand).

The term "PLP" may indicate a predetermined unit for transmitting data contained in a physical layer. Therefore, the term "PLP" may also be replaced with the terms 'data unit' or 'data pipe' as necessary.

A hybrid broadcast service configured to interwork with the broadcast network and/or the Internet network may be used as a representative application to be used in a digital television (DTV) service. The hybrid broadcast service transmits, in real time, enhancement data related to broadcast A/V (Audio/Video) contents transmitted through the terrestrial broadcast network over the Internet, or transmits, in real time, some parts of the broadcast A/V contents over the Internet, such that users can experience a variety of contents.

The present invention aims to provide a method for encapsulating an IP packet, an MPEG-2 TS packet, and a packet applicable to other broadcast systems in the next generation digital broadcast system in such a manner that the IP packet, the MPEG-2 TS packet, and the packet can be transmitted to a physical layer. In addition, the present invention proposes a method for transmitting layer-2 signaling using the same header format.

The contents to be described hereinafter may be implemented by the device. For example, the following processes can be carried out by a signaling processor, a protocol processor, a processor, and/or a packet generator.

Among terms used in the present invention, a real time (RT) service literally means a real time service. That is, the RT service is a service which is restricted by time. On the other hand, a non-real time (NRT) service means a non-real time service excluding the RT service. That is, the NRT service is a service which is not restricted by time. Data for an NRT service will be referred to as NRT service data.

A broadcast receiver according to the present invention may receive a non-real time (NRT) service through a medium, such as terrestrial broadcasting, cable broadcasting, or the Internet. The NRT service is stored in a storage medium of the broadcast receiver and is then displayed on a display device at a predetermined time or according to a user's request. In one embodiment, the NRT service is received in the form of a file and is then stored in the storage medium. In one embodiment, the storage medium is an internal hard disc drive (HDD) mounted in the broadcast receiver. In another example, the storage medium may be a universal serial bus (USB) memory or an external HDD connected to the outside of a broadcast receiving system. Signaling information is necessary to receive files constituting the NRT service, to store the files in the storage medium, and to provide the files to a user. In the present invention, such signaling information will be referred to as NRT service signaling information or NRT service signaling data. The NRT service according to the present invention may be classified into a fixed NRT service and a mobile NRT service according to a method of obtaining an IP datagram. In particular, the fixed NRT service is provided to a fixed broadcast receiver and the mobile NRT service is provided to a mobile broadcast receiver. In the present invention, the fixed NRT service will be described as an embodiment. However, the present invention may be applied to the mobile NRT service.

Among terms used in the present invention, an application (or synchronized application) is a data service providing interactive experience to a viewer to improve viewing experience. The application may be named a triggered declarative object (TDO), a declarative object (DO), or an NRT declarative object (NDO).

Among terms used in the present invention, a trigger is a signaling element for identifying signaling and setting a provision time of an application or an event in the application. The trigger may include location information of a TDO parameter table (TPT) (which may be named a TDO parameter element). The TPT is a signaling element including metadata for operating an application within a specific range.

The trigger may function as a time base trigger and/or an activation trigger. The time base trigger is used to set a time base for suggesting a criterion of a reproduction time of an event. The activation trigger is used to set an operation time of an application or an event in the application. The operation may correspond to start, end, pause, kill and/or resuming of an application or an event in the application. Time base messages may be used as the time base trigger or the time base trigger may be used as the time base messages. Activation messages, which will hereinafter be described, may be used as the activation trigger or the activation trigger may be used as the activation messages.

A media time is a parameter used to refer to a specific time when a content is reproduced.

The triggered declarative object (TDO) indicates additional information in a broadcast content. The TDO is a concept of triggering the additional information in the broadcast content on timing. For example, in a case in which an audition program is broadcast, current ranking of audition participants preferred by a viewer may be shown together with a corresponding broadcast content. At this time, additional information regarding the current ranking of the audition participants may be the TDO. The TDO may be changed through bidirectional communication with the viewer or may be provided in a state in which a viewer's intention is reflected in the TDO.

The apparatuses and methods for transmitting according to an embodiment of the present invention may be categorized into a base profile for the terrestrial broadcast service, a handheld profile for the mobile broadcast service and an advanced profile for the UHDTV service. In this case, the base profile can be used as a profile for both the terrestrial broadcast service and the mobile broadcast service. That is, the base profile can be used to define a concept of a profile which includes the mobile profile. This can be changed according to intention of the designer.

The present invention may process broadcast signals for the future broadcast services through non-MIMO (Multiple Input Multiple Output) or MIMO according to one embodiment. A non-MIMO scheme according to an embodiment of the present invention may include a MISO (Multiple Input Single Output) scheme, a SISO (Single Input Single Output) scheme, etc.

While MISO or MIMO uses two antennas in the following for convenience of description, the present invention is applicable to systems using two or more antennas.

The present invention may defines three physical layer (PL) profiles (base, handheld and advanced profiles) each optimized to minimize receiver complexity while attaining the performance required for a particular use case. The physical layer (PHY) profiles are subsets of all configurations that a corresponding receiver should implement.

The three PHY profiles share most of the functional blocks but differ slightly in specific blocks and/or parameters. Additional PHY profiles can be defined in the future. For the system evolution, future profiles can also be multiplexed with the existing profiles in a single RF channel through a future extension frame (FEF). The details of each PHY profile are described below.

1. Base Profile

The base profile represents a main use case for fixed receiving devices that are usually connected to a roof-top antenna. The base profile also includes portable devices that could be transported to a place but belong to a relatively stationary reception category. Use of the base profile could be extended to handheld devices or even vehicular by some improved implementations, but those use cases are not expected for the base profile receiver operation.

Target SNR range of reception is from approximately 10 to 20 dB, which includes the 15 dB SNR reception capability of the existing broadcast system (e.g. ATSC A/53). The receiver complexity and power consumption is not as critical as in the battery-operated handheld devices, which will use the handheld profile. Key system parameters for the base profile are listed in below table 1.

TABLE 1

| | |
|---|---|
| LDPC codeword length | 16K, 64K bits |
| Constellation size | 4~10 bpcu (bits per channel use) |
| Time de-interleaving memory size | ≤$2^{19}$ data cells |
| Pilot patterns | Pilot pattern for fixed reception |
| FFT size | 16K, 32K points |

2. Handheld Profile

The handheld profile is designed for use in handheld and vehicular devices that operate with battery power. The devices can be moving with pedestrian or vehicle speed. The power consumption as well as the receiver complexity is very important for the implementation of the devices of the handheld profile. The target SNR range of the handheld profile is approximately 0 to 10 dB, but can be configured to reach below 0 dB when intended for deeper indoor reception.

In addition to low SNR capability, resilience to the Doppler Effect caused by receiver mobility is the most important performance attribute of the handheld profile. Key system parameters for the handheld profile are listed in the below table 2.

TABLE 2

| | |
|---|---|
| LDPC codeword length | 16K bits |
| Constellation size | 2~8 bpcu |
| Time de-interleaving memory size | ≤$2^{18}$ data cells |
| Pilot patterns | Pilot patterns for mobile and indoor reception |
| FFT size | 8K, 16K points |

3. Advanced Profile

The advanced profile provides highest channel capacity at the cost of more implementation complexity. This profile requires using MIMO transmission and reception, and UHDTV service is a target use case for which this profile is specifically designed. The increased capacity can also be used to allow an increased number of services in a given bandwidth, e.g., multiple SDTV or HDTV services.

The target SNR range of the advanced profile is approximately 20 to 30 dB. MIMO transmission may initially use existing elliptically-polarized transmission equipment, with extension to full-power cross-polarized transmission in the future. Key system parameters for the advanced profile are listed in below table 3.

TABLE 3

| | |
|---|---|
| LDPC codeword length | 16K, 64K bits |
| Constellation size | 8~12 bpcu |
| Time de-interleaving memory size | ≤$2^{19}$ data cells |
| Pilot patterns | Pilot pattern for fixed reception |
| FFT size | 16K, 32K points |

In this case, the base profile can be used as a profile for both the terrestrial broadcast service and the mobile broadcast service. That is, the base profile can be used to define a concept of a profile which includes the mobile profile. Also, the advanced profile can be divided advanced profile for a base profile with MIMO and advanced profile for a handheld profile with MIMO. Moreover, the three profiles can be changed according to intention of the designer.

The following terms and definitions may apply to the present invention. The following terms and definitions can be changed according to design.

auxiliary stream: sequence of cells carrying data of as yet undefined modulation and coding, which may be used for future extensions or as required by broadcasters or network operators.

base data pipe: data pipe that carries service signaling data.

baseband frame (or BBFRAME): set of Kbch bits which form the input to one FEC encoding process (BCH and LDPC encoding).

cell: modulation value that is carried by one carrier of the OFDM transmission.

coded block: LDPC-encoded block of PLS1 data or one of the LDPC-encoded blocks of PLS2 data.

data pipe: logical channel in the physical layer that carries service data or related metadata, which may carry one or multiple service(s) or service component(s).

data pipe unit: a basic unit for allocating data cells to a DP in a frame.

data symbol: OFDM symbol in a frame which is not a preamble symbol (the frame signaling symbol and frame edge symbol is included in the data symbol).

DP_ID: this 8 bit field identifies uniquely a DP within the system identified by the SYSTEM_ID.

dummy cell: cell carrying a pseudorandom value used to fill the remaining capacity not used for PLS signaling, DPs or auxiliary streams.

emergency alert channel: part of a frame that carries EAS information data.

frame: physical layer time slot that starts with a preamble and ends with a frame edge symbol.

frame repetition unit: a set of frames belonging to same or different physical layer profile including a FEF, which is repeated eight times in a super-frame.

fast information channel: a logical channel in a frame that carries the mapping information between a service and the corresponding base DP.

FECBLOCK: set of LDPC-encoded bits of a DP data.

FFT size: nominal FFT size used for a particular mode, equal to the active symbol period Ts expressed in cycles of the elementary period T.

frame signaling symbol: OFDM symbol with higher pilot density used at the start of a frame in certain combinations of FFT size, guard interval and scattered pilot pattern, which carries a part of the PLS data.

frame edge symbol: OFDM symbol with higher pilot density used at the end of a frame in certain combinations of FFT size, guard interval and scattered pilot pattern.

frame-group: the set of all the frames having the same PHY profile type in a super-frame.

future extension frame: physical layer time slot within the super-frame that could be used for future extension, which starts with a preamble.

Futurecast UTB system: proposed physical layer broadcasting system, of which the input is one or more MPEG2-TS or IP or general stream(s) and of which the output is an RF signal.

input stream: A stream of data for an ensemble of services delivered to the end users by the system.

normal data symbol: data symbol excluding the frame signaling symbol and the frame edge symbol.

PHY profile: subset of all configurations that a corresponding receiver should implement.

PLS: physical layer signaling data consisting of PLS1 and PLS2.

PLS1: a first set of PLS data carried in the FSS symbols having a fixed size, coding and modulation, which carries basic information about the system as well as the parameters needed to decode the PLS2.

NOTE: PLS1 data remains constant for the duration of a frame-group.

PLS2: a second set of PLS data transmitted in the FSS symbol, which carries more detailed PLS data about the system and the DPs.

PLS2 dynamic data: PLS2 data that may dynamically change frame-by-frame.

PLS2 static data: PLS2 data that remains static for the duration of a frame-group.

preamble signaling data: signaling data carried by the preamble symbol and used to identify the basic mode of the system.

preamble symbol: fixed-length pilot symbol that carries basic PLS data and is located in the beginning of a frame.

NOTE: The preamble symbol is mainly used for fast initial band scan to detect the system signal, its timing, frequency offset, and FFTsize.

reserved for future use: not defined by the present document but may be defined in future.

superframe: set of eight frame repetition units.

time interleaving block (TI block): set of cells within which time interleaving is carried out, corresponding to one use of the time interleaver memory.

TI group: unit over which dynamic capacity allocation for a particular DP is carried out, made up of an integer, dynamically varying number of XFECBLOCKs.

NOTE: The TI group may be mapped directly to one frame or may be mapped to multiple frames. It may contain one or more TI blocks.

Type 1 DP: DP of a frame where all DPs are mapped into the frame in TDM fashion.

Type 2 DP: DP of a frame where all DPs are mapped into the frame in FDM fashion.

XFECBLOCK: set of Ncells cells carrying all the bits of one LDPC FECBLOCK.

FIG. 1 illustrates a structure of an apparatus for transmitting broadcast signals for future broadcast services according to an embodiment of the present invention.

The apparatus for transmitting broadcast signals for future broadcast services according to an embodiment of the present invention can include an input formatting block 1000, a BICM (Bit interleaved coding & modulation) block 1010, a frame structure block 1020, an OFDM (Orthogonal Frequency Division Multiplexing) generation block 1030 and a signaling generation block 1040. A description will be given of the operation of each module of the apparatus for transmitting broadcast signals.

IP stream/packets and MPEG2-TS are the main input formats, other stream types are handled as General Streams. In addition to these data inputs, Management Information is input to control the scheduling and allocation of the corresponding bandwidth for each input stream. One or multiple TS stream(s), IP stream(s) and/or General Stream(s) inputs are simultaneously allowed.

The input formatting block 1000 can demultiplex each input stream into one or multiple data pipe(s), to each of which an independent coding and modulation is applied. The data pipe (DP) is the basic unit for robustness control, thereby affecting quality-of-service (QoS). One or multiple service(s) or service component(s) can be carried by a single DP. Details of operations of the input formatting block 1000 will be described later.

The data pipe is a logical channel in the physical layer that carries service data or related metadata, which may carry one or multiple service(s) or service component(s).

Also, the data pipe unit: a basic unit for allocating data cells to a DP in a frame.

In the BICM block 1010, parity data is added for error correction and the encoded bit streams are mapped to complex-value constellation symbols. The symbols are interleaved across a specific interleaving depth that is used for the corresponding DP. For the advanced profile, MIMO encoding is performed in the BICM block 1010 and the additional data path is added at the output for MIMO transmission. Details of operations of the BICM block 1010 will be described later.

The Frame Building block 1020 can map the data cells of the input DPs into the OFDM symbols within a frame. After mapping, the frequency interleaving is used for frequency-domain diversity, especially to combat frequency-selective fading channels. Details of operations of the Frame Building block 1020 will be described later.

After inserting a preamble at the beginning of each frame, the OFDM Generation block 1030 can apply conventional OFDM modulation having a cyclic prefix as guard interval. For antenna space diversity, a distributed MISO scheme is applied across the transmitters. In addition, a Peak-to-Average Power Reduction (PAPR) scheme is performed in the time domain. For flexible network planning, this proposal provides a set of various FFT sizes, guard interval lengths and corresponding pilot patterns. Details of operations of the OFDM Generation block 1030 will be described later.

The Signaling Generation block 1040 can create physical layer signaling information used for the operation of each functional block. This signaling information is also transmitted so that the services of interest are properly recovered at the receiver side. Details of operations of the Signaling Generation block 1040 will be described later.

Figure 2:
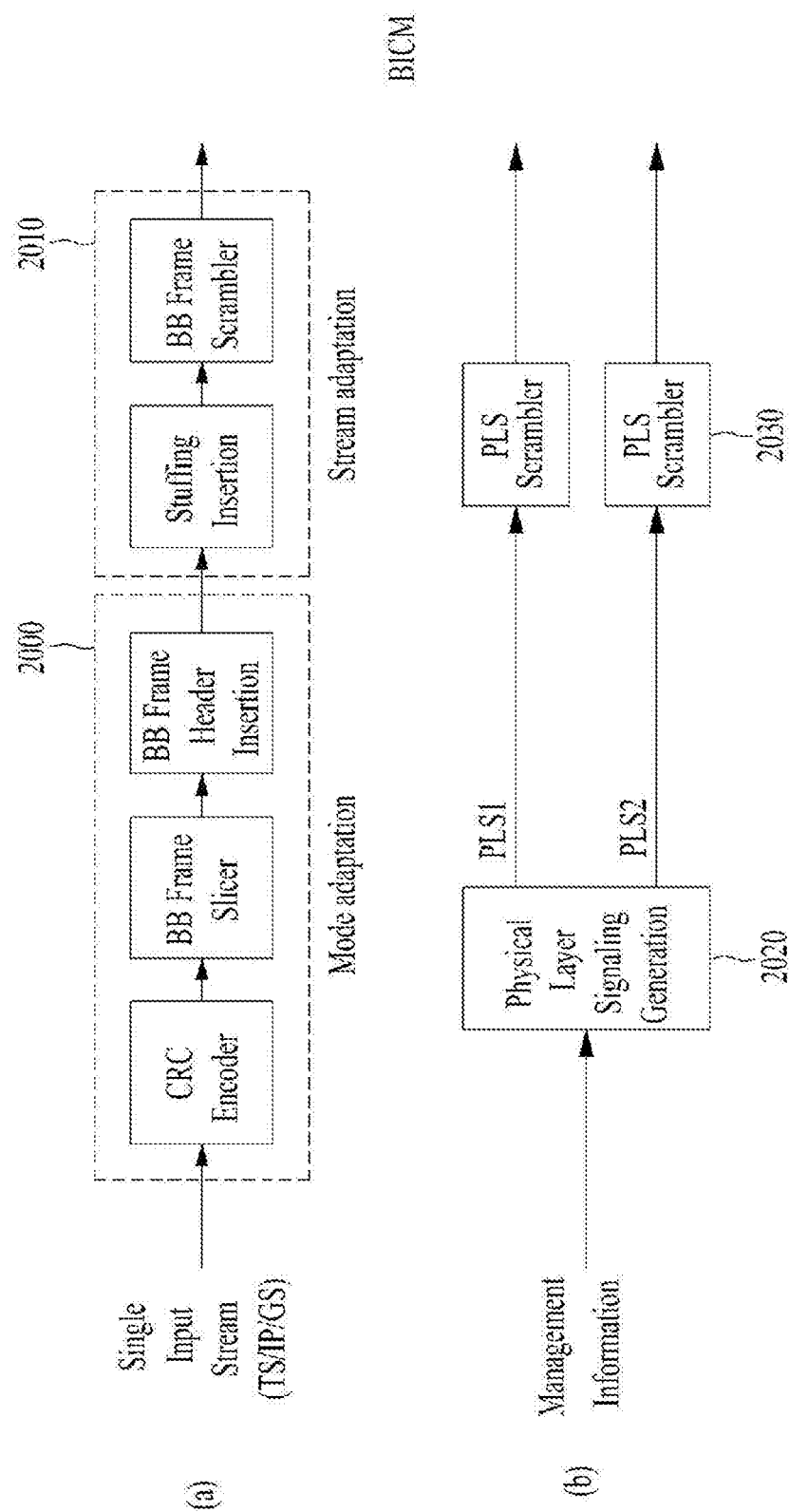
FIG. 2 illustrates an input formatting block according to one embodiment of the present invention.
Figure 3:
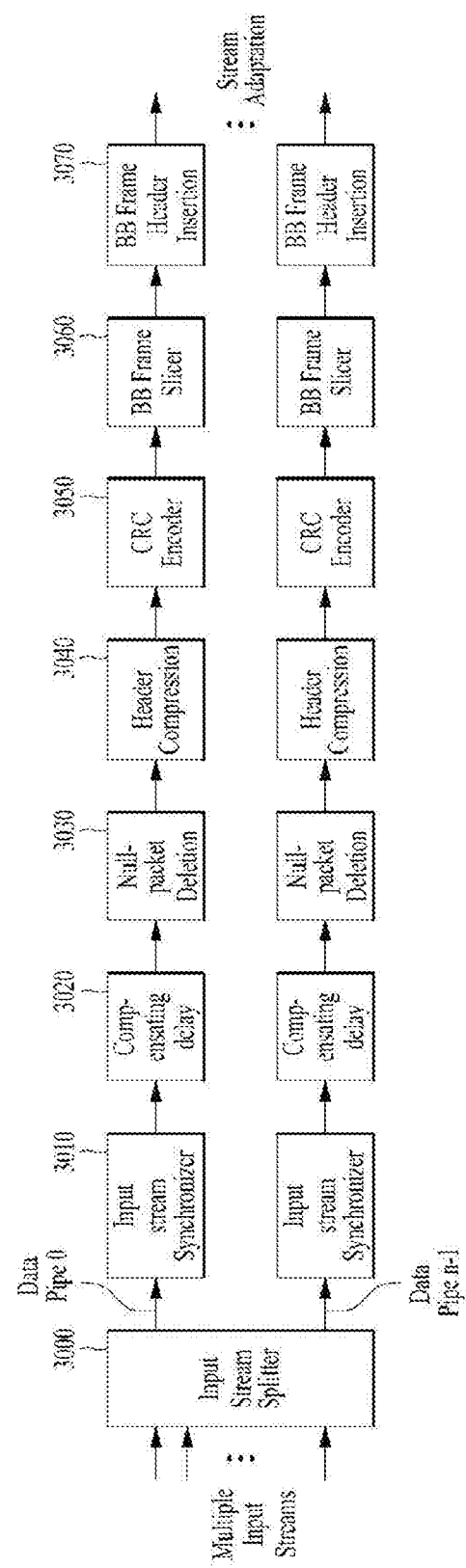
FIG. 3 illustrates an input formatting block according to another embodiment of the present invention.
Figure 4:
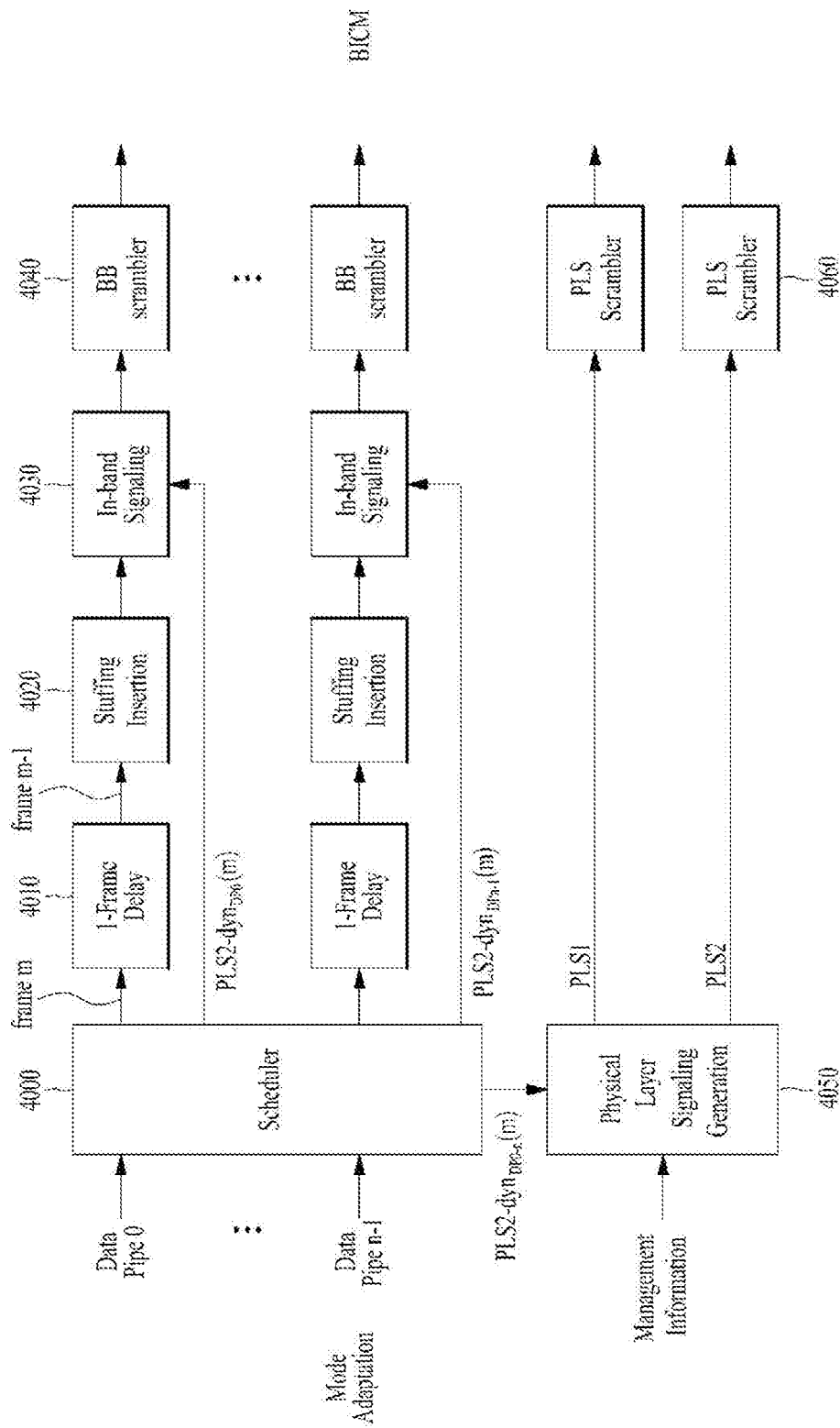
FIG. 4 illustrates an input formatting block according to another embodiment of the present invention.

FIGS. 2, 3 and 4 illustrate the input formatting block 1000 according to embodiments of the present invention. A description will be given of each figure.

FIG. 2 illustrates an input formatting block according to one embodiment of the present invention. FIG. 2 shows an input formatting module when the input signal is a single input stream.

The input formatting block illustrated in FIG. 2 corresponds to an embodiment of the input formatting block 1000 described with reference to FIG. 1.

The input to the physical layer may be composed of one or multiple data streams. Each data stream is carried by one DP. The mode adaptation modules slice the incoming data stream into data fields of the baseband frame (BBF). The system supports three types of input data streams: MPEG2-TS, Internet protocol (IP) and Generic stream (GS). MPEG2-TS is characterized by fixed length (188 byte) packets with the first byte being a sync-byte (0x47). An IP stream is composed of variable length IP datagram packets, as signaled within IP packet headers. The system supports both IPv4 and IPv6 for the IP stream. GS may be composed of variable length packets or constant length packets, signaled within encapsulation packet headers.

(a) shows a mode adaptation block 2000 and a stream adaptation 2010 for signal DP and (b) shows a PLS generation block 2020 and a PLS scrambler 2030 for generating and processing PLS data. A description will be given of the operation of each block.

The Input Stream Splitter splits the input TS, IP, GS streams into multiple service or service component (audio, video, etc.) streams. The mode adaptation module 2010 is comprised of a CRC Encoder, BB (baseband) Frame Slicer, and BB Frame Header Insertion block.

The CRC Encoder provides three kinds of CRC encoding for error detection at the user packet (UP) level, i.e., CRC-8, CRC-16, and CRC-32. The computed CRC bytes are appended after the UP. CRC-8 is used for TS stream and CRC-32 for IP stream. If the GS stream doesn't provide the CRC encoding, the proposed CRC encoding should be applied.

BB Frame Slicer maps the input into an internal logical-bit format. The first received bit is defined to be the MSB. The BB Frame Slicer allocates a number of input bits equal to the available data field capacity. To allocate a number of input bits equal to the BBF payload, the UP packet stream is sliced to fit the data field of BBF.

BB Frame Header Insertion block can insert fixed length BBF header of 2 bytes is inserted in front of the BB Frame. The BBF header is composed of STUFFI (1 bit), SYNCD (13 bits), and RFU (2 bits). In addition to the fixed 2-Byte BBF header, BBF can have an extension field (1 or 3 bytes) at the end of the 2-byte BBF header.

The stream adaptation 2010 is comprised of stuffing insertion block and BB scrambler.

The stuffing insertion block can insert stuffing field into a payload of a BB frame. If the input data to the stream adaptation is sufficient to fill a BB-Frame, STUFFI is set to '0' and the BBF has no stuffing field. Otherwise STUFFI is set to '1' and the stuffing field is inserted immediately after the BBF header. The stuffing field comprises two bytes of the stuffing field header and a variable size of stuffing data.

The BB scrambler scrambles complete BBF for energy dispersal. The scrambling sequence is synchronous with the BBF. The scrambling sequence is generated by the feedback shift register.

The PLS generation block 2020 can generate physical layer signaling (PLS) data. The PLS provides the receiver with a means to access physical layer DPs. The PLS data consists of PLS1 data and PLS2 data.

The PLS1 data is a first set of PLS data carried in the FSS symbols in the frame having a fixed size, coding and modulation, which carries basic information about the system as well as the parameters needed to decode the PLS2 data. The PLS1 data provides basic transmission parameters including parameters required to enable the reception and decoding of the PLS2 data. Also, the PLS1 data remains constant for the duration of a frame-group.

The PLS2 data is a second set of PLS data transmitted in the FSS symbol, which carries more detailed PLS data about the system and the DPs. The PLS2 contains parameters that provide sufficient information for the receiver to decode the desired DP. The PLS2 signaling further consists of two types of parameters, PLS2 Static data (PLS2-STAT data) and PLS2 dynamic data (PLS2-DYN data). The PLS2 Static data is PLS2 data that remains static for the duration of a frame-group and the PLS2 dynamic data is PLS2 data that may dynamically change frame-by-frame.

Details of the PLS data will be described later.

The PLS scrambler 2030 can scramble the generated PLS data for energy dispersal.

The above-described blocks may be omitted or replaced by blocks having similar or identical functions.

FIG. 3 illustrates an input formatting block according to another embodiment of the present invention.

The input formatting block illustrated in FIG. 3 corresponds to an embodiment of the input formatting block 1000 described with reference to FIG. 1.

FIG. 3 shows a mode adaptation block of the input formatting block when the input signal corresponds to multiple input streams.

The mode adaptation block of the input formatting block for processing the multiple input streams can independently process the multiple input streams.

Referring to FIG. 3, the mode adaptation block for respectively processing the multiple input streams can include an input stream splitter 3000, an input stream synchronizer 3010, a compensating delay block 3020, a null packet deletion block 3030, a head compression block 3040, a CRC encoder 3050, a BB frame slicer 3060 and a BB header insertion block 3070. Description will be given of each block of the mode adaptation block.

Operations of the CRC encoder 3050, BB frame slicer 3060 and BB header insertion block 3070 correspond to those of the CRC encoder, BB frame slicer and BB header insertion block described with reference to FIG. 2 and thus description thereof is omitted.

The input stream splitter 3000 can split the input TS, IP, GS streams into multiple service or service component (audio, video, etc.) streams.

The input stream synchronizer 3010 may be referred as ISSY. The ISSY can provide suitable means to guarantee Constant Bit Rate (CBR) and constant end-to-end transmission delay for any input data format. The ISSY is always used for the case of multiple DPs carrying TS, and optionally used for multiple DPs carrying GS streams.

The compensating delay block 3020 can delay the split TS packet stream following the insertion of ISSY information to allow a TS packet recombining mechanism without requiring additional memory in the receiver.

The null packet deletion block 3030, is used only for the TS input stream case. Some TS input streams or split TS streams may have a large number of null-packets present in order to accommodate VBR (variable bit-rate) services in a CBR TS stream. In this case, in order to avoid unnecessary transmission overhead, null-packets can be identified and not transmitted. In the receiver, removed null-packets can be re-inserted in the exact place where they were originally by reference to a deleted null-packet (DNP) counter that is inserted in the transmission, thus guaranteeing constant bit-rate and avoiding the need for time-stamp (PCR) updating.

The head compression block 3040 can provide packet header compression to increase transmission efficiency for TS or IP input streams. Because the receiver can have a priori information on certain parts of the header, this known information can be deleted in the transmitter.

For Transport Stream, the receiver has a-priori information about the sync-byte configuration (0x47) and the packet length (188 Byte). If the input TS stream carries content that has only one PID, i.e., for only one service component (video, audio, etc.) or service sub-component (SVC base layer, SVC enhancement layer, MVC base view or MVC dependent views), TS packet header compression can be applied (optionally) to the Transport Stream. IP packet header compression is used optionally if the input steam is an IP stream.

The above-described blocks may be omitted or replaced by blocks having similar or identical functions.

FIG. 4 illustrates an input formatting block according to another embodiment of the present invention.

The input formatting block illustrated in FIG. 4 corresponds to an embodiment of the input formatting block 1000 described with reference to FIG. 1.

FIG. 4 illustrates a stream adaptation block of the input formatting module when the input signal corresponds to multiple input streams.

Referring to FIG. 4, the mode adaptation block for respectively processing the multiple input streams can include a scheduler 4000, an 1-Frame delay block 4010, a stuffing insertion block 4020, an in-band signaling 4030, a BB Frame scrambler 4040, a PLS generation block 4050 and a PLS scrambler 4060. Description will be given of each block of the stream adaptation block.

Operations of the stuffing insertion block 4020, the BB Frame scrambler 4040, the PLS generation block 4050 and the PLS scrambler 4060 correspond to those of the stuffing insertion block, BB scrambler, PLS generation block and the PLS scrambler described with reference to FIG. 2 and thus description thereof is omitted.

The scheduler 4000 can determine the overall cell allocation across the entire frame from the amount of FEC-BLOCKs of each DP. Including the allocation for PLS, EAC and FIC, the scheduler generate the values of PLS2-DYN data, which is transmitted as in-band signaling or PLS cell in FSS of the frame. Details of FECBLOCK, EAC and FIC will be described later.

The 1-Frame delay block 4010 can delay the input data by one transmission frame such that scheduling information about the next frame can be transmitted through the current frame for in-band signaling information to be inserted into the DPs.

The in-band signaling 4030 can insert un-delayed part of the PLS2 data into a DP of a frame.

The above-described blocks may be omitted or replaced by blocks having similar or identical functions.

Figure 5:
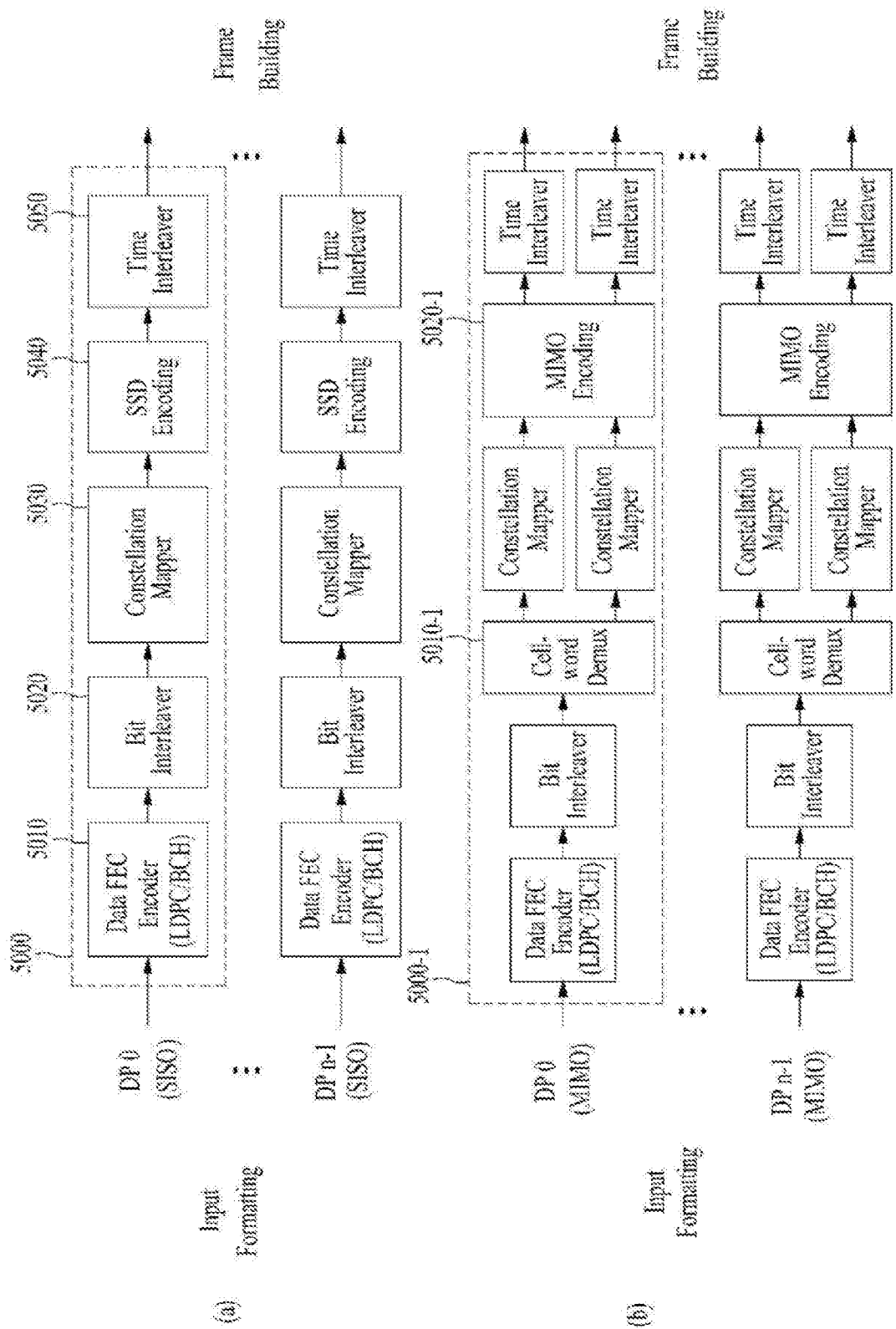
FIG. 5 illustrates a BICM block according to an embodiment of the present invention.

FIG. 5 illustrates a BICM block according to an embodiment of the present invention.

The BICM block illustrated in FIG. 5 corresponds to an embodiment of the BICM block 1010 described with reference to FIG. 1.

As described above, the apparatus for transmitting broadcast signals for future broadcast services according to an embodiment of the present invention can provide a terrestrial broadcast service, mobile broadcast service, UHDTV service, etc.

Since QoS (quality of service) depends on characteristics of a service provided by the apparatus for transmitting broadcast signals for future broadcast services according to an embodiment of the present invention, data corresponding to respective services needs to be processed through different schemes. Accordingly, the a BICM block according to an embodiment of the present invention can independently process DPs input thereto by independently applying SISO, MISO and MIMO schemes to the data pipes respectively corresponding to data paths. Consequently, the apparatus for transmitting broadcast signals for future broadcast services according to an embodiment of the present invention can control QoS for each service or service component transmitted through each DP.

(a) shows the BICM block shared by the base profile and the handheld profile and (b) shows the BICM block of the advanced profile.

The BICM block shared by the base profile and the handheld profile and the BICM block of the advanced profile can include plural processing blocks for processing each DP.

A description will be given of each processing block of the BICM block for the base profile and the handheld profile and the BICM block for the advanced profile.

A processing block 5000 of the BICM block for the base profile and the handheld profile can include a Data FEC encoder 5010, a bit interleaver 5020, a constellation mapper 5030, an SSD (Signal Space Diversity) encoding block 5040 and a time interleaver 5050.

The Data FEC encoder 5010 can perform the FEC encoding on the input BBF to generate FECBLOCK procedure using outer coding (BCH), and inner coding (LDPC). The outer coding (BCH) is optional coding method. Details of operations of the Data FEC encoder 5010 will be described later.

The bit interleaver 5020 can interleave outputs of the Data FEC encoder 5010 to achieve optimized performance with combination of the LDPC codes and modulation scheme while providing an efficiently implementable structure. Details of operations of the bit interleaver 5020 will be described later.

The constellation mapper 5030 can modulate each cell word from the bit interleaver 5020 in the base and the handheld profiles, or cell word from the Cell-word demultiplexer 5010-1 in the advanced profile using either QPSK, QAM-16, non-uniform QAM (NUQ-64, NUQ-256, NUQ-1024) or non-uniform constellation (NUC-16, NUC-64, NUC-256, NUC-1024) to give a power-normalized constellation point, e1. This constellation mapping is applied only for DPs. Observe that QAM-16 and NUQs are square shaped, while NUCs have arbitrary shape. When each constellation is rotated by any multiple of 90 degrees, the rotated constellation exactly overlaps with its original one. This "rotation-sense" symmetric property makes the capacities and the average powers of the real and imaginary components equal to each other. Both NUQs and NUCs are defined specifically for each code rate and the particular one used is signaled by the parameter DP_MOD filed in PLS2 data.

The SSD encoding block 5040 can precode cells in two (2D), three (3D), and four (4D) dimensions to increase the reception robustness under difficult fading conditions.

The time interleaver 5050 can operates at the DP level. The parameters of time interleaving (TI) may be set differently for each DP. Details of operations of the time interleaver 5050 will be described later.

A processing block 5000-1 of the BICM block for the advanced profile can include the Data FEC encoder, bit interleaver, constellation mapper, and time interleaver. However, the processing block 5000-1 is distinguished from the processing block 5000 further includes a cell-word demultiplexer 5010-1 and a MIMO encoding block 5020-1.

Also, the operations of the Data FEC encoder, bit interleaver, constellation mapper, and time interleaver in the processing block 5000-1 correspond to those of the Data FEC encoder 5010, bit interleaver 5020, constellation mapper 5030, and time interleaver 5050 described and thus description thereof is omitted.

The cell-word demultiplexer 5010-1 is used for the DP of the advanced profile to divide the single cell-word stream into dual cell-word streams for MIMO processing. Details of operations of the cell-word demultiplexer 5010-1 will be described later.

The MIMO encoding block 5020-1 can processing the output of the cell-word demultiplexer 5010-1 using MIMO encoding scheme. The MIMO encoding scheme was optimized for broadcasting signal transmission. The MIMO technology is a promising way to get a capacity increase but it depends on channel characteristics. Especially for broadcasting, the strong LOS component of the channel or a difference in the received signal power between two antennas caused by different signal propagation characteristics makes it difficult to get capacity gain from MIMO. The proposed MIMO encoding scheme overcomes this problem using a rotation-based pre-coding and phase randomization of one of the MIMO output signals.

MIMO encoding is intended for a 2×2 MIMO system requiring at least two antennas at both the transmitter and the receiver. Two MIMO encoding modes are defined in this proposal; full-rate spatial multiplexing (FR-SM) and full-rate full-diversity spatial multiplexing (FRFD-SM). The FR-SM encoding provides capacity increase with relatively small complexity increase at the receiver side while the FRFD-SM encoding provides capacity increase and additional diversity gain with a great complexity increase at the receiver side. The proposed MIMO encoding scheme has no restriction on the antenna polarity configuration.

MIMO processing is required for the advanced profile frame, which means all DPs in the advanced profile frame are processed by the MIMO encoder. MIMO processing is applied at DP level. Pairs of the Constellation Mapper outputs NUQ (e1,i and e2,i) are fed to the input of the MIMO Encoder. Paired MIMO Encoder output (g1,i and g2,i) is transmitted by the same carrier k and OFDM symbol 1 of their respective TX antennas.

The above-described blocks may be omitted or replaced by blocks having similar or identical functions.

Figure 6:
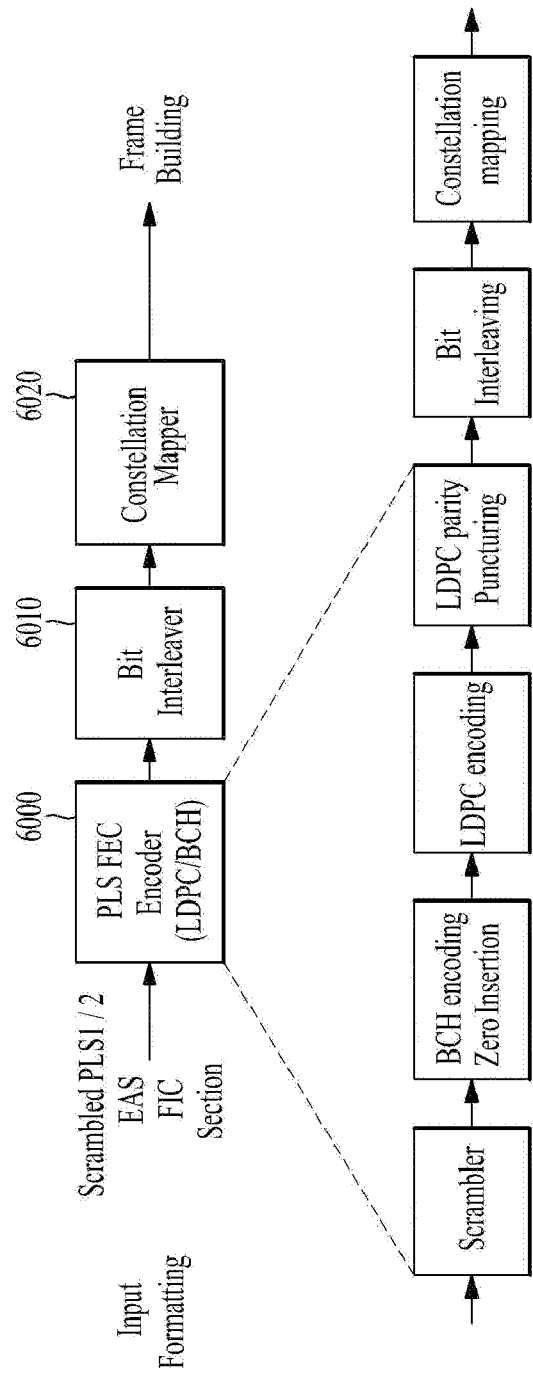
FIG. 6 illustrates a BICM block according to another embodiment of the present invention.

FIG. 6 illustrates a BICM block according to another embodiment of the present invention.

The BICM block illustrated in FIG. 6 corresponds to an embodiment of the BICM block 1010 described with reference to FIG. 1.

FIG. 6 illustrates a BICM block for protection of physical layer signaling (PLS), emergency alert channel (EAC) and fast information channel (FIC). EAC is a part of a frame that carries EAS information data and FIC is a logical channel in a frame that carries the mapping information between a service and the corresponding base DP. Details of the EAC and FIC will be described later.

Referring to FIG. 6, the BICM block for protection of PLS, EAC and FIC can include a PLS FEC encoder 6000, a bit interleaver 6010 and a constellation mapper 6020.

Also, the PLS FEC encoder 6000 can include a scrambler, BCH encoding/zero insertion block, LDPC encoding block and LDPC parity puncturing block. Description will be given of each block of the BICM block.

The PLS FEC encoder 6000 can encode the scrambled PLS 1/2 data, EAC and FIC section.

The scrambler can scramble PLS1 data and PLS2 data before BCH encoding and shortened and punctured LDPC encoding.

The BCH encoding/zero insertion block can perform outer encoding on the scrambled PLS 1/2 data using the shortened BCH code for PLS protection and insert zero bits after the BCH encoding. For PLS1 data only, the output bits of the zero insertion may be permitted before LDPC encoding.

The LDPC encoding block can encode the output of the BCH encoding/zero insertion block using LDPC code. To generate a complete coded block, Cldpc, parity bits, Pldpc are encoded systematically from each zero-inserted PLS information block, Ildpc and appended after it.

$$C_{ldpc} = [I_{ldpc} P_{ldpc}] = [i_0, i_1, \ldots, i_{K_{ldpc}-1}, p_0, p_1, \ldots, p_{N_{ldpc}-K_{ldpc}-1}]$$ [Math Figure 1]

The LDPC code parameters for PLS1 and PLS2 are as following table 4.

TABLE 4

| Signaling Type | $K_{sig}$ | $K_{bch}$ | $N_{bch\_parity}$ | $K_{ldpc}$ (=$N_{bch}$) | $N_{ldpc}$ | $N_{ldpc\_parity}$ | code rate | $Q_{ldpc}$ |
|---|---|---|---|---|---|---|---|---|
| PLS1 | 342 | 1020 | 60 | 1080 | 4320 | 3240 | 1/4 | 36 |
| PLS2 | <1021 | | | | | | | |
| | >1020 | 2100 | | 2160 | 7200 | 5040 | 3/10 | 56 |

The LDPC parity puncturing block can perform puncturing on the PLS1 data and PLS 2 data.

When shortening is applied to the PLS1 data protection, some LDPC parity bits are punctured after LDPC encoding. Also, for the PLS2 data protection, the LDPC parity bits of PLS2 are punctured after LDPC encoding. These punctured bits are not transmitted.

The bit interleaver 6010 can interleave the each shortened and punctured PLS1 data and PLS2 data.

The constellation mapper 6020 can map the bit interleaved PLS1 data and PLS2 data onto constellations.

The above-described blocks may be omitted or replaced by blocks having similar or identical functions.

Figure 7:
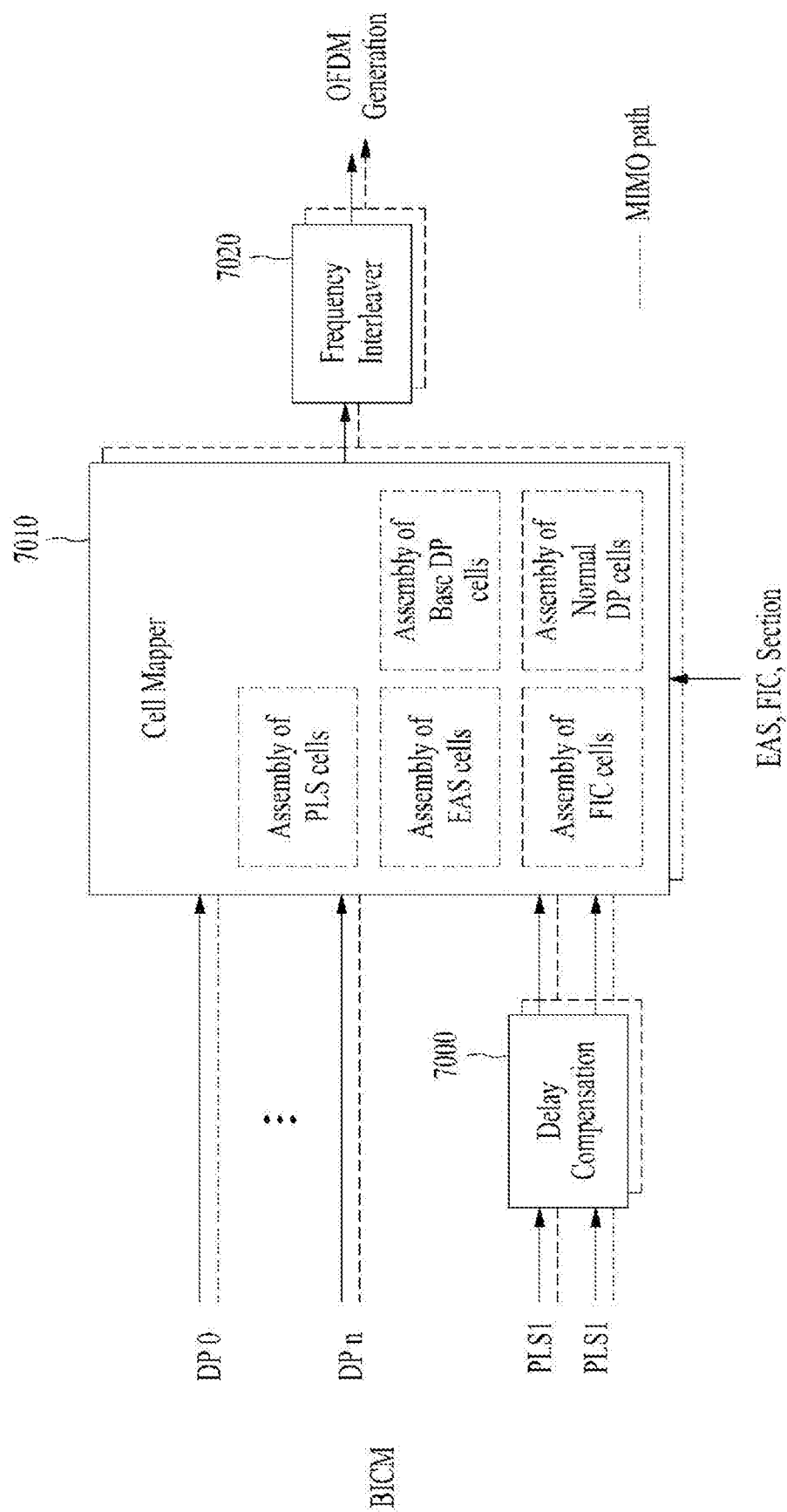
FIG. 7 illustrates a frame building block according to one embodiment of the present invention.

FIG. 7 illustrates a frame building block according to one embodiment of the present invention.

The frame building block illustrated in FIG. 7 corresponds to an embodiment of the frame building block 1020 described with reference to FIG. 1.

Referring to FIG. 7, the frame building block can include a delay compensation block 7000, a cell mapper 7010 and a frequency interleaver 7020. Description will be given of each block of the frame building block.

The delay compensation block 7000 can adjust the timing between the data pipes and the corresponding PLS data to ensure that they are co-timed at the transmitter end. The PLS data is delayed by the same amount as data pipes are by addressing the delays of data pipes caused by the Input Formatting block and BICM block. The delay of the BICM block is mainly due to the time interleaver. In-band signaling data carries information of the next TI group so that they are carried one frame ahead of the DPs to be signaled. The Delay Compensating block delays in-band signaling data accordingly.

The cell mapper 7010 can map PLS, EAC, FIC, DPs, auxiliary streams and dummy cells into the active carriers of the OFDM symbols in the frame. The basic function of the cell mapper 7010 is to map data cells produced by the TIs for each of the DPs, PLS cells, and EAC/FIC cells, if any, into arrays of active OFDM cells corresponding to each of the OFDM symbols within a frame. Service signaling data (such as PSI (program specific information)/SI) can be separately gathered and sent by a data pipe. The Cell Mapper operates according to the dynamic information produced by the scheduler and the configuration of the frame structure. Details of the frame will be described later.

The frequency interleaver 7020 can randomly interleave data cells received from the cell mapper 7010 to provide frequency diversity. Also, the frequency interleaver 7020 can operate on very OFDM symbol pair comprised of two sequential OFDM symbols using a different interleaving-seed order to get maximum interleaving gain in a single frame. Details of operations of the frequency interleaver 7020 will be described later.

The above-described blocks may be omitted or replaced by blocks having similar or identical functions.

Figure 8:
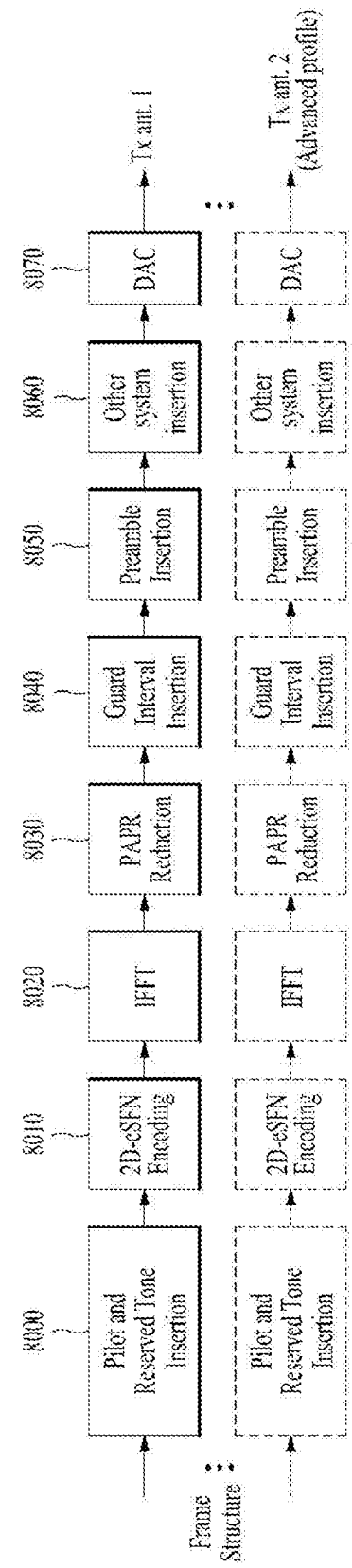
FIG. 8 illustrates an OFDM generation block according to an embodiment of the present invention.

FIG. 8 illustrates an OFDM generation block according to an embodiment of the present invention.

The OFDM generation block illustrated in FIG. 8 corresponds to an embodiment of the OFDM generation block 1030 described with reference to FIG. 1.

The OFDM generation block modulates the OFDM carriers by the cells produced by the Frame Building block, inserts the pilots, and produces the time domain signal for transmission. Also, this block subsequently inserts guard intervals, and applies PAPR (Peak-to-Average Power Radio) reduction processing to produce the final RF signal.

Referring to FIG. 8, the frame building block can include a pilot and reserved tone insertion block 8000, a 2D-eSFN encoding block 8010, an IFFT (Inverse Fast Fourier Transform) block 8020, a PAPR reduction block 8030, a guard interval insertion block 8040, a preamble insertion block 8050, other system insertion block 8060 and a DAC block 8070. Description will be given of each block of the frame building block.

The pilot and reserved tone insertion block 8000 can insert pilots and the reserved tone.

Various cells within the OFDM symbol are modulated with reference information, known as pilots, which have transmitted values known a priori in the receiver. The information of pilot cells is made up of scattered pilots, continual pilots, edge pilots, FSS (frame signaling symbol) pilots and FES (frame edge symbol) pilots. Each pilot is transmitted at a particular boosted power level according to pilot type and pilot pattern. The value of the pilot information is derived from a reference sequence, which is a series of values, one for each transmitted carrier on any given symbol. The pilots can be used for frame synchronization, frequency synchronization, time synchronization, channel estimation, and transmission mode identification, and also can be used to follow the phase noise.

Reference information, taken from the reference sequence, is transmitted in scattered pilot cells in every symbol except the preamble, FSS and FES of the frame. Continual pilots are inserted in every symbol of the frame. The number and location of continual pilots depends on both the FFT size and the scattered pilot pattern. The edge carriers are edge pilots in every symbol except for the preamble symbol. They are inserted in order to allow frequency interpolation up to the edge of the spectrum. FSS pilots are inserted in FSS(s) and FES pilots are inserted in FES. They are inserted in order to allow time interpolation up to the edge of the frame.

The system according to an embodiment of the present invention supports the SFN network, where distributed MISO scheme is optionally used to support very robust transmission mode. The 2D-eSFN is a distributed MISO scheme that uses multiple TX antennas, each of which is located in the different transmitter site in the SFN network.

The 2D-eSFN encoding block 8010 can process a 2D-eSFN processing to distorts the phase of the signals transmitted from multiple transmitters, in order to create both time and frequency diversity in the SFN configuration. Hence, burst errors due to low flat fading or deep-fading for a long time can be mitigated.

The IFFT block 8020 can modulate the output from the 2D-eSFN encoding block 8010 using OFDM modulation scheme. Any cell in the data symbols which has not been designated as a pilot (or as a reserved tone) carries one of the data cells from the frequency interleaver. The cells are mapped to OFDM carriers.

The PAPR reduction block 8030 can perform a PAPR reduction on input signal using various PAPR reduction algorithm in the time domain.

The guard interval insertion block 8040 can insert guard intervals and the preamble insertion block 8050 can insert preamble in front of the signal. Details of a structure of the preamble will be described later. The other system insertion block 8060 can multiplex signals of a plurality of broadcast transmission/reception systems in the time domain such that data of two or more different broadcast transmission/reception systems providing broadcast services can be simultaneously transmitted in the same RF signal bandwidth. In this case, the two or more different broadcast transmission/reception systems refer to systems providing different broadcast services. The different broadcast services may refer to a terrestrial broadcast service, mobile broadcast service, etc. Data related to respective broadcast services can be transmitted through different frames.

The DAC block 8070 can convert an input digital signal into an analog signal and output the analog signal. The signal output from the DAC block 7800 can be transmitted through multiple output antennas according to the physical layer profiles. A Tx antenna according to an embodiment of the present invention can have vertical or horizontal polarity.

The above-described blocks may be omitted or replaced by blocks having similar or identical functions according to design.

Figure 9:
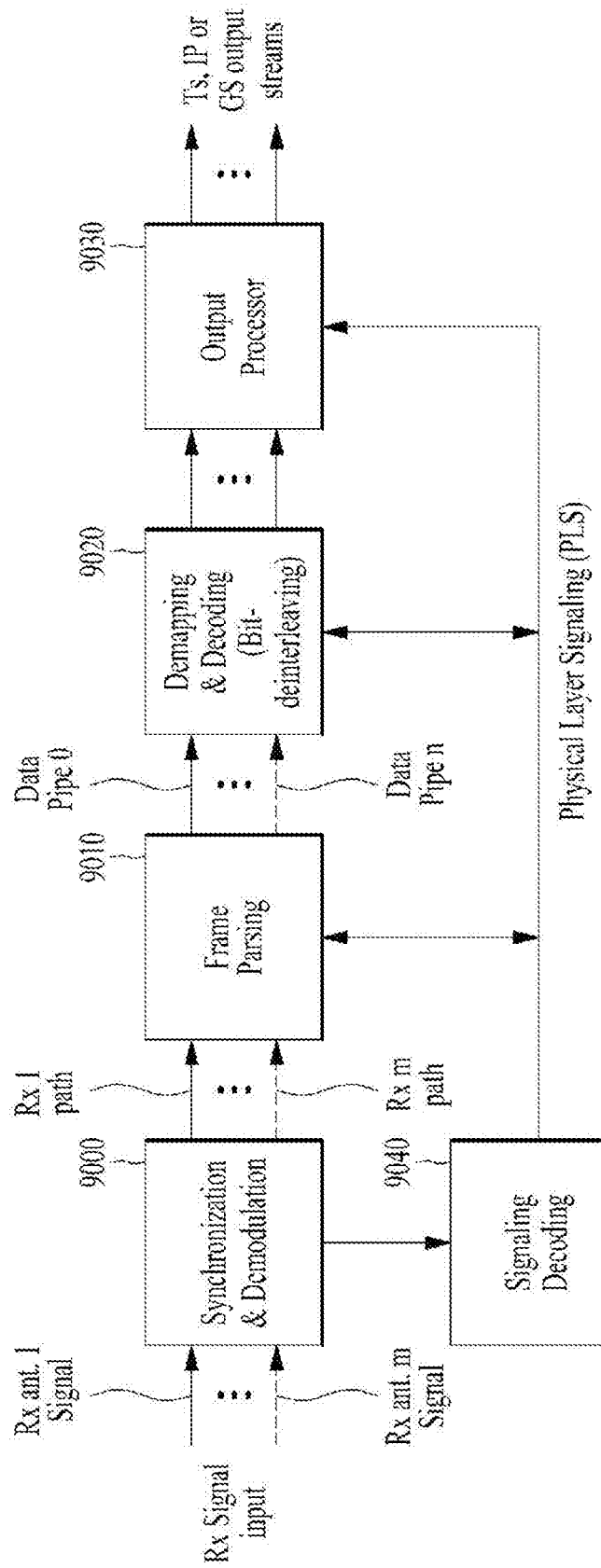
FIG. 9 illustrates a structure of an apparatus for receiving broadcast signals for future broadcast services according to an embodiment of the present invention.

FIG. 9 illustrates a structure of an apparatus for receiving broadcast signals for future broadcast services according to an embodiment of the present invention.

The apparatus for receiving broadcast signals for future broadcast services according to an embodiment of the present invention can correspond to the apparatus for transmitting broadcast signals for future broadcast services, described with reference to FIG. 1.

The apparatus for receiving broadcast signals for future broadcast services according to an embodiment of the present invention can include a synchronization & demodulation module 9000, a frame parsing module 9010, a demapping & decoding module 9020, an output processor 9030 and a signaling decoding module 9040. A description will be given of operation of each module of the apparatus for receiving broadcast signals.

The synchronization & demodulation module 9000 can receive input signals through m Rx antennas, perform signal detection and synchronization with respect to a system corresponding to the apparatus for receiving broadcast signals and carry out demodulation corresponding to a reverse procedure of the procedure performed by the apparatus for transmitting broadcast signals.

The frame parsing module 9100 can parse input signal frames and extract data through which a service selected by a user is transmitted. If the apparatus for transmitting broadcast signals performs interleaving, the frame parsing module 9100 can carry out deinterleaving corresponding to a reverse procedure of interleaving. In this case, the positions of a signal and data that need to be extracted can be obtained by decoding data output from the signaling decoding module 9400 to restore scheduling information generated by the apparatus for transmitting broadcast signals.

The demapping & decoding module 9200 can convert the input signals into bit domain data and then deinterleave the same as necessary. The demapping & decoding module 9200 can perform demapping for mapping applied for transmission efficiency and correct an error generated on a transmission channel through decoding. In this case, the demapping & decoding module 9200 can obtain transmission parameters necessary for demapping and decoding by decoding the data output from the signaling decoding module 9400.

The output processor 9300 can perform reverse procedures of various compression/signal processing procedures which are applied by the apparatus for transmitting broadcast signals to improve transmission efficiency. In this case, the output processor 9300 can acquire necessary control information from data output from the signaling decoding module 9400. The output of the output processor 8300 corresponds to a signal input to the apparatus for transmitting broadcast signals and may be MPEG-TSs, IP streams (v4 or v6) and generic streams.

The signaling decoding module 9400 can obtain PLS information from the signal demodulated by the synchronization & demodulation module 9000. As described above, the frame parsing module 9100, demapping & decoding module 9200 and output processor 9300 can execute functions thereof using the data output from the signaling decoding module 9400.

Figure 10:
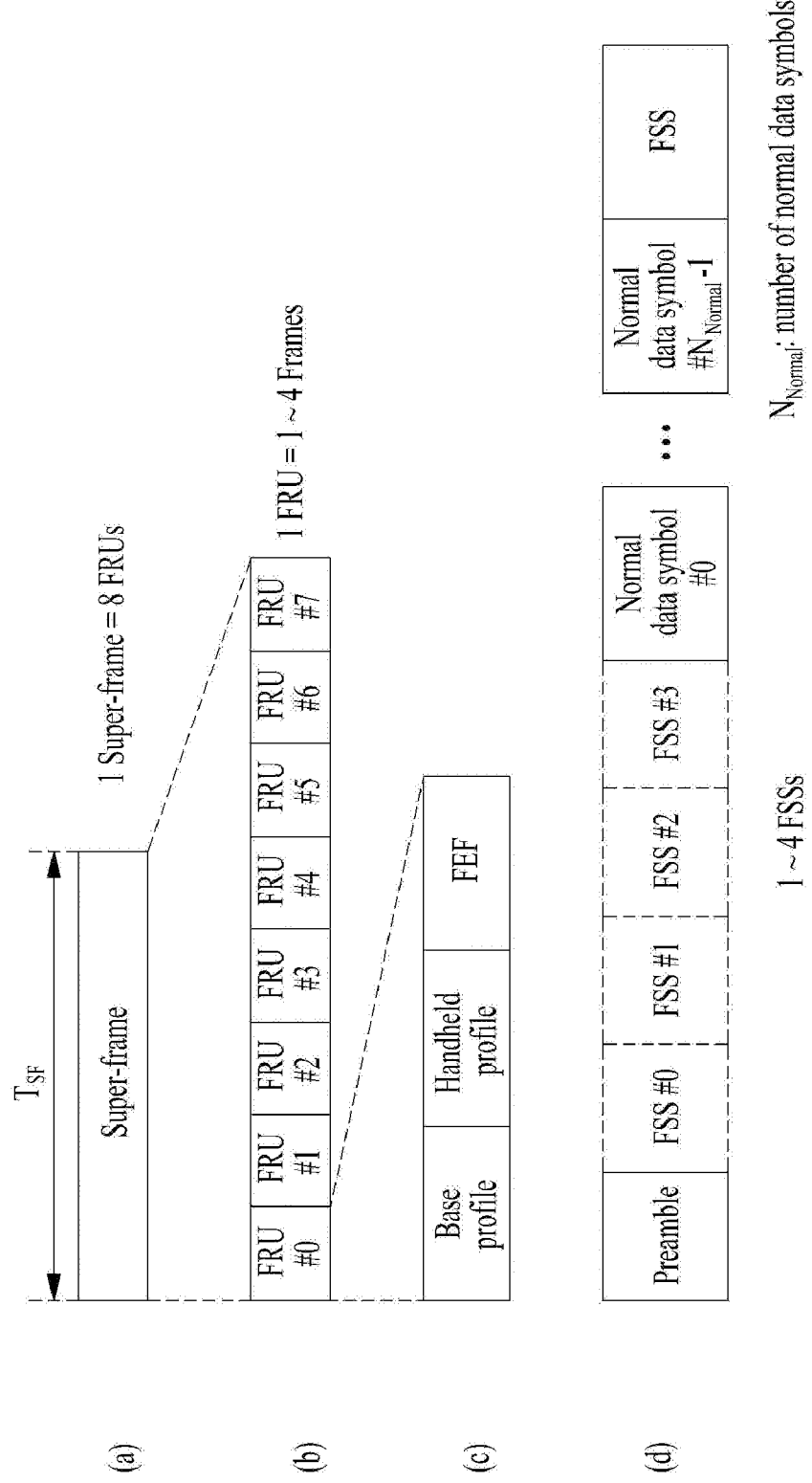
FIG. 10 illustrates a frame structure according to an embodiment of the present invention.

FIG. 10 illustrates a frame structure according to an embodiment of the present invention.

FIG. 10 shows an example configuration of the frame types and FRUs in a super-frame. (a) shows a super frame according to an embodiment of the present invention, (b) shows FRU (Frame Repetition Unit) according to an embodiment of the present invention, (c) shows frames of variable PHY profiles in the FRU and (d) shows a structure of a frame.

A super-frame may be composed of eight FRUs. The FRU is a basic multiplexing unit for TDM of the frames, and is repeated eight times in a super-frame.

Each frame in the FRU belongs to one of the PHY profiles, (base, handheld, advanced) or FEF. The maximum allowed number of the frames in the FRU is four and a given PHY profile can appear any number of times from zero times to four times in the FRU (e.g., base, base, handheld, advanced). PHY profile definitions can be extended using reserved values of the PHY_PROFILE in the preamble, if required.

The FEF part is inserted at the end of the FRU, if included. When the FEF is included in the FRU, the minimum number of FEFs is 8 in a super-frame. It is not recommended that FEF parts be adjacent to each other.

One frame is further divided into a number of OFDM symbols and a preamble. As shown in (d), the frame comprises a preamble, one or more frame signaling symbols (FSS), normal data symbols and a frame edge symbol (FES).

The preamble is a special symbol that enables fast Futurecast UTB system signal detection and provides a set of basic transmission parameters for efficient transmission and reception of the signal. The detailed description of the preamble will be will be described later.

The main purpose of the FSS(s) is to carry the PLS data. For fast synchronization and channel estimation, and hence fast decoding of PLS data, the FSS has more dense pilot pattern than the normal data symbol. The FES has exactly the same pilots as the FSS, which enables frequency-only interpolation within the FES and temporal interpolation, without extrapolation, for symbols immediately preceding the FES.

Figures 11, 12:
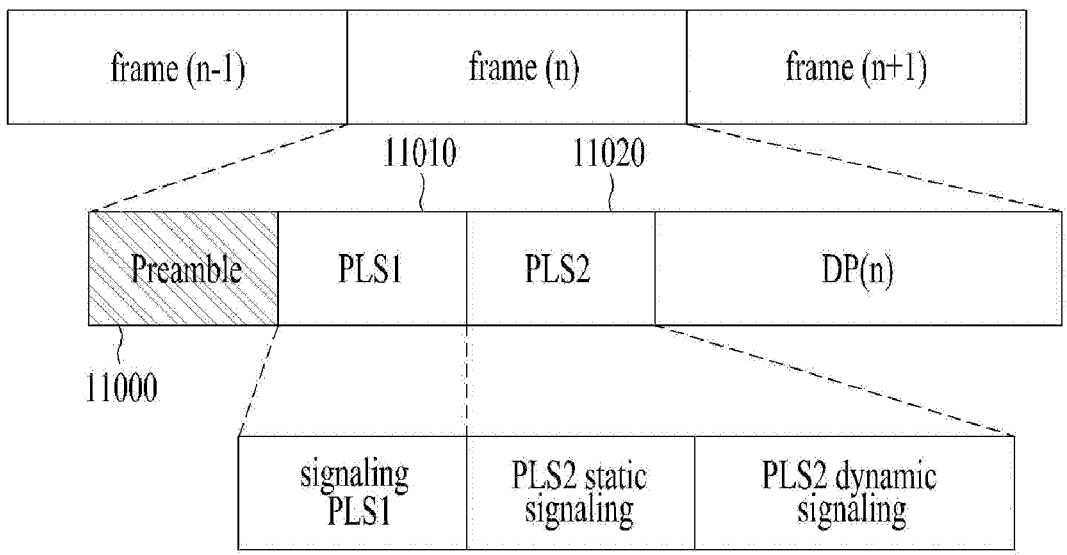
FIG. 11 illustrates a signaling hierarchy structure of the frame according to an embodiment of the present invention.
FIG. 12 illustrates preamble signaling data according to an embodiment of the present invention.

FIG. 11 illustrates a signaling hierarchy structure of the frame according to an embodiment of the present invention.

FIG. 11 illustrates the signaling hierarchy structure, which is split into three main parts: the preamble signaling data 11000, the PLS1 data 11010 and the PLS2 data 11020. The purpose of the preamble, which is carried by the preamble symbol in every frame, is to indicate the transmission type and basic transmission parameters of that frame. The PLS1 enables the receiver to access and decode the PLS2 data, which contains the parameters to access the DP of interest. The PLS2 is carried in every frame and split into two main parts: PLS2-STAT data and PLS2-DYN data. The static and dynamic portion of PLS2 data is followed by padding, if necessary.

FIG. 12 illustrates preamble signaling data according to an embodiment of the present invention.

Preamble signaling data carries 21 bits of information that are needed to enable the receiver to access PLS data and trace DPs within the frame structure. Details of the preamble signaling data are as follows:

PHY_PROFILE: This 3-bit field indicates the PHY profile type of the current frame. The mapping of different PHY profile types is given in below table 5.

TABLE 5

| Value | PHY profile |
|---|---|
| 000 | Base profile |
| 001 | Handheld profile |
| 010 | Advanced profiled |
| 011~110 | Reserved |
| 111 | FEF |

FFT_SIZE: This 2 bit field indicates the FFT size of the current frame within a frame-group, as described in below table 6.

TABLE 6

| Value | FFT size |
|---|---|
| 00 | 8K FFT |
| 01 | 16K FFT |
| 10 | 32K FFT |
| 11 | Reserved |

GI_FRACTION: This 3 bit field indicates the guard interval fraction value in the current super-frame, as described in below table 7.

TABLE 7

| Value | GI_FRACTION |
|---|---|
| 000 | 1/5 |
| 001 | 1/10 |
| 010 | 1/20 |
| 011 | 1/40 |
| 100 | 1/80 |
| 101 | 1/160 |
| 110~111 | Reserved |

EAC_FLAG: This 1 bit field indicates whether the EAC is provided in the current frame. If this field is set to '1', emergency alert service (EAS) is provided in the current frame. If this field set to '0', EAS is not carried in the current frame. This field can be switched dynamically within a super-frame.

PILOT_MODE: This 1-bit field indicates whether the pilot mode is mobile mode or fixed mode for the current frame in the current frame-group. If this field is set to '0', mobile pilot mode is used. If the field is set to '1', the fixed pilot mode is used.

PAPR_FLAG: This 1-bit field indicates whether PAPR reduction is used for the current frame in the current frame-group. If this field is set to value '1', tone reservation is used for PAPR reduction. If this field is set to '0', PAPR reduction is not used.

FRU_CONFIGURE: This 3-bit field indicates the PHY profile type configurations of the frame repetition units (FRU) that are present in the current super-frame. All profile types conveyed in the current super-frame are identified in this field in all preambles in the current super-frame. The 3-bit field has a different definition for each profile, as show in below table 8.

NETWORK_ID: This is a 16-bit field which uniquely identifies the current ATSC network.

SYSTEM_ID: This 16-bit field uniquely identifies the Futurecast UTB system within the ATSC network. The Futurecast UTB system is the terrestrial broadcast system

TABLE 8

|  | Current PHY_PROFILE = '000' (base) | Current PHY_PROFILE = '001' (handheld) | Current PHY_PROFILE = '010' (advanced) | Current PHY_PROFILE = '111' (FEF) |
|---|---|---|---|---|
| FRU_CONFIGURE = 000 | Only base profile present | Only handheld profile present | Only advanced profile present | Only FEF present |
| FRU_CONFIGURE = 1XX | Handheld profile present | Base profile present | Base profile present | Base profile present |
| FRU_CONFIGURE = X1X | Advanced profile present | Advanced profile present | Handheld profile present | Handheld profile present |
| FRU_CONFIGURE = XX1 | FEF present | FEF present | FEF present | Advanced profile present |

RESERVED: This 7-bit field is reserved for future use.

FIG. 13 illustrates PLS1 data according to an embodiment of the present invention.

PLS1 data provides basic transmission parameters including parameters required to enable the reception and decoding of the PLS2. As above mentioned, the PLS1 data remain unchanged for the entire duration of one frame-group. The detailed definition of the signaling fields of the PLS1 data are as follows:

PREAMBLE_DATA: This 20-bit field is a copy of the preamble signaling data excluding the EAC_FLAG.

NUM_FRAME_FRU: This 2-bit field indicates the number of the frames per FRU.

PAYLOAD_TYPE: This 3-bit field indicates the format of the payload data carried in the frame-group. PAYLOAD_TYPE is signaled as shown in table 9.

TABLE 9

| value | Payload type |
|---|---|
| 1XX | TS stream is transmitted |
| X1X | IP stream is transmitted |
| XX1 | GS stream is transmitted |

NUM_FSS: This 2-bit field indicates the number of FSS symbols in the current frame.

SYSTEM_VERSION: This 8-bit field indicates the version of the transmitted signal format. The SYSTEM_VERSION is divided into two 4-bit fields, which are a major version and a minor version.

Major version: The MSB four bits of SYSTEM_VERSION field indicate major version information. A change in the major version field indicates a non-backward-compatible change. The default value is '0000'. For the version described in this standard, the value is set to '0000'.

Minor version: The LSB four bits of SYSTEM_VERSION field indicate minor version information. A change in the minor version field is backward-compatible.

CELL_ID: This is a 16-bit field which uniquely identifies a geographic cell in an ATSC network. An ATSC cell coverage area may consist of one or more frequencies, depending on the number of frequencies used per Futurecast UTB system. If the value of the CELL_ID is not known or unspecified, this field is set to '0'.

whose input is one or more input streams (TS, IP, GS) and whose output is an RF signal. The Futurecast UTB system carries one or more PHY profiles and FEF, if any. The same Futurecast UTB system may carry different input streams and use different RF frequencies in different geographical areas, allowing local service insertion. The frame structure and scheduling is controlled in one place and is identical for all transmissions within a Futurecast UTB system. One or more Futurecast UTB systems may have the same SYSTEM_ID meaning that they all have the same physical layer structure and configuration.

The following loop consists of FRU_PHY_PROFILE, FRU_FRAME_LENGTH, FRU_GI_FRACTION, and RESERVED which are used to indicate the FRU configuration and the length of each frame type. The loop size is fixed so that four PHY profiles (including a FEF) are signaled within the FRU. If NUM_FRAME_FRU is less than 4, the unused fields are filled with zeros.

FRU_PHY_PROFILE: This 3-bit field indicates the PHY profile type of the (i+1)th (i is the loop index) frame of the associated FRU. This field uses the same signaling format as shown in the table 8.

FRU_FRAME_LENGTH: This 2-bit field indicates the length of the (i+1)th frame of the associated FRU. Using FRU_FRAME_LENGTH together with FRU_GI_FRACTION, the exact value of the frame duration can be obtained.

FRU_GI_FRACTION: This 3-bit field indicates the guard interval fraction value of the (i+1)th frame of the associated FRU. FRU_GI_FRACTION is signaled according to the table 7.

RESERVED: This 4-bit field is reserved for future use.

The following fields provide parameters for decoding the PLS2 data.

PLS2_FEC_TYPE: This 2-bit field indicates the FEC type used by the PLS2 protection. The FEC type is signaled according to table 10. The details of the LDPC codes will be described later.

TABLE 10

| Content | PLS2 FEC type |
|---|---|
| 00 | 4K-1/4 and 7K-3/10 LDPC codes |
| 01~11 | Reserved |

PLS2_MOD: This 3-bit field indicates the modulation type used by the PLS2. The modulation type is signaled according to table 11.

TABLE 11

| Value | PLS2_MODE |
|---|---|
| 000 | BPSK |
| 001 | QPSK |
| 010 | QAM-16 |
| 011 | NUQ-64 |
| 100~111 | Reserved |

PLS2_SIZE_CELL: This 15-bit field indicates $C_{total\_par-bal\_block}$, the size (specified as the number of QAM cells) of the collection of full coded blocks for PLS2 that is carried in the current frame-group. This value is constant during the entire duration of the current frame-group.

PLS2_STAT_SIZE_BIT: This 14-bit field indicates the size, in bits, of the PLS2-STAT for the current frame-group. This value is constant during the entire duration of the current frame-group.

PLS2_DYN_SIZE_BIT: This 14-bit field indicates the size, in bits, of the PLS2-DYN for the current frame-group. This value is constant during the entire duration of the current frame-group.

PLS2_REP_FLAG: This 1-bit flag indicates whether the PLS2 repetition mode is used in the current frame-group. When this field is set to value '1', the PLS2 repetition mode is activated. When this field is set to value '0', the PLS2 repetition mode is deactivated.

PLS2_REP_SIZE_CELL: This 15-bit field indicates Ctotal_partial_block, the size (specified as the number of QAM cells) of the collection of partial coded blocks for PLS2 carried in every frame of the current frame-group, when PLS2 repetition is used. If repetition is not used, the value of this field is equal to 0. This value is constant during the entire duration of the current frame-group.

PLS2_NEXT_FEC_TYPE: This 2-bit field indicates the FEC type used for PLS2 that is carried in every frame of the next frame-group. The FEC type is signaled according to the table 10.

PLS2_NEXT_MOD: This 3-bit field indicates the modulation type used for PLS2 that is carried in every frame of the next frame-group. The modulation type is signaled according to the table 11.

PLS2_NEXT_REP_FLAG: This 1-bit flag indicates whether the PLS2 repetition mode is used in the next frame-group. When this field is set to value '1', the PLS2 repetition mode is activated. When this field is set to value '0', the PLS2 repetition mode is deactivated.

PLS2_NEXT_REP_SIZE_CELL: This 15-bit field indicates Ctotal_full_block, The size (specified as the number of QAM cells) of the collection of full coded blocks for PLS2 that is carried in every frame of the next frame-group, when PLS2 repetition is used. If repetition is not used in the next frame-group, the value of this field is equal to 0. This value is constant during the entire duration of the current frame-group.

PLS2_NEXT_REP_STAT_SIZE_BIT: This 14-bit field indicates the size, in bits, of the PLS2-STAT for the next frame-group. This value is constant in the current frame-group.

PLS2_NEXT_REP_DYN_SIZE_BIT: This 14-bit field indicates the size, in bits, of the PLS2-DYN for the next frame-group. This value is constant in the current frame-group.

PLS2_AP_MODE: This 2-bit field indicates whether additional parity is provided for PLS2 in the current frame-group. This value is constant during the entire duration of the current frame-group. The below table 12 gives the values of this field. When this field is set to '00', additional parity is not used for the PLS2 in the current frame-group.

TABLE 12

| Value | PLS2-AP mode |
|---|---|
| 00 | AP is not provided |
| 01 | AP1 mode |
| 10~11 | Reserved |

PLS2_AP_SIZE_CELL: This 15-bit field indicates the size (specified as the number of QAM cells) of the additional parity bits of the PLS2. This value is constant during the entire duration of the current frame-group.

PLS2_NEXT_AP_MODE: This 2-bit field indicates whether additional parity is provided for PLS2 signaling in every frame of next frame-group. This value is constant during the entire duration of the current frame-group. The table 12 defines the values of this field PLS2_NEXT_AP_SIZE_CELL: This 15-bit field indicates the size (specified as the number of QAM cells) of the additional parity bits of the PLS2 in every frame of the next frame-group. This value is constant during the entire duration of the current frame-group.

RESERVED: This 32-bit field is reserved for future use.

CRC_32: A 32-bit error detection code, which is applied to the entire PLS1 signaling.

FIG. 14 illustrates PLS2 data according to an embodiment of the present invention.

FIG. 14 illustrates PLS2-STAT data of the PLS2 data. The PLS2-STAT data are the same within a frame-group, while the PLS2-DYN data provide information that is specific for the current frame.

The details of fields of the PLS2-STAT data are as follows:

FIC_FLAG: This 1-bit field indicates whether the FIC is used in the current frame-group. If this field is set to '1', the FIC is provided in the current frame. If this field set to '0', the FIC is not carried in the current frame. This value is constant during the entire duration of the current frame-group.

AUX_FLAG: This 1-bit field indicates whether the auxiliary stream(s) is used in the current frame-group. If this field is set to '1', the auxiliary stream is provided in the current frame. If this field set to '0', the auxiliary stream is not carried in the current frame. This value is constant during the entire duration of current frame-group.

NUM_DP: This 6-bit field indicates the number of DPs carried within the current frame. The value of this field ranges from 1 to 64, and the number of DPs is NUM_DP+1.

DP_ID: This 6-bit field identifies uniquely a DP within a PHY profile.

DP_TYPE: This 3-bit field indicates the type of the DP. This is signaled according to the below table 13.

TABLE 13

| Value | DP Type |
|---|---|
| 000 | DP Type 1 |
| 001 | DP Type 2 |
| 010~111 | reserved |

DP_GROUP_ID: This 8-bit field identifies the DP group with which the current DP is associated. This can be used by a receiver to access the DPs of the service components associated with a particular service, which will have the same DP_GROUP_ID.

BASE_DP_ID: This 6-bit field indicates the DP carrying service signaling data (such as PSI/SI) used in the Management layer. The DP indicated by BASE_DP_ID may be either a normal DP carrying the service signaling data along with the service data or a dedicated DP carrying only the service signaling data.

DP_FEC_TYPE: This 2-bit field indicates the FEC type used by the associated DP. The FEC type is signaled according to the below table 14.

TABLE 14

| Value | FEC_TYPE |
|---|---|
| 00 | 16K LDPC |
| 01 | 64K LDPC |
| 10~11 | Reserved |

DP_COD: This 4-bit field indicates the code rate used by the associated DP. The code rate is signaled according to the below table 15.

TABLE 15

| Value | Code rate |
|---|---|
| 0000 | 5/15 |
| 0001 | 6/15 |
| 0010 | 7/15 |
| 0011 | 8/15 |
| 0100 | 9/15 |
| 0101 | 10/15 |
| 0110 | 11/15 |
| 0111 | 12/15 |
| 1000 | 13/15 |
| 1001~1111 | Reserved |

DP_MOD: This 4-bit field indicates the modulation used by the associated DP. The modulation is signaled according to the below table 16.

TABLE 16

| Value | Modulation |
|---|---|
| 0000 | QPSK |
| 0001 | QAM-16 |
| 0010 | NUQ-64 |
| 0011 | NUQ-256 |
| 0100 | NUQ-1024 |
| 0101 | NUC-16 |
| 0110 | NUC-64 |
| 0111 | NUC-256 |
| 1000 | NUC-1024 |
| 1001~1111 | reserved |

DP_SSD_FLAG: This 1-bit field indicates whether the SSD mode is used in the associated DP. If this field is set to value '1', SSD is used. If this field is set to value '0', SSD is not used.

The following field appears only if PHY_PROFILE is equal to '010', which indicates the advanced profile:

DP_MIMO: This 3-bit field indicates which type of MIMO encoding process is applied to the associated DP. The type of MIMO encoding process is signaled according to the table 17.

TABLE 17

| Value | MIMO encoding |
|---|---|
| 000 | FR-SM |
| 001 | FRFD-SM |
| 010~111 | reserved |

DP_TI_TYPE: This 1-bit field indicates the type of time-interleaving. A value of '0' indicates that one TI group corresponds to one frame and contains one or more TI-blocks. A value of '1' indicates that one TI group is carried in more than one frame and contains only one TI-block.

DP_TI_LENGTH: The use of this 2-bit field (the allowed values are only 1, 2, 4, 8) is determined by the values set within the DP_TI_TYPE field as follows:

If the DP_TI_TYPE is set to the value '1', this field indicates PI, the number of the frames to which each TI group is mapped, and there is one TI-block per TI group (NTI=1). The allowed PI values with 2-bit field are defined in the below table 18.

If the DP_TI_TYPE is set to the value '0', this field indicates the number of TI-blocks NTI per TI group, and there is one TI group per frame (PI=1). The allowed PI values with 2-bit field are defined in the below table 18.

TABLE 18

| 2-bit field | $P_I$ | $N_{TI}$ |
|---|---|---|
| 00 | 1 | 1 |
| 01 | 2 | 2 |
| 10 | 4 | 3 |
| 11 | 8 | 4 |

DP_FRAME_INTERVAL: This 2-bit field indicates the frame interval ($I_{JUMP}$) within the frame-group for the associated DP and the allowed values are 1, 2, 4, 8 (the corresponding 2-bit field is '00', '01', '10', or '11', respectively). For DPs that do not appear every frame of the frame-group, the value of this field is equal to the interval between successive frames. For example, if a DP appears on the frames 1, 5, 9, 13, etc., this field is set to '4'. For DPs that appear in every frame, this field is set to '1'.

DP_TI_BYPASS: This 1-bit field determines the availability of time interleaver. If time interleaving is not used for a DP, it is set to '1'. Whereas if time interleaving is used it is set to '0'.

DP_FIRST_FRAME_IDX: This 5-bit field indicates the index of the first frame of the super-frame in which the current DP occurs. The value of DP_FIRST_FRAME_IDX ranges from 0 to 31.

DP_NUM_BLOCK_MAX: This 10-bit field indicates the maximum value of DP_NUM_BLOCKS for this DP. The value of this field has the same range as DP_NUM_BLOCKS.

DP_PAYLOAD_TYPE: This 2-bit field indicates the type of the payload data carried by the given DP. DP_PAYLOAD_TYPE is signaled according to the below table 19.

TABLE 19

| Value | Payload Type |
|---|---|
| 00 | TS |
| 01 | IP |
| 10 | GS |
| 11 | reserved |

DP_INBAND_MODE: This 2-bit field indicates whether the current DP carries in-band signaling information. The in-band signaling type is signaled according to the below table 20.

TABLE 20

| Value | In-band mode |
|---|---|
| 00 | In-band signaling is not carried. |
| 01 | INBAND-PLS is carried only |
| 10 | INBAND-ISSY is carried only |
| 11 | INBAND-PLS and INBAND-ISSY are carried |

DP_PROTOCOL_TYPE: This 2-bit field indicates the protocol type of the payload carried by the given DP. It is signaled according to the below table 21 when input payload types are selected.

TABLE 21

| Value | If DP_PAYLOAD_TYPE Is TS | If DP_PAYLOAD_TYPE Is IP | If DP_PAYLOAD_TYPE Is GS |
|---|---|---|---|
| 00 | MPEG2-TS | IPv4 | (Note) |
| 01 | Reserved | IPv6 | Reserved |
| 10 | Reserved | Reserved | Reserved |
| 11 | Reserved | Reserved | Reserved |

DP_CRC_MODE: This 2-bit field indicates whether CRC encoding is used in the Input Formatting block. The CRC mode is signaled according to the below table 22.

TABLE 22

| Value | CRC mode |
|---|---|
| 00 | Not used |
| 01 | CRC-8 |
| 10 | CRC-16 |
| 11 | CRC-32 |

DNP_MODE: This 2-bit field indicates the null-packet deletion mode used by the associated DP when DP_PAYLOAD_TYPE is set to TS ('00'). DNP_MODE is signaled according to the below table 23. If DP_PAYLOAD_TYPE is not TS ('00'), DNP_MODE is set to the value '00'.

TABLE 23

| Value | Null-packet deletion mode |
|---|---|
| 00 | Not used |
| 01 | DNP-NORMAL |
| 10 | DNP-OFFSET |
| 11 | reserved |

ISSY_MODE: This 2-bit field indicates the ISSY mode used by the associated DP when DP_PAYLOAD_TYPE is set to TS ('00'). The ISSY_MODE is signaled according to the below table 24 If DP_PAYLOAD_TYPE is not TS ('00'), ISSY_MODE is set to the value '00'.

TABLE 24

| Value | ISSY mode |
|---|---|
| 00 | Not used |
| 01 | ISSY-UP |
| 10 | ISSY-BBF |
| 11 | reserved |

HC_MODE_TS: This 2-bit field indicates the TS header compression mode used by the associated DP when DP_PAYLOAD_TYPE is set to TS ('00'). The HC_MODE_TS is signaled according to the below table 25.

TABLE 25

| Value | Header compression mode |
|---|---|
| 00 | HC_MODE_TS 1 |
| 01 | HC_MODE_TS 2 |
| 10 | HC_MODE_TS 3 |
| 11 | HC_MODE_TS 4 |

HC_MODE_IP: This 2-bit field indicates the IP header compression mode when DP_PAYLOAD_TYPE is set to IP ('01'). The HC_MODE_IP is signaled according to the below table 26.

TABLE 26

| Value | Header compression mode |
|---|---|
| 00 | No compression |
| 01 | HC_MODE_IP 1 |
| 10~11 | reserved |

PID: This 13-bit field indicates the PID number for TS header compression when DP_PAYLOAD_TYPE is set to TS ('00') and HC_MODE_TS is set to '01' or '10'.

RESERVED: This 8-bit field is reserved for future use.

The following field appears only if FIC_FLAG is equal to '1':

FIC_VERSION: This 8-bit field indicates the version number of the FIC.

FIC_LENGTH_BYTE: This 13-bit field indicates the length, in bytes, of the FIC.

RESERVED: This 8-bit field is reserved for future use.

The following field appears only if AUX_FLAG is equal to '1':

NUM_AUX: This 4-bit field indicates the number of auxiliary streams. Zero means no auxiliary streams are used.

AUX_CONFIG_RFU: This 8-bit field is reserved for future use.

AUX_STREAM_TYPE: This 4-bit is reserved for future use for indicating the type of the current auxiliary stream.

AUX_PRIVATE_CONFIG: This 28-bit field is reserved for future use for signaling auxiliary streams.

Figures 15, 16:
FIG. 15 illustrates PLS2 data according to another embodiment of the present invention.
FIG. 16 illustrates a logical structure of a frame according to an embodiment of the present invention.

FIG. 15 illustrates PLS2 data according to another embodiment of the present invention.

FIG. 15 illustrates PLS2-DYN data of the PLS2 data. The values of the PLS2-DYN data may change during the duration of one frame-group, while the size of fields remains constant.

The details of fields of the PLS2-DYN data are as follows:

FRAME_INDEX: This 5-bit field indicates the frame index of the current frame within the super-frame. The index of the first frame of the super-frame is set to '0'.

PLS_CHANGE_COUNTER: This 4-bit field indicates the number of super-frames ahead where the configuration will change. The next super-frame with changes in the configuration is indicated by the value signaled within this field. If this field is set to the value '0000', it means that no scheduled change is foreseen: e.g., value '1' indicates that there is a change in the next super-frame.

FIC_CHANGE_COUNTER: This 4-bit field indicates the number of super-frames ahead where the configuration (i.e., the contents of the FIC) will change. The next super-frame with changes in the configuration is indicated by the value signaled within this field. If this field is set to the value '0000', it means that no scheduled change is foreseen: e.g. value '0001' indicates that there is a change in the next super-frame.

RESERVED: This 16-bit field is reserved for future use.

The following fields appear in the loop over NUM_DP, which describe the parameters associated with the DP carried in the current frame.

DP_ID: This 6-bit field indicates uniquely the DP within a PHY profile.

DP_START: This 15-bit (or 13-bit) field indicates the start position of the first of the DPs using the DPU addressing scheme. The DP_START field has differing length according to the PHY profile and FFT size as shown in the below table 27.

TABLE 27

| PHY profile | DP_START field size | |
|---|---|---|
| | 64K | 16K |
| Base | 13 bit | 15 bit |
| Handheld | — | 13 bit |
| Advanced | 13 bit | 15 bit |

DP_NUM_BLOCK: This 10-bit field indicates the number of FEC blocks in the current TI group for the current DP. The value of DP_NUM_BLOCK ranges from 0 to 1023.

RESERVED: This 8-bit field is reserved for future use.

The following fields indicate the FIC parameters associated with the EAC.

EAC_FLAG: This 1-bit field indicates the existence of the EAC in the current frame. This bit is the same value as the EAC_FLAG in the preamble.

EAS_WAKE_UP_VERSION_NUM: This 8-bit field indicates the version number of a wake-up indication.

If the EAC_FLAG field is equal to '1', the following 12 bits are allocated for EAC_LENGTH_BYTE field. If the EAC_FLAG field is equal to '0', the following 12 bits are allocated for EAC_COUNTER.

EAC_LENGTH_BYTE: This 12-bit field indicates the length, in byte, of the EAC.

EAC_COUNTER: This 12-bit field indicates the number of the frames before the frame where the EAC arrives.

The following field appears only if the AUX_FLAG field is equal to '1':

AUX_PRIVATE_DYN: This 48-bit field is reserved for future use for signaling auxiliary streams. The meaning of this field depends on the value of AUX_STREAM_TYPE in the configurable PLS2-STAT.

CRC_32: A 32-bit error detection code, which is applied to the entire PLS2.

FIG. 16 illustrates a logical structure of a frame according to an embodiment of the present invention.

As above mentioned, the PLS, EAC, FIC, DPs, auxiliary streams and dummy cells are mapped into the active carriers of the OFDM symbols in the frame. The PLS1 and PLS2 are first mapped into one or more FSS(s). After that, EAC cells, if any, are mapped immediately following the PLS field, followed next by FIC cells, if any. The DPs are mapped next after the PLS or EAC, FIC, if any. Type 1 DPs follows first, and Type 2 DPs next. The details of a type of the DP will be described later. In some case, DPs may carry some special data for EAS or service signaling data. The auxiliary stream or streams, if any, follow the DPs, which in turn are followed by dummy cells. Mapping them all together in the above mentioned order, i.e. PLS, EAC, FIC, DPs, auxiliary streams and dummy data cells exactly fill the cell capacity in the frame.

Figure 17:
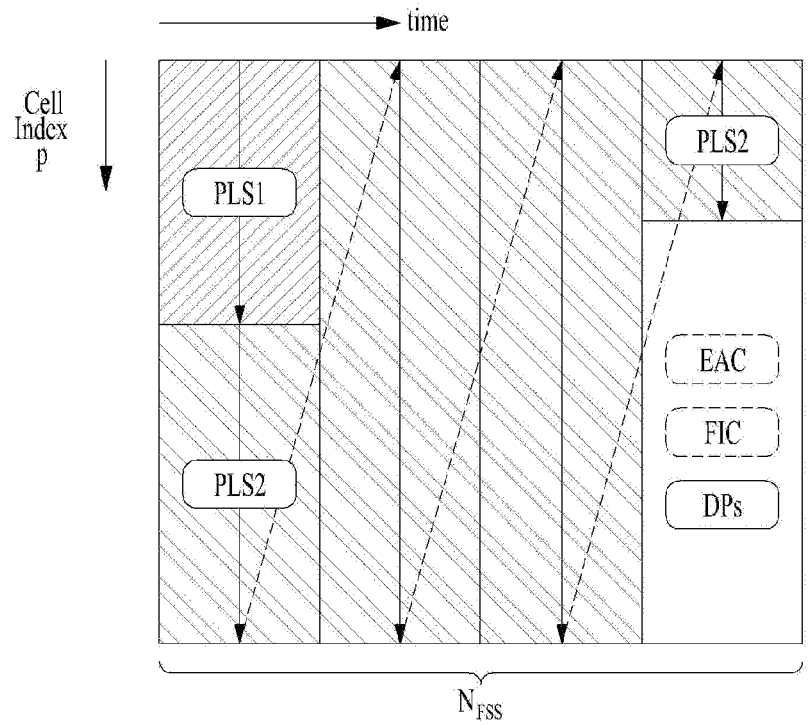
FIG. 17 illustrates PLS mapping according to an embodiment of the present invention.

FIG. 17 illustrates PLS mapping according to an embodiment of the present invention.

PLS cells are mapped to the active carriers of FSS(s). Depending on the number of cells occupied by PLS, one or more symbols are designated as FSS(s), and the number of FSS(s) NFSS is signaled by NUM_FSS in PLS1. The FSS is a special symbol for carrying PLS cells. Since robustness and latency are critical issues in the PLS, the FSS(s) has higher density of pilots allowing fast synchronization and frequency-only interpolation within the FSS.

PLS cells are mapped to active carriers of the NFSS FSS(s) in a top-down manner as shown in an example in FIG. 17. The PLS1 cells are mapped first from the first cell of the first FSS in an increasing order of the cell index. The PLS2 cells follow immediately after the last cell of the PLS1 and mapping continues downward until the last cell index of the first FSS. If the total number of required PLS cells exceeds the number of active carriers of one FSS, mapping proceeds to the next FSS and continues in exactly the same manner as the first FSS.

After PLS mapping is completed, DPs are carried next. If EAC, FIC or both are present in the current frame, they are placed between PLS and "normal" DPs.

Figure 18:
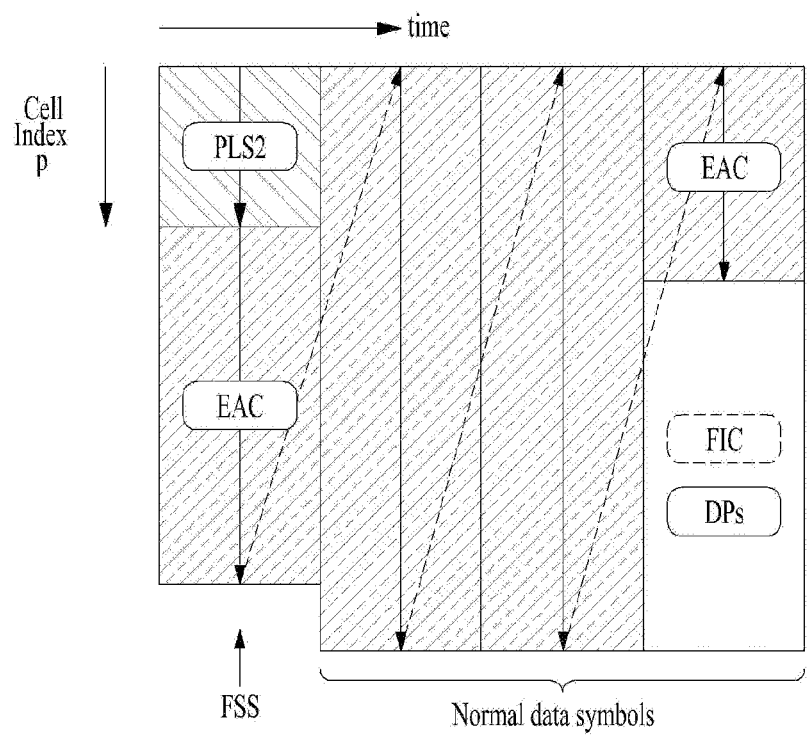
FIG. 18 illustrates EAC mapping according to an embodiment of the present invention.

FIG. 18 illustrates EAC mapping according to an embodiment of the present invention.

EAC is a dedicated channel for carrying EAS messages and links to the DPs for EAS. EAS support is provided but EAC itself may or may not be present in every frame. EAC, if any, is mapped immediately after the PLS2 cells. EAC is not preceded by any of the FIC, DPs, auxiliary streams or dummy cells other than the PLS cells. The procedure of mapping the EAC cells is exactly the same as that of the PLS.

The EAC cells are mapped from the next cell of the PLS2 in increasing order of the cell index as shown in the example in FIG. 18. Depending on the EAS message size, EAC cells may occupy a few symbols, as shown in FIG. 18.

EAC cells follow immediately after the last cell of the PLS2, and mapping continues downward until the last cell index of the last FSS. If the total number of required EAC cells exceeds the number of remaining active carriers of the last FSS mapping proceeds to the next symbol and continues in exactly the same manner as FSS(s). The next symbol for mapping in this case is the normal data symbol, which has more active carriers than a FSS.

After EAC mapping is completed, the FIC is carried next, if any exists. If FIC is not transmitted (as signaled in the PLS2 field), DPs follow immediately after the last cell of the EAC.

Figure 19:
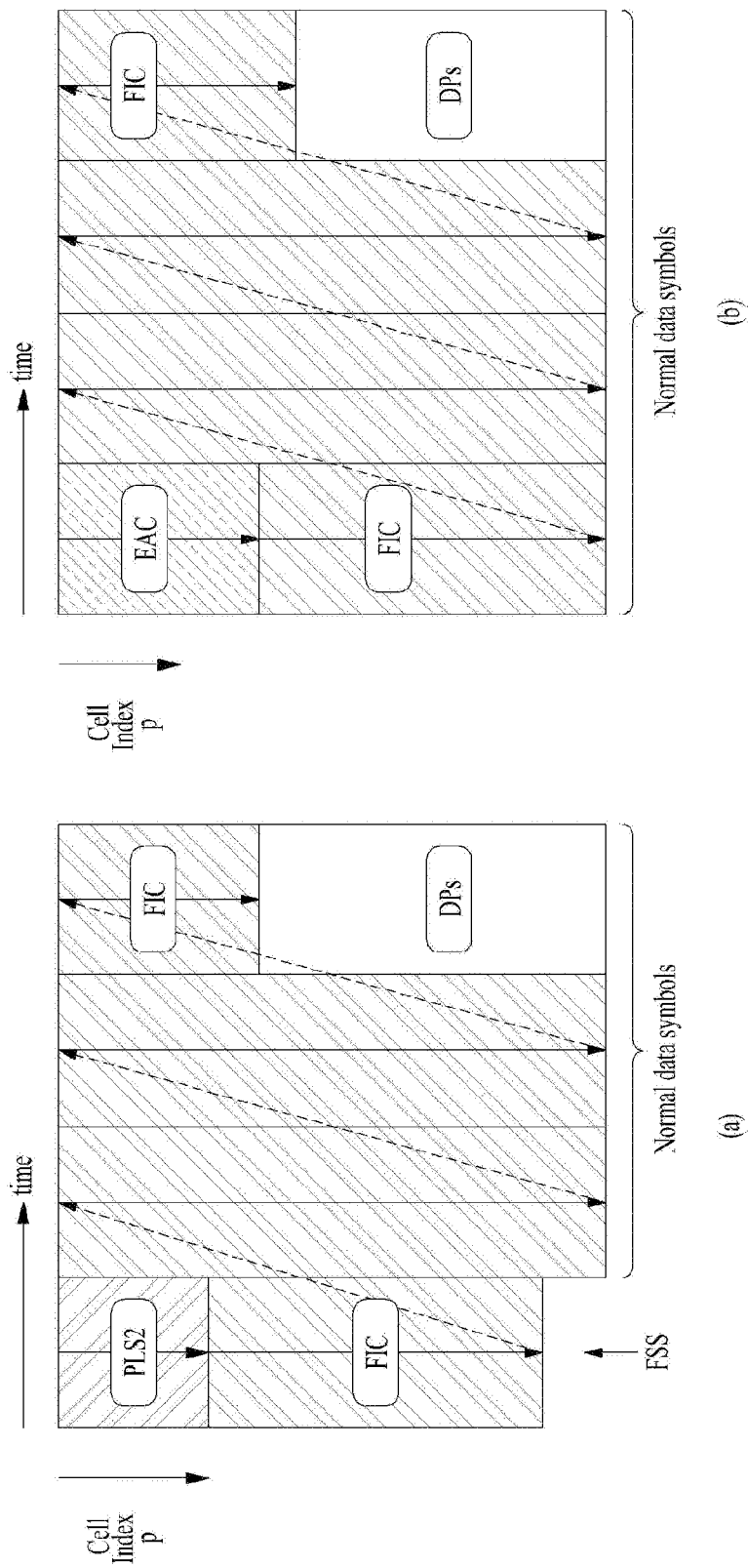
FIG. 19 illustrates FIC mapping according to an embodiment of the present invention.

FIG. 19 illustrates FIC mapping according to an embodiment of the present invention.

(a) shows an example mapping of FIC cell without EAC and (b) shows an example mapping of FIC cell with EAC.

FIC is a dedicated channel for carrying cross-layer information to enable fast service acquisition and channel scanning. This information primarily includes channel binding information between DPs and the services of each broadcaster. For fast scan, a receiver can decode FIC and obtain information such as broadcaster ID, number of services, and BASE_DP_ID. For fast service acquisition, in addition to FIC, base DP can be decoded using BASE_DP_ID. Other than the content it carries, a base DP is encoded and mapped to a frame in exactly the same way as a normal DP. Therefore, no additional description is required for a base DP. The FIC data is generated and consumed in the Management Layer. The content of FIC data is as described in the Management Layer specification.

The FIC data is optional and the use of FIC is signaled by the FIC_FLAG parameter in the static part of the PLS2. If FIC is used, FIC_FLAG is set to '1' and the signaling field for FIC is defined in the static part of PLS2. Signaled in this field are FIC_VERSION, and FIC_LENGTH_BYTE. FIC uses the same modulation, coding and time interleaving parameters as PLS2. FIC shares the same signaling parameters such as PLS2_MOD and PLS2_FEC. FIC data, if any, is mapped immediately after PLS2 or EAC if any. FIC is not preceded by any normal DPs, auxiliary streams or dummy cells. The method of mapping FIC cells is exactly the same as that of EAC which is again the same as PLS.

Without EAC after PLS, FIC cells are mapped from the next cell of the PLS2 in an increasing order of the cell index as shown in an example in (a). Depending on the FIC data size, FIC cells may be mapped over a few symbols, as shown in (b).

FIC cells follow immediately after the last cell of the PLS2, and mapping continues downward until the last cell index of the last FSS. If the total number of required FIC cells exceeds the number of remaining active carriers of the last FSS, mapping proceeds to the next symbol and continues in exactly the same manner as FSS(s). The next symbol for mapping in this case is the normal data symbol which has more active carriers than a FSS.

If EAS messages are transmitted in the current frame, EAC precedes FIC, and FIC cells are mapped from the next cell of the EAC in an increasing order of the cell index as shown in (b).

After FIC mapping is completed, one or more DPs are mapped, followed by auxiliary streams, if any, and dummy cells.

Figure 20:
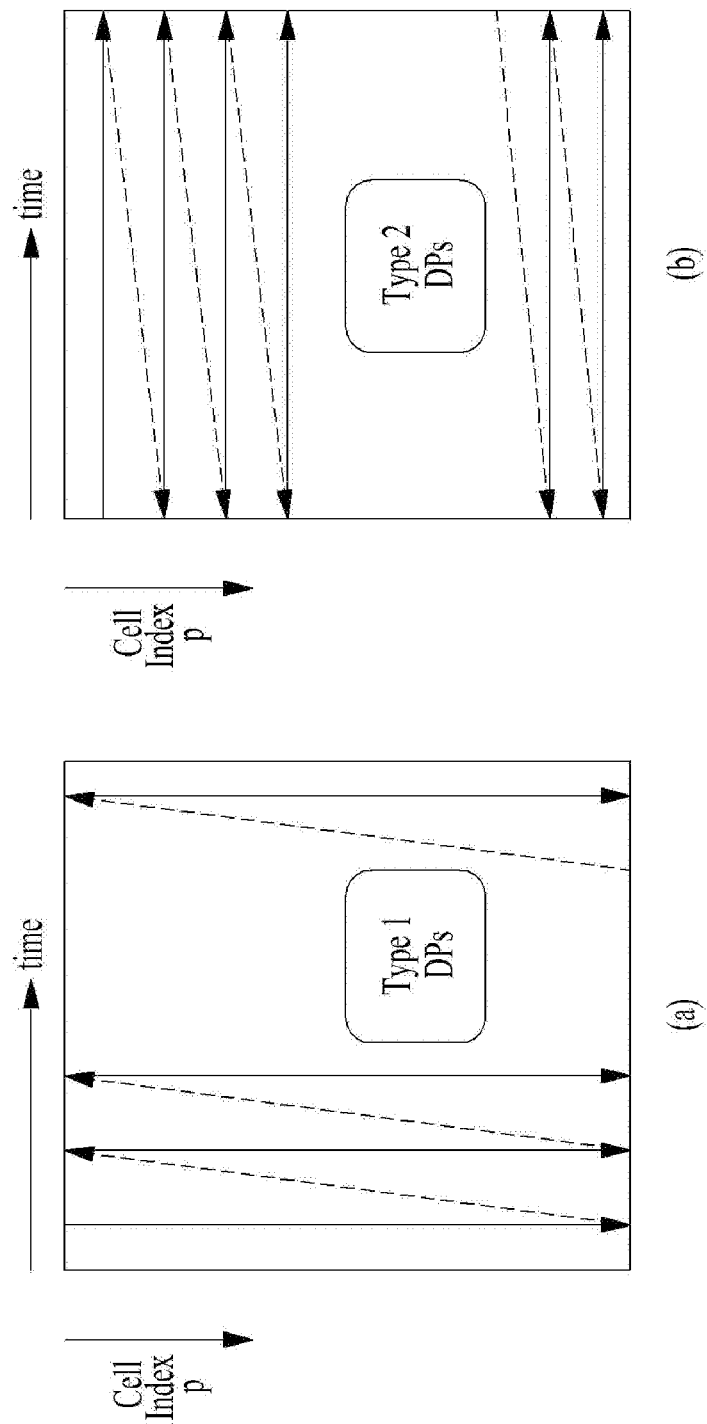
FIG. 20 illustrates a type of DP according to an embodiment of the present invention.

FIG. 20 illustrates a type of DP according to an embodiment of the present invention.

(a) shows type 1 DP and (b) shows type 2 DP.

After the preceding channels, i.e., PLS, EAC and FIC, are mapped, cells of the DPs are mapped. A DP is categorized into one of two types according to mapping method:

Type 1 DP: DP is mapped by TDM
Type 2 DP: DP is mapped by FDM

The type of DP is indicated by DP_TYPE field in the static part of PLS2. FIG. 20 illustrates the mapping orders of Type 1 DPs and Type 2 DPs. Type 1 DPs are first mapped in the increasing order of cell index, and then after reaching the last cell index, the symbol index is increased by one. Within the next symbol, the DP continues to be mapped in the increasing order of cell index starting from p=0. With a number of DPs mapped together in one frame, each of the Type 1 DPs are grouped in time, similar to TDM multiplexing of DPs.

Type 2 DPs are first mapped in the increasing order of symbol index, and then after reaching the last OFDM symbol of the frame, the cell index increases by one and the symbol index rolls back to the first available symbol and then increases from that symbol index. After mapping a number of DPs together in one frame, each of the Type 2 DPs are grouped in frequency together, similar to FDM multiplexing of DPs.

Type 1 DPs and Type 2 DPs can coexist in a frame if needed with one restriction; Type 1 DPs always precede Type 2 DPs. The total number of OFDM cells carrying Type 1 and Type 2 DPs cannot exceed the total number of OFDM cells available for transmission of DPs:

$$D_{DP1}+D_{DP2} \leq D_{DP}$$ [Math Figure 2]

where DDP1 is the number of OFDM cells occupied by Type 1 DPs, DDP2 is the number of cells occupied by Type 2 DPs. Since PLS, EAC, FIC are all mapped in the same way as Type 1 DP, they all follow "Type 1 mapping rule". Hence, overall, Type 1 mapping always precedes Type 2 mapping.

Figure 21:
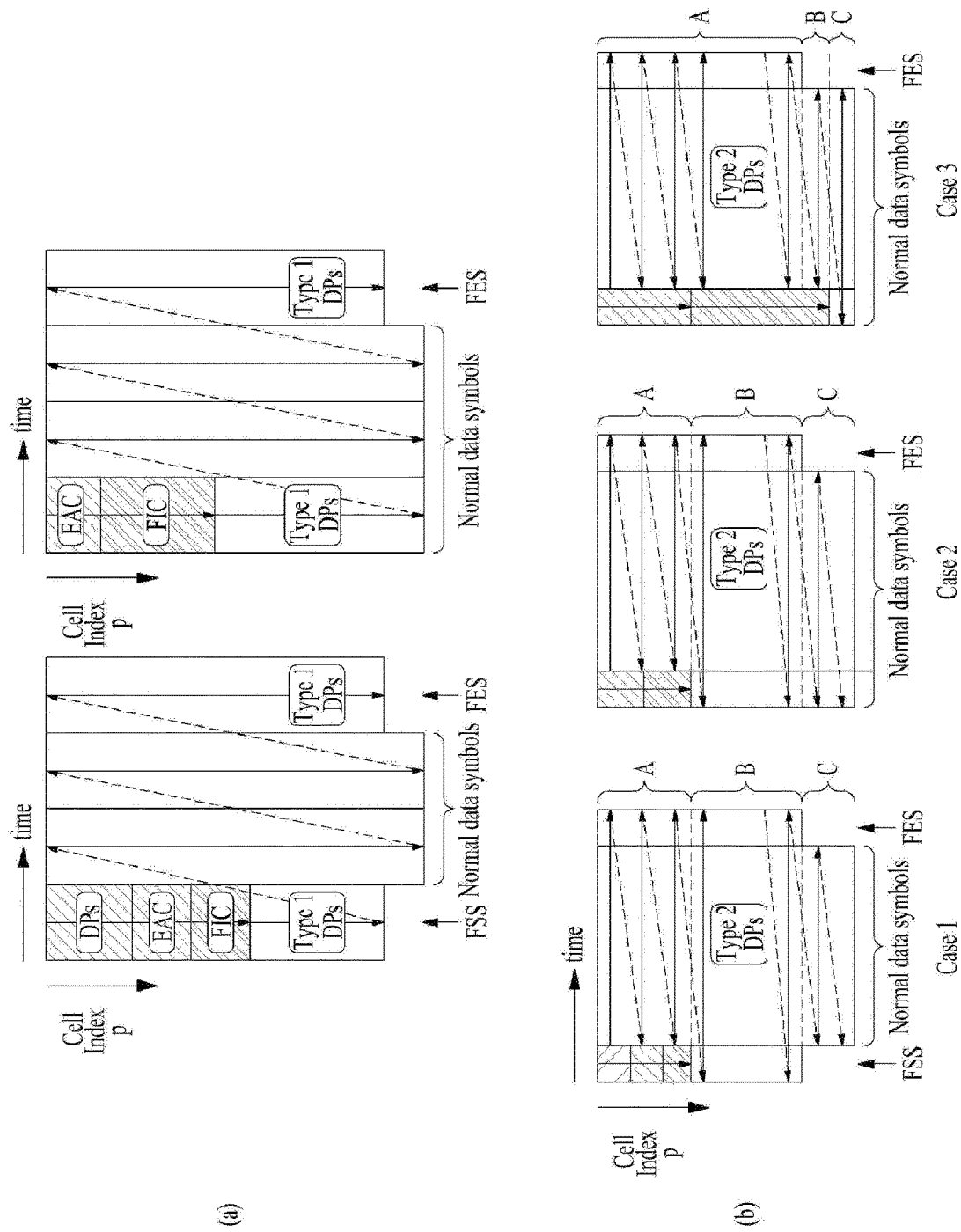
FIG. 21 illustrates DP mapping according to an embodiment of the present invention.

FIG. 21 illustrates DP mapping according to an embodiment of the present invention.

(a) shows an addressing of OFDM cells for mapping type 1 DPs and (b) shows an addressing of OFDM cells for mapping for type 2 DPs.

Addressing of OFDM cells for mapping Type 1 DPs (0, ..., DDP11) is defined for the active data cells of Type 1 DPs. The addressing scheme defines the order in which the cells from the TIs for each of the Type 1 DPs are allocated to the active data cells. It is also used to signal the locations of the DPs in the dynamic part of the PLS2.

Without EAC and FIC, address 0 refers to the cell immediately following the last cell carrying PLS in the last FSS. If EAC is transmitted and FIC is not in the corresponding frame, address 0 refers to the cell immediately following the last cell carrying EAC. If FIC is transmitted in the corresponding frame, address 0 refers to the cell immediately following the last cell carrying FIC. Address 0 for Type 1 DPs can be calculated considering two different cases as shown in (a). In the example in (a), PLS, EAC and FIC are assumed to be all transmitted. Extension to the cases where either or both of EAC and FIC are omitted is straightforward. If there are remaining cells in the FSS after mapping all the cells up to FIC as shown on the left side of (a).

Addressing of OFDM cells for mapping Type 2 DPs (0, ..., DDP21) is defined for the active data cells of Type 2 DPs. The addressing scheme defines the order in which the cells from the TIs for each of the Type 2 DPs are allocated to the active data cells. It is also used to signal the locations of the DPs in the dynamic part of the PLS2.

Three slightly different cases are possible as shown in (b). For the first case shown on the left side of (b), cells in the last FSS are available for Type 2 DP mapping. For the second case shown in the middle, FIC occupies cells of a normal symbol, but the number of FIC cells on that symbol is not larger than CFSS. The third case, shown on the right side in (b), is the same as the second case except that the number of FIC cells mapped on that symbol exceeds CFSS.

The extension to the case where Type 1 DP(s) precede Type 2 DP(s) is straightforward since PLS, EAC and FIC follow the same "Type 1 mapping rule" as the Type 1 DP(s).

A data pipe unit (DPU) is a basic unit for allocating data cells to a DP in a frame.

A DPU is defined as a signaling unit for locating DPs in a frame. A Cell Mapper 7010 may map the cells produced by the TIs for each of the DPs. A Time interleaver 5050 outputs a series of TI-blocks and each TI-block comprises a variable number of XFECBLOCKs which is in turn composed of a set of cells. The number of cells in an XFECBLOCK, Ncells, is dependent on the FECBLOCK size, Nldpc, and the number of transmitted bits per constellation symbol. A DPU is defined as the greatest common divisor of all possible values of the number of cells in a XFECBLOCK, Ncells, supported in a given PHY profile. The length of a DPU in cells is defined as LDPU. Since each PHY profile supports different combinations of FECBLOCK size and a different number of bits per constellation symbol, LDPU is defined on a PHY profile basis.

Figure 22:
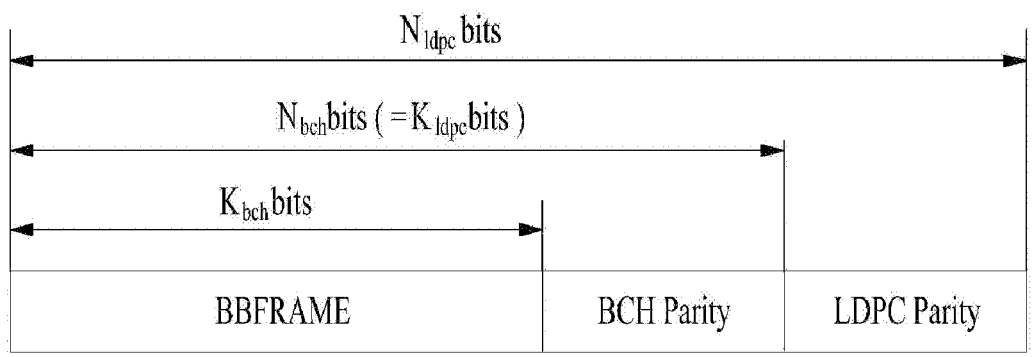
FIG. 22 illustrates an FEC structure according to an embodiment of the present invention.

FIG. 22 illustrates an FEC structure according to an embodiment of the present invention.

FIG. 22 illustrates an FEC structure according to an embodiment of the present invention before bit interleaving. As above mentioned, Data FEC encoder may perform the FEC encoding on the input BBF to generate FECBLOCK procedure using outer coding (BCH), and inner coding (LDPC). The illustrated FEC structure corresponds to the FECBLOCK. Also, the FECBLOCK and the FEC structure have same value corresponding to a length of LDPC codeword.

The BCH encoding is applied to each BBF (Kbch bits), and then LDPC encoding is applied to BCH-encoded BBF (Kldpc bits=Nbch bits) as illustrated in FIG. 22.

The value of Nldpc is either 64800 bits (long FECBLOCK) or 16200 bits (short FECBLOCK).

The below table 28 and table 29 show FEC encoding parameters for a long FECBLOCK and a short FECBLOCK, respectively.

TABLE 28

| LDPC Rate | $N_{ldpc}$ | $K_{ldpc}$ | $K_{bch}$ | BCH error correction capability | $N_{bch} - K_{bch}$ |
|---|---|---|---|---|---|
| 5/15 | 64800 | 21600 | 21408 | 12 | 192 |
| 6/15 | | 25920 | 25728 | | |
| 7/15 | | 30240 | 30048 | | |
| 8/15 | | 34560 | 34368 | | |
| 9/15 | | 38880 | 38688 | | |
| 10/15 | | 43200 | 43008 | | |
| 11/15 | | 47520 | 47328 | | |
| 12/15 | | 51840 | 51648 | | |
| 13/15 | | 56160 | 55968 | | |

TABLE 29

| LDPC Rate | $N_{ldpc}$ | $K_{ldpc}$ | $K_{bch}$ | BCH error correction capability | $N_{bch} - K_{bch}$ |
|---|---|---|---|---|---|
| 5/15 | 16200 | 5400 | 5232 | 12 | 168 |
| 6/15 | | 6480 | 6312 | | |
| 7/15 | | 7560 | 7392 | | |
| 8/15 | | 8640 | 8472 | | |
| 9/15 | | 9720 | 9552 | | |
| 10/15 | | 10800 | 10632 | | |
| 11/15 | | 11880 | 11712 | | |
| 12/15 | | 12960 | 12792 | | |
| 13/15 | | 14040 | 13872 | | |

The details of operations of the BCH encoding and LDPC encoding are as follows:

A 12-error correcting BCH code is used for outer encoding of the BBF. The BCH generator polynomial for short FECBLOCK and long FECBLOCK are obtained by multiplying together all polynomials.

LDPC code is used to encode the output of the outer BCH encoding. To generate a completed Bldpc (FECBLOCK), Pldpc (parity bits) is encoded systematically from each Ildpc (BCH-encoded BBF), and appended to Ildpc. The completed Bldpc (FECBLOCK) are expressed as follow Math figure.

$$B_{ldpc} = [I_{ldpc} P_{ldpc}] = [i_0, i_1, \ldots, i_{K_{ldpc}-1}, p_0, p_1, \ldots, p_{N_{ldpc}-K_{ldpc}-1}]$$ [Math Figure 3]

The parameters for long FECBLOCK and short FECBLOCK are given in the above table 28 and 29, respectively.

The detailed procedure to calculate Nldpc–Kldpc parity bits for long FECBLOCK, is as follows:

1) Initialize the parity bits, $$p_0 = p_1 = p_2 = \cdots = p_{N_{ldpc}-K_{ldpc}-1} = 0$$ [Math Figure 4]

2) Accumulate the first information bit—$i_0$, at parity bit addresses specified in the first row of an addresses of parity check matrix. The details of addresses of parity check matrix will be described later. For example, for rate 13/15:

$$p_{983} = p_{983} \oplus i_0 \quad p_{2815} = p_{2815} \oplus i_0$$
$$p_{4837} = p_{4837} \oplus i_0 \quad p_{4989} = p_{4989} \oplus i_0$$
$$p_{6138} = p_{6138} \oplus i_0 \quad p_{6458} = p_{6458} \oplus i_0$$
$$p_{6921} = p_{6921} \oplus i_0 \quad p_{6974} = p_{6974} \oplus i_0$$
$$p_{7572} = p_{7572} \oplus i_0 \quad p_{8260} = p_{8260} \oplus i_0$$
$$p_{8496} = p_{8496} \oplus i_0$$
[Math Figure 5]

3) For the next 359 information bits, $i_s$, s=1, 2, ..., 359 accumulate $i_s$ at parity bit addresses using following Math figure.

$$\{x + (s \bmod 360) \times Q_{ldpc}\} \bmod (N_{ldpc} - K_{ldpc})$$ [Math Figure 6]

where x denotes the address of the parity bit accumulator corresponding to the first bit $i_0$, and $Q_{ldpc}$ is a code rate dependent constant specified in the addresses of parity check matrix. Continuing with the example, $Q_{ldpc}=24$ for rate 13/15, so for information bit the following operations are performed:

$$p_{1007} = p_{1007} \oplus i_1 \quad p_{2839} = p_{2839} \oplus i_1$$
$$p_{4861} = p_{4861} \oplus i_1 \quad p_{5013} = p_{5013} \oplus i_1$$
$$p_{6162} = p_{6162} \oplus i_1 \quad p_{6482} = p_{6482} \oplus i_1$$
$$p_{6945} = p_{6945} \oplus i_1 \quad p_{6998} = p_{6998} \oplus i_1$$
$$p_{7596} = p_{7596} \oplus i_1 \quad p_{8284} = p_{8284} \oplus i_1$$
$$p_{8520} = p_{8520} \oplus i_1$$
[Math Figure 7]

4) For the 361st information bit $i_{360}$, the addresses of the parity bit accumulators are given in the second row of the addresses of parity check matrix. In a similar manner the addresses of the parity bit accumulators for the following 359 information bits $i_s$, s=361, 362, . . . , 719 are obtained using the Math Figure 6, where x denotes the address of the parity bit accumulator corresponding to the information bit $i_{360}$, i.e., the entries in the second row of the addresses of parity check matrix.

5) In a similar manner, for every group of 360 new information bits, a new row from addresses of parity check matrixes used to find the addresses of the parity bit accumulators. After all of the information bits are exhausted, the final parity bits are obtained as follows:

6) Sequentially perform the following operations starting with i=1.

$$p_i = p_i \oplus p_{i-1}, i=1,2,\ldots,N_{ldpc}-K_{ldpc}-1 \quad \text{[Math Figure 8]}$$

where final content of $p_i$, i=0, 1, . . . , $N_{ldpc}-K_{ldpc}-1$ is equal to the parity bit $p_i$.

TABLE 30

| Code Rate | $Q_{ldpc}$ |
| --- | --- |
| 5/15 | 120 |
| 6/15 | 108 |
| 7/15 | 96 |
| 8/15 | 84 |
| 9/15 | 72 |
| 10/15 | 60 |
| 11/15 | 48 |
| 12/15 | 36 |
| 13/15 | 24 |

This LDPC encoding procedure for a short FECBLOCK is in accordance with t LDPC encoding procedure for the long FECBLOCK, except replacing the table 30 with table 31, and replacing the addresses of parity check matrix for the long FECBLOCK with the addresses of parity check matrix for the short FECBLOCK.

TABLE 31

| Code Rate | $Q_{ldpc}$ |
| --- | --- |
| 5/15 | 30 |
| 6/15 | 27 |
| 7/15 | 24 |
| 8/15 | 21 |
| 9/15 | 18 |
| 10/15 | 15 |
| 11/15 | 12 |
| 12/15 | 9 |
| 13/15 | 6 |

Figure 23:
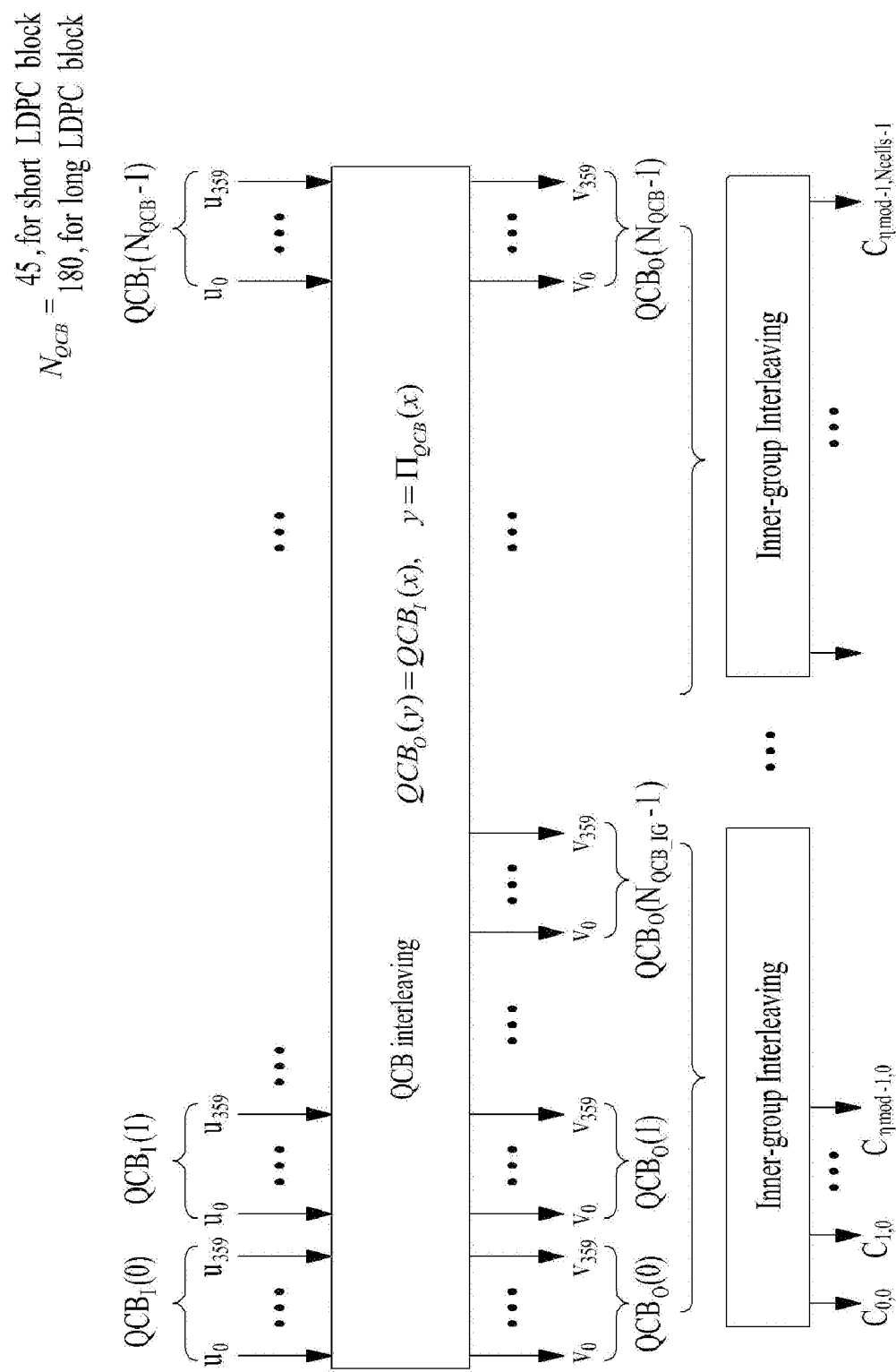
FIG. 23 illustrates a bit interleaving according to an embodiment of the present invention.

FIG. 23 illustrates a bit interleaving according to an embodiment of the present invention.

The outputs of the LDPC encoder are bit-interleaved, which consists of parity interleaving followed by Quasi-Cyclic Block (QCB) interleaving and inner-group interleaving.

(a) shows Quasi-Cyclic Block (QCB) interleaving and (b) shows inner-group interleaving.

The FECBLOCK may be parity interleaved. At the output of the parity interleaving, the LDPC codeword consists of 180 adjacent QC blocks in a long FECBLOCK and 45 adjacent QC blocks in a short FECBLOCK. Each QC block in either a long or short FECBLOCK consists of 360 bits. The parity interleaved LDPC codeword is interleaved by QCB interleaving. The unit of QCB interleaving is a QC block. The QC blocks at the output of parity interleaving are permutated by QCB interleaving as illustrated in FIG. 23, where Ncells=64800/$\eta_{mod}$ or 16200/$\eta_{mod}$ according to the FECBLOCK length. The QCB interleaving pattern is unique to each combination of modulation type and LDPC code rate.

After QCB interleaving, inner-group interleaving is performed according to modulation type and order ($\eta_{mod}$) which is defined in the below table 32. The number of QC blocks for one inner-group, NQCB_IG, is also defined.

TABLE 32

| Modulation type | $\eta_{mod}$ | $N_{QCB\_IG}$ |
| --- | --- | --- |
| QAM-16 | 4 | 2 |
| NUC-16 | 4 | 4 |
| NUQ-64 | 6 | 3 |
| NUC-64 | 6 | 6 |
| NUQ-256 | 8 | 4 |
| NUC-256 | 8 | 8 |
| NUQ-1024 | 10 | 5 |
| NUC-1024 | 10 | 10 |

The inner-group interleaving process is performed with NQCB_IG QC blocks of the QCB interleaving output. Inner-group interleaving has a process of writing and reading the bits of the inner-group using 360 columns and NQCB_IG rows. In the write operation, the bits from the QCB interleaving output are written row-wise. The read operation is performed column-wise to read out m bits from each row, where m is equal to 1 for NUC and 2 for NUQ.

Figure 24:
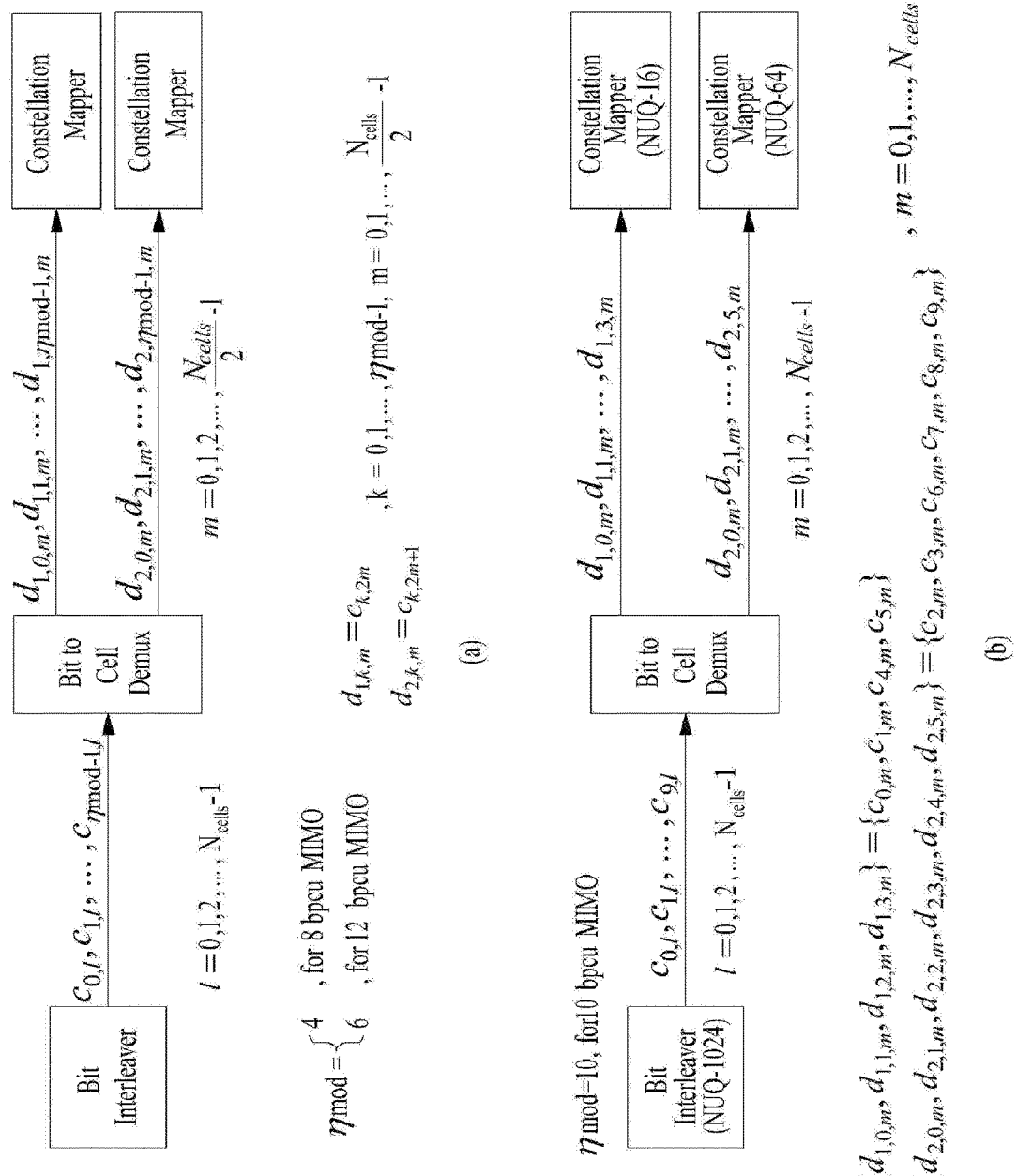
FIG. 24 illustrates a cell-word demultiplexing according to an embodiment of the present invention.

FIG. 24 illustrates a cell-word demultiplexing according to an embodiment of the present invention.

(a) shows a cell-word demultiplexing for 8 and 12 bpcu MIMO and (b) shows a cell-word demultiplexing for 10 bpcu MIMO.

Each cell word (c0,1, c1,1, . . . , cnmod−1,1) of the bit interleaving output is demultiplexed into (d1,0,m, d1,1,m . . . , d1,nmod−1,m) and (d2,0,m, d2,1,m . . . , d2,nmod−1,m) as shown in (a), which describes the cell-word demultiplexing process for one XFECBLOCK.

For the 10 bpcu MIMO case using different types of NUQ for MIMO encoding, the Bit Interleaver for NUQ-1024 is re-used. Each cell word (c0,1, c1,1, . . . , c9,1) of the Bit Interleaver output is demultiplexed into (d1,0,m, d1,1,m . . . , d1,3,m) and (d2,0,m, d2,1,m . . . , d2,5,m), as shown in (b).

FIG. 25 illustrates a time interleaving according to an embodiment of the present invention.

(a) to (c) show examples of TI mode.

The time interleaver operates at the DP level. The parameters of time interleaving (TI) may be set differently for each DP.

The following parameters, which appear in part of the PLS2-STAT data, configure the TI:

DP_TI_TYPE (allowed values: 0 or 1): Represents the TI mode; '0' indicates the mode with multiple TI blocks (more than one TI block) per TI group. In this case, one TI group is directly mapped to one frame (no inter-frame interleaving). '1' indicates the mode with only one TI block per TI group. In this case, the TI block may be spread over more than one frame (inter-frame interleaving).

DP_TI_LENGTH: If DP_TI_TYPE='0', this parameter is the number of TI blocks NTI per TI group. For DP_TI_TYPE='1', this parameter is the number of frames PI spread from one TI group.

DP_NUM_BLOCK_MAX (allowed values: 0 to 1023): Represents the maximum number of XFECBLOCKs per TI group.

DP_FRAME_INTERVAL (allowed values: 1, 2, 4, 8): Represents the number of the frames HUMP between two successive frames carrying the same DP of a given PHY profile.

DP_TI_BYPASS (allowed values: 0 or 1): If time interleaving is not used for a DP, this parameter is set to '1'. It is set to '0' if time interleaving is used.

Additionally, the parameter DP_NUM_BLOCK from the PLS2-DYN data is used to represent the number of XFECBLOCKs carried by one TI group of the DP.

When time interleaving is not used for a DP, the following TI group, time interleaving operation, and TI mode are not considered. However, the Delay Compensation block for the dynamic configuration information from the scheduler will still be required. In each DP, the XFECBLOCKs received from the SSD/MIMO encoding are grouped into TI groups. That is, each TI group is a set of an integer number of XFECBLOCKs and will contain a dynamically variable number of XFECBLOCKs. The number of XFECBLOCKs in the TI group of index n is denoted by NxBLOCK_Group (n) and is signaled as DP_NUM_BLOCK in the PLS2-DYN data. Note that NxBLOCK_Group(n) may vary from the minimum value of 0 to the maximum value NxBLOCK_Group_MAX (corresponding to DP_NUM_BLOCK_MAX) of which the largest value is 1023.

Each TI group is either mapped directly onto one frame or spread over PI frames. Each TI group is also divided into more than one TI blocks(NTI), where each TI block corresponds to one usage of time interleaver memory. The TI blocks within the TI group may contain slightly different numbers of XFECBLOCKs. If the TI group is divided into multiple TI blocks, it is directly mapped to only one frame. There are three options for time interleaving (except the extra option of skipping the time interleaving) as shown in the below table 33.

TABLE 33

| Modes | Descriptions |
| --- | --- |
| Option-1 | Each TI group contains one TI block and is mapped directly to one frame as shown in (a). This option is signaled in the PLS2-STAT by DP_TI_TYPE = '0' and DP_TI_LENGTH = '1'($N_{TI}$ = 1). |
| Option-2 | Each TI group contains one TI block and is mapped to more than one frame. (b) shows an example, where one TI group is mapped to two frames, i.e., DP_TI_LENGTH = '2' ($P_I$ = 2) and DP_FRAME_INTERVAL ($I_{JUMP}$ = 2). This provides greater time diversity for low data-rate services. This option is signaled in the PLS2-STAT by DP_TI_TYPE = '1'. |
| Option-3 | Each TI group is divided into multiple TI blocks and is mapped directly to one frame as shown in (c). Each TI block may use full TI memory, so as to provide the maximum bit-rate for a DP. This option is signaled in the PLS2-STAT signaling by DP_TI_TYPE = '0' and DP_TI_LENGTH = $N_{TI}$, while $P_I$ = 1. |

In each DP, the TI memory stores the input XFECBLOCKs (output XFECBLOCKs from the SSD/MIMO encoding block). Assume that input XFECBLOCKs are defined as $(d_{n,s,0,0}, d_{n,s,0,1}, \ldots, d_{n,s,0,N_{cells}-1}, d_{n,s,1,0}, \ldots, d_{n,s,1,N_{cells}-1}, \ldots, d_{n,s,N_{xBLOCK\_TI}(n,s)-1,0}, \ldots, d_{n,s,N_{xBLOCK\_TI}(n,s)-1,N_{cells}-1})$, where $d_{n,s,r,q}$ is the qth cell of the rth XFECBLOCK in the sth TI block of the nth TI group and represents the outputs of SSD and MIMO encodings as follows.

$$d_{n,s,r,q} = \begin{cases} f_{n,s,r,q}, & \text{the output of SSD} \ldots \text{encoding} \\ g_{n,s,r,q}, & \text{the output of MIMO encoding} \end{cases}$$

In addition, assume that output XFECBLOCKs from the time interleaver are defined as $(h_{n,s,0}, h_{n,s,1}, \ldots, h_{n,s,i}, \ldots, h_{n,s,N_{xBLOCK\_TI}(n,s) \times N_{cells}-1})$, where $h_{n,s,i}$ is the ith output cell (for in the sth TI block of the nth TI group.

Typically, the time interleaver will also act as a buffer for DP data prior to the process of frame building. This is achieved by means of two memory banks for each DP. The first TI-block is written to the first bank. The second TI-block is written to the second bank while the first bank is being read from and so on.

The TI is a twisted row-column block interleaver. For the sth TI block of the nth TI group, the number of rows $N_r$ of a TI memory is equal to the number of cells $N_{cells}$, i.e., $N_r = N_{cells}$ while the number of columns $N_c$ is equal to the number $N_{xBLOCK\_TI}(n,s)$.

Figure 26:
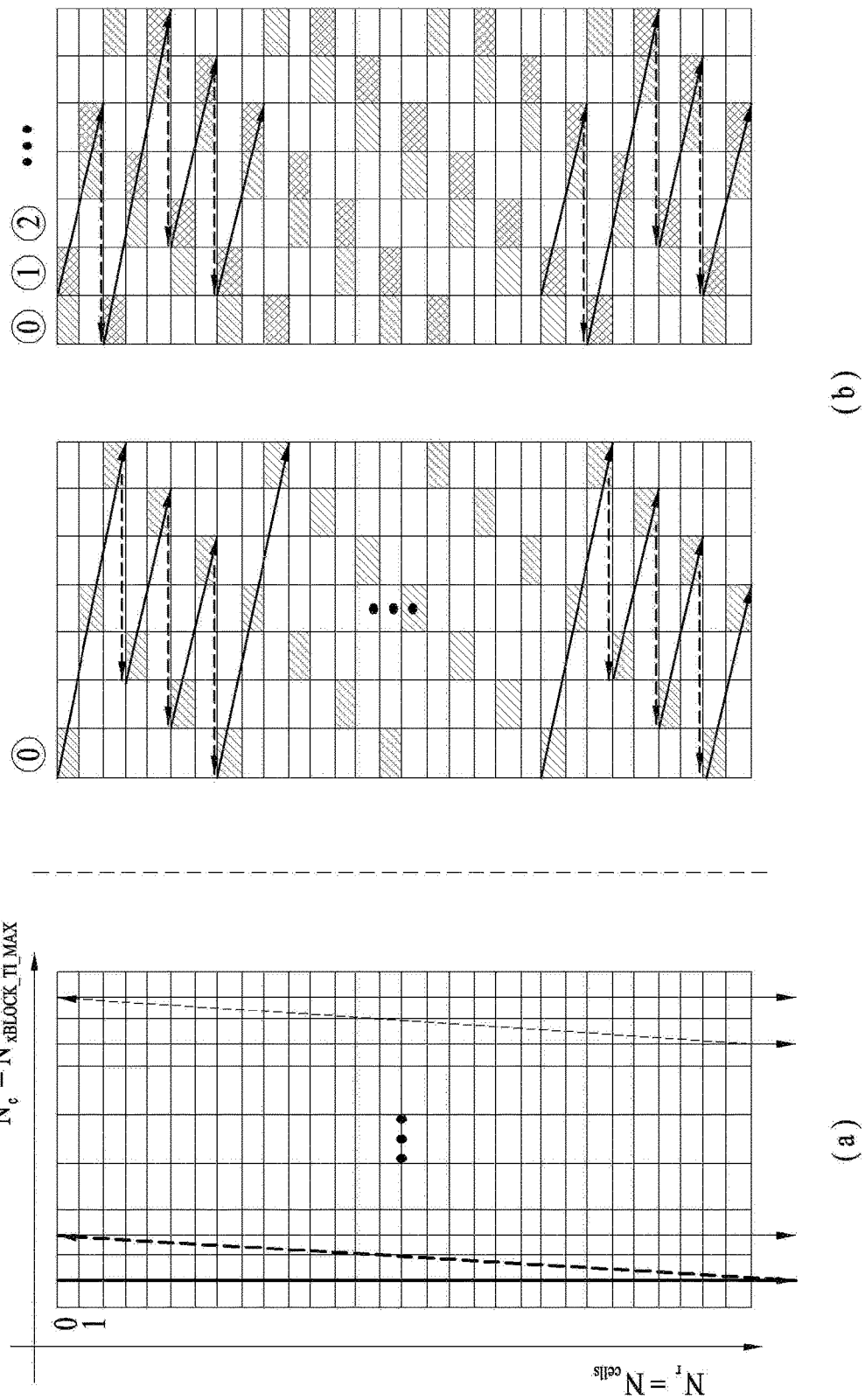
FIG. 26 illustrates the basic operation of a twisted row-column block interleaver according to an embodiment of the present invention.

FIG. 26 illustrates the basic operation of a twisted row-column block interleaver according to an embodiment of the present invention.

shows a writing operation in the time interleaver and (b) shows a reading operation in the time interleaver The first XFECBLOCK is written column-wise into the first column of the TI memory, and the second XFECBLOCK is written into the next column, and so on as shown in (a). Then, in the interleaving array, cells are read out diagonal-wise. During diagonal-wise reading from the first row (rightwards along the row beginning with the left-most column) to the last row, $N_r$ cells are read out as shown in (b). In detail, assuming $z_{n,s,i}$ (i=0, ..., $N_rN_c$) as the TI memory cell position to be read sequentially, the reading process in such an interleaving array is performed by calculating the row index $R_{n,s,i}$, the column index $C_{n,s,i}$, and the associated twisting parameter $T_{n,s,i}$ as follows expression.

[Math Figure 9]

GENERATE $(R_{n,s,i}, C_{n,s,i})$=
{
$R_{n,s,i} = \mod(i, N_r)$,
$T_{n,s,i} = \mod(S_{shift} \times R_{n,s,i}, N_c)$,
$C_{n,s,i} = \mod\left(T_{n,s,i} + \left\lfloor \frac{i}{N_r} \right\rfloor, N_c\right)$
} where $S_{shift}$ is a common shift value for the diagonal-wise reading process regardless of $N_{xBLOCK\_TI}(n,s)$, and it is determined by $N_{xBLOCK\_TI\_MAX}$ given in the PLS2-STAT as follows expression.

[Math Figure 10]

$$\text{for} \begin{cases} N'_{xBLOCK\_TI\_MAX} = N_{xBLOCK\_TI\_MAX} + 1, & \text{if } N_{xBLOCK\_TI\_MAX} \bmod 2 = 0 \\ N'_{xBLOCK\_TI\_MAX} = N_{xBLOCK\_TI\_MAX}, & \text{if } N_{xBLOCK\_TI\_MAX} \bmod 2 = 1' \end{cases}$$

$$S_{shift} = \frac{N'_{xBLOCK\_TI\_MAX} - 1}{2}$$

As a result, the cell positions to be read are calculated by a coordinate as $z_{n,s,i} = N_r C_{n,s,i} + R_{n,s,i}$.

Figure 27:
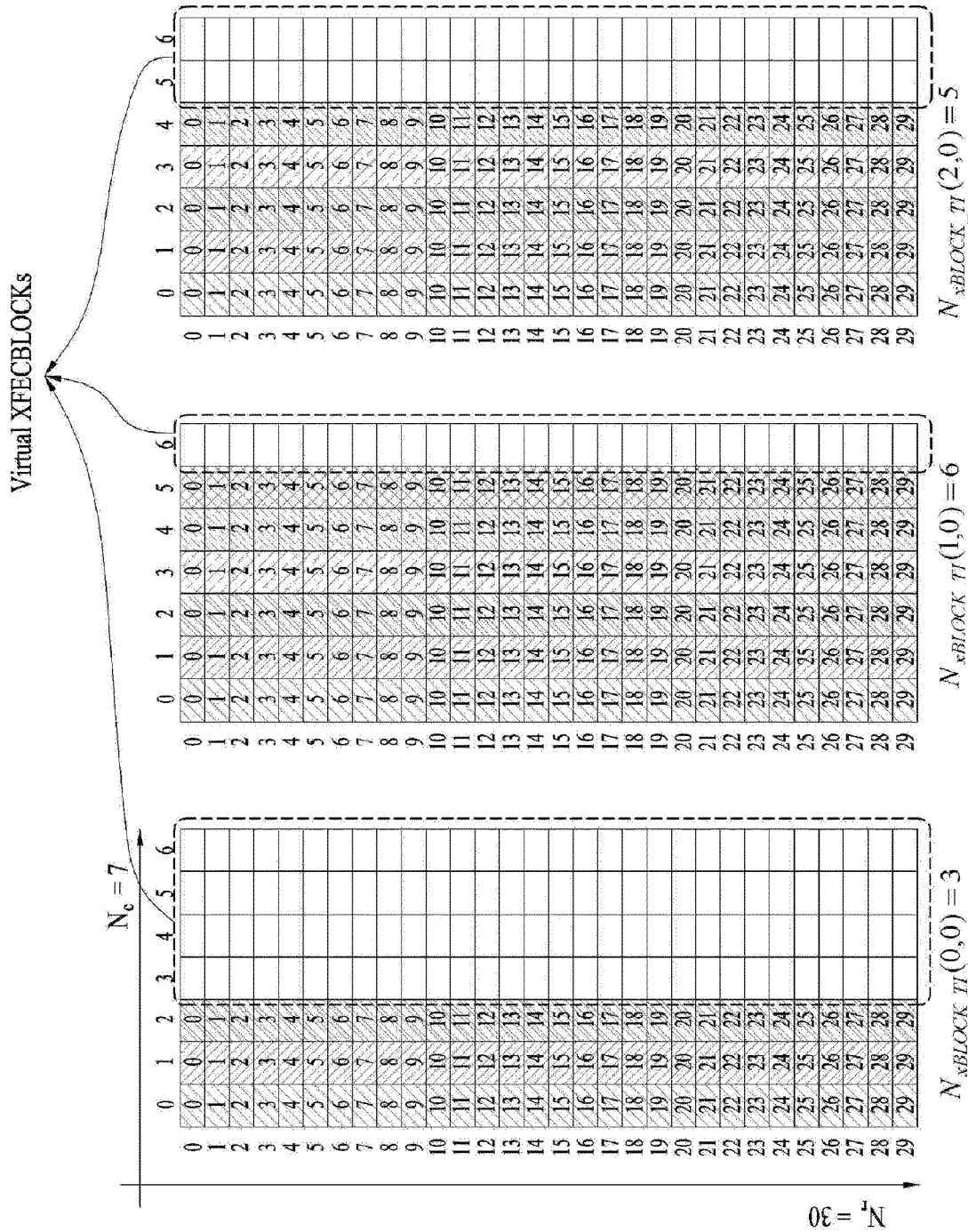
FIG. 27 illustrates an operation of a twisted row-column block interleaver according to another embodiment of the present invention.

FIG. 27 illustrates an operation of a twisted row-column block interleaver according to another embodiment of the present invention.

More specifically, FIG. 27 illustrates the interleaving array in the TI memory for each TI group, including virtual XFECBLOCKs when $N_{xBLOCK\_TI}(0,0)=3$, $N_{xBLOCK\_TI}(1,0)=6$, $N_{xBLOCK\_TI}(2,0)=5$.

The variable number $N_{xBLOCK\_TI}(n,s)=N_r$ will be less than or equal to $N'_{xBLOCK\_TI\_MAX}$. Thus, in order to achieve a single-memory deinterleaving at the receiver side, regardless of $N_{xBLOCK\_TI}(n,s)$, the interleaving array for use in a twisted row-column block interleaver is set to the size of $N_r \times N_c = N_{cells} \times N'_{xBLOCK\_TI\_MAX}$ by inserting the virtual XFECBLOCKs into the TI memory and the reading process is accomplished as follow expression.

[Math FIG. 11]

```
p = 0;
for i = 0; i < N_cells N_xBLOCK_TI_MAX'; i = i + 1
{GENERATE (R_{n,s,i}, C_{n,s,i});
V_i = N_r C_{n,s,j} + R_{n,s,j}
  if V_i < N_cells N_xBLOCK_TI (n,s)
  {
    Z_{n,s,p} = V_i; p = p + 1;
  }
}
```

The number of TI groups is set to 3. The option of time interleaver is signaled in the PLS2-STAT data by DP_TI_TYPE='0', DP_FRAME_INTERVAL='1', and DP_TI_LENGTH='1', $N_{TI}=1$, $I_{JUMP}=1$, and $P_1=1$. The number of XFECBLOCKs, each of which has Ncells=30 cells, per TI group is signaled in the PLS2-DYN data by NxBLOCK_TI(0,0)=3, NxBLOCK_TI(1,0)=6, and NxBLOCK_TI(2,0)=5, respectively. The maximum number of XFECBLOCK is signaled in the PLS2-STAT data by NxBLOCK_Group_MAX, which leads to $\lfloor N_{xBLOCK\_Group\_MAX}/N_{TI} \rfloor = N_{xBLOCK\_TI\_MAX}=6$.

Figure 28:
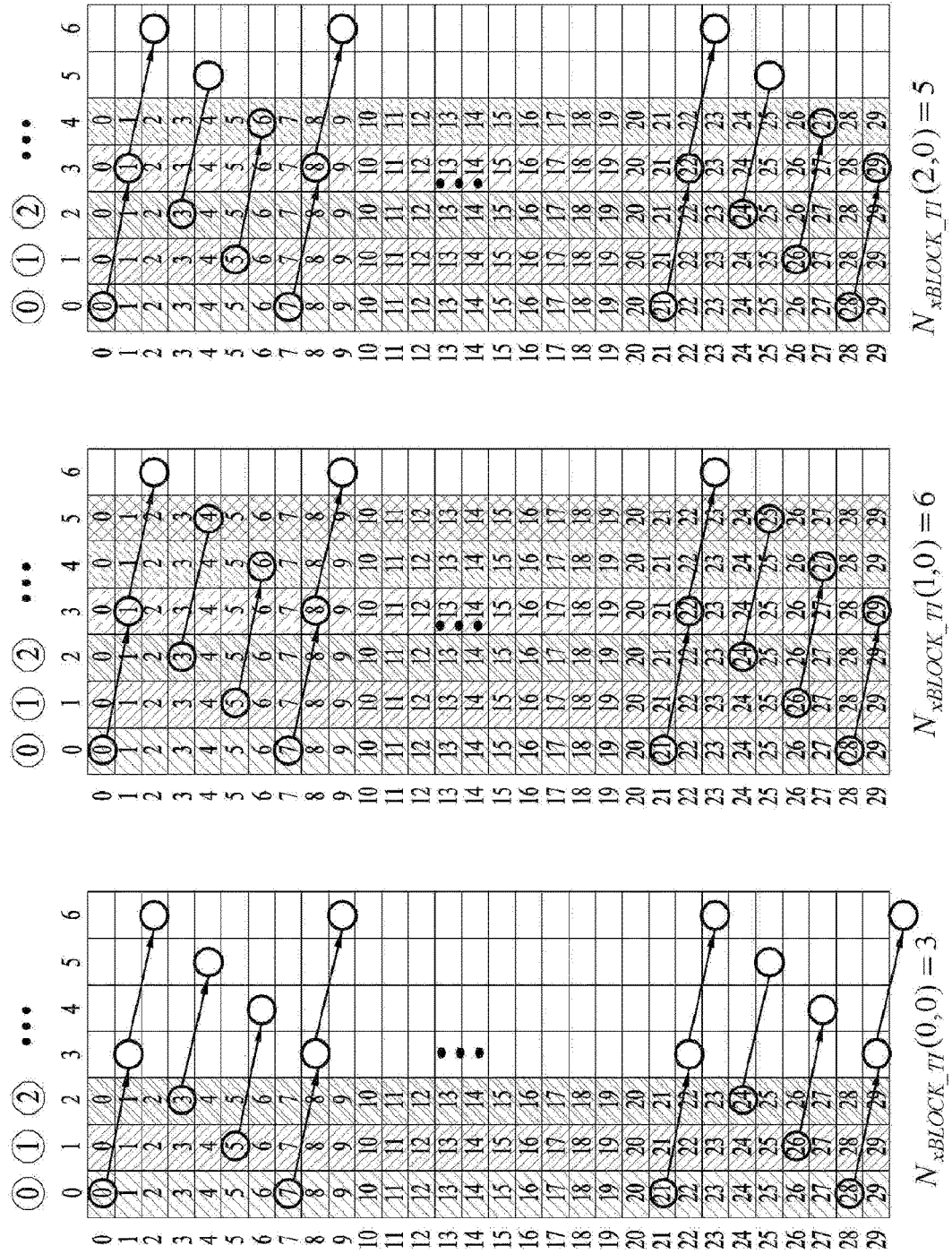
FIG. 28 illustrates a diagonal-wise reading pattern of a twisted row-column block interleaver according to an embodiment of the present invention.

FIG. 28 illustrates a diagonal-wise reading pattern of a twisted row-column block interleaver according to an embodiment of the present invention.

More specifically FIG. 28 shows a diagonal-wise reading pattern from each interleaving array with parameters of $N'_{xBLOCK\_TI\_MAX}=7$ and Sshift=(7−1)/2=3. Note that in the reading process shown as pseudocode above, if $V_i \geq N_{cells} N_{xBLOCK\_TI}(n,s)$, the value of Vi is skipped and the next calculated value of Vi is used.

Figure 29:
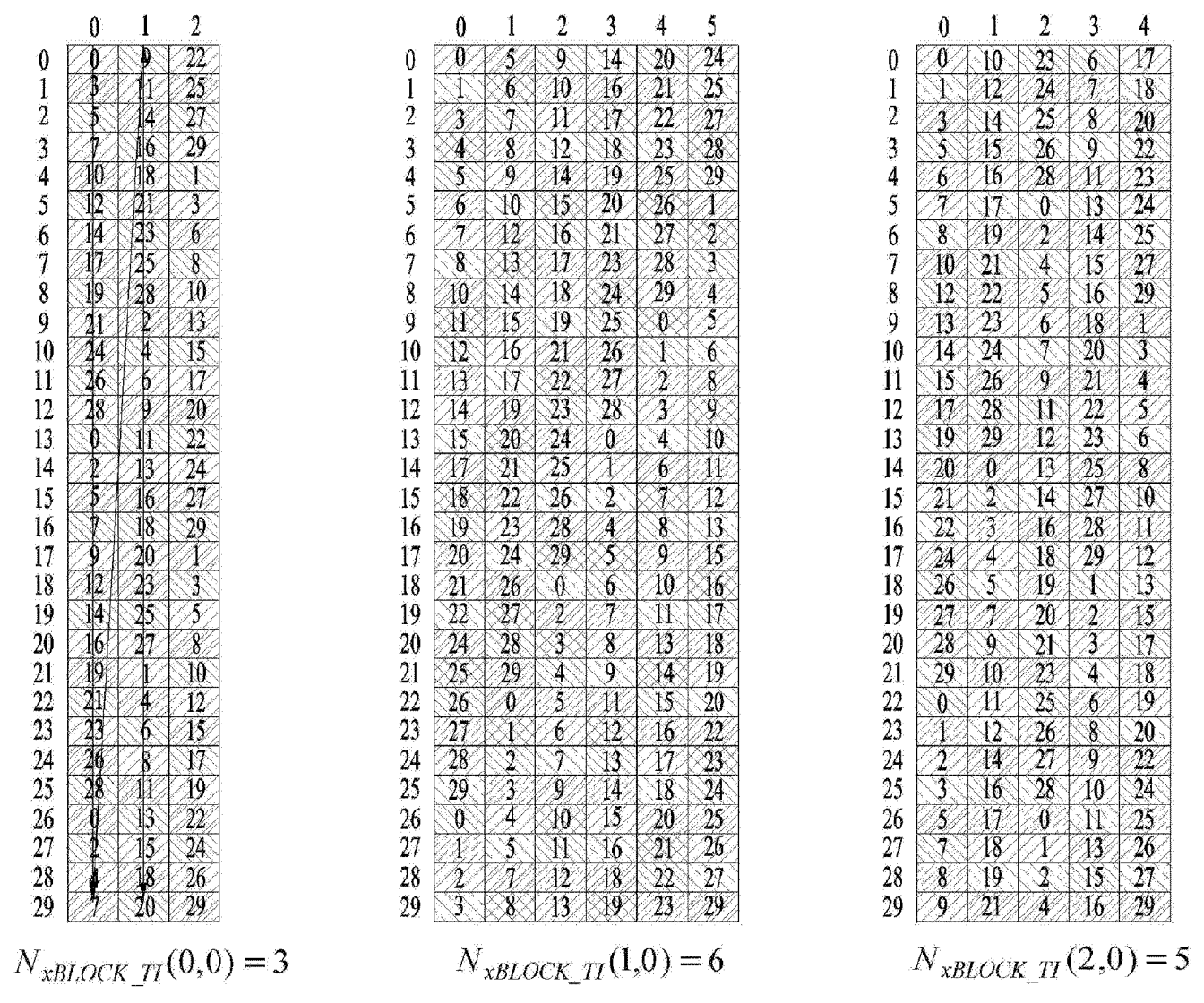

FIG. 29 illustrates interleaved XFECBLOCKs from each interleaving array according to an embodiment of the present invention.

FIG. 29 illustrates the interleaved XFECBLOCKs from each interleaving array with parameters of $N'_{xBLOCK\_TI\_MAX}=7$ and Sshift=3.

Figure 30:
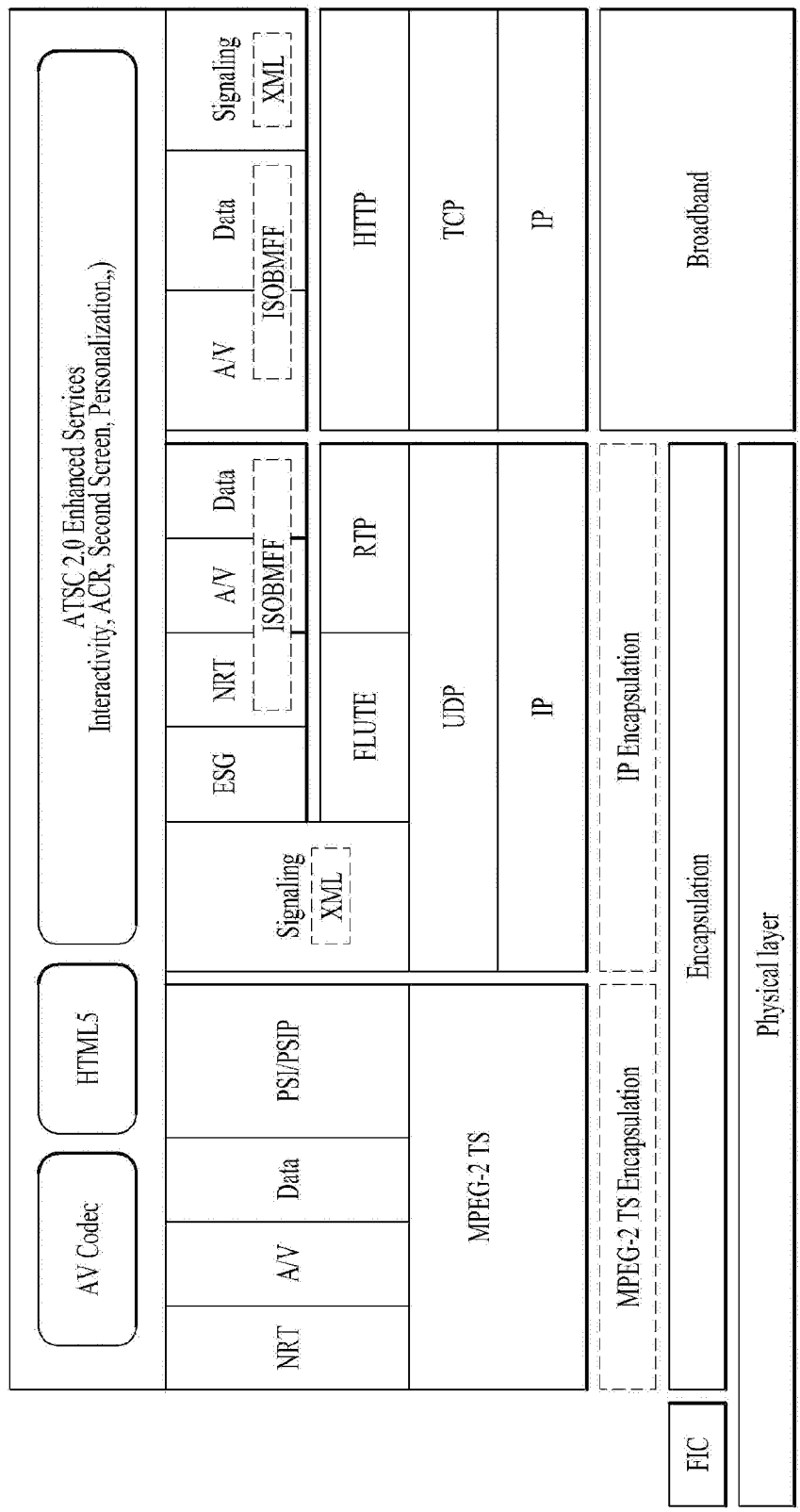
FIG. 30 is a view showing a protocol stack for a next generation broadcasting system according to an embodiment of the present invention.

FIG. 30 is a view showing a protocol stack for a next generation broadcasting system according to an embodiment of the present invention.

The broadcasting system according to the present invention may correspond to a hybrid broadcasting system in which an Internet Protocol (IP) centric broadcast network and a broadband are coupled.

The broadcasting system according to the present invention may be designed to maintain compatibility with a conventional MPEG-2 based broadcasting system.

The broadcasting system according to the present invention may correspond to a hybrid broadcasting system based on coupling of an IP centric broadcast network, a broadband network, and/or a mobile communication network (or a cellular network).

Referring to the figure, a physical layer may use a physical protocol adopted in a broadcasting system, such as an ATSC system and/or a DVB system. For example, in the physical layer according to the present invention, a transmitter/receiver may transmit/receive a terrestrial broadcast signal and convert a transport frame including broadcast data into an appropriate form.

In an encapsulation layer, an IP datagram is acquired from information acquired from the physical layer or the acquired IP datagram is converted into a specific frame (for example, an RS Frame, GSE-lite, GSE, or a signal frame). The frame main include a set of IP datagrams. For example, in the encapsulation layer, the transmitter include data processed from the physical layer in a transport frame or the receiver extracts an MPEG-2 TS and an IP datagram from the transport frame acquired from the physical layer.

A fast information channel (FIC) includes information (for example, mapping information between a service ID and a frame) necessary to access a service and/or content. The FIC may be named a fast access channel (FAC).

The broadcasting system according to the present invention may use protocols, such as an Internet Protocol (IP), a User Datagram Protocol (UDP), a Transmission Control Protocol (TCP), an Asynchronous Layered Coding/Layered Coding Transport (ALC/LCT), a Rate Control Protocol/RTP Control Protocol (RCP/RTCP), a Hypertext Transfer Protocol (HTTP), and a File Delivery over Unidirectional Transport (FLUTE). A stack between these protocols may refer to the structure shown in the figure.

In the broadcasting system according to the present invention, data may be transported in the form of an ISO based media file format (ISOBMFF). An Electrical Service Guide (ESG), Non Real Time (NRT), Audio/Video (A/V), and/or general data may be transported in the form of the ISOBMFF.

Transport of data through a broadcast network may include transport of a linear content and/or transport of a non-linear content.

Transport of RTP/RTCP based A/V and data (closed caption, emergency alert message, etc.) may correspond to transport of a linear content.

An RTP payload may be transported in the form of an RTP/AV stream including a Network Abstraction Layer (NAL) and/or in a form encapsulated in an ISO based media file format. Transport of the RTP payload may correspond to transport of a linear content. Transport in the form encapsulated in the ISO based media file format may include an MPEG DASH media segment for A/V, etc.

Transport of a FLUTE based ESG, transport of non-timed data, transport of an NRT content may correspond to transport of a non-linear content. These may be transported in an MIME type file form and/or a form encapsulated in an ISO based media file format. Transport in the form encapsulated in the ISO based media file format may include an MPEG DASH media segment for A/V, etc.

Transport through a broadband network may be divided into transport of a content and transport of signaling data.

Transport of the content includes transport of a linear content (A/V and data (closed caption, emergency alert message, etc.)), transport of a non-linear content (ESG, non-timed data, etc.), and transport of a MPEG DASH based Media segment (A/V and data).

Transport of the signaling data may be transport including a signaling table (including an MPD of MPEG DASH) transported through a broadcasting network.

In the broadcasting system according to the present invention, synchronization between linear/non-linear contents transported through the broadcasting network or synchronization between a content transported through the broadcasting network and a content transported through the broadband may be supported. For example, in a case in which one UD content is separately and simultaneously transported through the broadcasting network and the broadband, the receiver may adjust the timeline dependent upon a transport protocol and synchronize the content through the broadcasting network and the content through the broadband to reconfigure the contents as one UD content.

An applications layer of the broadcasting system according to the present invention may realize technical characteristics, such as Interactivity, Personalization, Second Screen, and automatic content recognition (ACR). These characteristics are important in extension from ATSC 2.0 to ATSC 3.0. For example, HTML5 may be used for a characteristic of interactivity.

In a presentation layer of the broadcasting system according to the present invention, HTML and/or HTML5 may be used to identify spatial and temporal relationships between components or interactive applications.

In the present invention, signaling includes signaling information necessary to support effective acquisition of a content and/or a service. Signaling data may be expressed in a binary or XMK form. The signaling data may be transmitted through the terrestrial broadcasting network or the broadband.

A real-time broadcast A/V content and/or data may be expressed in an ISO Base Media File Format, etc. In this case, the A/V content and/or data may be transmitted through the terrestrial broadcasting network in real time and may be transmitted based on IP/UDP/FLUTE in non-real time. Alternatively, the broadcast A/V content and/or data may be received by receiving or requesting a content in a streaming mode using Dynamic Adaptive Streaming over HTTP (DASH) through the Internet in real time. In the broadcasting system according to the embodiment of the present invention, the received broadcast A/V content and/or data may be combined to provide various enhanced services, such as an Interactive service and a second screen service, to a viewer.

FIG. 31 is a view illustrating a broadcast transmission frame according to an embodiment of the present invention.

According to the embodiment, the broadcast transmission frame includes a P1 part, an L1 part, a common PLP part, an interleaved PLP part (e.g., a scheduled & interleaved PLP's part), and/or an auxiliary data part.

According to the embodiment, the broadcast transmission device transmits information on transport signal detection through the P1 part of the transmission frame. Additionally, the broadcast transmission device may transmit turning information on broadcast signal tuning through the P1 part.

According to the embodiment, the broadcast transmission device transmits a configuration of the broadcast transmission frame and characteristics of each PLP through the L1 part. At this point, the broadcast reception device 100 decodes the L1 part on the basis of the P1 part to obtain the configuration of the broadcast transmission frame and the characteristics of each PLP.

According to the embodiment, the broadcast transmission device may transmit information commonly applied to PLPs through the common PLP part. According to a specific embodiment of the present invention, the broadcast transmission frame may not include the common PLP part.

According to the embodiment, the broadcast transmission device transmits a plurality of components included in broadcast service through an interleaved PLP part. At this point, the interleaved PLP part includes a plurality of PLPs.

Moreover, according to the embodiment, the broadcast transmission device may signal to which PLP components configuring each broadcast service are transmitted through an L1 part or a common PLP part. However, the broadcast reception device 100 decodes all of a plurality of PLPs of an interleaved PLP part in order to obtain specific broadcast service information on broadcast service scan.

Unlike the embodiment, the broadcast transmission device may transmit a broadcast transmission frame including a broadcast service transmitted through a broadcast transmission frame and an additional part that includes information on a component included in the broadcast service. At this point, the broadcast reception device 100 may instantly obtain information on the broadcast service and the components therein through the additional part.

FIG. 32 is a view of a broadcast transmission frame according to another embodiment of the present invention.

According to the embodiment, the broadcast transmission frame includes a P1 part, an L1 part, a fast information channel (FIC) part, an interleaved PLP part (e.g., a scheduled & interleaved PLP's part), and/or an auxiliary data part.

Except the FIC part, other parts are identical to those of the previous figure.

The broadcast transmission device transmits fast information through the FIC part. The fast information may include configuration information of a broadcast stream transmitted through a transmission frame, simple broadcast service information, and service signaling relating to a corresponding service/component. The broadcast reception device 100 may scan broadcast service on the basis of the FIC part. In more detail, the broadcast reception device 100 may extract information on broadcast service from the FIC part.

FIG. 33 is a view illustrating a structure of a transport packet transmitting a broadcast service according to an embodiment of the present invention.

In the embodiment, a transport packet transmitting a broadcast service includes a Network Protocol field, an Error Indicator field, a Stuffing Indicator field, a Pointer field, a Stuffing bytes field, and/or payload data.

The Network Protocol field represents the type of a network protocol.

The Error Indicator field represents that an error is detected from a corresponding transport packet. In more detail, if a value of the Error Indicator field is 0, it represents that no error is detected from a corresponding packet and if a value of the Error Indicator field is 1, it represents that an error is detected from a corresponding packet According to a specific embodiment of the present invention, the Error Indicator field may be a 1-bit field.

The Stuffing Indicator field represents whether stuffing bytes are included in a corresponding transport packet. At this point, the stuffing bytes represent data included in a payload to maintain the length of a fixed packet. According to a specific embodiment of the present invention, when a value of the Stuffing Indicator field is 1, a transport packet includes a stuffing byte and when a value of the Stuffing Indicator field is 0, a transport packet includes no stuffing byte According to a specific embodiment of the present invention, the Stuffing Indicator field may be a 1-bit field.

The Pointer field represents a start point of a new network packet in a payload part of a corresponding transport packet. According to a specific embodiment of the present invention, when a value of the Pointer field is 0x7FF, it may represent that there is no start point of a new network packet. Additionally, According to a specific embodiment of the present invention, when a value of the Pointer field is not 0x7FF, it may represent an offset value from the last part of a transport packet header to the start point of a new network packet. According to a specific embodiment of the present invention, the Pointer field may be an 11-bit field.

The Stuffing Bytes field represents a stuffing byte filling between the header and the payload data to maintain a fixed packet length.

A configuration of a broadcast reception device for receiving broadcast service will be described with reference to 34.

FIG. 34 is a view illustrating meanings of Network Protocol field according to an embodiment of the present invention.

The Network Protocol field represents the type of a network protocol. According to a specific embodiment of the present invention, a value of the Network Protocol field may represent the IPv4 protocol or a frame packet type. In more detail, when a value of the Network Protocol field is 000, it may represent the IPv4 protocol. In more detail, as shown in the embodiment of FIG. 34, when a value of the Network Protocol field is 111, it may represent a frame_packet_type protocol. At this point, framed_packet_type may be a protocol defined by ATSC A/153. In more detail, framed_packet_type may represent a network packet protocol not including a field representing information on the length. According to a specific embodiment of the present invention, the Network Protocol may be a 3-bit field.

Figure 35:
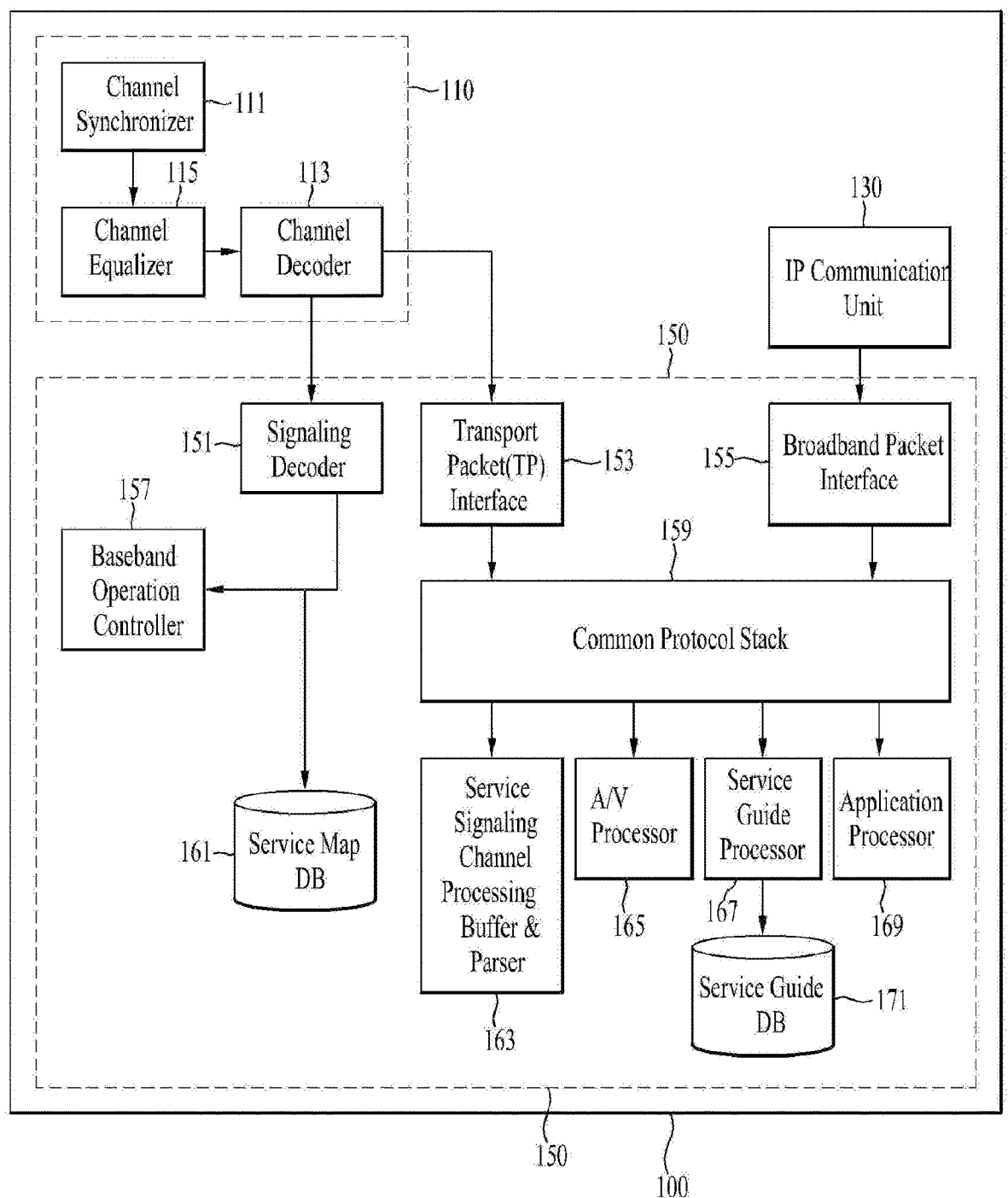
FIG. 35 is a view illustrating a configuration of a broadcast reception device according to an embodiment of the present invention.

FIG. 35 is a view illustrating a configuration of a broadcast reception device according to an embodiment of the present invention.

The broadcast reception device 100 includes a broadcast reception unit 110, an internet protocol (IP) communication unit 130, and/or a control unit 150.

The broadcast reception unit 110 includes a channel synchronizer 111, a channel equalizer 113, and/or a channel decoder 115.

The channel synchronizer 111 synchronizes a symbol frequency with a timing in order for decoding in a baseband where a broadcast signal is received.

The channel equalizer 113 corrects the distortion of a synchronized broadcast signal. In more detail, the channel equalizer 113 corrects the distortion of a synchronized signal due to multipath and Doppler effects.

The channel decoder 115 decodes a distortion corrected broadcast signal. In more detail, the channel decoder 115 extracts a transmission frame from the distortion corrected broadcast signal. At this point, the channel decoder 115 may perform forward error correction (FEC).

The IP communication unit 130 receives and transmits data through internet network.

The control unit 150 includes a signaling decoder 151, a transport packet interface 153, a broadband packet interface 155, a baseband operation control unit 157, a common protocol stack 159, a service map database 161, a service signaling channel processing buffer and parser 163, an A/V processor 165, a broadcast service guide processor 167, an application processor 169, and/or a service guide database 171.

The signaling decoder 151 decodes signaling information of a broadcast signal.

The transport packet interface 153 extracts a transport packet from a broadcast signal. At this point, the transport packet interface 153 may extract data such as signaling information or IP datagram from the extracted transport packet.

The broadcast packet interface 155 extracts an IP packet from data received from internet network. At this point, the broadcast packet interface 155 may extract signaling data or IP datagram from the IP packet.

The baseband operation control unit 157 controls an operation relating to receiving broadcast information from a baseband.

The common protocol stack 159 extracts audio or video from a transport packet.

The A/V processor 547 processes audio or video.

The service signaling channel processing buffer and parser 163 parses and buffers signaling information that signals broadcast service. In more detail, the service signaling channel processing buffer and parser 163 parses and buffers signaling information that signals broadcast service from the IP datagram.

The service map database 165 stores a broadcast service list including information on broadcast services.

The service guide processor 167 processes terrestrial broadcast service guide data guiding programs of terrestrial broadcast service.

The application processor 169 extracts and processes application related information from a broadcast signal.

The serviced guide database 171 stores program information of a broadcast service.

Figure 36:
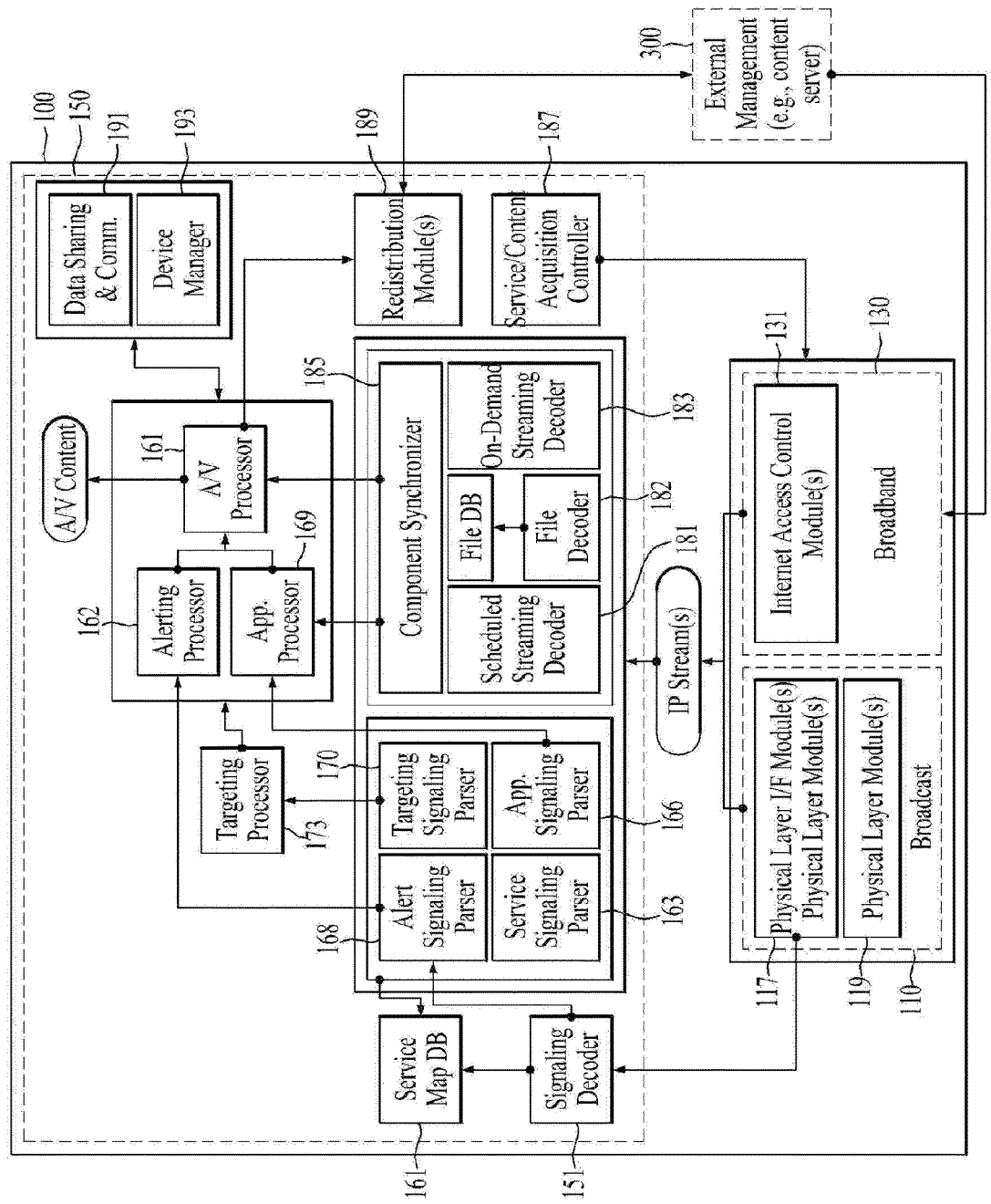
FIG. 36 is a view illustrating a configuration of a broadcast reception device according to another embodiment of the present invention.

FIG. 36 is a view illustrating a configuration of a broadcast reception device according to another embodiment of the present invention.

In an embodiment, the broadcast reception device 100 includes a broadcast reception unit 110, an internet protocol (IP) communication unit 130, and/or a control unit 150.

The broadcast reception unit 110 may include one or more processors, one or more circuits, and/or one or more hardware modules, which perform each of a plurality of functions that the broadcast reception unit 110 performs. In more detail, the broadcast reception unit 110 may be a System On Chip (SOC) in which several semiconductor parts are integrated into one. At this point, the SOC may be semiconductor in which various multimedia components such as graphics, audio, video, and modem and a semiconductor such as a processor and D-RAM are integrated into one. The broadcast reception unit 110 may include a physical layer module 119 and a physical layer IP frame module 117. The physical layer module 119 receives and processes a broadcast related signal through a broadcast channel of a broadcast network. The physical layer IP frame module 117 converts a data packet such as an IP datagram obtained from the physical layer module 119 into a specific frame. For example, the physical layer module 119 may convert an IP datagram into an RS Frame or GSE.

The IP communication unit 130 may include one or more processors, one or more circuits, and/or one or more hardware modules, which perform each of a plurality of functions that the IP communication unit 130 performs. In more detail, the IP communication unit 130 may be a System On Chip (SOC) in which several semiconductor parts are integrated into one. At this point, the SOC may be semiconductor in which various multimedia components such as graphics, audio, video, and modem and a semiconductor such as a processor and D-RAM are integrated into one. The IP communication unit 130 may include an internet access control module 131. The internet access control module 131 may control an operation of the broadcast reception device 100 to obtain at least one of service, content, and signaling data through an internet communication network (for example, broad band).

The control unit 150 may include one or more processors, one or more circuits, and/or one or more hardware modules, which perform each of a plurality of functions that the control unit 150 performs. In more detail, the control unit 150 may be a System On Chip (SOC) in which several semiconductor parts are integrated into one. At this point, the SOC may be semiconductor in which various multimedia components such as graphics, audio, video, and modem and a semiconductor such as a processor and D-RAM are integrated into one. The control unit 150 may include at least one of a signaling decoder 151, a service map database 161, a service signaling channel parser 163, an application signaling parser 166, an alert signaling parser 168, a targeting signaling parser 170, a targeting processor 173, an A/V processor 161, an alerting processor 162, an application processor 169, a scheduled streaming decoder 181, a file decoder 182, a user request streaming decoder 183, a file database 184, a component synchronization unit 185, a service/content acquisition control unit 187, a redistribution module 189, a device manager 193, and/or a data sharing unit 191.

The service/content acquisition control unit 187 controls operations of a receiver to obtain services or contents through a broadcast network or an internet communication network and signaling data relating to services or contents.

The signaling decoder 151 decodes signaling information.

The service signaling parser 163 parses service signaling information.

The application signaling parser 166 extracts and parses service related signaling information. At this point, the service related signaling information may be service scan related signaling information. Additionally, the service related signaling information may be signaling information relating to contents provided through a service.

The alert signaling parser 168 extracts and parses alerting related signaling information.

The target signaling parser 170 extracts and parses information for personalizing services or contents or information for signaling targeting information.

The targeting processor 173 processes information for personalizing services or contents.

The alerting processor 162 processes alerting related signaling information.

The application processor 169 controls application related information and the execution of an application. In more detail, the application processor 169 processes a state of a downloaded application and a display parameter.

The A/V processor 161 processes an A/V rendering related operation on the basis of decoded audio or video and application data.

The scheduled streaming decoder 181 decodes a scheduled streaming that is a content streamed according to a schedule defined by a contents provider such as broadcaster.

The file decoder 182 decodes a downloaded file. Especially, the file decoder 182 decodes a file downloaded through an internet communication network.

The user request streaming decoder 183 decodes a content (for example, On Demand Content) provided by a user request.

The file database 184 stores files. In more detail, the file database 184 may store a file downloaded through an internet communication network.

The component synchronization unit 185 synchronizes contents or services. In more detail, the component synchronization unit 185 synchronizes a presentation time of a content obtained through at least one of the scheduled streaming decoder 181, the file decoder 182, and the user request streaming decoder 183. The component synchronization unit 185 may acquire additional packets including information (will be described below in this specification) for synchronizing broadcast streams with any other heterogeneous streams transmitted by heterogeneous networks other than the broadcast network.

The service/content acquisition control unit 187 controls operations of a receiver to obtain services, contents or signaling information relating to services or contents.

When services or contents are not received through a broadcast network, the redistribution module 189 performs operations to support obtaining at least one of services, contents, service related information, and content related information. In more detail, the redistribution module 189 may request at least one of services, contents, service related information, and content related information from the external management device 300. At this point, the external management device 300 may be a content server.

The device manager 193 manages an interoperable external device. In more detail, the device manager 193 may perform at least one of the addition, deletion, and update of an external device. Additionally, an external device may perform connection and data exchange with the broadcast reception device 100.

The data sharing unit 191 performs a data transmission operation between the broadcast reception device 100 and an external device and processes exchange related information. In more detail, the data sharing unit 191 may transmit AV data or signaling information to an external device. Additionally, the data sharing unit 191 may receive AV data or signaling information from an external device.

Figure 37:
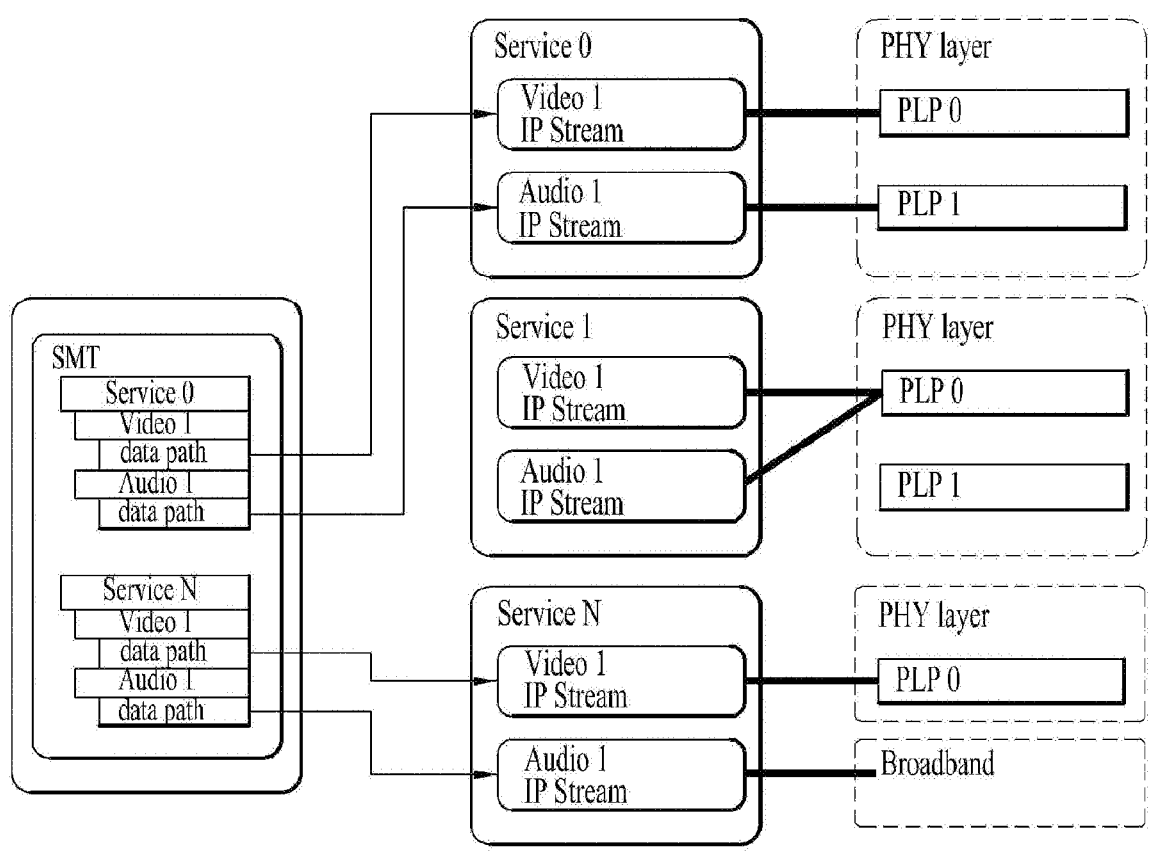
FIG. 37 is a view illustrating an architecture for acquiring a service and/or content in a next-generation broadcast system according to an embodiment of the present invention.

FIG. 37 is a view illustrating an architecture for acquiring a service and/or content in a next-generation broadcast system according to an embodiment of the present invention.

A method provided by the present invention enables a receiver to effectively acquire a service or content through a broadcast network or the Internet in the next-generation broadcast system.

The figure shows an example of acquiring a service or content in a hybrid broadcast system.

For example, service 0 is composed of one piece of video data and one piece of audio data and the video/audio can be acquired through IP streams transmitted through a terrestrial broadcast network.

In the case of service 1, since an IP stream carrying video data and an IP stream carrying audio data are transmitted through one PLP, the receiver can acquire service 1 by decoding the PLP.

In the case of service N, audio data can be acquired through the Internet while video data is transmitted through the terrestrial broadcast network.

In the process of acquiring components included in service 0, service 1 or service N as described above, the aforementioned embodiments of the present invention can be used. That is, the receiver can identify PLPs through which the components included in service 0, service 1 or service N are transmitted and acquire a desired service by decoding corresponding PLPs.

FIG. 38 is a view illustrating a broadcast service signaling table according to an embodiment of the present invention.

The broadcast service signaling table may include at least one of broadcast service identification information, information representing the current state of a broadcast service, the name of a broadcast service, information representing whether a protection algorithm for broadcast service is applied, category information of a broadcast service, and media component signaling information signaling a media component that a broadcast service includes. The media component signaling information signaling a media component that the broadcast service includes may include information representing whether each media component is essential to a corresponding broadcast service. Additionally, the media component signaling information signaling a media component that the broadcast service includes may include information relating to each component.

In more detail, as shown in the embodiment, the broadcast service signaling table may include at least one of a table_id field, section_syntax_indicator field, a private_indicator field, a section_length field, a table_id_extension field, a version_number field, a current_next_indicator field, a section_number field, a last_section_number field, a num_services field, a service_id field, a service_status field, an SP_indicator field, a short_service_name_length field, a short_service_name field, a channel_number field, a service_category field, a num_components field, an essential_component_indicator field, a num_component_level_descriptor field, a component_level_descriptor field, a num_service_level descriptors field, and/or a service_level_descriptor field.

The table_id field represents an identifier of a broadcast service signaling information table. At this point, a value of the table_id field may be one of reserved id values defined in ATSC A/65. According to a specific embodiment of the present invention, the table_id field may be an 8-bit field.

The section_syntax_indicator field represents whether the broadcast service signaling information table is a private section table in a long format of MPEG-2 TS standard. According to a specific embodiment of the present invention, the section_syntax_indicator field may be a 1-bit field.

The private_indicator field represents whether a current table corresponds to a private section. According to a specific embodiment of the present invention, the private_indicator field may be a 1-bit field.

The section_length field represents the length of a section after the section_length field. According to a specific embodiment of the present invention, the section_length field may be a 12-bit field.

The table_id_extension field represents a value for identifying a broadcast service signaling information table in combination with the table_id field. Especially, the table_id field may include an SMT_protocol_version field representing a protocol version of a service signaling information table. According to a specific embodiment of the present invention, the SMT_protocol_version field may be an 8-bit field.

The version_number field represents a version of a service signaling table. The broadcast reception device 100 may determine the availability of a service signaling information table on the basis of a value of the version_number field. In more detail, when a value of the version_number field is identical to a version of a previously received service signaling table, the information of the service signaling table may not be used. According to a specific embodiment of the present invention, the version_number field may be a 5-bit field.

The current_next_indicator field represents whether information of a broadcast service signaling table is currently available. In more detail, when a value of the current_next_indicator field is 1, it may represent that the information of the broadcast service signaling table is available. Moreover, when a value of the current_next_indicator field is 1, it may represent that the information of the broadcast service signaling table is available next time. According to a specific embodiment of the present invention, the current_next_indicator field may be a 1-bit field.

The section_number field represents a current section_number. According to a specific embodiment of the present invention, the section_number field may be an 8-bit field.

The last_section_number field represents the last_section_number. When the size of a broadcast service signaling table is large, it may be divided into a plurality of sections and then transmitted. At this point, the broadcast reception device 100 determines whether all sections necessary for a broadcast service signaling table are received on the basis of the section_number field and the last_section_number field. According to a specific embodiment of the present invention, the last_section_number field may be an 8-bit field.

The service_id field represents a service identifier for identifying a broadcast service. According to a specific embodiment of the present invention, the service_id field may be a 16-bit field.

The service_status field represents the current state of a broadcast service. In more detail, it may represent whether the broadcast service is available currently. According to a specific embodiment of the present invention, when a value of the service_status field is 1, it may represent that the broadcast service is available currently. According to a specific embodiment of the present invention, the broadcast reception device 100 may determine whether to display a corresponding broadcast service in a broadcast service list and a broadcast service guide on the basis of a value of the service_status field. For example, when a corresponding broadcast service is unavailable, the broadcast reception device 100 may not display the corresponding broadcast service in a broadcast service list and a broadcast service guide. According to another specific embodiment of the present invention, the broadcast reception device 100 may limit an access to a corresponding broadcast service on the basis of a value of the service_status field. For example, when a corresponding broadcast service is unavailable, the broadcast reception device 100 may limit an access to a corresponding broadcast service through a channel up/down key. According to a specific embodiment of the present invention, the service_status field may be a 2-bit field.

The SP_indicator field may represent whether service protection is applied to at least one component in a corresponding broadcast service. For example, when a value of SP_indicator is 1, it may represent that service protection is applied to at least one component in a corresponding broadcast service. According to a specific embodiment of the present invention, the SP_indicator field may be a 1-bit field.

The short_service_name_length field represents the size of the short_service_name field.

The short_service_name field represents the name of a broadcast service. In more detail, the short_service_name field may be displayed by summarizing the name of a broadcast service.

The channel_number field displays a virtual channel_number of a corresponding broadcast service.

The service_category field represents a category of a broadcast service.

The num_component field represents the number of media components that a corresponding broadcast service includes. According to a specific embodiment of the present invention, the num_component field may be a 5-bit field.

The essential_component_indicator field represents whether a corresponding media component is an essential media component essential to a corresponding broadcast service presentation. According to a specific embodiment of the present invention, the essential_component_indicator field may be a 1-bit field.

The num_component_level_descriptor field represents the number of component_level_descriptor fields. According to a specific embodiment of the present invention, the num_component_level_descriptor field may be a 4-bit field.

The component_level_descriptor field includes an additional property for a corresponding component.

The num_service_level descriptors field represents the number of service_level_descriptor fields. According to a specific embodiment of the present invention, the num_service_level descriptors field may be a 4-bit field.

The service_level_descriptor field includes an additional property for a corresponding service.

The service signaling table may further include information on ensemble. When the same Forward Error Correction (FEC) is applied to at least one service and transmitted, the ensemble represents a collection of the at least one service.

FIG. 39 is a view of meanings of the service_category field according to another embodiment of the present invention The service_category field may represent at least one of TV service, radio service, broadcast service guide, RI service, and emergency alerting. For example, as shown in the embodiment, in the case that a value of the service_category field is 0x01, it represents TV service. In the case that a value of the service_category field is 0x02, it represents radio service. In the case that a value of the service_category field is 0x03, it represents RI service. In the case that a value of the service_category field is 0x08, it represents service guide. In the case that a value of the service_category field is 0x09, it represents emergency alerting. According to a specific embodiment of the present invention, the service_category field may be a 6-bit field.

FIG. 40 is a view of a broadcast service signaling table according to another embodiment of the present invention.

In more detail, as shown in the embodiment, the broadcast service signaling table may further include a num_ensemble_level descriptors field and/or an ensemble_level_descriptor field.

The num_ensemble_level descriptors field represents the number of ensemble_level_descriptor fields. According to a specific embodiment of the present invention, the num_ensemble_level descriptors field may be a 4-bit field.

The ensemble_level_descriptor field includes an additional property for a corresponding ensemble.

Additionally, the service signaling table may further include stream identifier information for identifying a media component.

Figures 41, 42:
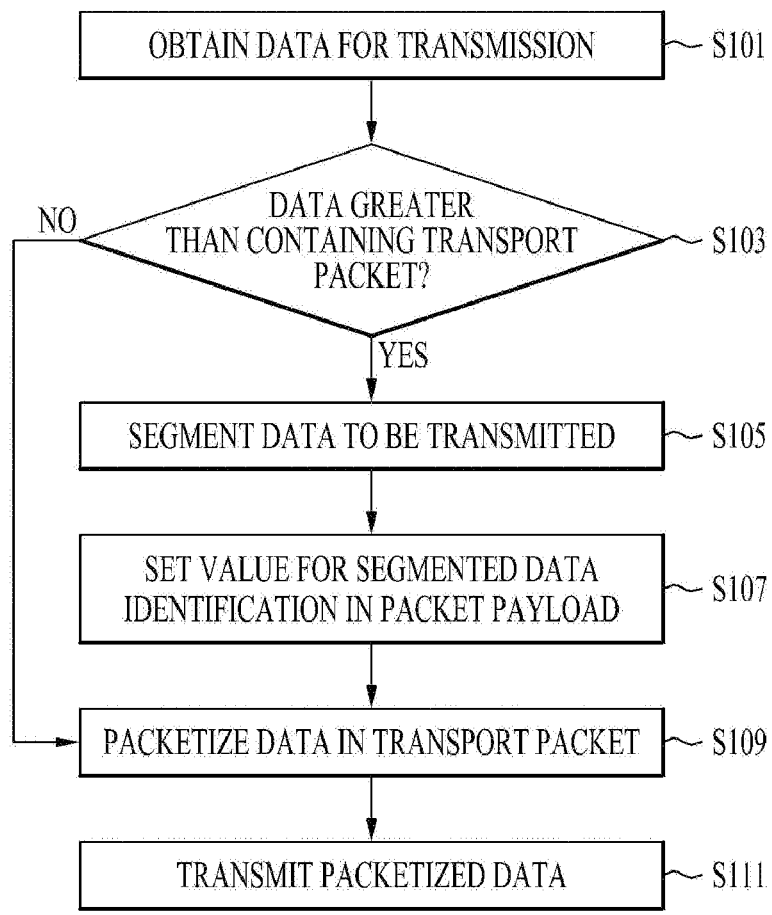
FIG. 41 is a view of a stream identifier descriptor according to another embodiment of the present invention.
FIG. 42 is a view illustrating an operation when a broadcast transmission device transmits a broadcast service signaling table according to an embodiment of the present invention.

FIG. 41 is a view of a stream identifier descriptor according to another embodiment of the present invention.

The stream identifier information includes at least one of a descriptor_tag field, a descriptor_length field, and a component_tag field.

The descriptor_tag field represents a descriptor including stream identifier information. According to a specific embodiment of the present invention, the descriptor_tag field may be an 8-bit field.

The descriptor_length field represents the length of stream identifier information after a corresponding field. According to a specific embodiment of the present invention, the descriptor_length field may be an 8-bit field.

The component_tag field represents a media component identifier for identifying a media component. At this point, the media component identifier may have a different unique value than a media component identifier of another media component on a corresponding signaling information table. According to a specific embodiment of the present invention, the component_tag field may be an 8-bit field.

An operation for transmitting/receiving a broadcast service signaling table will be described below.

The above broadcast service table is described as in a bitstream format but according to a specific embodiment of the present invention, a broadcast service table may be in an XML format.

FIG. 42 is a view illustrating an operation when a broadcast transmission device transmits a broadcast service signaling table according to an embodiment of the present invention.

The broadcast transmission device may include a transmission unit for transmitting a broadcast signals and a control unit for controlling operations of the broadcast transmission unit. A transmission unit may include one or more processors, one or more circuits, and one or more hardware modules, which perform each of a plurality of functions that the transmission unit performs. In more detail, the transmission unit may be a System On Chip (SOC) in which several semiconductor parts are integrated into one. At this point, the SOC may be semiconductor in which various multimedia components such as graphics, audio, video, and modem and a semiconductor such as a processor and D-RAM are integrated into one. The control unit may include one or more processors, one or more circuits, and one or more hardware modules, which perform each of a plurality of functions that the control unit performs. In more detail, the control unit may be a System On Chip (SOC) in which several semiconductor parts are integrated into one. At this point, the SOC may be semiconductor in which various multimedia components such as graphics, audio, video, and modem and a semiconductor such as a processor and D-RAM are integrated into one.

The broadcast transmission device obtains data to be contained in a transport packet and transmitted through the control unit in operation S101. The data that the broadcast transmission device transmits may be real-time content or metadata relating to real-time content. In more detail, real-time content may be a broadcast A/V content transmitted through a terrestrial broadcast network or enhancement data relating to broadcast AV content.

The broadcast transmission device determines whether data obtained through the control unit exceeds the size that a transport packet for data transmission contains in operation S103. In more detail, a transport packet that the broadcast transmission device is to use may be based on a protocol using a fixed packet length. At this point, when data to be transmitted exceeds the size that a packet covers, it is difficult to transmit data smoothly. Additionally, when data to be transmitted is very smaller than a packet, it is inefficient to transmit only a small size of one data in one packet. Accordingly, in order to overcome the inefficiency, the broadcast transmission device compares the sizes of a transport packet and data through the control unit.

If it is determined that a transport packet cannot contain the size of data that the broadcast transmission device is to transmit, the broadcast transmission device segments data to be transmitted through the control unit in operation S105. The segmented data may be divided in a plurality of transport packets and then transmitted. Then, the plurality of transport packets may additionally include information for identifying the segmented data. According to another embodiment, the information for identifying segmented data may be transmitted through additional datagram instead of a transport packet.

The broadcast transmission device sets a value for identifying the segmented data in the packet payload through the control unit S107.

The broadcast transmission device packetizes data having a smaller size than segmented data or a transport packet through the control unit in operation S109. In more detail, the broadcast transmission device processes data to be in a delivery from. The processed broadcast packet may include a packet header and packet payload. Additionally, the packet payload may include data and the header of a payload. Herein, besides the packet header, the payload header is a field for signaling payload data in the packet payload. Additionally, the packet payload including segmented data may include a segmented data header in addition to the header of a payload. Herein, besides the payload header, the segmented data header is a field for signaling payload data in the packet payload.

According to an embodiment, the broadcast transmission device may packetize one data in one packet. According to another embodiment, the broadcast transmission device may packetize a plurality of data in one packet. According to another embodiment, the broadcast transmission device may segment and packetize one data in a plurality of packets.

As mentioned above, according to the size of data or the length of a packet, a packetized transport packet may vary. Therefore, it is necessary for the broadcast transmission device to transmit different transport packets in distinguishable forms. According to an embodiment, the broadcast transmission device may packetize data by including information representing the form of a packet in the payload header of a transport packet through the control unit. According to another embodiment, when it is difficult to distinguish data to be transmitted only with information in the payload header, the control unit of the broadcast transmission device may packetize data by additionally including information for identifying the type of a transport packet.

The broadcast transmission device transmits the packetized broadcast packet through the transmission unit in operation S1111. According to an embodiment, a broadcast packet may be transmitted through a terrestrial broadcast network. According to another embodiment, a broadcast packet may be transmitted through an internet network.

Figure 43:
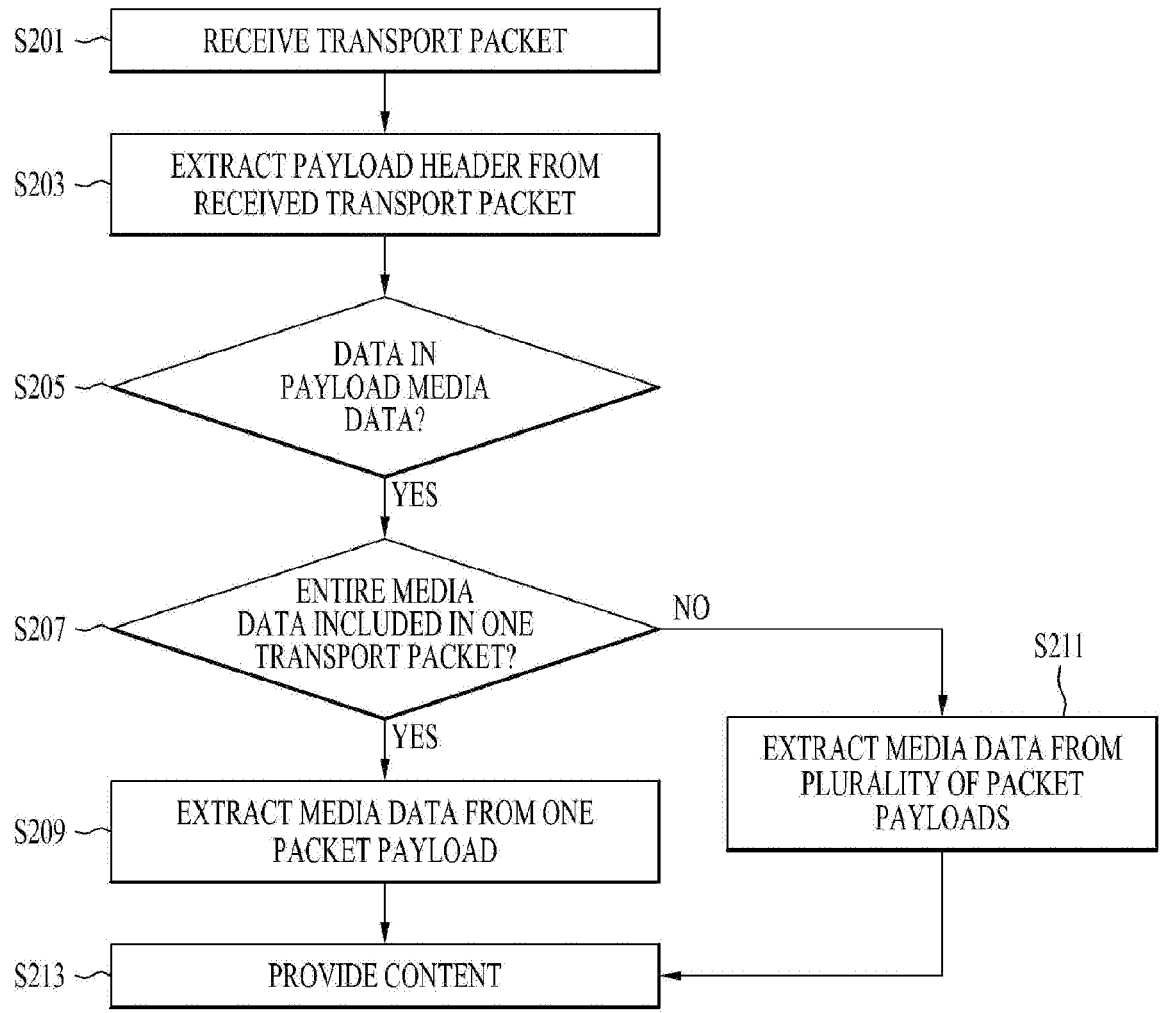
FIG. 43 is a view illustrating an operation when a broadcast reception device receives a packetized broadcast packet according to an embodiment of the present invention.

FIG. 43 is a view illustrating an operation when a broadcast reception device receives a packetized broadcast packet according to an embodiment of the present invention.

The broadcast reception device 100 receives a packetized transport packet through the broadcast reception unit 110 in operation S201.

The broadcast reception device 100 extracts a payload header from the received transport packet through the control unit 150 in operation S203. The control unit 150 may obtain payload data including data and a payload header signaling the payload data from the payload of the transport packet. In more detail, the control unit 150 of the broadcast reception device 100 may extract additional information for providing at least one of a broadcast content in the packet payload and an enhancement content relating to the broadcast content, from the received transport packet.

According to an embodiment, the control unit 150 of the broadcast reception device 100 may extract at least one of payload error determination information, payload priority information, and payload type information from the payload header. In more detail, the payload error determination information represents whether there is an error in the payload in a broadcast packet or whether a corresponding payload includes a content violating a predetermined syntax.

Additionally, the priority information represents a priority of data in the payload. Additionally, the priority information represents property information of data in the payload. For example, in the case of a payload including signaling information of file format media data, the priority information of a corresponding packet is set to the highest priority.

Additionally, the payload type information represents the type of a packet payload including payload data. For example, the payload type information may represent whether the broadcast transmission device packetizes one data in one packet payload or divides and packetizes one data in a plurality of packet payloads.

The broadcast reception device 100 determines whether data in the payload is media data from information in the extracted payload header through the control unit 150 in operation S205. In more detail, the control unit 150 of the broadcast reception device 100 may determine the type of a payload in a corresponding packet on the basis of the packet header information. According to an embodiment, the type of a payload may be media data including broadcast content and an enhancement content relating to the broadcast content. According to another embodiment, the type of a payload may be metadata including additional information necessary for providing media data.

When it is determined that data in the payload is media data, the control unit 150 of the broadcast reception device 100 determines whether entire media data is included in one transport packet in operation S207. According to a specific embodiment, according to the length of a transport packet and the size of entire media data, the broadcast transmission device may packetize the entire media data in one transport packet. According to another embodiment, the broadcast transmission device may divide entire media data and packetize them in different transport packets. Accordingly, the control unit 150 of the broadcast reception device 100 may determine the type of a broadcast packet through the payload header so as to extract complete media data for content output.

On the other hand, according to an embodiment of the present invention, when the control unit 150 of the broadcast reception device 100 determines that data in the payload is not media data, this will be described in more detail with reference to FIG. 66.

When it is determined that entire media data is included in one transport packet, the control unit 150 extracts media data from one packet payload in operation S209. According to an embodiment, the control unit 150 of the broadcast reception device 100 may extract only one media data from one transport packet. According to another embodiment, the control unit 150 of the broadcast reception device 100 may extract a plurality of media data from one transport packet. On the other hand, when it is determined that entire media data is not included in a transport packet, the control unit 150 extracts media data from a plurality of packet payloads on the basis of a payload header and a segment data header in operation S211. In more detail, the control unit 150 may obtain information of divided and packetized media data from the payload header and the segment data header. Accordingly, the control unit 150 may identify divided media data according to the obtained information. That is, the control unit 150 may obtain the order of divided media data according to the obtained information. The control unit 150 may concatenate media data obtained from different transport packets on the basis of a corresponding order.

The broadcast reception device 100 provides content through the control unit 150 in operation S213. According to an embodiment, the control unit 150 may provide content on the basis of extracted media data. According to another embodiment, the control unit 150 may provide content on the basis of concatenated media data.

The control unit 150 may output A/V content. According to another embodiment, the broadcast reception device 100 may output enhancement data relating to A/V content.

Figure 44:
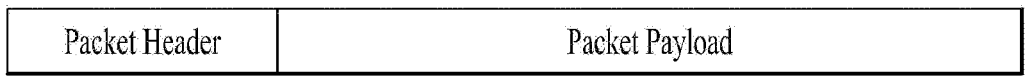
FIG. 44 is a view illustrating a segment configuration according to an embodiment of the present invention.

FIG. 44 is a view illustrating a segment configuration according to an embodiment of the present invention.

On a packet based data transfer protocol, each packet is configured with a packet header and a packet payload as shown in FIG. 40 in general. The packet header may include information of a packet payload in a packet. The packet payload may include media data to be transmitted via a broadcast network or an internet network. Media data that the packet payload includes may be at least one of audio, video, enhancement service, and additional information.

Figure 45:
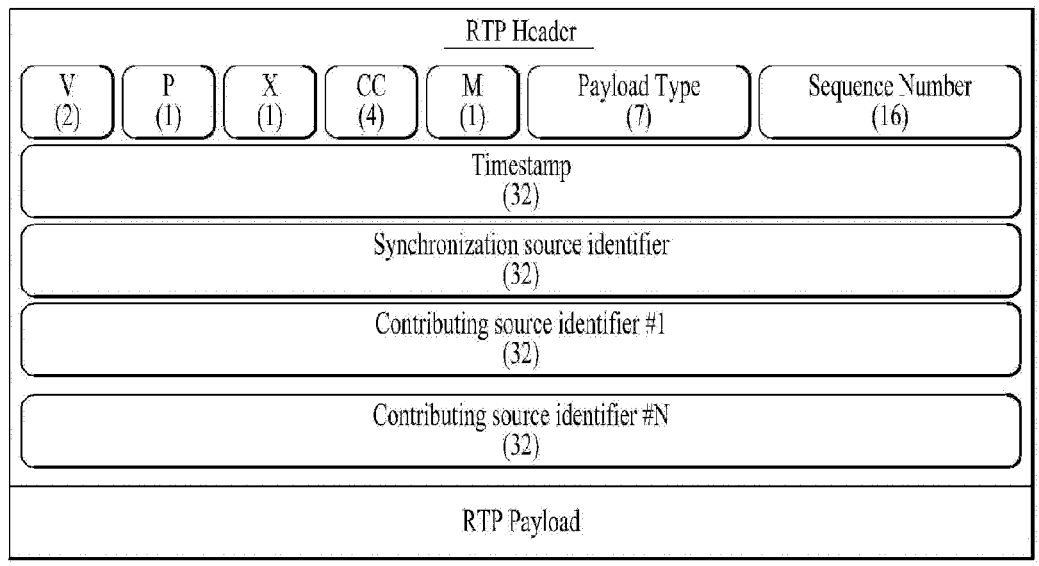
FIG. 45 is a view illustrating a structure of a real-time transport protocol (RTP) packet for real-time content transmission according to an embodiment of the present invention.

FIG. 45 is a view illustrating a structure of a real-time transport protocol (RTP) packet for real-time content transmission according to an embodiment of the present invention.

An RTP packet may include an RTP Header and an RTP Payload. The RTP header include at least one of a Timestamp, a Synchronization source identifier, and/or a Contributing source identifier.

The RTP Header may include at least one of a V (version) field, a P (padding) field, an X (extension) field, a CC field, an M (Marker bit) field, a Payload Type field, a Sequence Number field, and/or a Timestamp field.

The V (version) field represents version information of a corresponding RTP. According to a specific embodiment of the present invention, the V (version) field may be a 2-bit field.

The P (padding) field represents whether there are padding bits in a payload. According to a specific embodiment of the present invention, the P (padding) field may be a 1-bit field.

The X (extension) field represents whether there is an extension field in the RTP Header. According to a specific embodiment of the present invention, the X (extension) field may be a 1-bit field.

The CC field represents the number of Contributing sources. According to a specific embodiment of the present invention, the CC field may be a 4-bit field.

The M (Marker bit) field may represent a different meaning according to the Payload type. For example, when a transport object is a file, the M (Marker bit) field may represent the end of the file. According to another embodiment, when a transport object is video or audio data, the M (Marker bit) field may represent the first or last object of related access units. According to a specific embodiment of the present invention, the M (Marker bit) field may be a 1-bit field.

The Payload Type field represents the type of an RTP Payload. According to a specific embodiment of the present invention, the Payload Type field may be a 7-bit field.

The Sequence Number field represents the sequence number of an RTP packet. According to a specific embodiment of the present invention, the Sequence Number field may be a 16-bit field.

The Timestamp field may represent time information relating to an RTP packet. The Timestamp field may be interpreted differently according to a value of the Payload Type field. According to a specific embodiment of the present invention, the Timestamp field may be a 32-bit field.

RTP payload may be included in an audio/video access unit according to the payload type of RTP Header. For example, in the case of H.264, a network abstract layer (NAL) unit may be included.

Figure 46:
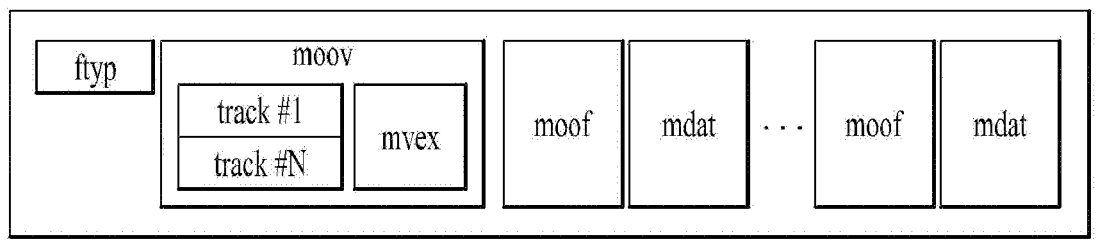
FIG. 46 is a view illustrating a media file format based on an ISO base media file format (ISO BMFF) according to an embodiment of the present invention.

FIG. 46 is a view illustrating a media file format based on an ISO base media file format (ISO BMFF) according to an embodiment of the present invention.

As shown in the figure, the media file format may include one ftyp and at least one moov, moof, and mdat in general.

ftyp represents the type and suitability of a media file. Ftyp is located at the front in a media file if possible.

moov is a container for all media data. In more detail, moov is a container box for single track of presentation. Presentation may be configured with one or more tracks. Each track is separated from another track in presentation. According to an embodiment, a track may contain media data and according to another embodiment, a track may contain information for packetized streaming protocol.

mdat is a container of media data and moof contains information on mdat.

Figure 47:
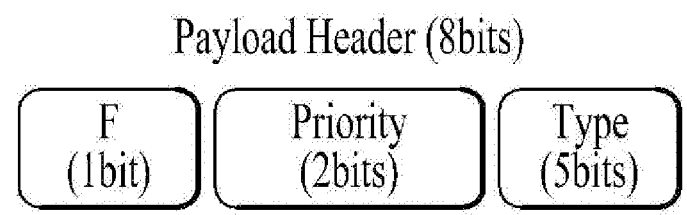
FIG. 47 is a view illustrating a configuration of a payload header in a packet payload according to an embodiment of the present invention.

FIG. 47 is a view illustrating a configuration of a payload header in a packet payload according to an embodiment of the present invention.

Currently, a real-time transport protocol is mostly transmitted based on an access unit of a media file. In more detail, an access unit refers to a minimum unit for transmitting a media file or data. Accordingly, there is insufficient consideration on a method of transmitting media file format based data in real-time.

According to an embodiment of the present invention, a broadcast transmission device may transmit one file format based media data through a payload included in one transport packet. In this case, the transport packet may be referred to as a single unit packet. According to an embodiment of the present invention, a broadcast transmission device may transmit a plurality of file format based media data through a payload included in one transport packet. In this case, the transport packet may be referred to as an aggregation packet. According to another embodiment of the present invention, a broadcast transmission device may divide one file format based media data into several transport packets and may then transmit them. In this case, the transport packet may be referred to as a fragmented packet. According to another embodiment of the present invention, a broadcast transmission device may transmit one or a plurality of metadata for media stream through the payload of one transport packet. According to another embodiment, the broadcast transmission device may transmit one metadata through the payloads of a plurality of transport packets.

Additionally, a broadcast transmission device according to an embodiment of the present invention may transmit media data through various protocols. The protocol may include at least one of a real-time transport protocol (RTP), an asynchronous layered coding (ALC), and a layered coding transport (LCT).

In more detail, a broadcast transmission device may insert a field representing information on a payload type in the header of a transport packet to represent that there is file format based media data in a payload through a corresponding field. For example, in the case of the RTP, the payload type field of a header may represent the data type of a payload and a specific value may be assigned to a corresponding field as a payload type value for file format based media data. Then, in this case, when data including the end of one media file is included in the payload of a packet, the M field of an RTP packet header may be set to 1.

In order to overcome the above issues, a payload header according to an embodiment of the present invention may include at least one of information representing whether there is an error or syntax error on data in a payload, information representing the priority of data, and information representing the type of data. In this case, information representing whether there is an error or syntax error on data in the payload of a payload header may be referred to as an F field. According to an embodiment, the information representing whether there is an error or syntax error on data in the payload of a payload header may be set to 1 as forbidden_zero_bit when there is an error or syntax violation on data in a payload. In more detail, the information representing whether there is an error or syntax error on data in the payload of a payload header may be one bit.

Additionally, information representing the priority of data in a payload header may be referred to as an information Priority field. According to an embodiment, the information representing the priority of data is a field representing the priority of payload data. Then, the information representing the priority of data may represent whether payload data includes important metadata on a media file format.

For example, in ISO BMFF, in the case of payload data including ftyp and moov, information representing the priority of data may be set to the highest priority. According to an embodiment, information representing the priority of data may represent the highest priority highest (highest), a relatively lower priority than the highest priority (medium), and the lowest priority (low) through a control unit of a broadcast transmission device. In this case, information representing the priority of data may be set to 0x00 in the case of the highest priority, 0x01 in the case of a relatively lower priority than the highest priority, and 0x02 in the case of the lowest priority. The above setting value is just one exemplary and may be wet to another arbitrary value.

Additionally, in this case, information representing the type of data may be referred to as a type field. In more detail, through information representing the type of data, the control unit 150 of the broadcast reception device 100 may identify whether a transport packet is a packet transmitting one data by one packet, a packet transmitting a plurality of different data by one packet, or a packet transmitting data obtained by dividing one into a plurality of data.

Additionally, through information representing the type of data, the control unit 150 of the broadcast reception device 100 may identify whether a transport packet is a packet transmitting metadata including time information of content or a packet transmitting metadata including description information of content.

According to an embodiment, in the case of a packet transmitting one data by one packet, the broadcast reception device may set information representing the type of data to 0x00. Additionally, in the case of a packet transmitting a plurality of different data by one packet, the broadcast reception device may set information representing the type of data to 0x01. Additionally, in the case of a packet dividing one data and transmitting divided data, the broadcast reception device may set information representing the type of data to 0x02.

Additionally, the broadcast transmission device may packetize metadata including presentation or decoding time information of content instead of media data and may then transmit the packetized metadata. In the case the broadcast reception device may set information representing the type of data to 0x03. Moreover, the time information may be referred to as timeline data.

Additionally, the broadcast transmission device may packetize and transmit metadata including description information of content. In the case the broadcast reception device may set information representing the type of data to 0x04. Moreover, the above information may be referred to as labeling data.

However, the above setting values are just exemplary so that the present invention is not limited to the above values. According to a specific embodiment of the present invention, the type field may be a 5-bit field.

Figure 48:
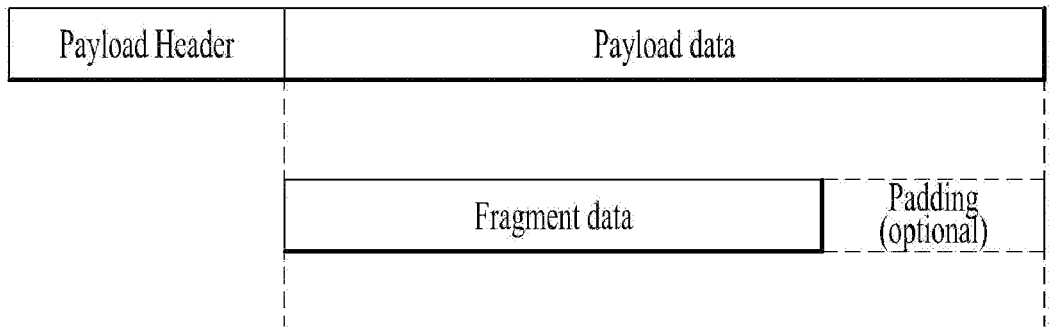
FIG. 48 is a view illustrating a payload configuration of a transport packet in which one media data is packetized in one packet.

FIG. 48 is a view illustrating a payload configuration of a transport packet in which one media data is packetized in one packet.

As shown, a packet in which one media data is included in one packet may be referred to as a single unit packet. The payload of a single unit packet may include a payload header and payload data. The payload data may include fragmented data including one file format based media data. According to an embodiment, when a transport protocol uses a transport packet of a fixed length, payload data may include padding bits in addition to fragmented data. Herein the padding bit refers to a bit for filling the remaining space after filling data in a transport packet.

Figure 49:
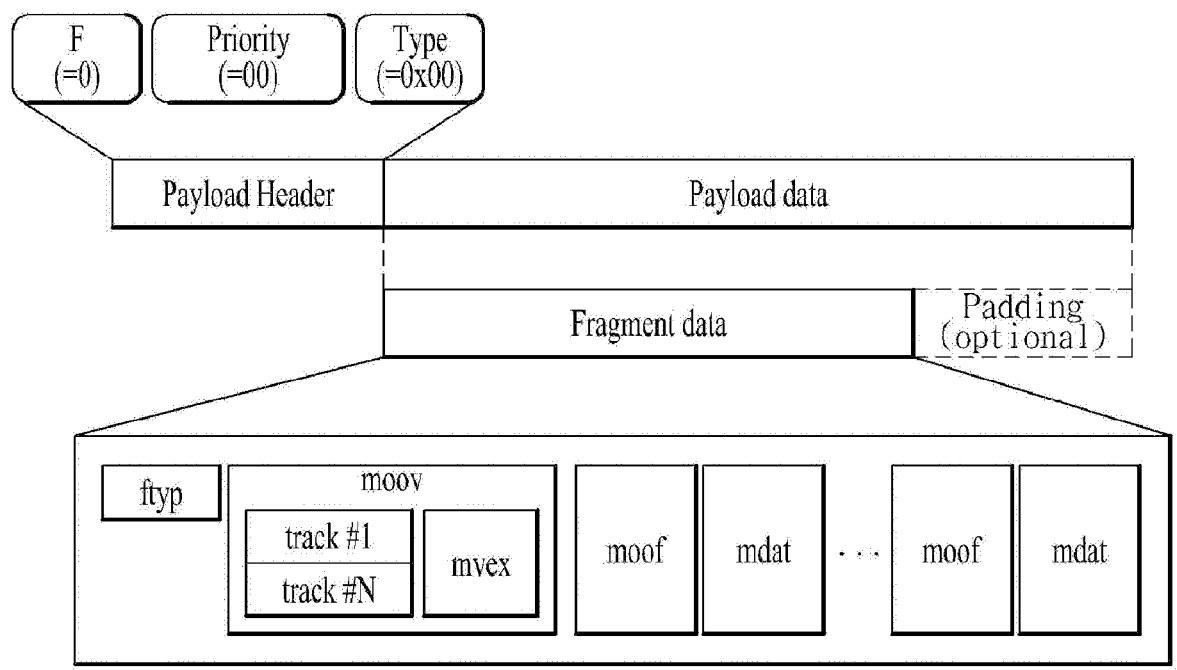
FIG. 49 is a view illustrating a payload configuration of a transport packet in which one media data is packetized in one packet.

FIG. 49 is a view illustrating a payload configuration of a transport packet in which one media data is packetized in one packet.

A detailed view of a transport packet shown in the above figure. As shown, a payload header may include at least one of information representing whether there is an error or syntax error in data in a payload, information representing the priority of data, and/or information representing the type of data.

As shown, information representing whether there is an error or syntax error on data in a payload may include a value representing a content that there is no error and syntax violation. According to a specific embodiment of the present invention, a corresponding value may be 0.

Since a media file in payload data includes important data such as ftyp, Information representing the priority of data may have the highest priority. As mentioned above, in the case of ftyp, since ftyp includes information for signaling a media file, it may have the highest priority. According to a specific embodiment of the present invention, a value representing the highest priority may be 0x00.

Since one media file is all included in one packet payload, Information representing the type of data may represent a single unit packet. According to a specific embodiment, information representing the type of data may have a value of 0x00. Additionally, a padding bit may be selectively inserted into payload data according to the length and transport protocol of media file.

Figure 50:
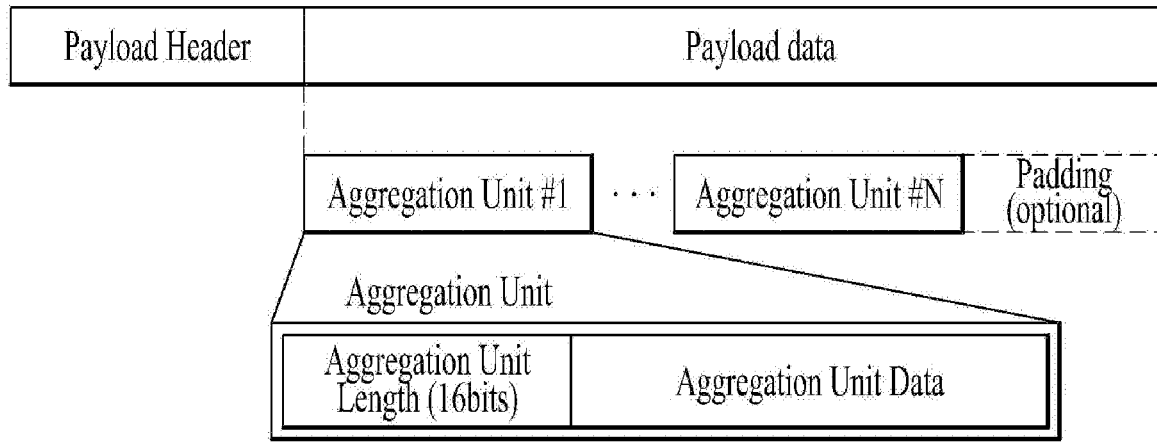
FIG. 50 is a view illustrating a configuration of a transport packet in which a plurality of media data are packetized in one packet.

FIG. 50 is a view illustrating a configuration of a transport packet in which a plurality of media data are packetized in one packet.

The above packet may be referred to as an aggregation packet. As shown, when the payload of one transport packet includes a plurality of different file format based media data, payload data may include a plurality of aggregation units. Each aggregation unit may include another file format based media data. According to an embodiment, when a transport protocol uses a packet of a fixed length, payload data may include padding bits in addition to fragmented data.

According to an embodiment, one aggregation unit may include at least one of information representing the length of an aggregation unit and aggregation data. In this case, information representing the length of an aggregation unit may be referred to as an aggregation unit length field. According to a specific embodiment of the present invention, the aggregation unit may be 16 bits. Additionally, aggregation unit data represent data in one file.

Figure 51:
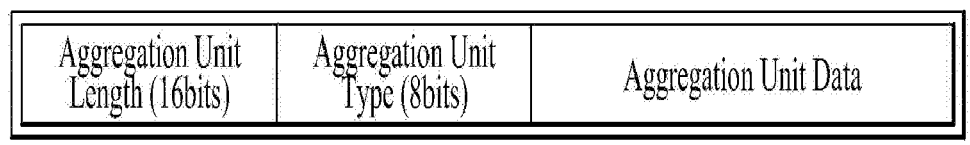
FIG. 51 is a view illustrating a configuration of an aggregation unit according to an embodiment of the present invention.

FIG. 51 is a view illustrating a configuration of an aggregation unit according to another embodiment of the present invention.

One aggregation unit may further include information representing the type of a file in an aggregation unit in addition to the embodiment described above.

Information representing the type of aggregation may be referred to as an aggregation unit type field. According to a specific embodiment, the broadcast transmission device may set the aggregation type to 0x00.

According to another embodiment, the aggregation type may represent that a corresponding aggregation unit includes a file in Self-initializing Segment format on MPEG-Dynamic Adaptive Streaming over HTTP (DASH). Herein, a self-initializing segment is obtained by integrating an initializing segment and a media segment without an additional initializing segment. In more detail, the self-initializing segment may include a media segment and its media form. According to a specific embodiment, in this case, the broadcast transmission device may set the aggregation type to 0x01.

According to another embodiment, the aggregation type may represent that a corresponding aggregation unit includes a file in Initialization Segment format on MPEG-DASH. Herein, the initializing segment is a format following ISO BMFF. In more detail, the initializing segment needs to include ftyp and moov. But, it does not include moof. According to a specific embodiment, in this case, the broadcast transmission device may set the aggregation type to 0x02.

Figure 52:
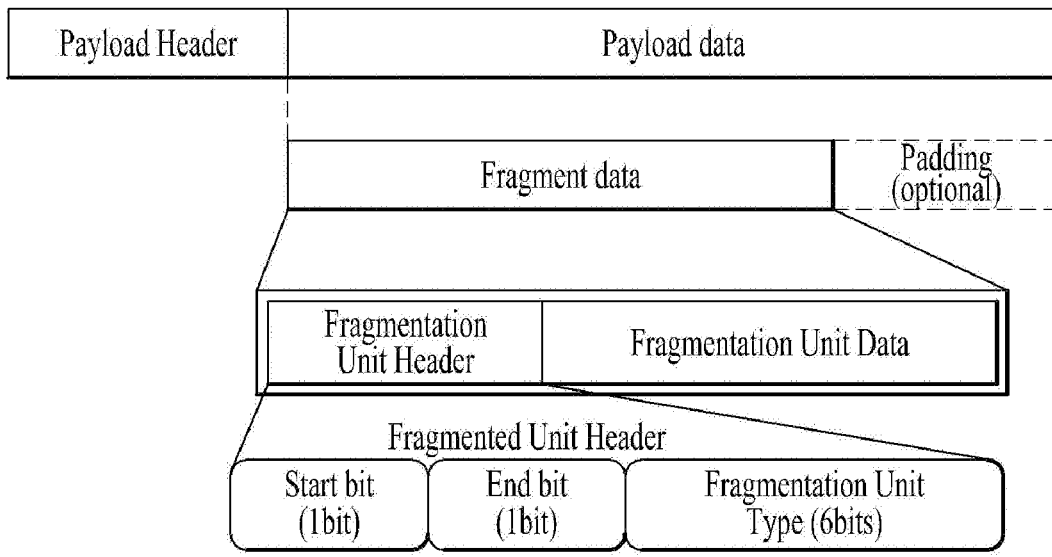
FIG. 52 is a view illustrating the payload of a fragmented packet according to an embodiment of the present invention.

FIG. 52 is a view illustrating the payload of a fragmented packet according to an embodiment of the present invention.

A payload configuration of a transport packet (hereinafter referred to as a fragmented packet) in which one media data is divided and packetized into a plurality of transport packets is shown.

As shown, the payload of a fragmented packet may include a fragmentation unit. Additionally, when a transport protocol uses a packet of a fixed length, the payload of a fragmented packet may include padding bits.

According to an embodiment, a fragmentation unit FU may include at least one a Fragmentation unit header and Fragmentation unit data. The Fragmentation unit data may include part of one file format based media data. The Fragmentation unit header may include information of fragmentation unit data.

In more detail, the fragmentation unit header may include at least one of information representing whether fragmentation unit data includes the start part data among entire file media data, information representing whether fragmentation unit data includes the end part data among entire file media data, and information representing the type of a fragmentation unit.

According to an embodiment, the information representing whether fragmentation unit data includes the start part data among entire file media data may be referred to as a start bit field. In more detail, the start part data may be part of entire data including the first bit of entire media data.

For example, the fragmentation unit data of a corresponding payload includes start part data, the broadcast transmission device may set information representing whether fragmentation unit data includes the start part data among entire file media data to 1. In more detail, the information representing whether fragmentation unit data includes the start part data among entire file media data may be one bit.

According to an embodiment, the information representing whether fragmentation unit data includes the end part data among entire file media data may be referred to as an end bit field. In more detail, the end part data may be part of entire data including the end bit of entire media data.

For example, the fragmentation unit data of a corresponding payload includes end part data, the broadcast transmission device may set information representing whether fragmentation unit data includes the end part data among entire file media data to 1. In more detail, the information representing whether fragmentation unit data includes the end part data among entire file media data may be one bit.

According to an embodiment, information representing the type of a fragmentation unit may be referred to as a fragmentation unit type field.

According to an embodiment, a fragmentation unit type may represent that a corresponding packet indicates that a fragmentation unit includes a file format based basic file. In more detail, the file format based basic file may be a media file having a file format based on ISO BMFF. According to a specific embodiment, the broadcast transmission device may set the fragmentation unit type to 0x00.

According to another embodiment, the fragmentation unit type may represent that a corresponding fragmentation unit includes a file in Self-initializing Segment format on MPEG-DASH. According to a specific embodiment, in this case, the broadcast transmission device may set the fragmentation unit type to 0x01.

According to another embodiment, the fragmentation unit type may represent that a corresponding fragmentation unit includes a file in Initialization Segment format on MPEG-DASH. According to a specific embodiment, in this case, the broadcast transmission device may set the fragmentation unit to 0x02.

According to another embodiment, the fragmentation unit type may represent that a corresponding fragmentation unit includes a file in media Segment format on MPEG-DASH. According to a specific embodiment, in this case, the broadcast transmission device may set the fragmentation unit to 0x03.

In more detail, information representing a fragmentation unit type may be six bits.

Figure 53:
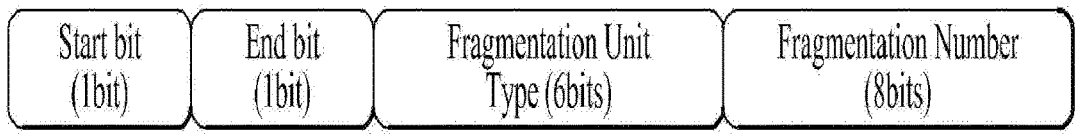
FIG. 53 is a view illustrating a configuration of a payload in a fragmented packet according to another embodiment of the present invention.

FIG. 53 is a view illustrating a configuration of a payload in a fragmented packet according to another embodiment of the present invention.

The embodiment may be applied to the case there is no information relating to the order of a transport packet in the header therein.

As shown, the fragmentation unit header in a fragmentation unit FU may include at least one of information representing whether fragmentation unit data includes the start part data among entire file media data, information representing whether fragmentation unit data includes the end part data among entire file media data, information representing the type of a fragmentation unit, and information representing the order in entire data of a fragmentation unit. Among the information, the remaining information other than the information representing the order of a fragmentation unit is identical to that described with reference to the previous figure.

The information representing the order of a fragmentation unit may be referred to as a fragmentation number field. In more detail, when file format based media data is divided into a plurality of fragmented packets, the broadcast transmission device may set a value to the information representing the order of a fragmentation unit to assign the order of a corresponding packet. According to a specific embodiment of the present invention, the Fragmentation number field may be an 8-bit field.

Figure 54:
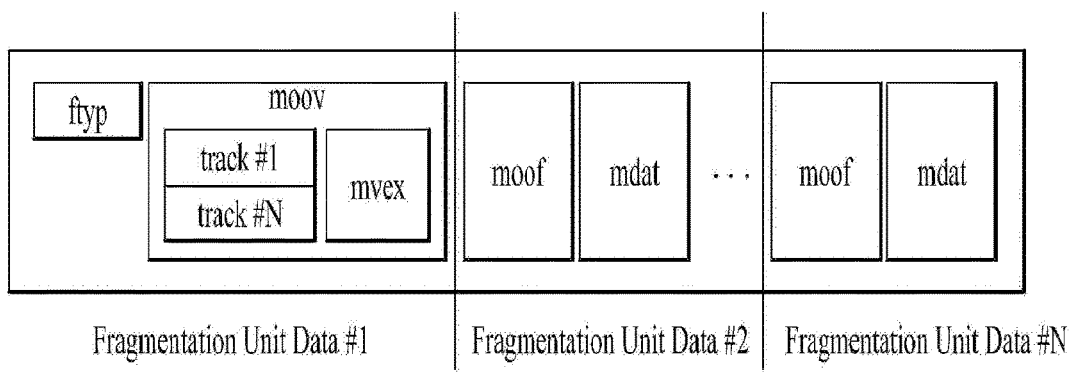
FIG. 54 is a view when a broadcast transmission device fragments an ISO BMFF based media file into a plurality of packets.

FIG. 54 is a view when a broadcast transmission device fragments an ISO BMFF based media file into a plurality of packets.

As shown, in ISO BMFF based media file may include ftyp and moov, and a plurality of moof and mdat.

The broadcast transmission device may divide an ISO BMFF based media file into a plurality of files and may then include them in different fragmentation unit data. Additionally, the broadcast transmission device may include related information in a payload header by dividing an ISO BMFF based media file.

Figure 55:
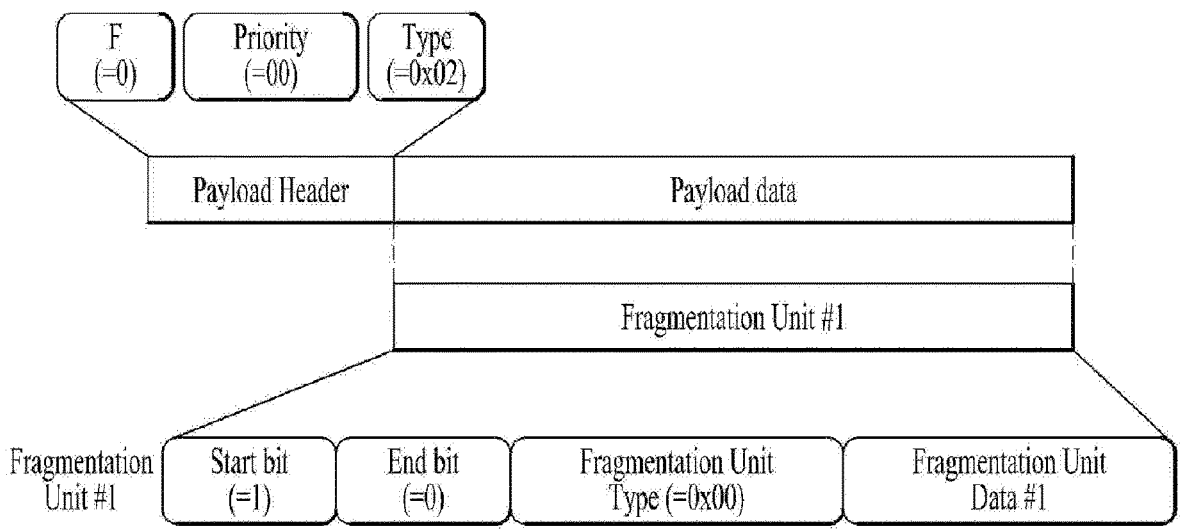
FIG. 55 is a view illustrating first fragmentation unit data packetized by the broadcast transmission device.

FIG. 55 is a view illustrating first fragmentation unit data packetized by the broadcast transmission device.

As shown, according to an embodiment of the present invention, the broadcast transmission device determines that there is no error or syntax error in a corresponding packet and sets the F field to 0.

Additionally, the broadcast transmission device may set the Priority field to a value representing the highest priority. According to a specific embodiment of the present invention, a corresponding value may be 0x00.

Additionally, the broadcast transmission device may set the Type field to a value representing a packet for dividing one file format based media file into several payloads and transmitting them. According to a specific embodiment of the present invention, a corresponding value may be 0x02.

The payload data may include a fragmentation unit. Again, the fragmentation unit may include a Start bit field, an End bit field, a fragmentation unit type field, and a fragmentation unit data field.

The broadcast transmission device may set the Start bit field to a value representing a content that a corresponding packet includes the start data of a media file. In more detail, since a first fragmentation unit includes the start data of media data as shown in FIG. 54, the broadcast transmission device may set a value representing a corresponding content to the start bit field.

Moreover, the broadcast transmission device may set the End bit field of a first fragmentation unit shown in FIG. 55 to a value representing a content that the end data of a media file is not included. According to a specific embodiment, the broadcast transmission device may set the End bit field to 0 to represent a content that a corresponding packet does not include the end data of a media file.

Moreover, as shown, the broadcast transmission device may set the fragmentation unit type field to a value representing a content that the first fragmentation unit includes a file format based basic form of file. In more detail, the file format based basic form may be file format data following ISO BMFF. According to a specific embodiment, the broadcast transmission device may set the fragmentation unit type field to 0x00 to represent corresponding content.

Figure 56:
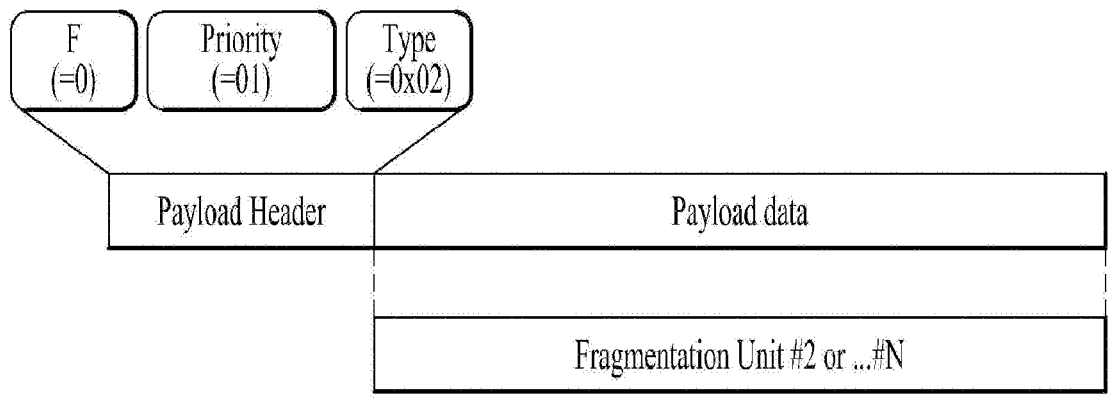
FIG. 56 is a view illustrating a fragmentation unit including remaining data except for the start data in the fragmentation unit data according to an embodiment of the present invention.

FIG. 56 is a view illustrating a fragmentation unit including remaining data except for the start data in the fragmentation unit data according to an embodiment of the present invention.

As shown, according to an embodiment of the present invention, the broadcast transmission device may set the F field of a payload header to a value representing that there is no error or syntax error in a corresponding packet. According to a specific embodiment, the broadcast transmission device may set the F field to 0. Additionally, the broadcast transmission device sets the Priority field to a value representing the payload data shown in FIG. 56 has a relatively low priority.

According to a specific embodiment, data signaling entire media data may not be included from a second fragment unit. Accordingly, since the second fragmentation unit has a relatively lower priority than the first fragmentation unit, the priority field may be set to a value having a relatively lower priority. For example, a corresponding value may be 0x01.

Additionally, the broadcast transmission device may set the Type field to 0x02 as a Fragmented packet that a corresponding packet represents a packet dividing one file format based media file into several payloads and transmitting them.

Figure 57:
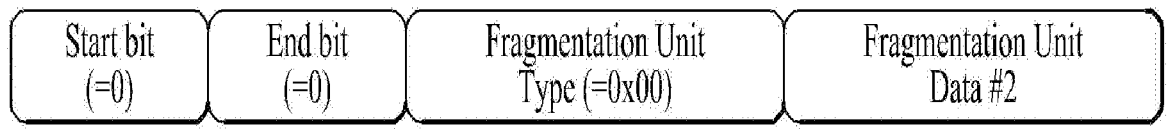
FIG. 57 is a view illustrating a payload configuration when payload data does not include fragmentation unit data including start data and fragmentation unit data including end data.

FIG. 57 is a view illustrating a payload configuration when payload data does not include fragmentation unit data including start data and fragmentation unit data including end data.

According to an embodiment of the present invention, since the fragmentation unit data does not include start data and end data, the broadcast transmission device may set the start bit field and the end bit field to a value representing corresponding information. According to a specific embodiment, the broadcast transmission device may set the start bit and end bit fields to 0.

Additionally, the broadcast transmission device may set the content that a fragmentation unit type field includes a file format based basic form of file to a specific value of a fragmentation unit type field. In more detail, the file format based basic form may be file format data following ISO BMFF. According to a specific embodiment, the broadcast transmission device may set the fragmentation unit type field to 0x00 to represent corresponding content. File format based media data divided into packets may have a unique order from an entire file. The broadcast reception device 100 may identify that the fragmentation unit data divided through the control unit 150 includes the start part among entire data on the basis of the start bit field. Additionally, the fact that the fragmentation unit data includes the end part in entire data may be identified on the basis of the End bit field. However, there may be a case that cannot be identified only by the Start bit field and the End bit field.

When the fragmentation unit data does not include start data or end data in entire data, the broadcast reception device 100 may identify a corresponding packet through information representing the order of the fragmentation unit data included in a payload according to an embodiment. In more detail, information representing the order of fragmentation unit data may be a fragmentation number field. Additionally, a broadcast transmission device may set the order of corresponding fragmentation unit data to the above-mentioned presentation field.

However, according to another embodiment, a transport packet may not include order information of fragmentation unit data. In this case, according to an embodiment, a broadcast transmission device may insert information for identifying the order of fragmentation unit data into a packet header. The information for identifying the order of fragmentation unit data into a packet header may be referred to as a sequence number field. According to another embodiment, a broadcast transmission device may insert information for identifying the order of fragmentation unit data into offset information of an IP datagram.

Figure 58:
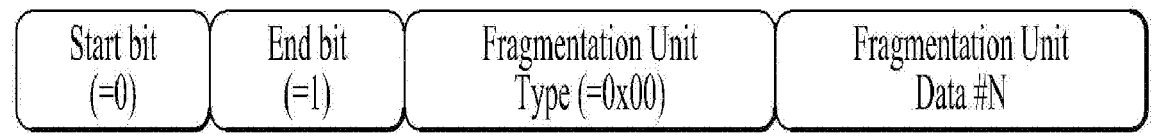
FIG. 58 is a view illustrating a configuration of a payload including a fragmentation unit including the end data among divided entire media data.

FIG. 58 is a view illustrating a configuration of a payload including a fragmentation unit including the end data among divided entire media data. In more detail, the figure is a view illustrating a payload configuration when payload data does not include fragmentation unit data including start data but includes fragmentation unit data including end data.

According to an embodiment of the present invention, since the fragmentation unit data includes end data, the broadcast transmission device may set the start bit field and the end bit field to a value representing corresponding information. According to a specific embodiment, the broadcast transmission device may set the start field to 0. Then, the broadcast transmission device may set the end bit field to 1.

Additionally, a broadcast transmission device may set the fragmentation unit type field to represent the content that media data including a corresponding packet includes a basic form of file starting from ISO BMFF based ftyp. According to a specific embodiment, a broadcast transmission device may set the fragmentation unit type field to 0x00.

Data that a broadcast transmission device transmits through a transport packet may include metadata in addition to the above-mentioned media data.

The metadata represents additional information necessary for providing media data. Hereinafter, referring to FIGS. 59 to 66, suggested are a broadcast transmission device and an operating method thereof, and a broadcast reception device and an operating method thereof, in order for packetizing metadata in a transport packet and transmitting and receiving it.

Additionally, hereinafter, timeline information is mainly described as one example of metadata. The timeline information is a series of time information for media content. In more detail, the timeline information may be a series of time information for presentation or decoding.

Additionally, the timeline information may include base timeline information. The basic timeline means a reference timeline necessary for synchronizing media data transmitted through a plurality of different transmission networks. In more detail, when the timeline of media data transmitted through a second transmission network is mapped into the timeline of media data transmitted through a first transmission network, the timeline of the media data transmitted through the first transmission network becomes a basic timeline.

Moreover, the broadcast transmission device may express the metadata in XML format. Additionally, the broadcast transmission device may express the metadata in a descriptor format includable in a signaling table.

FIG. 59 is a view illustrating a timeline signaling table of metadata according to an embodiment of the present invention.

According to an embodiment of the present invention, the timeline signaling table may include information representing metadata relating to a timeline or information that corresponding metadata includes a timeline component access unit. The above information may be referred to as an identifier field. According to a specific embodiment of the present invention, the identifier field may be an 8-bit field.

Additionally, according to an embodiment of the present invention, the timeline signaling table may include information representing the length of timeline information of a timeline component access unit. The above information may be referred to as an AU_length field. According to a specific embodiment of the present invention, the AU_length field may be a 32-bit field.

Additionally, according to an embodiment of the present invention, the timeline signaling table may include information on whether including location information on services and/or content components relating to a timeline component access unit. The above information may be referred to as a location_flag field. According to a specific embodiment of the present invention, the location_flag field may be a 1-bit field.

Additionally, according to an embodiment of the present invention, the timeline signaling table may include version information of a timestamp in a timeline component access unit. The timestamp represents time information through which a corresponding access unit needs to be outputted in a continuous timeline. The above information may be referred to as a timestamp_version field. According to a specific embodiment of the present invention, the timestamp_version field may be a 1-bit field.

Additionally, according to an embodiment of the present invention, the timeline signaling table may include timestamp type information of a timeline component access unit. The above information may be referred to as a timestamp type field.

According to an embodiment, the timestamp type information may be set to a value representing a decoding time of a service or content component relating to a timeline component access unit. In more detail, the decoding time of a content component may be referred to as a decoding timestamp. According to a specific embodiment, the broadcast transmission device may set timestamp type information to 0x00 when corresponding information represents a decoding time.

According to another embodiment, the timestamp type information may be set to a value representing the presentation time of a service or content component relating to a timeline component access unit. In more detail, the presentation time of a content component may be referred to as a presentation timestamp. According to a specific embodiment, the broadcast transmission device may set timestamp type information to 0x01 when corresponding information represents a presentation time.

Moreover, according to a specific embodiment of the present invention, the timestamp_type field may be a 1-bit field.

Additionally, according to an embodiment of the present invention, the timeline signaling table may include timestamp format information of a timeline component access unit. The above information may be referred to as a timestamp_format field.

According to an embodiment, the timestamp format information may represent that a timestamp in a timeline component access unit is a format of a media time. According to a specific embodiment, the broadcast transmission device may set the timestamp_format field to 0x00 to represent that the timestamp format of a corresponding access unit is a media time format.

According to another embodiment, the timestamp format information may represent that a timestamp in a timeline component access unit is a format of a Network time protocol (NTP). According to a specific embodiment, the broadcast transmission device may set the timestamp_format field to 0x01 to represent that the timestamp format of a corresponding access unit is an NTP format.

According to another embodiment, the timestamp format information may represent that a timestamp in a timeline component access unit is a format of a MPEG DASH media presentation time. According to a specific embodiment, the broadcast transmission device may set the timestamp_format field to 0x02 to represent that the timestamp format of a corresponding access unit is a MPEG DASH media presentation time. The media time field indicating a media time may representing a media presentation time of MPEF DASH.

According to another embodiment, the timestamp format information may represent that a timestamp in a timeline component access unit is a format of a NPT (now playing time). According to a specific embodiment, the broadcast transmission device may set the timestamp_format field to 0x03 to represent that the timestamp format of a corresponding access unit is a NPT (now playing time) format.

According to another embodiment, the timestamp format information may represent that a timestamp in a timeline component access unit is a format of a timecode. According to a specific embodiment, the broadcast transmission device may set the timestamp_format field to 0x04 to represent that the timestamp format of a corresponding access unit is a timecode format. Moreover, according to a specific embodiment of the present invention, the timestamp_format field may be a 4-bit field.

According to another embodiment, the timestamp format information may represent that a timestamp in a timeline component access unit is a format of a precision time protocol (PTP).

According to another embodiment, the timestamp format information may have values 0x05-0x0E which is reserved for the future use.

According to another embodiment, the timestamp format information may have a value 0x0F for representing a timestamp format for a private use.

Additionally, according to an embodiment of the present invention, the timeline signaling table may include location information on a component of service or content relating to information in a timestamp in a timeline component access unit. The above information may be referred to as a location field. The location information may indicates an identifier MPD (Media Presentation Description) of the MPEG DASH or an MPD URL of the stream, content component or service.

Additionally, according to an embodiment of the present invention, the timeline signaling table may include information representing the length of the location information. The information representing a location information length may be referred to as a location_length field. According to a specific embodiment of the present invention, the location_length field may be an 8-bit field.

Additionally, according to an embodiment of the present invention, the timeline signaling table may include timestamp format version information of a basic timestamp that is a matching reference. The above information may be referred to as an origin_timestamp_version field.

According to an embodiment, when the origin_timestamp_version field is set to 0, this represents that a timestamp format has a 32-bit format. According to another embodiment, when the origin_timestamp_version field is set to 1, this represents that a timestamp format has a 64-bit format.

Additionally, according to an embodiment of the present invention, the timeline signaling table may include timestamp_type information of a basic timeline. The above information may be referred to as an origin_timestamp_type field.

According to an embodiment, the origin_timestamp_type field may be set to a value representing a decoding time of a service or content component relating to a basic timeline. In more detail, the decoding time of a content component may be referred to as a decoding timestamp. According to a specific embodiment, the broadcast transmission device may set the origin_timestamp_type field to 0x00 when corresponding information represents a decoding time.

According to another embodiment, the origin_timestamp_ type field may be set to a value representing a presentation time of a service or content component relating to a basic timeline. In more detail, the presentation time of a content component may be referred to as a presentation timestamp. According to a specific embodiment, the broadcast transmission device may set the origin_timestamp_type field to 0x01 when corresponding information represents a presentation time.

Additionally, according to an embodiment of the present invention, the timeline signaling table may include information representing a timestamp format for a base timeline. The above information may be referred to as an origin_timestamp_format field.

According to an embodiment, the origin_timestamp_format field may represent that a timestamp of a basic timeline is a format of a media time. According to a specific embodiment, the broadcast transmission device may set the origin_timestamp_format field to 0x00 to represent that the timestamp format of a corresponding basic timeline is a media time format.

According to another embodiment, the origin_timestamp_ format field may represent that a timestamp of a basic timeline is a format of an NTP. According to a specific embodiment, the broadcast transmission device may set the origin_timestamp_format field to 0x01 to represent that the timestamp format of a corresponding basic timeline is an NTP format.

According to another embodiment, the origin_timestamp_format field may represent that a timestamp of a basic timeline is a format of a MPEG DASH media presentation time. According to a specific embodiment, the broadcast transmission device may set the timestamp_format field to 0x02 to represent that the timestamp_format of a corresponding basic timeline is a MPEG DASH media presentation time format.

According to another embodiment, the origin_timestamp_ format field may represent that a timestamp of a basic timeline is a format of a NPT (now playing time). According to a specific embodiment, the broadcast transmission device may set the origin_timestamp_format field to 0x03 to represent that the timestamp_format of a corresponding basic timeline is a NPT (now playing time) format.

According to another embodiment, the origin_timestamp_format field may represent that a timestamp of a basic timeline is a format of a timecode. According to a specific embodiment, the broadcast transmission device may set the origin_timestamp_format field to 0x04 to represent that the timestamp_format of a corresponding basic timeline is a timecode format.

According to another embodiment, the origin_timestamp_ format field may represent that a timestamp of a basic timeline is a format of a precision time protocol (PTP).

The values 0x05-0x0E is reserved for the origin_timestamp_format field for the future use.

The origin_timestamp_format field may have a value 0x0F for representing this field is used for private use.

Additionally, according to an embodiment of the present invention, the timeline signaling table may include information on whether including location information on services and content components relating to a basic timeline that is a timeline mapping reference. The above information may be referred to as an origin_location_flag field. According to an embodiment, when the origin_location_flag field is set to a value other than 0, a timeline AU may include at least one of an origin_location_length field and an origin_location field.

Additionally, according to an embodiment of the present invention, the timeline signaling table may include location information on a service or content relating to a basic timeline. The above information may be referred to as an origin_location field. According to a specific embodiment, information in the origin_location field may be an IP address, a port number, or a URI form.

Additionally, according to an embodiment of the present invention, the timeline signaling table may include length information of position information on a service or content relating to a basic timeline. The above information may be referred to as an origin_location_length field. According to a specific embodiment of the present invention, the origin_location_length field may be an 8-bit field.

Additionally, according to an embodiment of the present invention, when a basic timeline that the reference of timeline mapping is a format of a media time, the timeline signaling table may include information of an available time scale. The above information may be referred to as an origin_timescale field. For example, in the case of MPEG-2 TS, the time scale may represent 9000 Hz. According to a specific embodiment of the present invention, the origin_timescale field may be a 32-bit field.

Additionally, according to an embodiment of the present invention, the timeline signaling table may include media time information on a basic timeline. The above information may be referred to as an origin_media_time field. Moreover, the origin_media_time field may mean differently according to origin_timestamp_type. For example, when origin_timestamp_type means PTS, the origin_media_time field may represent a presentation time. For example, when origin_timestamp_type means DTS, the origin_media_time field may represent a decoding time. According to a specific embodiment, the origin_media_time field may be 32 bits when the origin_timestamp_version field is set to 0 and may be 64 bits when the origin_timestamp_version field is set to 1.

Additionally, according to an embodiment of the present invention, the timeline signaling table may include timestamp_type information of a basic timeline. The above information may be referred to as an origin_timestamp field. The basic timeline timestamp information may represent different formats of timestamps according to a value of the origin_timestamp_format field. Additionally, the basic timeline timestamp information may represent different meanings according to a value of the origin_timestamp_type field.

For example, when origin_timestamp_type signals PTS, the basic timeline timestamp information may represent a presentation time.

For example, when the origin_timestamp_type field represents DTS and the origin_timestamp_format field is 0x01, the corresponding origin_timestamp field may represent a decoding time expressed in NTP. According to a specific embodiment, the origin_timestamp field may be 32 bits when the origin_timestamp_version field is set to 0 and may be 64 bits when the origin_timestamp_version field is set to 1.

According to an embodiment, when the origin_timestamp_format field represents reserved, a timeline AU may include at least one of a private_data_length field and a private_data_bytes( ) field.

The private_data_length field may represent the byte unit length of the private_data_bytes( ) field. According to a specific embodiment of the present invention, the private_data_length field may be a 16-bit field.

The private_data_bytes( ) field may define by the length that the private_data_length field represents or may include future expansion content.

Figure 60:
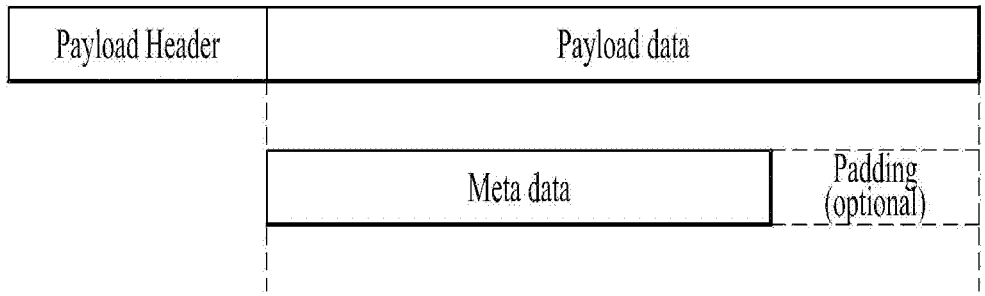
FIG. 60 is a view illustrating a configuration of payload data in which one metadata is packetized in payload data of a transport packet.

FIG. 60 is a view illustrating a configuration of payload data in which one metadata is packetized in payload data of a transport packet.

According to an embodiment, the payload data may include metadata and the metadata may include media stream related timeline data. Additionally, according to an embodiment, when a broadcasts transmission device uses a packet of a fixed length in a transport protocol, payload data may include a padding bit additionally.

Figure 61:
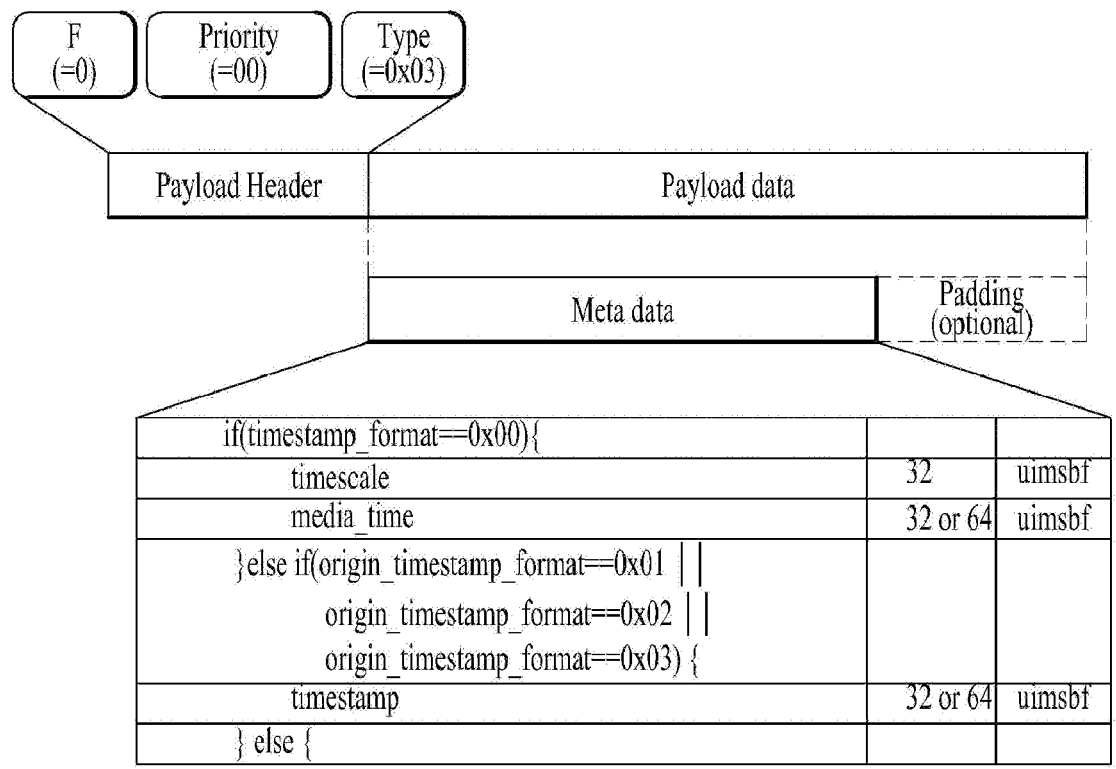
FIG. 61 is a view when payload data of a transport packet includes metadata for a timeline according to an embodiment of the present invention.

FIG. 61 is a view when payload data of a transport packet includes metadata for a timeline according to an embodiment of the present invention.

As shown, according to an embodiment, the payload header may include at least one of an F field, a Priority field, and a Type field.

According to an embodiment, a broadcast transmission device may set the F field to a value representing there is no error or syntax violation in a payload. In more detail, the broadcast transmission device may set the F field to 0. Additionally, the broadcast transmission device may set the Priority field to a value representing the highest priority as payload data includes all important data of a media file configuration. In more detail, the broadcast transmission device may set the Priority field to 0x00. Additionally, the broadcast transmission device may set the Type field to a value representing information including metadata of timeline information in a payload. In more detail, the broadcast transmission device may set the Type field to 0x03. Additionally, the metadata may include the syntax described above.

Figure 62:
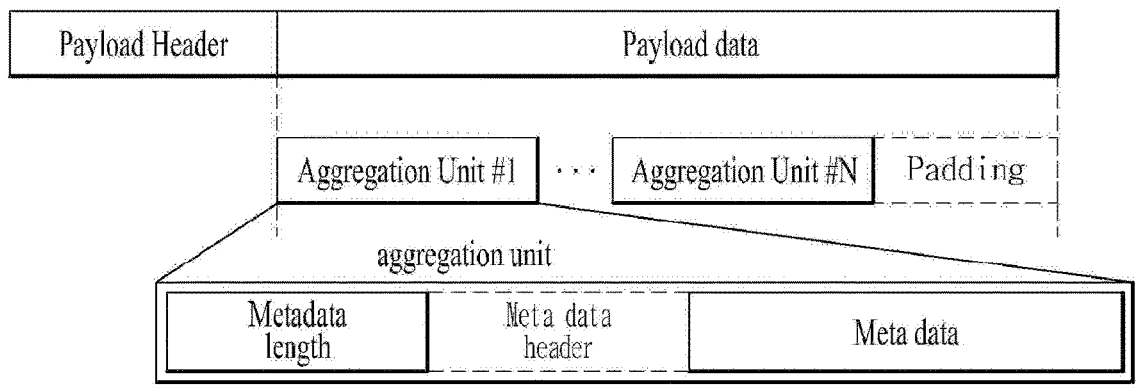
FIG. 62 is a view when a plurality of metadata are packetized in one transport packet.

FIG. 62 is a view when a plurality of metadata are packetized in one transport packet.

As shown, the case that one transport packet includes a plurality of metadata may be referred to as an aggregation packet. According to an embodiment, the payload data may include a plurality of aggregation units.

The aggregation packet may include metadata for media streams, payloads of video data, or payloads of audio data.

According to an embodiment, the aggregation unit may include information representing the length of metadata. According to another embodiment, when there is a metadata header field additionally, the aggregation unit may include information on the sum of a metadata header field and a metadata field length. The above information may be referred to as a metadata length field.

Figure 63:
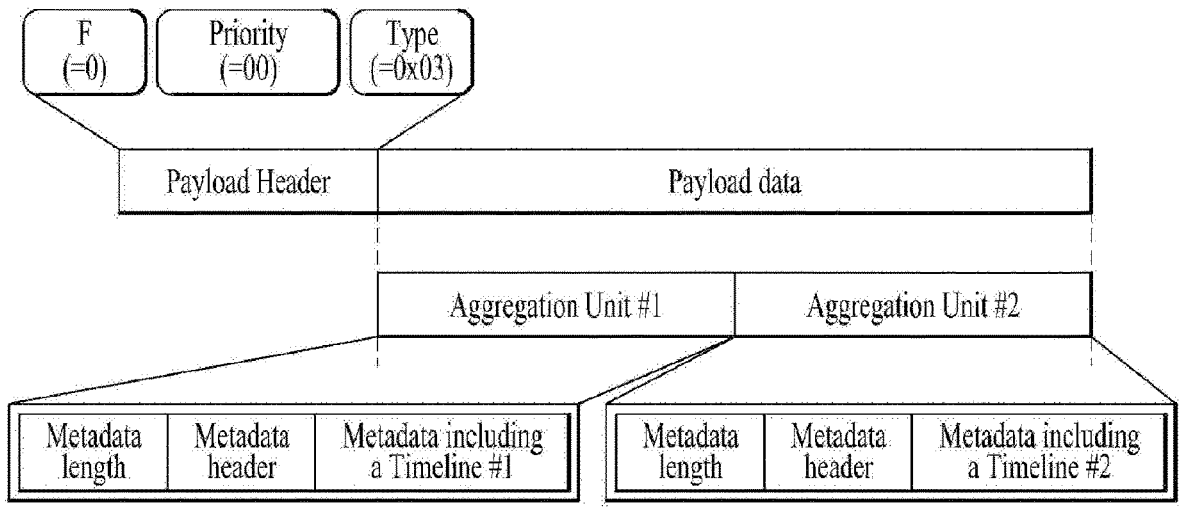
FIG. 63 is a view when one transport packet includes several timeline information.

FIG. 63 is a view when one transport packet includes several timeline information.

In more detail, the figure illustrates the case that one transport packet includes a plurality of timeline information having different references in relation to one media stream. According to an embodiment, a transport packet may include a payload header and/or a content of the payload header is identical to that of the figure described above.

Additionally, according to an embodiment, the payload data may include two aggregation units. However, the number of aggregation units in payload data may be two or more.

According to an embodiment, as shown in FIG. 62, each aggregation unit may include at least one of a metadata length field, a metadata header field, and a metadata field including timeline information.

However, the first aggregation unit shown in FIG. 63 may include a metadata field including a first timeline and the second aggregation unit may include a metadata field including a second timeline. According to a specific embodiment, each timeline may have data based on different references. For example, the first timeline may have data based on a media time and the second timeline may have data based on NTP.

Figure 64:
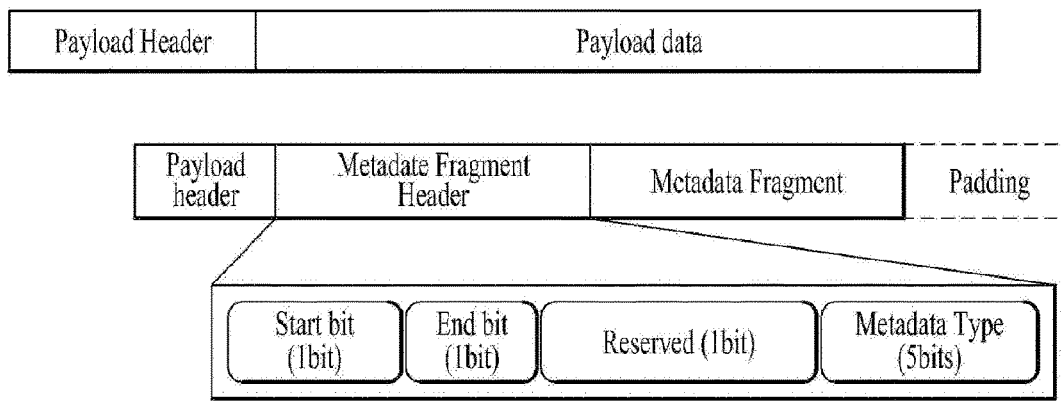
FIG. 64 is a view illustrating a packet payload in which one metadata is divided and packetized in a plurality of transport packets.

FIG. 64 is a view illustrating a packet payload in which one metadata is divided and packetized in a plurality of transport packets.

According to an embodiment, when the length of one metadata is greater than the length of a transport packet, in this case, a broadcast transmission device may divide corresponding metadata in several transport packets and may then transmit them. As shown, a transport packet may include at least one of a payload header, a metadata fragment header, and/or a metadata fragment. Additionally, when a transport protocol uses a packet of a fixed length, a transport packet may include padding bits.

As shown, according to an embodiment, a metadata fragment header may include information representing whether a metadata fragment in payload data of a corresponding transport packet includes the start part of entire metadata. In more detail, the start part data may be part of entire data including the first bit of entire media data. The above information may be referred to as a start bit field. According to a specific embodiment of the present invention, the start bit field may be a 1-bit field. According to an embodiment, the broadcast transmission device may set start bit to 1 when a metadata fragment in a corresponding transport packet includes the start part of entire metadata.

According to another embodiment, a metadata fragment header may include information representing whether a metadata fragment in payload data of a corresponding transport packet includes the end part of entire metadata. In more detail, the end part data may be part of entire data including the end bit of entire media data. The above information may be referred to as an end bit field. According to a specific embodiment of the present invention, the end bit field may be a 1-bit field. According to an embodiment, the broadcast transmission device may set end bit to 1 when a metadata fragment in a corresponding transport packet includes the end part of entire metadata.

According to another embodiment, the metadata header may include information representing a metadata type. The above information may be referred to as a metadata type field. According to a specific embodiment, the metadata type may represent that a corresponding metadata fragment includes timeline information. In this case, the broadcast transmission device may set the metadata type field to 0x00.

According to another embodiment, the metadata type may represent that a corresponding metadata fragment includes metadata relating to labeling. In this case, the broadcast transmission device may set the metadata type field to 0x01. According to a specific embodiment of the present invention, the metadata type field may be a 5-bit field.

Figure 65:
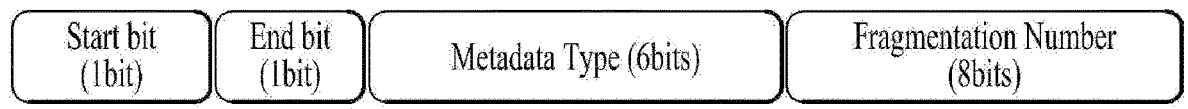
FIG. 65 is a view illustrating a metadata fragment header according to another embodiment of the present invention.

FIG. 65 is a view illustrating a metadata fragment header according to another embodiment of the present invention.

Hereinafter, description for the same content as that of the figure is omitted.

According to an embodiment of the present invention, a metadata fragment header may include information representing the order of a metadata fragment in a corresponding packet payload. The above information may be referred to as a Fragmentation number field. The broadcast reception device 100 may determine which number metadata is included in a corresponding packet on the basis of metadata fragment order information in a packet payload.

Figure 66:
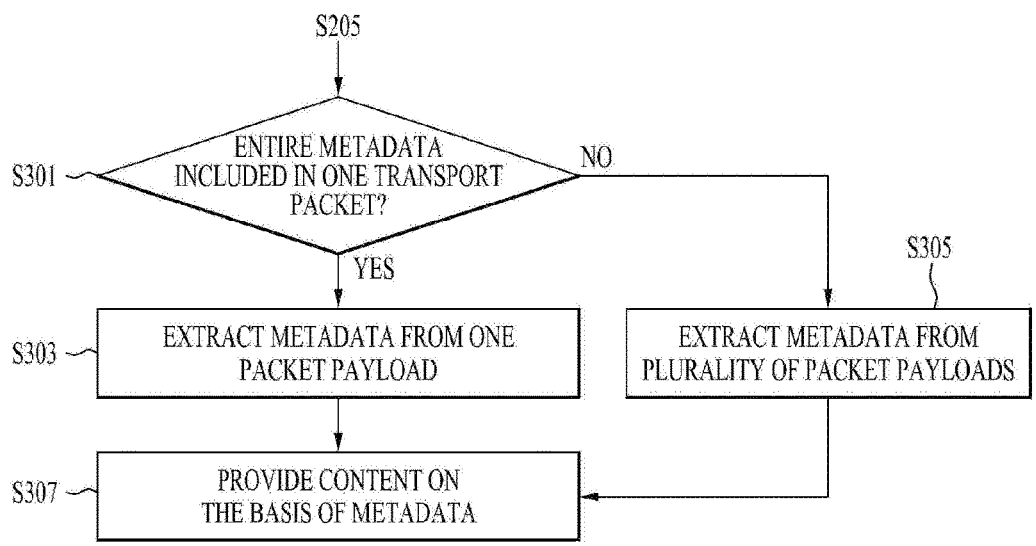
FIG. 66 is a view illustrating an operation when a broadcast reception device receives a broadcast packet according to an embodiment of the present invention.

FIG. 66 is a view illustrating an operation when a broadcast reception device receives a broadcast packet according to an embodiment of the present invention.

When it is determined that the data in the payload is not the media data in operation S205 of the previous figure, the control unit 150 of the broadcast reception device 100 determines whether entire metadata is included one transport packet in operation S301. In more detail, the control unit 150 may determine that data in a payload is not metadata instead of media data from payload header information. Then, the control unit 150 may determine whether corresponding entire metadata is included in one transport packet and transmitted. As mentioned above, one or more different metadata may be included in one transport packet. Or, one metadata is divided and included in a plurality of different transport packets.

According to an embodiment of the present invention, when the control unit 150 of the broadcast reception device 100 determines that entire metadata is included in one transport packet, the control unit 150 extracts metadata from one packet payload in operation S303. In more detail, the control unit 150 extracts a payload header and extracts metadata on the basis of the extracted payload header. According to an embodiment, the control unit 150 may extract one metadata from one packet payload. Moreover, according to another embodiment, the control unit 150 may extract a plurality of metadata from one packet payload. According to another embodiment of the present invention, the control unit 150 of the broadcast reception device 100 may determine that one metadata is divided and included in a plurality of transport packets. In this case, the control unit 150 extracts metadata from a plurality of packets payloads in operation S305. According to a specific embodiment, one metadata may be divided and packetized in a plurality of transport packets. The control unit 150 of the broadcast reception device 100 obtains metadata signaling data from a packet payload. Then, the control unit 150 may extract metadata from a plurality of packet payloads on the basis of the obtained signaling data.

The control unit 150 of the broadcast reception device 100 provides content on the basis of the extracted metadata in operation S307. According to a specific embodiment, the control unit 150 may obtain the presentation or decoding time information of a content from metadata. According to another embodiment, the control unit 150 may obtain content describing information from metadata.

Figure 67:
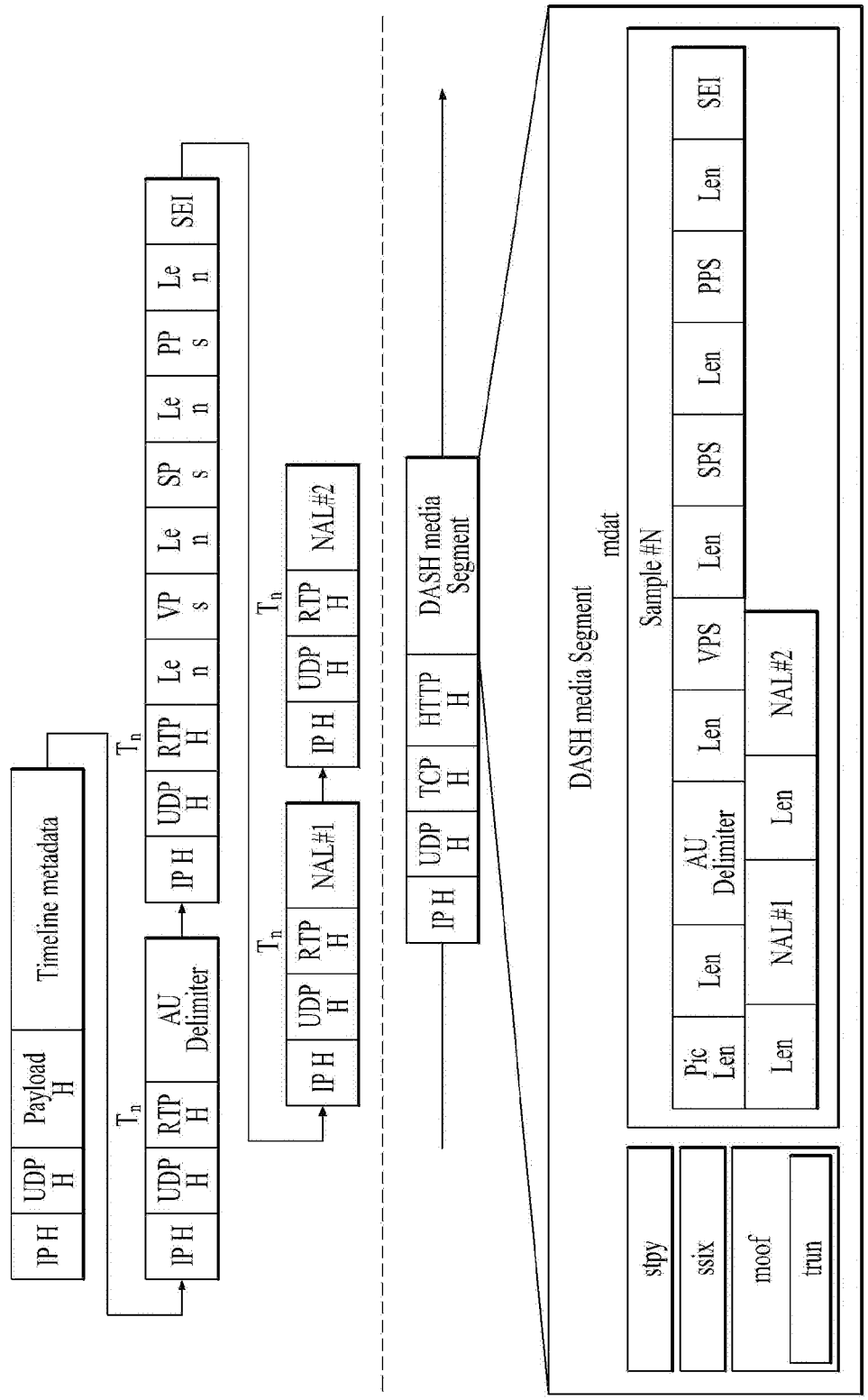
FIG. 67 is a view when video stream is transmitted using RTP through broadcast network and video stream is transmitted using file format based media data through an internet network.

FIG. 67 is a view when video stream is transmitted using RTP through broadcast network and video stream is transmitted using file format based media data through an internet network. In this case, after receiving an RTP packet or IP/UDP packet including timeline related metadata, the broadcast reception device 100 may allow decoding and presentation between related streams by matching an RTP protocol based video stream and a DASH based video stream.

FIG. 68 is a view illustrating syntax of a timeline component access unit according to another embodiment of the present invention.

The timeline component AU may include additional metadata associated with media streams transmitted through a broadcast network or the Internet. A timeline component AU including metadata regarding a timeline associated with a media stream is shown in the figure.

The timeline component AU may be represented in a different format such as XML.

The timeline component AU may include identifier information, AU_length information, location_flag information, origin_timestamp_flag information, timestamp_version information, timestamp_type information, timestamp_format information, location_length information, location information, origin_timestamp_version information, origin_timestamp_type information, origin_timestamp_format information, origin_location_flag information, origin_location_length information, origin_location information, origin_timescale information, origin_media_time information, origin_timestamp information, private_data_length information, private_data_bytes( ) information, timescale information, media_time information, timestamp information and/or data_bytes( ) information.

Description of information having the same names as the aforementioned information included in the syntax of the timeline component AU is replaced by the aforementioned corresponding description.

The identifier information may be an identifier indicating metadata associated with the timeline or an identifier indicating the timeline component access unit (AU) syntax is included.

The AU_length information can indicate the length of information included in the timeline component AU.

The location_flag information can indicate whether location information about services and content components associated with the information included in the timeline component AU is included.

The origin_timestamp_flag information can indicate whether information related to the origin timestamp.

The timestamp_version information can indicate version information of the timestamp included in the timeline component AU.

The timestamp_type information can indicate the type of the timestamp included in the timeline component AU. For example, when the timestamp_type information has a value of 0x00, the timestamp_type information can indicate a decoding timestamp (DTS) that represents a decoding time of data (e.g. audio access unit) such as an access unit of an associated service/content component. When the timestamp_type information has a value of 0x01, the timestamp_type information can indicate a presentation timestamp (PTS) that represents a reproduction time of data (e.g. audio access unit) such as an access unit of an associated service/content component.

The timestamp_format information can indicate the format of the timestamp included in the timeline component AU. For example, when the timestamp_format information has a value of 0x00, the timestamp_format information indicates media_time. Further, the timestamp_format information can indicate a network time protocol (NTP) when the timestamp_format information is 0x01, indicate PTS when the timestamp_format information is 0x02, and indicate a timecode when the timestamp_format information is 0x03. Values of 0x04 to 0x0F can be reserved for later extension.

The location_length information can indicate the length of the location field.

The location information can indicate location information about services and content components associated with the information included in the timeline component AU. The location information can be represented in the form of IP address/port number or URI.

The origin_timestamp_version information can indicate the version of the timestamp format for a base timeline that can be a standard of timeline mapping. When the corresponding field value is 0, this value can indicate that a 32-bit format is used. When the field value is 1, this value can indicate that a 64-bit format is used. For example, when a video stream is transmitted through a broadcast network and an audio stream is transmitted through the Internet, a base timeline that becomes a standard during timeline mapping of the video stream and the audio stream can be a timestamp of the video stream transmitted through the broadcast network. In this case, origin_timestamp_version can indicate the timestamp_format for the video stream transmitted through the broadcast network.

The origin_timestamp_type information can indicate the type of the timestamp for the base timeline that can be a standard of timeline mapping. For example, when the origin_ timestamp_type information has a value of 0x00, the origin_timestamp_type information can indicate a decoding timestamp (DTS) that represents a decoding time of data (e.g. audio access unit) such as access units of services/content components associated with the base timeline. When the origin_timestamp_type information has a value of 0x01, the origin_timestamp_type information can indicate a presentation timestamp (PTS) that represents a reproduction time of data (e.g. audio access unit) such as access units of services/content components associated with the base timeline.

The origin_timestamp_format information can indicate the format of the timestamp for the base timeline that can be a timeline mapping standard. For example, when the origin_timestamp_format information has a value of 0x00, the origin_timestamp_format information indicates media time. When the origin_timestamp_format information has a value of 0x01, the origin_timestamp_format information indicates NTP (Network Time Protocol). In addition, the origin_timestamp_format information can indicate PTS when the origin_timestamp_format information is 0x02 and indicate a timecode when the origin_timestamp_format information is 0x03. Values of 0x04 to 0x0F can be reserved for later extension.

The origin_location_flag information can indicate whether location information about services and content components associated with the base timeline that can be a timeline mapping standard is included.

The origin_location_length information can indicate the length of the origin_location field.

The origin_location information can indicate location information about services and content components associated with the base timeline that can be a timeline mapping standard. The origin_location information can be represented in the form of IP address/port number or URI.

The origin_timescale information can indicate a time scale that can be used when the media time of the base timeline corresponding to the timeline mapping standard is represented. For example, the timescale can have a value of 90K in the case of MPEG-2 TS.

The origin_media_time information can indicate the media time on the base timeline corresponding to the timeline mapping standard. Meaning of the media time may depend on origin_timestamp_type. For example, the origin_media_time information can indicate a media time with respect to reproduction time when origin_timestamp_type is PTS and indicate a media time with respect to a decoding time when origin_timestamp_type is DTS. The origin_media_time information can be represented as 32 bits when origin_timestamp_version is 0 and as 64 bits when origin_timestamp_version is 1.

The origin_timestamp information can indicate a timestamp in different formats on the base timeline corresponding to the timeline mapping standard according to the field value of origin_timestamp_format. Meaning of the timestamp corresponding to the origin_timestamp information may depend on origin_timestamp_type. For example, the corresponding timestamp of the origin_timestamp information can indicate a decoding time represented as NTP when origin_timestamp_type is DTS and origin_timestamp_format has a value of '0x01'. The origin_timestamp information can be represented as 32 bits when origin_timestamp_version is 0 and as 64 bits when origin_timestamp_version is 1.

The private_data_length information can indicate the length of the following private_data_bytes in bytes.

The private_data_bytes( ) information is privately defined by the length of private_data_length or indicates a region for later extension.

The timescale information can indicate a time scale that can be used to represent a media time.

The media_time information can indicate a media time. The meaning of the media time corresponding to the media_time information may depend on timestamp_type. For example, the media_time information can indicate a media time with respect to a reproduction time when timestamp_type is PTS. The media_time information can be represented as 322 bits when timestamp_version is 0 and as 64 bits when timestamp_version is 1.

The timestamp information can indicate a timestamp in different formats according to the field value of timestamp_format. Meaning of the timestamp corresponding to the timestamp information may depend on timestamp_type. For example, the timestamp corresponding to the timestamp information can indicate a decoding time represented as NTP when timestamp_type is DTS and timestamp_format has a value of '0x01'. The timestamp information can be represented as 32 bits when timestamp_version is 0 and as 64 bits when timestamp_version is 1.

The data_bytes( ) information indicates fields or a region for later extension.

Data such as audio/video streams transmitted through the RTP protocol and data such as audio/video data transmitted through MPEG DASH can be synchronized on the basis of the base timeline such as NTP to decode or reproduce broadcast content by mapping a media presentation time represented as a specific timescale (e.g. 10000 hz) of MPEG DASH with an NTP based timestamp.

Figure 69:
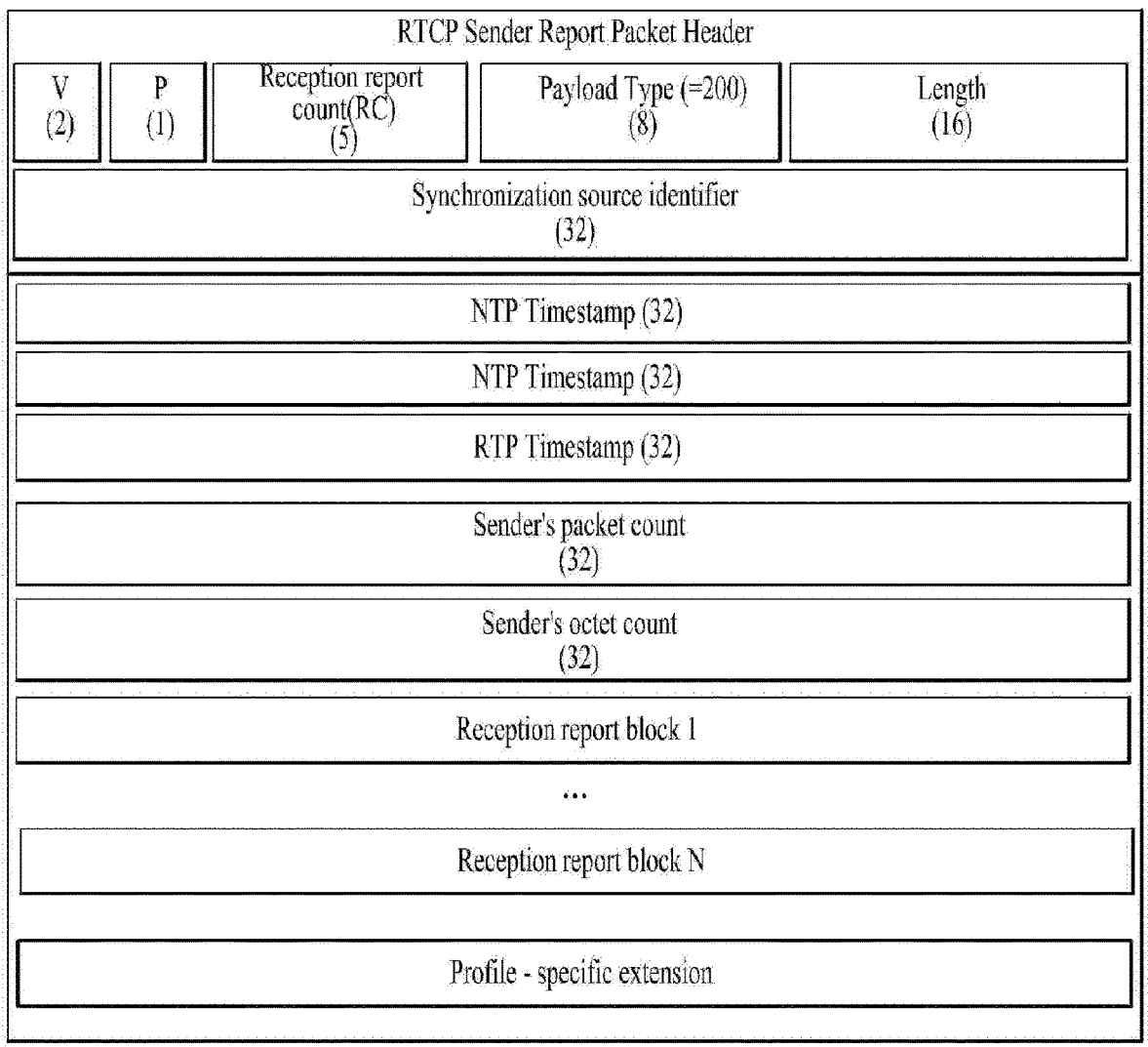
FIG. 69 illustrates a transport packet format for supporting media synchronization on a real-time content transport protocol according to an embodiment of the present invention.

FIG. 69 illustrates a transport packet format for supporting media synchronization on a real-time content transport protocol according to an embodiment of the present invention.

In the case of a transport protocol supporting real-time content transmission, for example, real-time transport protocol (RTP), an RTP packet can include an audio access unit or a video network abstraction nlayer (NAL) unit. To support decoding and/or reproduction of audio/video streams by synchronizing the audio/video streams on the RTP, an RTP control protocol (RTCP) packet can be used. The RTCP packet, generated by a transmitting end, includes information about a matching relationship between an RTP timestamp included in an RTP packet header and a network time protocol (NTP), and a receiving end synchronizes streams by matching decoding and reproduction time of the streams to an NTP based timeline using the information.

To this end, an RTCP sender report packet may include V (version) information, P (padding) information, reception report count (RC) information, payload type information, length information, synchronization source identifier information, NTP timestamp information, RTP timestamp information, sender's packet count information, sender's octet count information, reception report block and/or profile-specific extension.

The V (version) information indicates version information of the RTP.

The P (padding) information indicates presence or absence of padding bits in a payload.

The reception report count (RC) information indicates the number of reception reports.

The payload type information indicates the type of the payload of the RTCP packet. The payload type information can indicate which one of a sender report, a reception report or an application-specific packet is included in the payload.

The length information indicates the length of the RTCP packet.

The synchronization source identifier information is an identifier for identifying a source of a stream.

The NTP timestamp information represents the timestamp of the network time protocol as 64 bits.

The RTP timestamp information indicates an RTP timestamp value associated with the NTP timestamp field.

The sender's packet count information corresponds to the total number of RTP data packets transmitted by the sender since starting transmission up until the time this SR packet was generated. The count is reset if the sender changes its SSRC identifier.

The sender's octet count information corresponds to the total number of payload octets (i.e., not including header or padding) transmitted in RTP data packets by the sender since starting transmission up until the time this SR packet was generated. The count is reset if the sender changes its SSRC identifier. This field can be used to estimate the average payload data rate.

The profile-specific extension can indicate a field that can be extended according to transport protocol profile. This field can include profile-specific information and can include different pieces of information or be interpreted according to profile.

Figure 70:
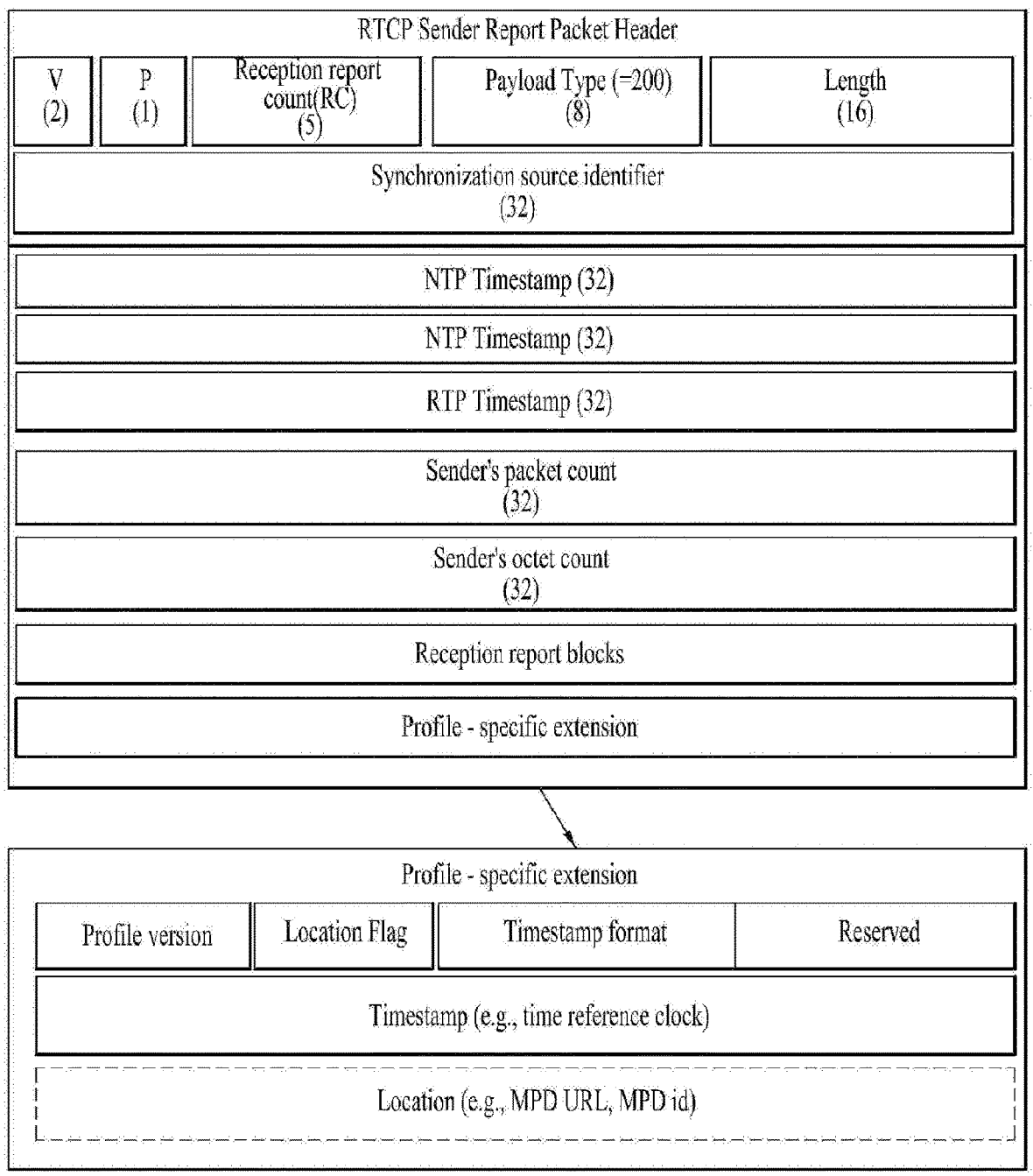
FIG. 70 illustrates the profile-specific extension according to an embodiment of the present invention.

FIG. 70 illustrates the profile-specific extension according to an embodiment of the present invention.

Information for supporting time synchronization with different transport protocol packets transmitted through the same network or different transport protocol based packets (e.g. MPEG DASH segments delivered through broadband) delivered through different network can be added to the profile-specific extension field of the RTCP sender report packet. The corresponding packet can be configured in a different format. For example, an NTP timestamp can be mapped to an RTP timestamp or DASH media representation time on the basis of the NTP timestamp.

The aforementioned profile-specific extension included in the RTCP sender report packet may include profile version information, location flag information, timestamp format information, timestamp information and/or location information.

The profile version information can indicate the version information of a profile.

The location flag can indicate whether the location field is included.

The timestamp format information can indicate the format of the included timestamp field.

For example, 0x00 and 0x07 to 0x0F are reserved as timestamp_format information values. When the timestamp format information has a value of 0x01, this value indicates media time. The timestamp format information can indicate NTP when the timestamp format information has a value of 0x02, indicate normal playing time when the timestamp format information has a value of 0x03, indicate an SMPTE time code when the timestamp format information has a value of 0x04, indicate a 90 kHz based timestamp when the timestamp format information has a value of 0x05 and indicate GPS time when the timestamp format information has a value of 0x06.

When the timestamp format information has a value of 0x01, this value can indicate that the format of the timestamp field is media time, and the media time can correspond to media presentation time of MPEG DASH.

The timestamp information can include related timing information. For example, the timestamp information can include related presentation reference clock information of an MPD of MPEG DASH. The timestamp information can include timing information such as a timescale and/or a reference timeline based on the timescale.

The location information can indicate MPD related information (e.g. MPD id or URL) of MPEG DASH, which is associated with the timestamp field value.

In addition, information included in the syntax of the aforementioned timeline component access unit may be included in the profile-specific extension.

Figure 71:
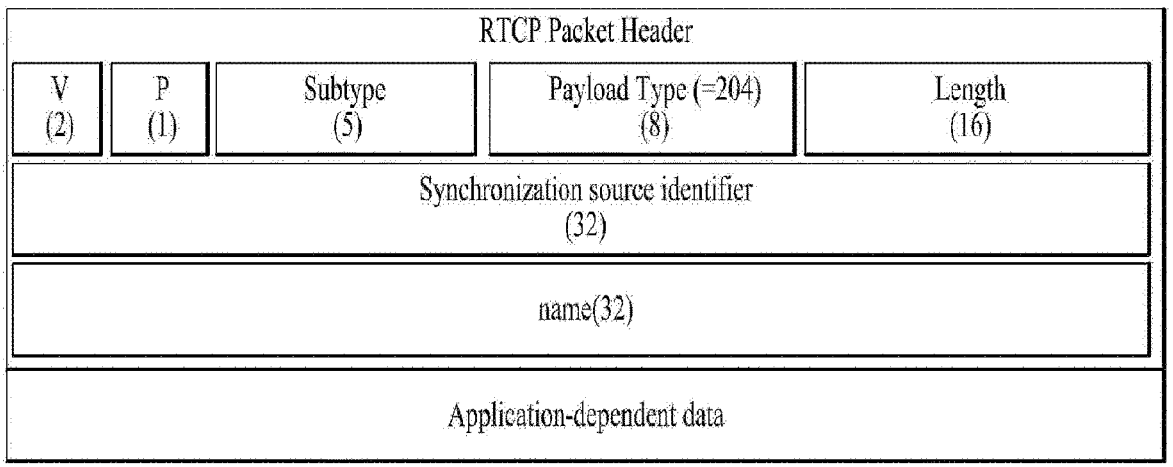
FIG. 71 illustrates an RTPC application packet corresponding to an application-defined RTCP Packet according to an embodiment of the present invention.

FIG. 71 illustrates an RTPC application packet corresponding to an application-defined RTCP Packet according to an embodiment of the present invention.

The RTCP packet may include V (version) information, P (padding) information, subtype information, payload type information, length information, name information and/or application-dependent data.

The V (version) information indicates version information of the RTP protocol.

The P (padding) information indicates presence or absence of padding bits in a payload.

The subtype information can indicate the subtype of the RTCP packet payload.

The payload type information indicates the type of the RTCP packet payload. The payload type information can indicate that the payload includes the application-specific packet.

The length information indicates the length of the RTCP packet.

The name information can include information such as an application name.

The application-dependent data can include application-restricted information.

Figure 72:
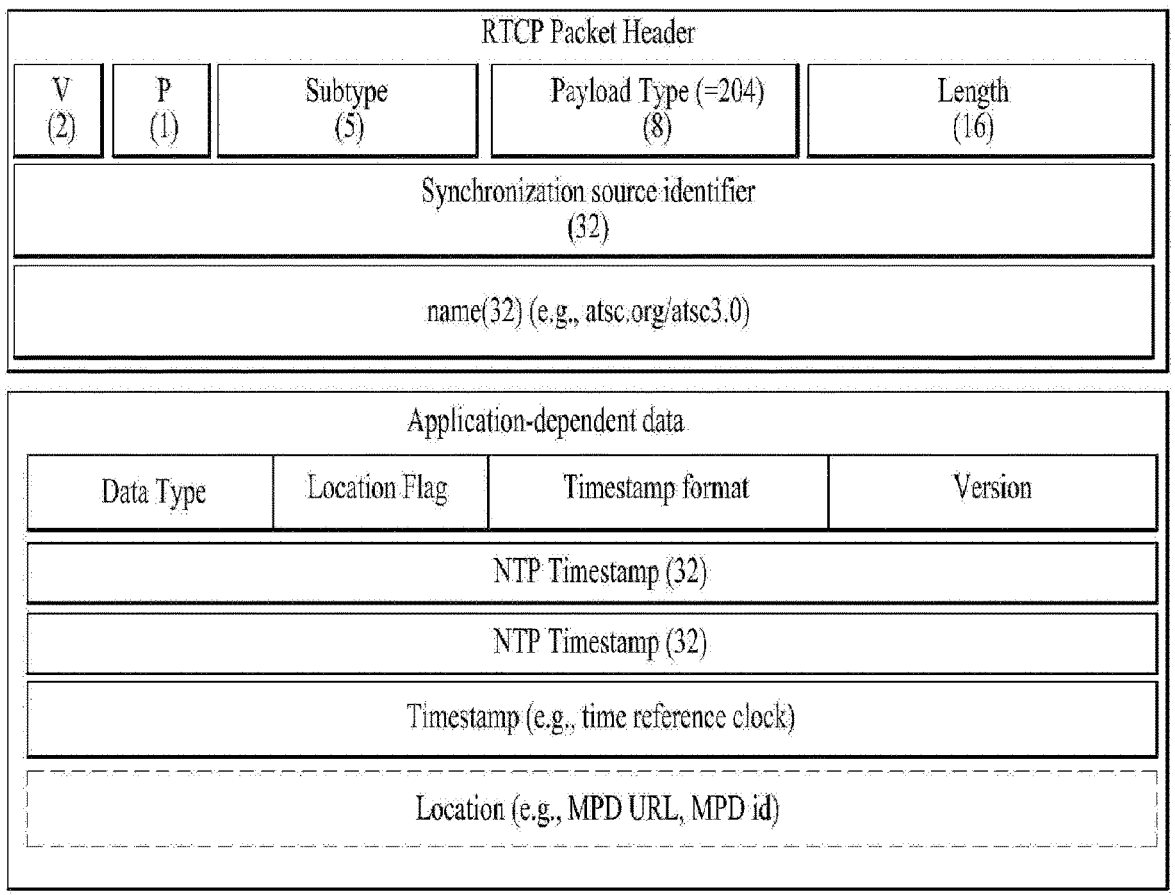
FIG. 72 illustrates the application-dependent data according to an embodiment of the present invention.

FIG. 72 illustrates the application-dependent data according to an embodiment of the present invention.

According to one embodiment of the present invention, timing information for time synchronization can be transmitted/received using the application-dependent data field.

The application-dependent data field may include data type information, version information, location flag information, timestamp format information, NTP timestamp information, timestamp information and/or location information.

The data type information can indicate the type of data included in the corresponding field.

The version information can indicate version information of the profile of the corresponding packet.

The location flag information can indicate whether the corresponding packet includes the location field.

The timestamp format information can indicate the format of the included timestamp field. For example, 0x00 and 0x07 to 0x0F, from among timestamp format information values, may be reserved for later use. The timestamp format information can indicate media time, network time protocol (NTP), normal playing time (NPT), an SMPTE time code, a 90 kHz based timestamp and GPS time when the timestamp format information has values of 0x01, 0x02, 0x03, 0x04, 0x05 and 0x06, respectively.

For example, the media presentation time of MPEG DASH can be represented as media time corresponding to a timestamp format information value of 0x01. Alternatively, the media presentation time of MPEG DASH can be indicated by allocating a different value to the timestamp format information.

The NTP timestamp information indicates the timestamp of the network time protocol.

The timestamp information may include related timing information. For example, the timestamp information can include related presentation reference clock information of the MPD of MPEG DASH. The timestamp information can include timing information such as a timescale and/or a reference timeline based on the timescale.

The location information can indicate MPD related information (e.g. MPD id or URL) of MPEG DASH, which is associated with the timestamp field value.

When the aforementioned application-dependent data field is used, the MPEG DASH media presentation time can be mapped to the timestamp of the network transport protocol when RTP transmission/reception protocol is used for a broadcast network and MPEG DASH based media data is transmitted/received through the Internet. Since RTP timestamps of audio/video data can also be mapped to the RTP timestamp, broadcast content can be decoded and/or reproduced by achieving synchronization between RTP packets and MPEG DASH data.

Figure 73:
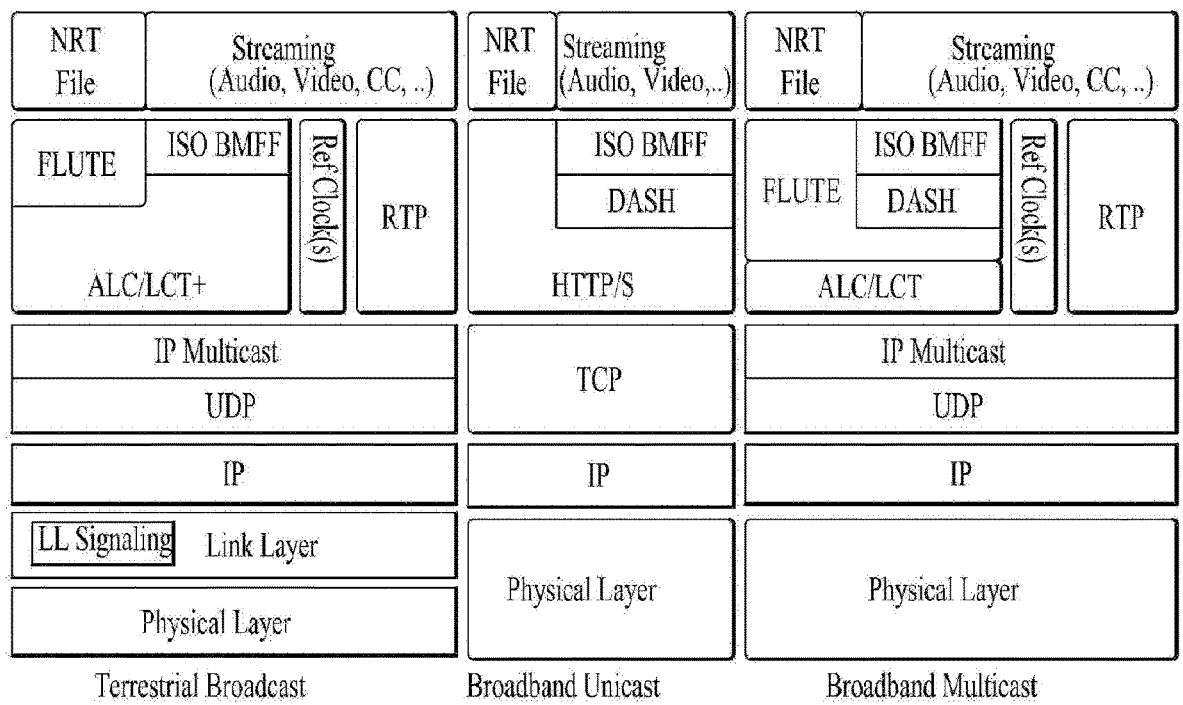
FIG. 73 illustrates, as an embodiment of the present invention, a protocol stack that may be applied to the broadcast system.

FIG. 73 illustrates, as an embodiment of the present invention, a protocol stack that may be applied to the broadcast system.

In terrestrial broadcast channel, streaming data (e.g., video, audio, closed caption) can be delivered via RTP or ALC/LCT extension over IP/UDP. Especially, access unit of streaming data can be delivered via RTP or ISO BMFF object including the set of access units of streaming data can be delivered via ALC/LCT extension. Moreover, non-real-time files can be delivered via FLUTE over ACL/LCT. In addition, IP/UDP datagrams or link layer signaling can be encapsulated in link layer and delivered as encapsulated forms.

In broadband network, MPEG DASH can support the delivery of streaming data and HTTP can support file delivery over unicast channel. Over multicast channel, streaming data can be delivered via MPEG DASH or RTP, and file can be delivered via FLUTE.

The figure shows an example of these protocol stacks for content delivery in future broadcasting systems, including the clock reference streams. The clock reference streams may include data or information for providing reference timings between various streams (ex. video, audio, or data streams) which can be provided from various source.

An encapsulation in the link layer will be further described below. There can be different methods that can transmit directly the relevant packets without any link layer encapsulation.

The link layer provides encapsulation of IP packets, MPEG-2 TS and/or other protocol packets. Using link layer encapsulation, the physical layer can process one encapsulation packet format, independent of the network layer protocol type. Basically, network layer packets are transformed into the payload of link layer packets. Concatenation and segmentation of network layer packets into link layer packets can be performed in order to use the physical layer resources efficiently.

For the concatenation, when the network layer packet is small, the payload of a link layer packet includes several network layer packets. The link layer packet header includes fields to perform concatenation. The link layer packet header may include information specifying whether there is a concatenation for the network layer packets, information specifying an order of the concatenation between the network layer packets, and/or information specifying a number of the network layer packets to be concatenated in the link layer packet.

For segmentation and reassembly, when the network layer packet is too large to process in the physical layer, the network layer packet is divided into two or more segments. The link layer packet header includes fields to perform segmentation on the sending side and reassembly on the receiving side. The link layer packet header may include information specifying the network layer packet where a payload of this link layer packet may be included, information specifying a number of the segmentations of the network layer packet, information specifying an order of each of the segmentations in the network layer packet, and/or information specifying a first segmentation and/or a last segmentation of the network layer packet.

For overhead reduction, the link layer provides optional header compression for reduction of overhead in IP flows. Header compression can be based on the RoHC (Robust Header compression) framework. The RoHC framework can operate in the unidirectional mode.

For link layer signaling transmission, the link layer provides transport of signaling information such as a fast information channel, EAS (Emergency Alert System) messages and/or signaling generated at the link layer such as information for overhead reduction.

For signaling through a fast information channel, the main purpose of the fast information channel is to efficiently deliver essential information for rapid channel scan and service acquisition. This information primarily includes binding information between broadcast services and the physical data pipe.

For transport of EAS signaling, If the physical layer supports a special emergency alert channel with adequate bandwidth to carry basic emergency alert messages (e.g., Common Alerting Protocol messages), this channel can carry emergency alert related signaling and the basic emergency alert messages. Additional media files can be delivered via separate data pipes. If the physical layer only supports low bandwidth notifications that emergency alert messages are available, then basic alert messages and additional media files can be delivered via separate data pipes. In both cases the separate data pipes can be configured to have high robustness.

An overview of the signaling and a description of the "bootstrap" process a device goes through to get the signaling information in future broadcasting systems will be described below. There can be three levels of signaling in each broadcast stream:

(a) List of all services that have at least one component in the broadcast stream, with skeletal information about each service (e.g., name, channel number, service type), and a pointer to the location of detailed information about each service (unless the PHY layer provides a dedicated physical layer pipe and there is a dedicated IP multicast address/port for such detailed information). This list can be used to build a service table during a quick service scan.

(b) Properties of each service that has at least one component in the broadcast stream, analogous to A/65 VCT (excluding Service Location Descriptor), or service level information in A/153 SMT or the URL of the DASH MPD for each service containing one or more components, and a pointer to the location of detailed information about the components of the service (unless this information is in the same location as the service level information).

(c) Location and properties of each component of each service, analogous to MPEG-2 PMT or component level information in A/153 SMT, or DASH MPD. Location of a component would include the physical channel, physical layer pipe, IP multicast address and port, and TSI of ALC/LCT+ session (where applicable) for components delivered by broadcast, or the URL of the DASH MPD for components delivered via broadband (with information for indicating a DASH adaptation set or a DASH Representation in the DASH MPD associated with a component delivered via broadband). For the purposes of this signaling, the clock reference streams will be considered to be components of the services.

When a viewer selects a service, the device would look in the service table built from the level (a) signaling during a service scan to determine the physical channel(s) in which the components of the service can be found.

The device would then tune to the appropriate physical channel(s) and access the level (b) and level (c) signaling to get the additional information needed.

Figure 74:
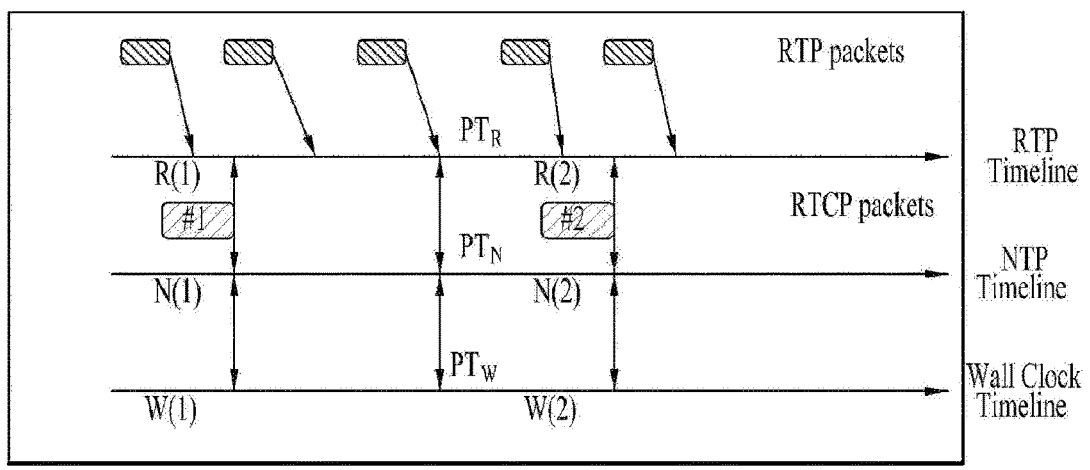
FIG. 74 illustrates, as an embodiment of the present invention, a conversion of RTP presentation times to receiver wall clock times.

FIG. 74 illustrates, as an embodiment of the present invention, a conversion of RTP presentation times to receiver wall clock times.

The broadcast system may support a real time continuous content delivery of the broadcast streams.

For broadcast and multicast delivery, two different methods are described for real-time delivery of continuous content via broadcast and multicast—RTP and/or ISO BMFF over ALC/LCT+. If both methods are supported, they may not be both used within the same service.

For RTP Carriage, delivery of continuous content components via RTP can be supported for real-time broadcast or multicast delivery of the content. Such delivery can conform to a transport protocol for real-time application (RTP) and appropriate additional payload specifications for the type of media being carried, such as for timed-text closed captions, for H.264 video, for HEVC video, for HE AAC audio, etc. In particular, RTCP SR (RTP Control Protocol Sender Report) packets can be used for synchronization among different continuous content components being delivered via broadcast or multicast.

What is being delivered via the broadcast to the receiver can consist of: One broadcast IP multicast RTP stream for each of the continuous component tracks—e.g., video, audio, and closed caption (using protocol path RTP/IP-Multicast/UDP/IP), and/or One broadcast IP multicast RTCP SR stream for each of the continuous component tracks (using protocol path RTCP/IP-Multicast/UDP/IP)

For synchronizing one or more continuous components delivered via the broadcast, we can exploit the following approach.

For each of the continuous component track, use the NTP (Network Time Protocol) time stamps N(i) and/or the corresponding RTP (Real-time Transport Protocol) time stamps R(i) in the RTCP stream for the track to convert the presentation times in the RTP packet headers (which are relative to the RTP timeline) to presentation times relative to the NTP timeline. In this specification, the NTP timeline is an example of a reference timeline to which the timings can be mapped. The NTP time timeline can be replaced by the reference timeline or combined with the reference timeline. The reference timeline includes a NTP timeline, a GPS timeline, a Precision Time Protocol (PTP) timeline, Now Playing Time (NPT), and/or UTC (Coordinated Universal Time).

If PTR is the presentation time in a particular RTP packet header, and if N(i) and R(i) are the values from the most recent RTCP packet, then the formula for the conversion is, $PTN=N(i)+(PTR-R(i))/(RTP$ clock rate), where PTN is the presentation time relative to the NTP timeline.

When the service is first selected, and only one RTCP packet has been received so far, the signaled nominal RTP clock rate can be used for this computation. As more RTCP packets are received, a more accurate value for the actual RTP clock rate can be obtained from the values, $(R(i+1)-R(i))/(N(i+1)-N(i))$, where R(i) and N(i) are values from one RTCP packet, and R(i+1) and N(i+1) are values from the next RTCP packet. The figure shows an example of this situation.

Compare the NTP time stamps N(i) in the RTCP packets with the receiver wall clock times W(i) at the point in time when the packets are received to determine any offset between the two. (A combination of delivery delay and possible discrepancy between the receiver wall clock and the server NTP clock can cause a non-zero offset.) Use this offset to adjust the presentation times in the RTP packet headers from values PTN relative to the server NTP timeline to values PTW relative to the receiver wall clock timeline.

The figure illustrates the conversion of a presentation time stamp PTR of an access unit in an RTP packet to the presentation time PTN relative to the NTP timeline and then to the presentation time PTW relative to the wall clock timeline.

Figure 75:
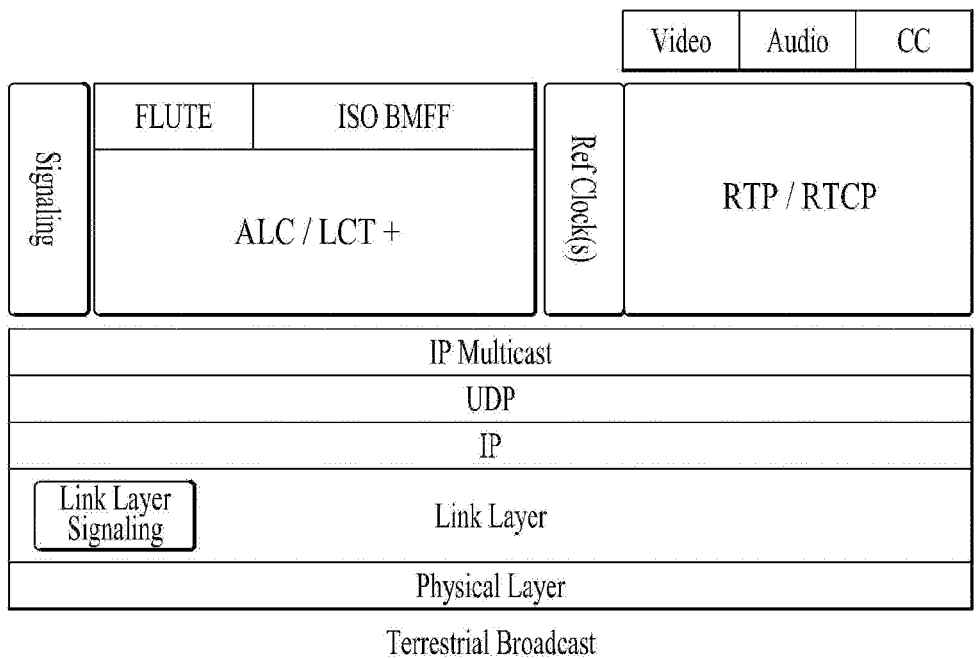
FIG. 75 illustrates, as an embodiment of the present invention, a protocol stack for a case in which one video track, one audio track, and one closed caption track are delivered via broadcast with RTP.

FIG. 75 illustrates, as an embodiment of the present invention, a protocol stack for a case in which one video track, one audio track, and one closed caption track are delivered via broadcast with RTP.

We consider the following use case when one video track, one audio track, and one closed caption track, all delivered via broadcast, what is being delivered via the broadcast to the receiver can consist of: one broadcast IP multicast RTP stream for each of the three tracks—one video, one audio, and one closed caption (using protocol path RTP/IP-Multicast/UDP/IP) and/or One broadcast IP multicast RTCP SR stream for each of the three tracks (using protocol path RTCP/IP-Multicast/UDP/IP).

Receiver may use signaling to get the IP multicast addresses and ports of the 3 RTP streams (audio, video, CC tracks), and/or the 3 RTCP streams (audio, video, CC tracks).

Receiver may extract the RTP packets for the video, audio, and/or closed caption tracks from the broadcast as they arrive.

Receiver may extract the RTCP packets for the video, audio, and/or closed caption tracks from the broadcast as they arrive.

For each of the three tracks, Receiver may use the NTP time stamps N(i) and the corresponding RTP time stamps R(i) in the RTCP stream for the track to convert the presentation times in the RTP packet headers (which are relative to the RTP timeline) to presentation times relative to the NTP timeline. If PTR is the presentation time in a particular RTP packet header, and if N(i) and R(i) are the values from the most recent RTCP packet, then the formula for the conversion is $PTN=N(i)+(PTR-R(i))/(RTP$ clock rate), where PTN is the presentation time relative to the NTP timeline. When the service is first selected, and only one RTCP packet has been received so far, the signaled nominal RTP clock rate can be used for this computation. As more RTCP packets are received, a more accurate value for the actual RTP clock rate can be obtained from the values $(R(i+1)-R(i))/(N(i+1)-N(i))$, where R(i) and N(i) are values from one RTCP packet, and R(i+1) and N(i+1) are values from the next RTCP packet. FIG. 2 below shows an example of this situation.

Receiver may compare the NTP time stamps N(i) in the RTCP packets with the receiver wall clock times W(i) at the point in time when the packets are received to determine any offset between the two. (A combination of delivery delay and possible discrepancy between the receiver wall clock and the server NTP clock can cause a non-zero offset.) Use this offset to adjust the presentation times in the RTP packet headers from values PTN relative to the server NTP timeline to values PTW relative to the receiver wall clock timeline. The previously described figure gives an example of this computation.

Receiver may present the access units in the RTP streams at the appropriate wall clock times.

Figure 76:
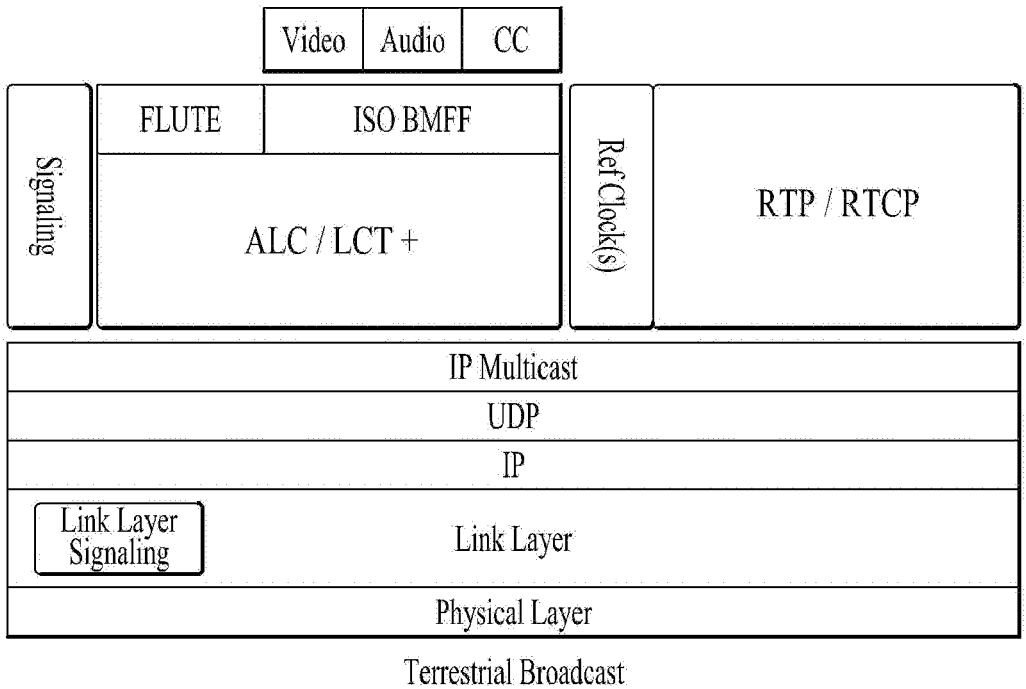
FIG. 76 illustrates, as an embodiment of the present invention, a protocol stack for a case in which one video track, one audio track, and one closed caption track are delivered via broadcast with ISO BMFF over ALC/LCT+.

FIG. 76 illustrates, as an embodiment of the present invention, a protocol stack for a case in which one video track, one audio track, and one closed caption track are delivered via broadcast with ISO BMFF over ALC/LCT+.

Delivery of continuous content components via ISO BMFF (ISO base media file format) objects contained in ALC/LCT+ (Asynchronous Layered Coding/Layered Coding Transport+) packets can be supported for real-time broadcast or multicast delivery of the content. The ISO BMFF objects can be formatted according to MPEG ISO Base Media File Format (ISO BMFF), conforming to profiles to be specified according to applications. The ALC/LCT+ packets can be formatted with an additional LCT header extension, such as to carry presentation timing information. The presentation timing information can include a presentation time stamp for packets that contain the beginning of an ISO BMFF object. Such a presentation time stamp can map the start of the ISO BMFF object timeline to the appropriate point in the time base described in the below paragraph. If it is necessary to associate a URL with each ISO BMFF object (for example, if an MPD is used for signaling), each ISO BMFF object can have an HTTP-style header containing a Content-Location field. Or ALC/LCT+ packets that contain the start of an ISO BMFF object can have an LCT extension header containing an associated URL.

A "Broadcast Timeline" may be established by sending broadcast timeline clock reference values via broadcast or multicast. This Broadcast Timeline can serve as the reference time base for the presentation timing information in the LCT header extension.

Any service containing one or more continuous content components being delivered in real-time broadcast or multicast mode via ISO BMFF objects over ALC/LCT+ may contain a separate "Time Base" component to define a time base to serve as the reference time base for presentation. This Time Base component can consist of time stamp packets transmitted at appropriate intervals. The time stamps can represent samples of an encoder side system clock, which can be used by decoders to establish a decoder side system clock, in the same way as PCR values are used to establish system clocks in an MPEG-2 environment.

What is being delivered via the broadcast to the receiver can consist of one broadcast IP multicast stream containing clock reference time stamps for a broadcast time line (using protocol path Ref-Clock/IP-Multicast/UDP/IP), and/or one broadcast ISO BMFF stream for each of the continuous component tracks (e.g., video, audio, and closed caption).

When one broadcast IP multicast stream contains clock reference time stamps for a broadcast time line (using protocol path Ref-Clock/IP-Multicast/UDP/IP), the time scale of the time line may be ordinary clock time (e.g., the clock could be just UTC time at the server expressed in some suitable format).

When one broadcast ISO BMFF stream for each of the continuous component tracks is used, each ISO BMFF file can be delivered as an ALC/LCT+ object.

When one broadcast ISO BMFF stream for each of the continuous component tracks is used, ALC/LCT+ packets that contain the start of an ISO BMFF file have an LCT extension header giving the start time for the time line of the ISO BMFF file, relative to the broadcast time line.

When one broadcast ISO BMFF stream for each of the continuous component tracks is used, if it is necessary to associate a URL with each ISO BMFF file (for example, if an MPD is used for signaling), each ISO BMFF file can have an HTTP-style header containing a Content-Location field. Or ALC/LCT+ packets that contain the start of an ISO BMFF file can have an LCT extension header containing an associated URL.

We consider the following use case in which one video track, one audio track, and one closed caption track, all delivered via broadcast.

Receiver may use signaling to get the IP multicast addresses and ports of the clock reference stream, and/or the IP multicast addresses and ports and the TSI (Transport Stream Identifier) values for the ALC/LCT+ sessions carrying the ISO BMFF stream(s) for the video, audio, and closed caption tracks.

Receiver may extract the time stamps from the clock reference stream as they appear, and use them to determine the offset between the broadcast time line and the receiver "wall clock" time.

Receiver may extract the ISO BMFF file(s) for the video, audio and closed caption tracks from the broadcast as they appear.

Receiver may use the presentation time stamp in the ALC/LCT+ extension header of each BMFF file, adjusted by the offset determined in above step, to set the wall clock start time for the time line of each ISO BMFF file.

Receiver may present the access units in the BMFF files at the appropriate wall clock times, based on the wall clock start time for each ISO BMFF file and the internal relative timing information in the file.

The broadcast system may support a unicast delivery of the broadcast streams.

MPEG DASH (Dynamic adaptive streaming over HTTP) can be supported for real-time delivery of continuous components over a unicast channel, with segments conforming to the specifications in ISO BMFF. Both a "live" DASH profile and a "pre-recorded" DASH profile can be specified for this purpose, with the live profile intended for delivery of live content, and the pre-recorded profile intended for delivery of pre-recorded content (either as part of a linear service or part of an on-demand service).

Error correction for real-time continuous content delivery to fixed and mobile receivers may be supported at the physical layer.

The broadcast system, as an embodiment of the present invention, may support a non-real time (NRT) file (or data) delivery.

The non-real-time delivery of files via broadcast or multicast can be supported.

Error correction for non-real-time delivery of files can be supported using FEC (Forward Error Correction) and using post-delivery repair.

The non-real-time delivery of files via unicast can be supported via HTTP 1.1 and via HTTP 1.1 over TLS 1.2.

In order to support non-real-time delivery of content files, it may be necessary to specify file formats that are to be supported. It is especially necessary to specify file formats of files containing continuous media to ensure that synchronization with other content is possible.

Figure 77:
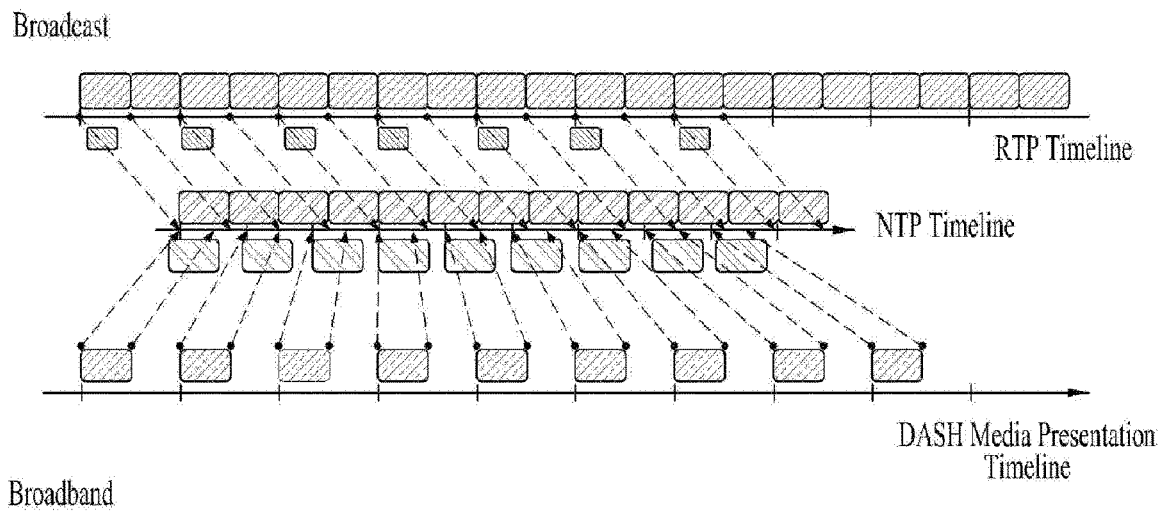
FIG. 77 illustrates, as an embodiment of the present invention, a working example of synchronization between a continuous media component delivered via RTP in broadcast channel and a continuous media component delivered via DASH over broadband.

FIG. 77 illustrates, as an embodiment of the present invention, a working example of synchronization between a continuous media component delivered via RTP in broadcast channel and a continuous media component delivered via DASH over broadband.

The broadcast streams can be delivered in different types, via different transmission paths. The model for synchronization between multiple media component streams delivered in real-time over broadcast or multicast and DASH segments carrying movie fragments delivered via a unicast broadband channel may be needed to be implemented.

For a combination of RTP (Broadcast or Multicast) and DASH (Unicast), as mentioned in previous description, each continuous media component delivered via RTP can have an associated RTCP SR stream. Each RTCP SR packet can carry an NTP clock reference timestamp and a corresponding RTP clock reference timestamp, which can be used to map the RTP timeline to the NTP timeline. Thus, the presentation time of the access units in the RTP stream (which can be indicated by RTP presentation time stamps in the RTP packet headers) can be determined by the mapping of the RTP timeline to the NTP timeline.

In order to synchronize content delivered via DASH (unicast) with content delivered via RTP (broadcast or multicast), it is necessary to establish a mapping from the DASH Media Presentation timeline to the NTP timeline. Information necessary to establish a mapping from the DASH Media Presentation timeline to the NTP timeline can be delivered in the broadcast or multicast.

The figure describes a working example of synchronization between a continuous media component delivered via RTP in broadcast channel and a continuous media component delivered via DASH over broadband. Mapping information related to DASH media presentation timeline to NTP timeline can be delivered via broadcast or multicast (e.g., green colored packets in the below figure).

Figure 78:
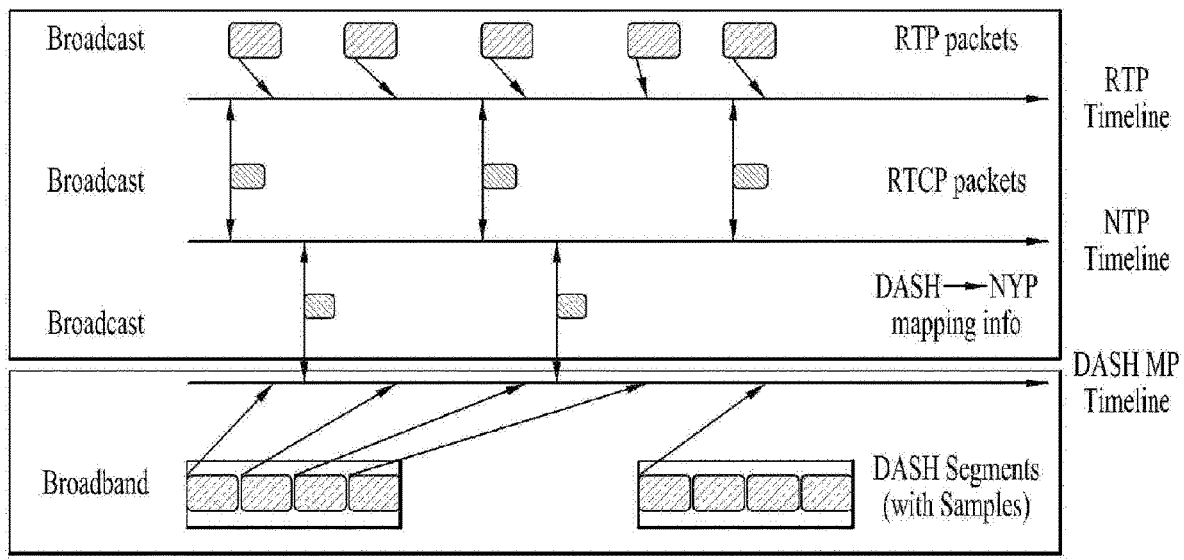
FIG. 78 illustrates, as an embodiment of the present invention, a way of synchronization between a continuous media component delivered via RTP in broadcast channel and a continuous media component delivered via DASH over broadband.

FIG. 78 illustrates, as an embodiment of the present invention, a way of synchronization between a continuous media component delivered via RTP in broadcast channel and a continuous media component delivered via DASH over broadband.

One way to achieve the synchronization is to include DASH Media Presentation clock reference timestamps in the RTCP packet by using the RTCP format customization mechanisms. It can be application-defined RTCP packet. Moreover, DASH Media Presentation clock reference timestamps can be included to the RTCP packet (especially sender report packet), along with the RTP clock reference timestamps and NTP clock reference timestamps.

Figure 79:
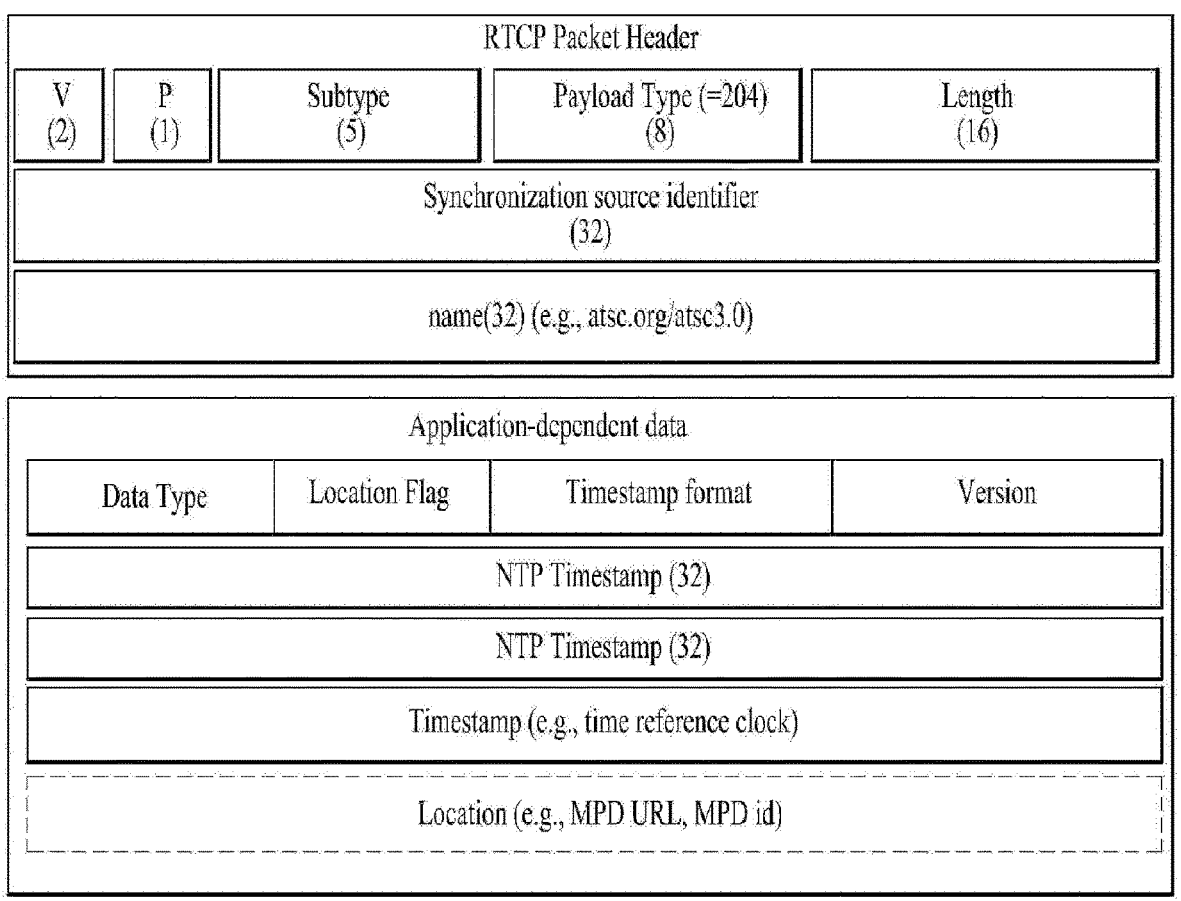
FIG. 79 illustrates, as another embodiment of the present invention, an example of application-defined RTCP packet.

FIG. 79 illustrates, as another embodiment of the present invention, an example of application-defined RTCP packet.

The application-defined RTCP packet may include V (version), P (padding), Subtype, Payload Type, Length, Name, and/or Application-dependent data. The Application-dependent data may include data type, version, Location Flag, Timestamp format, NTP timestamp, Timestamp, and/or Location.

The V (version) indicates a version of RTP protocol.

The P (padding) indicates the existence of padding bits in the payload.

The Subtype describes subtype information of RTCP packet payload.

The Payload Type indicates the type of RTCP packet payload.

The Length indicates the length of RTCP packet.

The Name include application name.

The Application-dependent data include application-dependent data.

The data type indicates the type information of application-dependent data.

The version indicates the version of this application-dependent data profile.

The Location Flag indicates existence of location field within application-dependent data.

The Timestamp format indicates the format of Timestamp field. For example, it can indicate different format as followings. For example, 0x00: reserved 0x01: media time, 0x02: NTP (Network Time Protocol), 0x03: normal playing time, 0x04: SMPTE time code, 0x05: 90 KHz based timestamp, 0x06: GPS time, 0x07-0x0F: reserved, in the case of MPEG DASH, this field can include 0x01 to indicate "media time".

The NTP timestamp includes the timestamp value of network time protocol.

The Timestamp includes time reference clock information (e.g., time scale, the time scale based presentation time stamp, etc). For example, it can include DASH Media Presentation clock reference timestamps in the case of MPEG DASH.

The Location includes related location value, e.g., DASH MPD id or URL.

Figure 80:
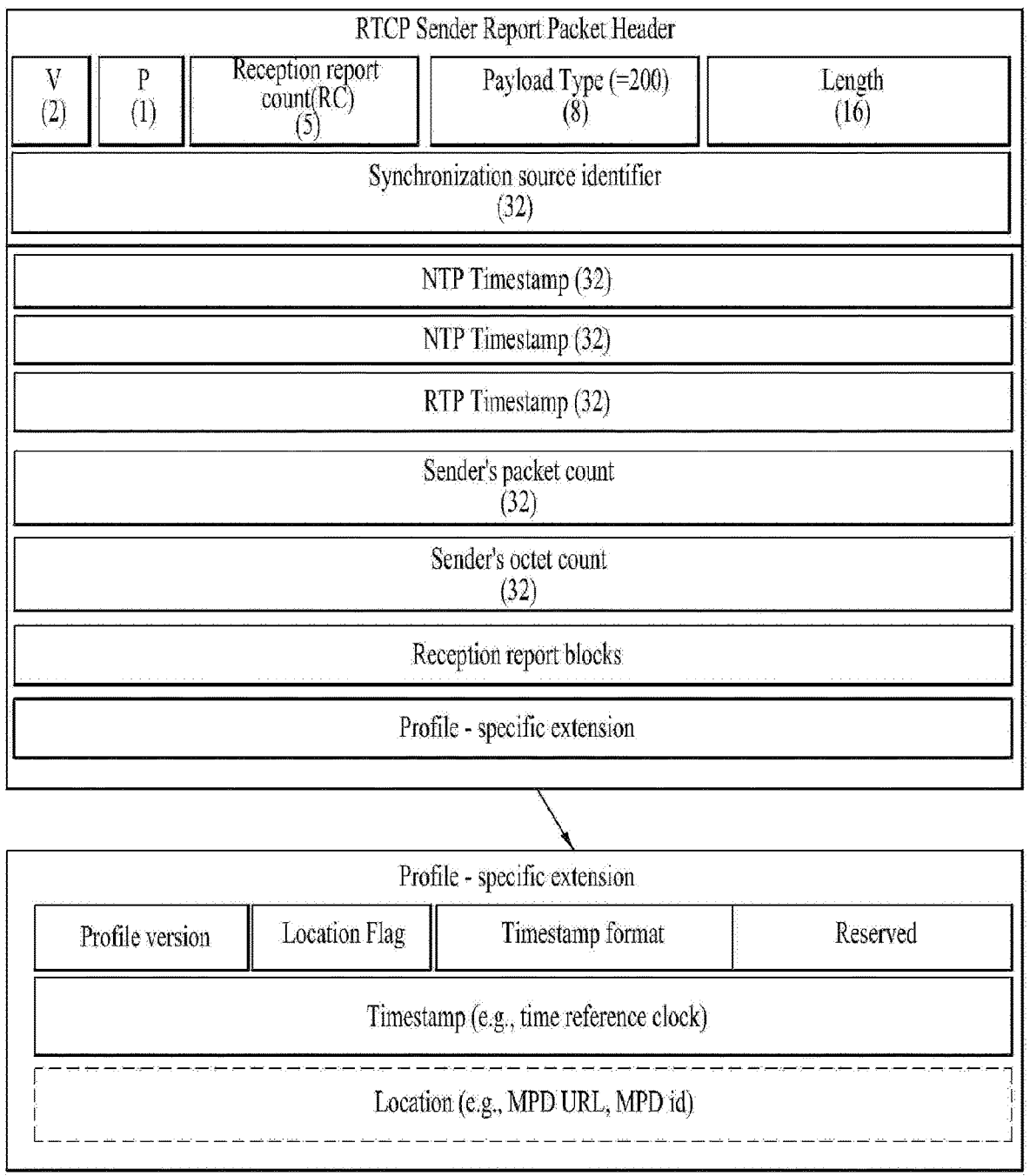
FIG. 80 illustrates, as another embodiment of the present invention, an example of the RTCP sender report packet header.

FIG. 80 illustrates, as another embodiment of the present invention, an example of the RTCP sender report packet header.

DASH Media Presentation clock reference timestamps can be included to the RTCP packets (especially sender report packets), along with the RTP clock reference timestamps and NTP clock reference timestamps.

An explanation for information included in the RTCP sender report packet may be referred from the previously described explanations.

The RTCP sender report packet may include version, Location Flag, Timestamp format, Timestamp, and/or Location.

The version indicates the profile version.

The Location Flag indicates existence of location field within profile-specific data.

The Timestamp format indicates the format of Timestamp field. For example, it can indicate different format as followings. For example, 0x00: reserved, 0x01: media time, 0x02: NTP (Network Time Protocol), 0x03: normal playing time, 0x04: SMPTE time code, 0x05: 90 KHz based timestamp, 0x06: GPS time, 0x07-0x0F: reserved.

The Timestamp includes time reference clock information (e.g., time scale, the time scale based presentation time stamp, etc. For example, it can include DASH Media Presentation clock reference timestamps in the case of MPEG DASH.

The Location includes related location value, e.g., DASH MPD id or URL.

Figure 81:
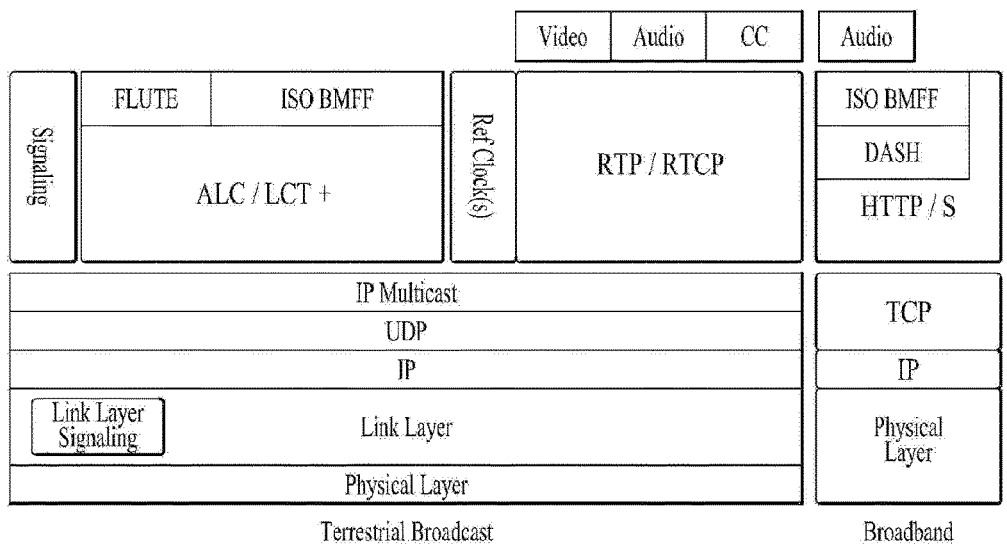
FIG. 81 illustrates, as an embodiment of the present invention, a protocol stack for a Hybrid Delivery with RTP.

FIG. 81 illustrates, as an embodiment of the present invention, a protocol stack for a Hybrid Delivery with RTP.

Another way to achieve the synchronization is to include a separate "DASH-NTP time base mapping" component in the service, delivered via broadcast or multicast, to map the DASH Media Presentation timeline to the NTP timeline.

What is being delivered via the broadcast or broadband to the receiver can consist of one broadcast IP multicast RTP stream for each of the broadcast continuous component tracks—e.g., video, audio, and closed caption (using protocol path RTP/IP-Multicast/UDP/IP), one broadcast IP multicast RTCP SR stream for each of the broadcast continuous component tracks (using protocol path RTCP/IP-Multicast/UDP/IP), one or more continuous component tracks available via broadband using DASH (using protocol path ISO BMFF/DASH/HTTP(S)/TCP/IP), and/or one broadcast IP multicast stream containing NTP time stamps and corresponding times on the DASH Media Presentation timeline. (One can think of this conceptually as an RTCP stream for the DASH component(s). Its purpose is to map the DASH Media Presentation timeline to the NTP timeline.) (using protocol path Ref-Clocks/IP-Multi cast/UDP/IP).

We can consider the following hybrid delivery use case in which one video track, one audio track, and one closed caption track are delivered via broadcast, and a second audio track is delivered via unicast broadband.

The figure shows the protocol stack for content delivery in this case. The audio track shown in gray with crosshatching is not used for the presentation.

The Receiver may use signaling to determine which audio track is to be presented (in this case the alternate audio track), get the IP multicast addresses and ports for the broadcast video and closed caption RTP/RTCP streams, get the IP multicast address and port for the DASH-NTP clock mapping stream, and/or get the URL of the MPD for the broadband DASH delivery of the alternate audio stream.

The Receiver may use the URL of the MPD to retrieve the DASH MPD.

The Receiver may extract the RTP packets for the video and closed caption tracks from the broadcast as they arrive.

The Receiver may extract the RTCP packets for the video and closed caption tracks from the broadcast as they arrive.

The Receiver may extract the NTP-DASH clock mapping packets as they arrive.

For the video and closed caption tracks, The Receiver may use the NTP time stamps N(i) and the corresponding RTP time stamps R(i) in the RTCP stream for the track to convert the presentation times in the RTP packet headers (which are relative to the RTP timeline) to presentation times relative to the NTP timeline, just as in RTP delivery.

The Receiver may use the NTP-DASH clock mapping packets to map the DASH Media presentation timeline to the NTP timeline (The time scale of both of these timelines is ordinary clock time, so it is only necessary to determine the offset between them).

The Receiver may compare the NTP time stamps in the RTCP packets with the receiver wall clock time at the point in time when the packets are received to determine any offset between the two. (A combination of delivery delay and possible discrepancy between the receiver wall clock and the server NTP clock can cause a non-zero offset.) Use this offset to adjust the presentation times in the RTP packets from the NTP Timeline to the receiver wall clock timeline, and to adjust the mapping between the DASH Media Presentation timeline and the NTP timeline to obtain a mapping between the DASH Media Presentation timeline and the receiver wall clock timeline.

The Receiver may present the access units in the RTP stream (video and closed caption tracks) at the appropriate wall clock times.

Using the mapping in the above step, The Receiver may determine the time in the DASH Media Presentation timeline that corresponds to the current receiver wall clock time. Use the MPD to determine the corresponding DASH Period, DASH Representation containing the desired audio track, DASH Segment, and URL of that Segment.

The Receiver may retrieve that DASH Segments and succeeding Segments. And Present the access units in them at the appropriate wall clock times, using the mapping in above step.

Figure 82:
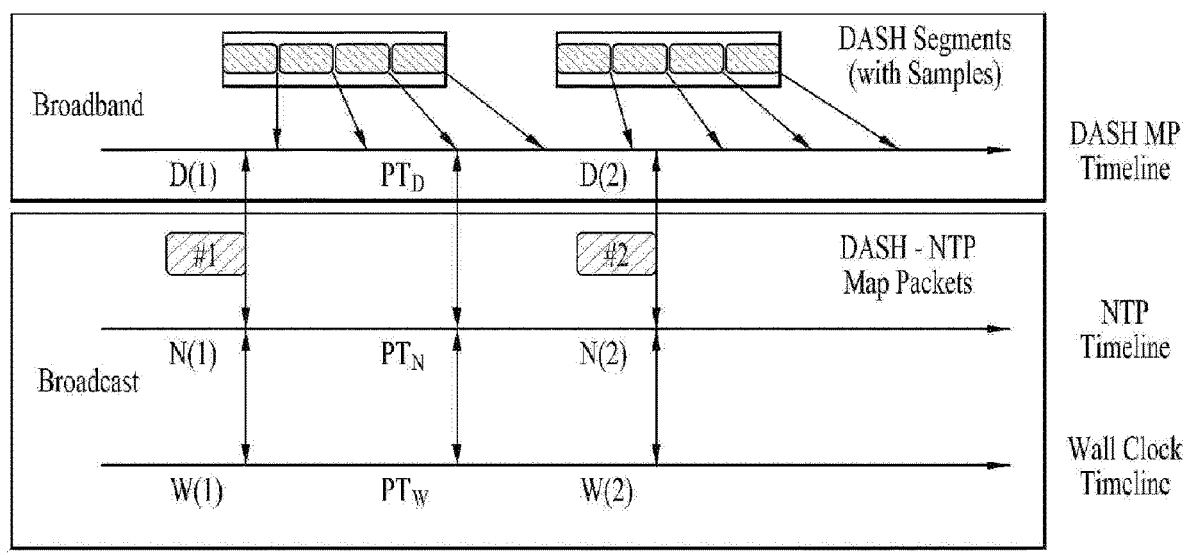
FIG. 82 illustrates, as an embodiment of the present invention, the conversion of DASH presentation times to receiver wall clock timeline.

FIG. 82 illustrates, as an embodiment of the present invention, the conversion of DASH presentation times to receiver wall clock timeline.

A presentation time PTD relative to the DASH Media Presentation timeline is converted to a presentation time PTN relative to the NTP timeline, and then to a presentation time PTW relative to wall clock time.

Figure 83:
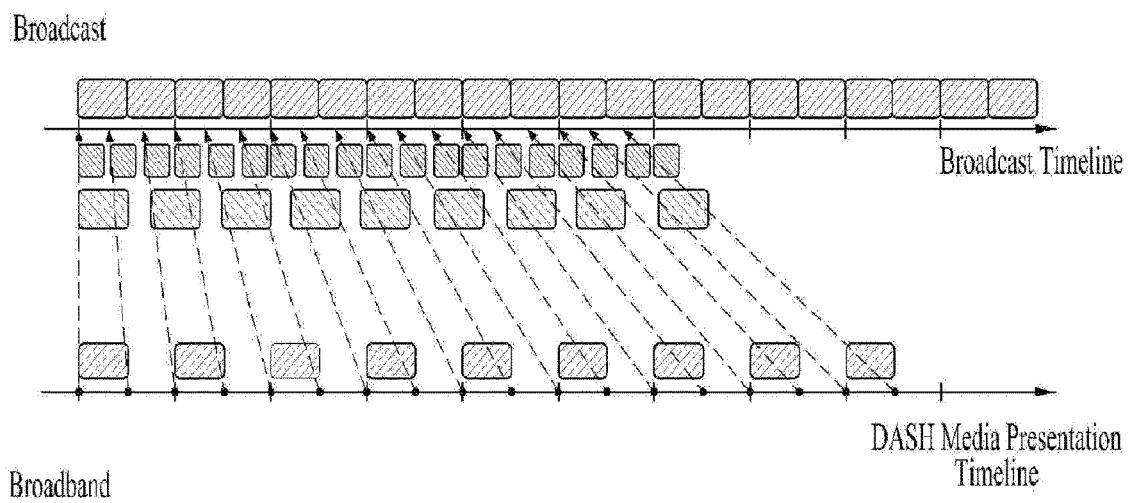
FIG. 83 illustrates, as an embodiment of the present invention, a synchronization of content delivered via DASH (unicast) with content delivered via ALC/LCT+.

FIG. 83 illustrates, as an embodiment of the present invention, a synchronization of content delivered via DASH (unicast) with content delivered via ALC/LCT+.

As stated in this document, a Broadcast Timeline can be established whenever continuous content is delivered via ALC/LCT+, to serve as the reference time base for the presentation timing information in the LCT header extension of ALC/LCT+ packets. In order to synchronize content delivered via DASH (unicast) with content delivered via ALC/LCT+ (broadcast or multicast), information necessary to establish a mapping from the DASH Media Presentation timeline to the Broadcast Timeline can be delivered in the broadcast or multicast as shown in the figure.

The information may correspond to timeline component AUs (or i.e. broadcast timeline packets, or i.e. Time Base components).

There is a possibility that streams transmitted through heterogeneous networks such as the broadcasting network and the Internet may be synchronized and used for one service in the receiver of the above-described broadcasting system. For example, as illustrated, when a video stream is transmitted through the broadcasting network and an audio stream is transmitted through the Internet, the two streams need to be synchronized, decoded and reproduced for one service. In other words, video is acquired over the broadcasting network and audio is acquired over the Internet to use one service. For example, a viewer who desires to view the same content using audio recorded in a different language from a language provided in the broadcasting network may receive the audio of the corresponding content recorded in the desired language through the Internet and use the received audio.

However, the two streams have different timelines and thus a mechanism is needed to perform mapping between the two timelines. Here, each of the timelines may indicate absolute or relative time serving as a criterion for reproduction or decoding of data or content transmitted through each transport network. In a service, content contained in video transmitted through the broadcasting network needs to be identical to content contained in audio transmitted through the Internet.

The present embodiment proposes a method and apparatus for using a timeline component for synchronization between streams transmitted through heterogeneous networks such as the broadcasting network and the Internet. A timeline component stream may include one or more timeline component access units (AUs). The timeline components AU may be contiguously disposed in the timeline component.

The timeline component AU shows an example in which a timeline of a stream transmitted through the Internet is mapped to a timeline of a stream transmitted through the broadcasting network. When a header of a packet transmitted through the broadcasting network includes information about the timeline of the stream transmitted through the broadcasting network, a timeline component AU transmissible through the broadcasting network may include timestamp information and the like such as a decoding time stamp (DTS), a presentation time stamp (PTS), and the like of a stream transmitted through a heterogeneous network (for example, the Internet). When information about a timeline of the stream transmitted through the heterogeneous network (for example, the Internet) is included in the timeline component AU, the information about the timeline of the stream transmitted through the heterogeneous network (for example, the Internet) may be packetized in the same packet structure as that of the stream transmitted through the broadcasting network. In this way, a timestamp of the stream transmitted through the broadcasting network included in the packet header may be mapped to a timestamp of the stream transmitted through the Internet on a one-to-one basis, and both the streams may be synchronized in one timeline, and decoded and reproduced.

The presentation timestamp (PTS) is a timestamp metadata field in an MPEG transport stream, MPEG program stream or similar data stream that is used to achieve synchronization of programs' separate elementary streams (for example Video, Audio, Subtitles) when presented to the viewer. The PTS is given in units related to a program's overall clock reference, either Program Clock Reference (PCR) or System Clock Reference (SCR), which is also transmitted in the transport stream or program stream.

The Decode Time Stamp (DTS) indicates the time at which an access unit should be instantaneously removed from the receiver buffer and decoded. It differs from the Presentation Time Stamp (PTS) only when picture reordering is used for B pictures. If DTS is used, PTS may be provided in the bit stream.

The above description may be applied to a case in which streams transmitted through one network use different timelines. For example, when the above-described scheme is used, a relay service provider, who collects streams transmitted through a plurality of heterogeneous networks and provides the streams to viewers, does not need to directly perform reprocessing for synchronization of different streams.

The timeline component AU may be expressed in another format such as XML or the like. The timeline component AU may include identifier information, version information, AU_length information, location_flag information, PTS_flag information, DTS_flag information, media_time_flag information, NTP_time_flag information, PTP_time_flag information, timecode_flag information, PCR_time_flag information, location_length information, location information, timescale information, media_time_PTS information, media_time_DTS information, NTP_time_PTS information, NTP_time_DTS information, PTP_time_PTS information, PTP_time_DTS information, timecode_PTS information, timecode_DTS information, PCR_time_PTS information, and/or PCR_time_DTS information.

The identifier information is an identifier that uniquely indicates a structure of the timeline component AU.

The version information may indicate lengths of timestamp fields such as a lower PTS, DTS and the like. For example, the length may correspond to 64 bits when the version information has a value of 1, and correspond to 32 bits when the version information has a value of 0.

The AU_length information indicates a length of the timeline component AU.

The location_flag information indicates whether the timeline component AU includes location information of a stream transmitted through an external network.

The PTS_flag information indicates whether the timeline component AU includes a PTS value.

The DTS_flag information indicates whether the timeline component AU includes a DTS value.

The media_time_flag information indicates whether a timestamp having a media time format is included.

The NTP_time_flag information indicates whether a timestamp having an NTP format is included.

The PTP_time_flag information indicates whether a timestamp having a PTP format is included.

The timecode_flag information indicates whether a timestamp having a society of motion picture and television engineers (SMPTE) time code format is included.

The PCR_time_flag information indicates whether a PCR-based timestamp of an MPEG-2 TS is included.

The location_length information indicates a length of a location field.

The location information indicates a URL or a unique ID of a stream transmitted through a heterogeneous network. When the location information indicates the unique ID, the location information may be used by being linked to information such as signaling data or the like.

The timescale information indicates a media timescale. The timescale information is information for identifying a unit of time indicated by other information.

The media_time_PTS information indicates a PTS expressed in a media time format.

The media_time_DTS information indicates a DTS expressed in a media time format.

The NTP_time_PTS information indicates a PTS expressed in an NPT format.

The NTP_time_DTS information indicates a DTS expressed in an NPT format.

The PTP_time_PTS information indicates a PTS expressed in a PTP format.

The PTP_time_DTS information indicates a DTS expressed in a PTP format.

The PTP_time_PTS or PTP_time_DTS information can have a size either one
32 bits, 64 bits or 80 bits.
The timecode_PTS information indicates a PTS expressed in an SMPTE time
code format.
The timecode_DTS information indicates a DTS expressed in an SMPTE time
code format.
The PCR_time_PTS information indicates a PTS expressed in a PCR format.
The PCR_time_DTS information indicates a DTS expressed in a PCR format.

According to an embodiment of the present invention, the receiver may synchronize a stream transmitted through the broadcasting network with a stream transmitted through a heterogeneous network by applying at least one timestamp information included in the timeline component AU to a stream in an external network which is identified by the location information.

The timeline component AU may be expressed in another format such as XML or the like. The timeline component AU may include identifier information, version information, AU_length information, location_flag information, PTS_flag information, DTS_flag information, timestamp_version_flag information, timestamp_type information, location_length information, location information, timescale information, media_time_PTS information, media_time_DTS information, timestamp_type_PTS information, and/or timestamp_to_DTS information (or timestamp_type_DTS information).

Description of information corresponding to the same term as that of the information included in syntax of the timeline component AU described above is replaced by the above description.

The timestamp_version_flag information indicates a timestamp format of a timeline to be mapped. For example, it is possible to indicate that a 32-bit format is to be used when the timestamp_version_flag information has a value of 0, and a 64-bit format is to be used when the timestamp_version_flag information has a value of 1.

The timestamp_type information indicates a type of a timestamp of a timeline to be mapped. For example, the timestamp_type information indicates that the type corresponds to a media time when the information has a value of 0x00, indicates that the type corresponds to NTP when the information has a value of 0x01, indicates that the type corresponds to PTP when the information has a value of 0x02, and indicates that the type corresponds to a time code when the information has a value of 0x03. When the information has a value of 0x04-0x1F, the type may be defined later, and the value may be reserved.

The timescale information may indicate a timescale that expresses a media time of a timeline to be mapped. For example, in an MPEG-2 TS, the timescale may have a value of 90K.

The media_time_PTS information may indicate a presentation timestamp of a timeline to be mapped, that is, a media time with respect to a point in time at which reproduction is performed. The media_time_PTS information may be indicated by a 32-bit format when a timestamp_version_flag value is 0, and indicated by a 64-bit format when the value is 1.

The media_time_DTS information may indicate a decoding timestamp of a timeline to be mapped, that is, a media time with respect to a point in time at which decoding is performed. The media_time_DTS information may be indicated by a 32-bit format when a timestamp_version_flag value is 0, and indicated by a 64-bit format when the value is 1.

The timestamp_type_PTS information may indicate a presentation timestamp according to a timestamp_type of a timeline to be mapped, that is, a point in time at which reproduction is performed. The timestamp_type_PTS information may be indicated by a 32-bit format when a timestamp_version_flag value is 0, and indicated by a 64-bit format when the value is 1. For example, when a timestamp_type field value indicates NTP, a timestamp_type_PTS field value may have a timestamp value for an NTP-based reproduction time point.

The timestamp_type_DTS information may indicate a decoding timestamp according to a timestamp_type of a timeline to be mapped, that is, a point in time at which decoding is performed. The timestamp_type_DTS information may be indicated by a 32-bit format when a timestamp_version_flag value is 0, and indicated by a 64-bit format when the value is 1. For example, when a timestamp_type field value indicates an NTP, a timestamp_type_PTS field value may have a timestamp value for an NTP-based decoding time point.

In the above-described synchronization scheme through sharing of a timeline between transport streams transmitted through heterogeneous networks using the timeline component, the timeline may be shared by mapping a timestamp of a packet header of a broadcasting network transport stream to a timestamp of an Internet transport stream included in a timeline component AU of a packet payload on a one-to-one basis.

However, timestamp-related information may not be present in a header of the broadcasting network transmission packet.

As in the figure, when the timestamp-related information is not present in the header of the transmission packet, additional information for an origin timestamp in a timeline is needed. The timeline may be shared between the broadcasting network and the Internet by mapping the origin timestamp to the timestamp of the Internet transport stream on a one-to-one basis.

Information related to the origin timestamp and the timestamp of the transport stream in the heterogeneous network (for example, the Internet) may be included in the timeline component AU.

The origin timestamp may be defined as a timestamp on a reference timeline. For example, in the above-described embodiment, a timestamp for the stream transmitted through the broadcasting network may be defined as the origin timestamp.

Syntax of the timeline component AU according to another embodiment of the present invention may include information related to the origin timestamp in addition to syntax of the timeline component AU described above.

The timeline component AU may include identifier information, version information, AU_length information, location_flag information, origin_PTS_flag information, origin_DTS_flag information, origin_PTS information, origin_DTS information, location_length information, PTS_flag information, DTS_flag information, media_time_flag information, NTP_time_flag information, PTP_time_flag information, timecode_flag information, PCR_time_flag information, location_URL_length information, location_URL information, timescale information, media_time_PTS information, media_time_DTS information, NTP_time_PTS information, NTP_time_DTS information, PTP_time_PTS information, PTP_time_DTS information, time-code_PTS information, timecode_DTS information, PCR_time_PTS information, and/or PCR_time_DTS information.

Description of information corresponding to the same term as that of the information included in syntax of the timeline component AU described above is replaced by the above description.

The origin_PTS_flag information indicates whether the timeline component AU includes an origin_PTS value.

The origin_DTS_flag information indicates whether the timeline component AU includes an origin DTS value.

The origin_PTS information indicates a PTS of a current packet on a reference base timeline of timeline mapping.

The origin_DTS information indicates a DTS of a current packet on a reference base timeline of timeline mapping.

The location_URL_length information indicates a length of the location_URL information.

The location_URL information may indicate a URL of a stream transmitted through a heterogeneous network, or an identifier that uniquely identifies the stream transmitted through the heterogeneous network.

The receiver may acquire a timeline component AU from a packet payload of a transport stream in the broadcasting network, and parse origin_PTS information and/or origin_DTS information in the timeline component AU to acquire timestamp information for the transport stream in the broadcasting network based on the parsed information. The receiver may synchronize a transport stream of the broadcasting network with a transport stream of a heterogeneous network using information related to the timestamp of the transport stream in the broadcasting network acquired through the origin_PTS information and/or the origin_DTS information and a timestamp for the heterogeneous network included in the timeline component AU.

Figure 84:
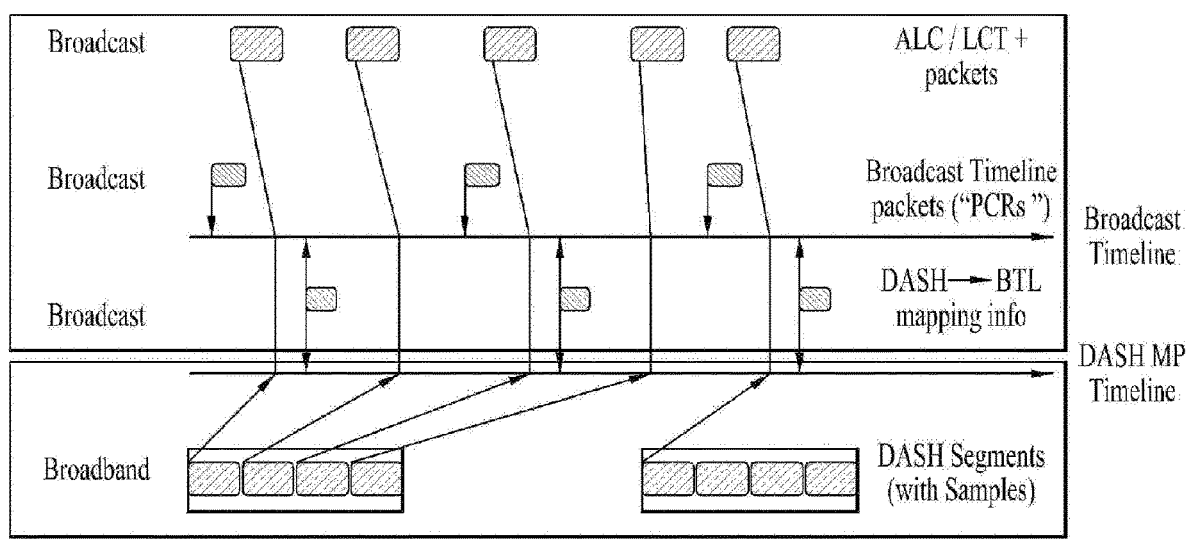
FIG. 84 illustrates, as an embodiment of the present invention, a way of the synchronization of content delivered via DASH (unicast) with content delivered via ALC/LCT+.

FIG. 84 illustrates, as an embodiment of the present invention, a way of the synchronization of content delivered via DASH (unicast) with content delivered via ALC/LCT+.

Each continuous media component delivered via ALC/LCT+ can have broadcast timeline clock reference timestamps in ALC extension headers, or a separate broadcast "Time Base" component of the service can deliver broadcast timeline clock reference timestamps at appropriate intervals.

In the case when broadcast timeline clock reference timestamps are included in ALC extension headers, corresponding DASH Media Presentation timeline reference timestamps can be included along with them, to provide a mapping from the DASH Media Presentation timeline to the broadcast timeline.

In the case when broadcast clock reference timestamps are included in a separate Broadcast Time Base component of the service, corresponding DASH Media Presentation timeline reference timestamps can be included in the separate Broadcast Time Base component along with them, to provide a mapping from the DASH Media Presentation timeline to the broadcast timeline.

What is being delivered via the broadcast or broadband to the receiver can consist of one broadcast IP multicast stream containing clock reference time stamps for a "broadcast time line" and corresponding time stamps for the DASH Media Presentation timeline of the alternate audio stream that is available via unicast broadband using DASH (using protocol path Ref-Clocks/IP-Multicast/UDP/IP), one broadcast ISO BMFF stream for each of the continuous component tracks (e.g., video, audio, and closed caption). Each ISO BMFF file can be delivered as an ALC/LCT+ object (using protocol path ISO BMFF/ALC/LCT+/IP-Multicast/UDP/IP), and/or one or more continuous component tracks available via broadband using DASH (using protocol path ISO BMFF/DASH/HTTP(S)/TCP/IP).

For one broadcast IP multicast stream containing clock reference time stamps for a "broadcast time line" and corresponding time stamps for the DASH Media Presentation timeline of the alternate audio stream that is available via unicast broadband using DASH, the time scale of the time line is ordinary clock time; e.g., the clock could be just UTC time at the server expressed in some suitable format (perhaps NTP format).

For one broadcast ISO BMFF stream for each of the continuous component tracks (e.g., video, audio, and closed caption), ALC/LCT+ packets that contain the start of an ISO BMFF file have an LCT extension header giving the start time for the time line of the ISO BMFF file, relative to the "broadcast time line". If it is necessary to associate a URL with each ISO BMFF file (for example, if an MPD is used for signaling), each ISO BMFF file can have an HTTP-style header containing a Content-Location field. Or ALC/LCT+ packets that contain the start of an ISO BMFF file can have an LCT extension header containing an associated URL.

We can consider the following hybrid delivery use case in which one video track, one audio track, and/or one closed caption track are delivered via broadcast, and a second audio track is delivered via unicast broadband.

Figure 85:
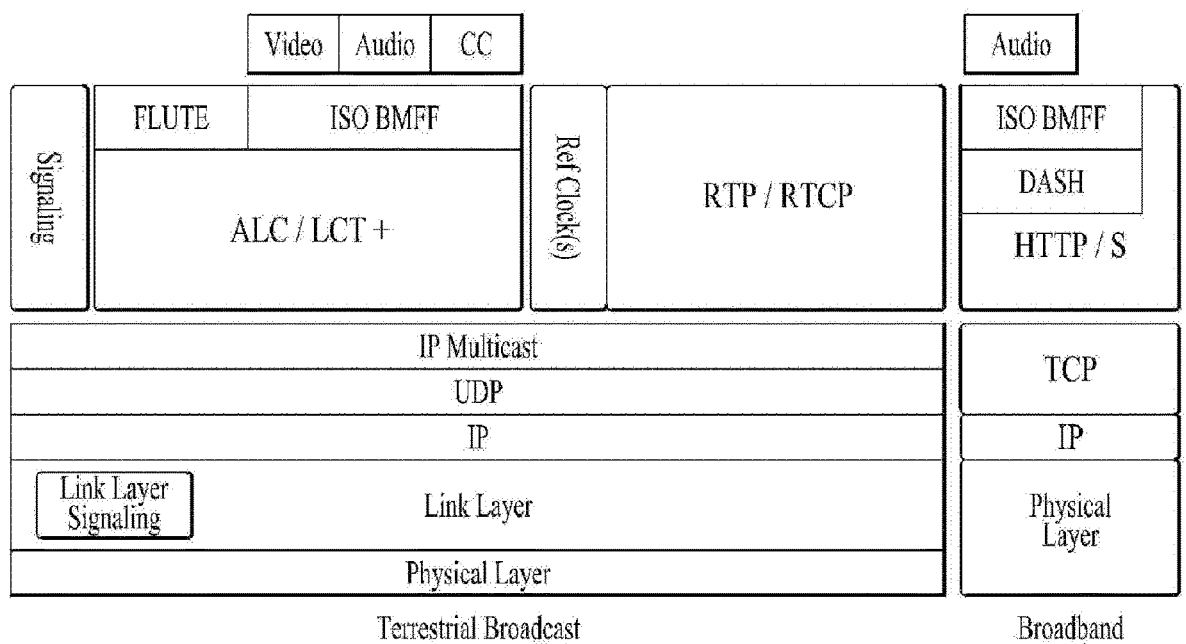
FIG. 85 illustrates, as an embodiment of the present invention, a protocol stack for Hybrid Delivery with ISO BMFF over ALC/LCT+.

FIG. 85 illustrates, as an embodiment of the present invention, a protocol stack for Hybrid Delivery with ISO BMFF over ALC/LCT+

The audio track shown in gray with crosshatching is not used for the presentation.

The receiver may use signaling to determine which audio track is to be presented (in this case the alternate audio track), get the IP multicast addresses and ports and the TSI values for the ALC/LCT+ sessions carrying the video and closed caption tracks, get the IP multicast address and port for the clock reference/mapping stream, and/or get the URL of the MPD for the broadband DASH delivery of the alternate audio stream.

The receiver may use the URL of the MPD to retrieve the DASH MPD.

The receiver may extract the time stamps from the clock reference/mapping stream as they appear, and use them to determine the offset between the "broadcast timeline" and the receiver "wall clock" timeline, and to determine the offset between the DASH Media Presentation timeline and the "broadcast timeline". This results in a mapping from the DASH Media Presentation timeline to the receiver "wall clock" timeline.

The receiver may extract the broadcast ISO BMFF files for the video and closed caption tracks from the broadcast as they appear.

The receiver may use the presentation time stamp in the ALC/LCT+ extension header of each BMFF file, adjusted by the offset determined in above step, to set the wall clock start time for the time line of each ISO BMFF file.

The receiver may present the access units in the broadcast BMFF files at the appropriate times, based on the wall clock start time for each ISO BMFF file and the internal timing information in the file.

Using the timeline mapping obtained in above step, the receiver may determine the time in the DASH Media Presentation timeline that corresponds to the current receiver wall clock time. Use the MPD to determine the corresponding DASH Period, DASH Representation containing the desired audio track, DASH Segment, and URL of that Segment. And retrieve the appropriate DASH segments and present them at the appropriate wall clock times.

Above two methods can be applied when other transport protocols are used for broadcast channel.

The broadcast system may provide a broadcast content in which real-time continuous content and NRT files are combined for presenting more information for the viewers.

To synchronize the play-out of continuous content from non-real-time files with continuous content delivered in real-time, the general approach to synchronization can be to map the timeline of the file-based content to the timeline of the real-time continuous content.

For example, the synchronization can be to map the time line of the file-based content to the NTP time base in the RTP case or to the Broadcast Timeline in the ISO BMFF over ALC/LCT case of broadcast/multicast content. Similarly, if it is desired to synchronize the play-out of continuous content from files with continuous content delivered via unicast, the general approach will be to map the time line of the file-base content to the DASH media presentation time line.

How the timeline of the file-based content is determined can depend on the file format. In order to specify a synchronization mechanism, it is necessary to require the clock rate of the file-based timeline, and the presentation time of the first presentation unit in the file relative to this timeline. How this information about the timeline of the file-based content is determined will depend on the file format. The timeline specifies a clock rate and a start time corresponding to the first presentation unit in the file, and that all the presentation units in the file have a presentation time relative to this timeline.

The appropriate timeline mapping information can be signaled. The NTP time, Broadcast Timeline time, or DASH media presentation timeline time that corresponding to the beginning of the file can be signaled. The will allow the presentation time of any presentation unit in the file to be computed relative to this timeline.

The broadcast system may encode service signaling data and transmit to the receiver where the service signaling data is used to acquire the broadcast contents.

One way that service signaling could be handled is to define new service signaling data structures that reflect the service model, and specify a suitable mechanism for delivery of such signaling. Such data structures would need to include a way to reference DASH MPD files in order to support real-time unicast delivery of continuous components.

Another way that service signaling could be handled is to use DASH MPD structures to signal all continuous components delivered in real-time, and augment this with some data structures to signal other categories of components.

The described methods of the present inventions may be performed in the transmitter or the receiver described above.

Although the description of the present invention is explained with reference to each of the accompanying drawings for clarity, it is possible to design new embodiment(s) by merging the embodiments shown in the accompanying drawings with each other. And, if a recording medium readable by a computer, in which programs for executing the embodiments mentioned in the foregoing description are recorded, is designed in necessity of those skilled in the art, it may belong to the scope of the appended claims and their equivalents.

An apparatus and method according to the present invention may be non-limited by the configurations and methods of the embodiments mentioned in the foregoing description.

And, the embodiments mentioned in the foregoing description can be configured in a manner of being selectively combined with one another entirely or in part to enable various modifications.

In addition, a method according to the present invention can be implemented with processor-readable codes in a processor-readable recording medium provided to a network device. The processor-readable medium may include all kinds of recording devices capable of storing data readable by a processor. The processor-readable medium may include one of ROM, RAM, CD-ROM, magnetic tapes, floppy discs, optical data storage devices, and the like for example and also include such a carrier-wave type implementation as a transmission via Internet. Furthermore, as the processor-readable recording medium is distributed to a computer system connected via network, processor-readable codes can be saved and executed according to a distributive system.

It will be appreciated by those skilled in the art that various modifications and variations can be made in the present invention without departing from the spirit or scope of the inventions. Thus, it is intended that the present invention covers the modifications and variations of this invention provided they come within the scope of the appended claims and their equivalents.

Both apparatus and method inventions are mentioned in this specification and descriptions of both of the apparatus and method inventions may be complementarily applicable to each other.

Various embodiments have been described in the best mode for carrying out the invention.

The present invention is available in a series of broadcast signal provision fields. It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A receiver for synchronizing components delivered on different transport networks, the receiver comprising:
   a broadband network interface configured to receive broadband data including at least one audio component for a service via a broadband path, wherein the at least one audio component relates to a Dynamic Adaptive Streaming over HTTP (DASH) segment;
   a broadcast network interface configured to receive a broadcast signal including a video component for the service, first timing information for the at least one audio component, and second timing information for the video component via a broadcast path, wherein the broadcast signal further includes a MPD (Media Presentation Description) having a DASH representation containing a segment URL for the DASH segment delivered over broadband; and
   a processor configured to calculate an offset based on a receiver wall clock, and process at least one of the at least one audio component or the video component which is time-aligned based on the calculated offset.

2. The receiver of claim 1, wherein the first timing information and the second timing information are included in an adaptation set level or a representation level of DASH MPD.

3. The receiver of claim 2, wherein the DASH segment is generated based on an ISO BMFF (Base Media File Format).

4. The receiver of claim 3, wherein the service is a collection of continuous media components.

5. A method for synchronizing components delivered on different transport networks in a receiver, the method comprising:
   receiving, by the receiver, broadband data including at least one audio component for a service via a broadband path, wherein the at least one audio component relates to a Dynamic Adaptive Streaming over HTTP (DASH) segment;
   receiving, by the receiver, a broadcast signal including a video component for the service, first timing information for the at least one audio component, and second timing information for the video component via a broadcast path, wherein the broadcast signal further includes a MPD (Media Presentation Description) having a DASH representation containing a segment URL for the DASH segment delivered over broadband;
   calculating an offset based on a receiver wall clock; and
   processing at least one of the at least one audio component or the video component which is time-aligned based on the calculated offset.

6. The method of claim 5, wherein the first timing information and the second timing information are included in an adaptation set level or a representation level of DASH MPD.

7. The method of claim 6, wherein the DASH segment is generated based on an ISO BMFF (Base Media File Format).

8. The method of claim 7, wherein the service is a collection of continuous media components.

* * * * *